United States Patent
Otsuji et al.

[11] Patent Number: 6,080,833
[45] Date of Patent: Jun. 27, 2000

[54] LOW-BIREFRINGENT ORGANIC OPTICAL COMPONENT AND A SPIROBIINDAN POLYMER

[75] Inventors: Atsuo Otsuji; Keisuke Takuma; Rihoko Suzuki; Tatsuhiro Urakami; Toshihiro Motoshima, all of Kanagawa; Wataru Yamashita, Fukuoka; Tomomi Yoshimura, Kanagawa; Atsushi Shibuya, Kanagawa; Yoshihiro Sakata, Kanagawa; Hideaki Oikawa, Kanagawa; Masahiro Ohta, Kanagawa; Masanobu Ajioka, Kanagawa; Masatoshi Takagi, Kanagawa; Akio Karasawa, Kanagawa, all of Japan

[73] Assignee: Mitsui Chemicals, Inc., Tokyo, Japan

[21] Appl. No.: 08/896,008

[22] Filed: Jul. 17, 1997

[30] Foreign Application Priority Data

| Jul. 31, 1996 | [JP] | Japan | 8-201825 |
| Aug. 2, 1996 | [JP] | Japan | 8-204614 |
| Aug. 2, 1996 | [JP] | Japan | 8-204615 |
| Dec. 12, 1996 | [JP] | Japan | 8-331831 |
| Dec. 12, 1996 | [JP] | Japan | 8-331832 |
| Dec. 12, 1996 | [JP] | Japan | 8-331833 |

[51] Int. Cl.$^7$ ........................................ C08G 64/00
[52] U.S. Cl. ..................... 528/201; 528/196; 528/198; 528/298
[58] Field of Search ................ 528/201, 196, 528/198, 298

[56] References Cited

U.S. PATENT DOCUMENTS 4,734,482  3/1988  Tamai et al. ........................ 528/185

FOREIGN PATENT DOCUMENTS

| 0287887 | 10/1988 | European Pat. Off. . |
| 0621297 | 10/1994 | European Pat. Off. . |
| WO88/06606 | 9/1988 | WIPO . |

OTHER PUBLICATIONS

Patent Abstracts of Japan, vol. 15, No. 398 (C–0874), Oct. 9, 1991 & JP03162413A (Idemitsu Kosan Co. Ltd.), Jul. 12, 1991, *abstract*.

*Primary Examiner*—Duc Truong
*Attorney, Agent, or Firm*—Burns, Doane, Swecker & Mathis, L.L.P.

[57] ABSTRACT

A low-birefringent organic optical component comprising a polymer prepared by polymerizing a racemic mixture of the monomer with an asymmetric spiro ring represented by general formula (1) as an essential ingredient;

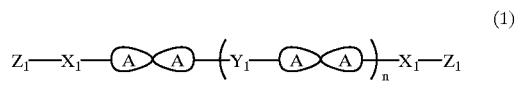

wherein ring A represents a monocyclic or polycyclic organic group, wherein two ring As are mutually bound each other via a spiro bond to form a spiro ring which has a molecular asymmetric structure; n is an integer of 0 to 10; $X_1$ and $Y_1$ are binding groups; and $Z_1$ is a polymerization-active group. The component has excellent transparency, mechanical strength and heat resistance, as well as a low birefringence.

24 Claims, 4 Drawing Sheets

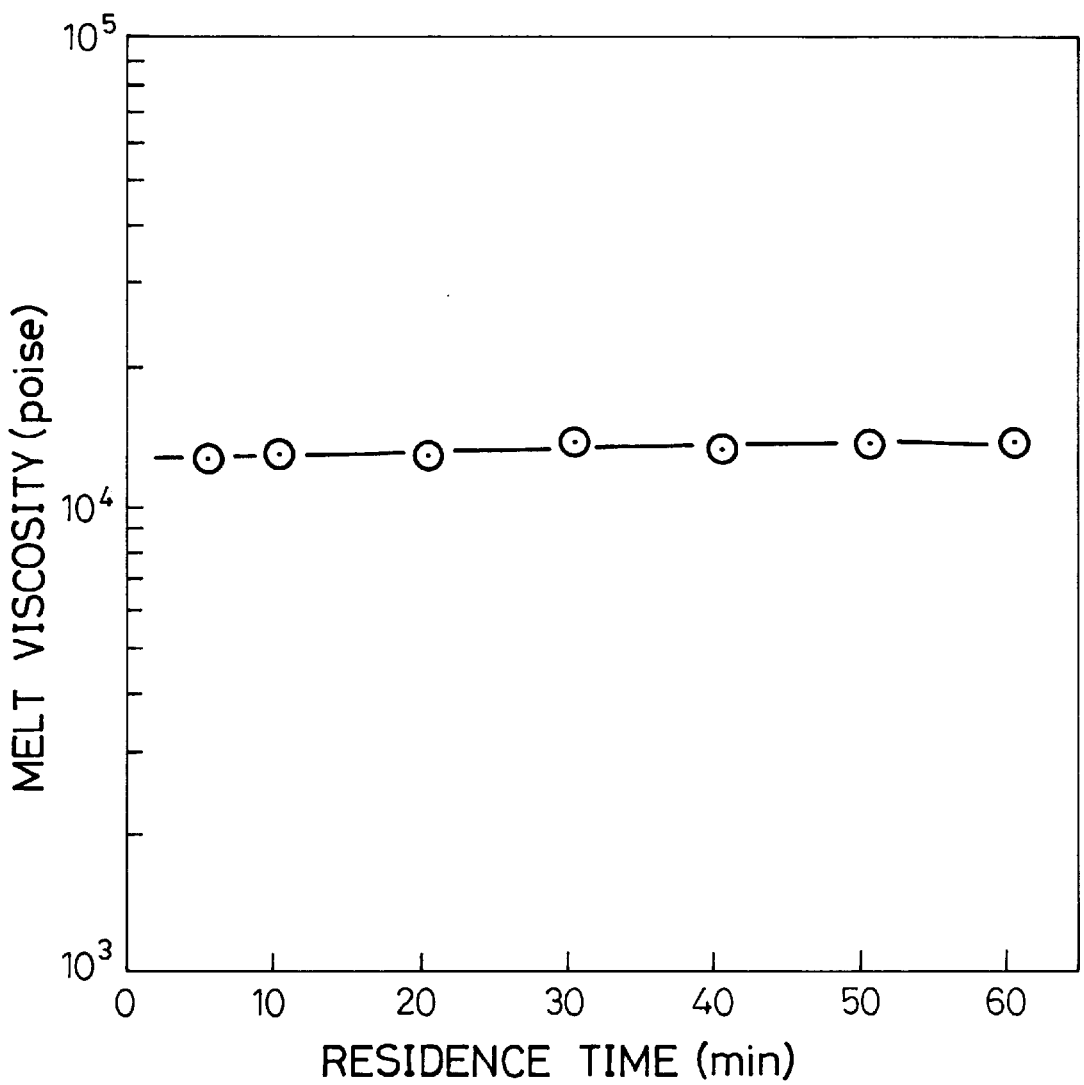
F I G. 4

LOW-BIREFRINGENT ORGANIC OPTICAL COMPONENT AND A SPIROBIINDAN POLYMER

BACKGROUND OF THE INVENTION

1. Field of the Invention

This invention relates to a low-birefringent organic optical component and a polymer with a spirobiindan structure. The low-birefringent organic optical component of this invention has excellent transparency, mechanical strength and heat resistance as well as a low birefringence, which is useful as, for example, a substrate for an optical disk, a pick-up lens, a plastic substrate for a liquid cell and a prism.

2. Description of the Related Art

Inorganic glasses have a number of excellent physical properties such as excellent transparency and a reduced optical anisotropy, and thus have been used in various fields. The glasses, however, have problems such as fragility due to their heavy weight and a poor productivity, leading to recent intensive attempts for developing a transparent polymer as a substitute for an inorganic glass.

A transparent polymer such as poly(methyl methacrylate) and polycarbonate has excellent transparency, mechanical properties such as shock resistance, processability and moldability, which has been, therefore, used in various applications such as transparent components of a car and a lens, as an alternative to an inorganic glass.

Meanwhile, an optical disk on which information such as sounds, images and texts is recorded and reproduced using a laser beam, has been rapidly extended in its use. In an optical disk used as an information recording medium, a laser beam passes through the disk body during its use. Thus, the disk is required to be optically transparent, and is strongly required to be optically homogeneous for reducing reading errors of an information. When using a conventional polymer such as polycarbonate and poly(methyl methacrylate), there occurs a problem that a residual stress generated by some factors such as temperature distribution, molecular orientation and volume variation near a glass-transition temperature generated by cooling and fluidizing processes of a resin during casting a disk substrate, may cause a birefringence when a laser beam passes through the disk substrate. Large optical heterogeneity due to the birefringence may become a fatal defect for an optical component such as an optical disk substrate because it may cause significant problems such as reading errors of a recorded information. Hence, an optical component, typically an optical disk substrate, is required to be made from a material with better optical characteristics than any of conventional polymers, e.g., a low birefringence and excellent transparency and heat resistance.

For dealing with the above problems, JP-A 63-314235 has disclosed a low-birefringent polycarbonate from a spiro compound such as a homopolymeric polycarbonate of spirobiindanol or a copolymeric polycarbonate of spirobiindanol and bisphenol-A. However, the former polycarbonate has a low birefringence, but is practically problematic due to its poor transparency and mechanical strength, while in the latter polycarbonate, increase of bisphenol-A improves transparency and mechanical strength, but increases the birefringence, leading to limiting its applications as an optical component. Thus, it has been strongly desired to solve these conflicting problems.

JP-A 3-162413 has suggested a polymer such as a polycarbonate having a spirobichroman structure as a material with a low birefringence. However, the polymer is also practically problematic due to its poor transparency and mechanical strength, although a homopolymeric polycarbonate of a spirobichroman derivative has a low birefringence. Furthermore, for a copolymeric polycarbonate of a spirobichroman derivative and bisphenol A, increase of bisphenol A causes increase of birefringence although it improves transparency and mechanical strength. Thus, it has been desired to solve these conflicting problems.

Polyimides are well known as an engineering plastic with a high heat resistance. Polyimides, however, have good heat resistance, but a high birefringence. For example, the polyimide described in JP-A 8-504967 may be used as an optical material, but has a birefringence of at least 0.01 level which is not adequately low. Furthermore, according to "PHOTO-SENSITIVE POLYIMIDE—Fundamentals and Applications", edited by KAZUYUKI HORIE and TAKASHI YAMASHITA TECHNOMIC PUBLISHING COMP., p. 300 (1995), commercially available polyimides have a birefringence of at least 0.1; even a special fluorinated polyimide indicates a birefringence of 0.01 level. Thus, these may significantly improve heat resistance, but considerably limit their use as an optical component.

Aromatic polyimides are also known as an engineering plastic. However, optical properties, particularly a refractive index and a birefringence, have not been described very much for aromatic polyimides, and thus, substantially no data on the properties are available.

A polyimide can be prepared by reaction of a diamine with a tetracarboxylic dianhydride, and is excellent in some properties such as heat resistance, mechanical strength, chemical resistance, dimensional stability, incombustibility and electric insulation. Hence, polyimides have been extensively used in the fields of electric and electronic devices. In particular, they are anticipated to be more extensively and more largely used, in the fields requiring good heat resistance and electric insulation.

Polyimides have a high heat resistance and a high chemical resistance. It is advantageous in terms of its application to an optical component, while it is not necessarily advantageous in terms of processability. For example, Kapton or Vespel (DuPont) and Upilex (Ube Industries Ltd.), represented by formulas (A) and (B), are well-known polyimides.

Since these polyimides are insoluble, infusible and less processable, special and inefficient molding techniques such as compression and cutting or solution film casting of a polyamide acid as a precursor for a polyimide, have been used to prepare a molding or film.

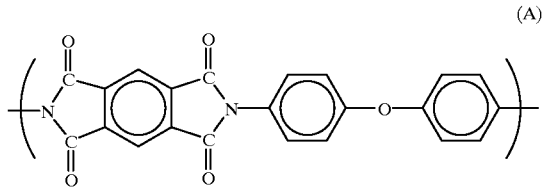

(A)

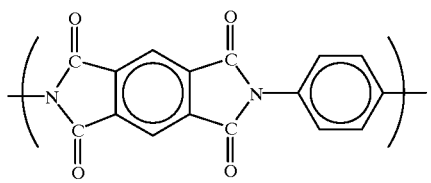
(B)

To solve the above problems, Ultem (G. E.; U.S. Pat. Nos. 3,847,867 and 3,847,869), a polyetherimide represented by formula (C) has been developed. This polyetherimide can be subject to melt processing, and is soluble in a general solvent such as amides, phenols and halogenated hydrocarbons and thus has excellent processability as a solution. The polyetherimide, however, has a glass-transition temperature of about 215° C., indicating an inadequate heat resistance.

The heat-resistant adhesive polyimide represented by formula (F) is also known (JP-B 5-74637). The polyimide has the same level of heat resistance and thermal plasticity as those of formulas (D) and (E), as well as exhibits sufficient solubility in a solvent to be processable by melt processing and solution molding depending on selection of the group R;

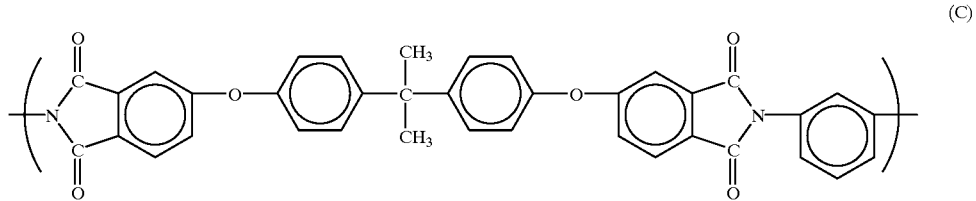
(C)

The polyimides represented by formulas (D) and (E) (both are manufactured by Mitsui Toatsu Chemicals Inc.; JP-As 62-205124 and 2-18419) are known as those which has high heat resistance and can be subject to melt process. These polyimides have a glass-transition temperature of 250° C. level, indicating a better heat resistance than the above polyetherimide (C) and can be subject to melt process, but has a poor solubility in a solvent and thus is difficult to be processed as a solution.

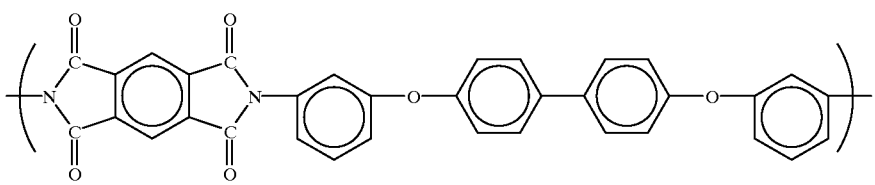
(D)

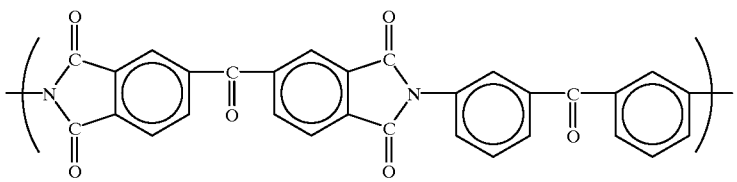
(E)

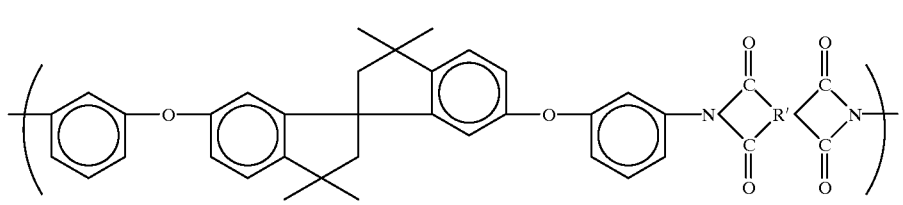

(F)

wherein R' represents a particular tetravalent aromatic group.

However, as aircraft and space instruments as well as electric and electronic devices will be advanced, higher heat resistance, i.e., a high glass-transition temperature, will be desired.

The above polyetherimide of formula (C) and the polyimide of formula (D) have a number of bending groups in their principal chain for improving melt fluidity and solubility. Increasing the number of bending groups generally results in increase of coefficient of linear thermal expansion of the resin itself. Since a resin with a low coefficient of linear thermal expansion is required in the field of electronic materials wherein fine processing is desired, the above polyimide of the prior art is not desirable.

Polyimides are anticipated to be more extensively and more largely used, in the fields of electric and electronic devices, especially in the fields requiring good heat resistance and electric insulation.

Recently, microelectronics have been markedly developed in electric and electronic fields. In particular, research and development of an insulating material for a multilayer circuit board has been extensively attempted. Polyimides, among the organic materials used in these fields, are preferably used as an insulating film because these are particularly excellent in heat resistance and dimensional stability and have a lower dielectric constant compared with an inorganic material. However, the dielectric constants of the commercially available polyimide resins are, for example, 3.6/1 kHz for a polyimide prepared from 4,4'-diaminodiphenyl ether and pyromellitic dianhydride (Trade Name: Kapton or Vespel); 3.5/1 kHz for a polyimide prepared from metadiaminobenzene and 3,3',4,4'-biphenyltetracarboxylic dianhydride (Trade Name: Upilex); and 3.7/1 kHz for a polyimide from 3,3'-diaminobenzophenone and 3,3',4,4'-benzophenonetetracarboxylic dianhydride (Trade Name: LARC-TPI).

Polyimide resins have been already used as an insulating material for a flexible printed board, but because of increasing integration of an electronic circuit, improvement in electric characteristics such as a lower dielectric constant has been desired. Specifically, an insulating material with a low dielectric constant of below 3.0, preferably about 2.8, is desired because, for example, for a large computer, using a multilayer circuit board makes it inevitable to transmit a signal at a high speed, while the signal transmission speed is inversely proportional to the dielectric constant of the board material, and thus the high dielectric constant of the board material causes delay in signal transmission, inhibiting speed-up. Since polyimides are used in an interlayer insulating film with a multilayer wiring structure, necessity for a polyimide with a low dielectric constant has been paid more attention in the light of the above reasons.

Teflon (DuPont) is a well-known resin with a low dielectric constant, while a variety of polyimides having a low dielectric constant have been developed as an engineering polymer having good properties such as heat resistance. Introduction of fluorine atoms or fluoroalkyl groups are known as a technique for giving a polyimide a low dielectric constant; specifically, such a low dielectric constant has become possible by using a fluorine-containing aromatic diamine or aromatic acid dianhydride as described by A. K. St. Clair et al. in NASA, U.S.A. (Polymeric Materials Science and Engineering, 59, 28–32 (1988)) and in EP 0299865. However, for the polyimides of the prior art, no descriptions are found with regard to molding processability such as melt process. Similarly, the polyimides described in U.S. Pat. No. 5,089,593 are difficult to be subject to melt processing because the diamine has an amino group at a para position to the bonding position and thus the overall polyimides are rigid and do not give melting fluidity when the acid anhydride is rigid.

Furthermore, colorless and transparent engineering plastics with a low dielectric constant have been extensively developed. The polycarbonate represented by formula (G) is well-known as a highly colorless and transparent resin.

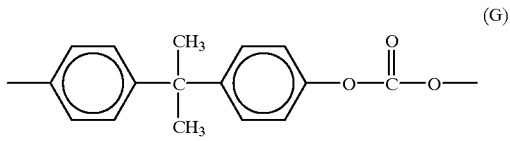

(G)

The resin has a low glass-transition temperature of about 150° C., indicating insufficient heat resistance.

The polyethersulfone (PES) represented by formula (H) is also well known as a transparent resin.

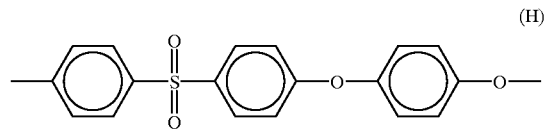

(H)

However, since the resin has a sulfone group which is highly water-absorptive, it is not preferable as a material for electric or electronic field where moisture should be eliminated.

Polyimides have been resins with dark reddish-brown to yellow, but a variety of polyimides which is colorless and transparent have recently been developed. For example, the polyimide represented by formula (I) has an excellent yellowness index (e.g., JP-A 1-182324).

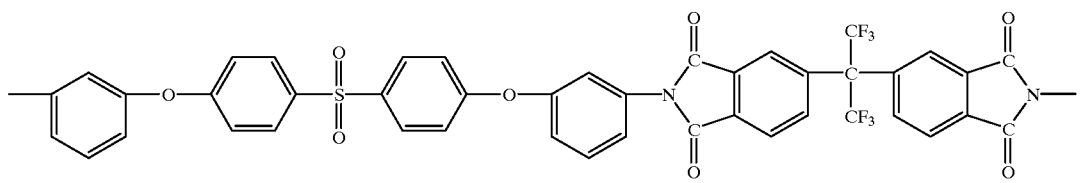

(I)

However, this polyimide also has a problem of water absorptivity because of having a sulfone group like the above PES.

Furthermore, the above polyimides of NASA (A. K. St. Clair et al., Polymeric Materials Science and Engineering, 59, 28–32 (1988)) and EP 0299865 have a number of bending groups in their principal chain, and increase of the number of bending groups generally causes increase of the coefficient of linear thermal expansion of the resin itself. Since a resin with a low coefficient of linear thermal expansion is required in the field of electronic materials to which a fine processing is expected, the above polyimides of the prior art are not preferable.

SUMMARY OF THE INVENTION

This invention is for solving the above problems and its objectives are to provide an organic optical component with good transparency, mechanical strength and heat resistance as well as a low birefringence, and to provide a variety of spirobiindan polymers useful as the optical component.

Another objective of this invention is to provide a fluorine-containing polyimide which comprehensively meets the demands for a low dielectric constant, a low water absorptivity, colorlessness and transparency, a low coefficient of linear thermal expansion and molding processability; a polyimide having high heat resistance, i.e., a high glass-transition temperature, a low water absorptivity and a low coefficient of linear thermal expansion, while retaining good molding processability in melt processing and solution molding; and a polyimide and a polyamide with excellent transparency, mechanical strength and heat resistance, showing a low birefringence and a low optical loss.

We have intensively attempted to solve the above problems, and have found a low-birefringent organic optical polymer component excellent in transparency, mechanical strength and heat resistance; a spirobiindan polymer having a particular structure useful as an optical component; a novel polyimide or polyamide which may be used in the optical component, to achieve this invention.

This invention relates to a low-birefringent organic optical component, comprising a polymer prepared by polymerizing a racemic mixture of the monomer with an asymmetric spiro ring represented by Formula (1), as an essential ingredient;

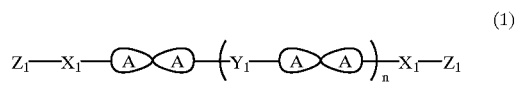

(1)

wherein ring A represents a monocyclic or polycyclic organic group, wherein two ring As are mutually bound via a spiro bond to form a spiro ring which has a molecular asymmetric structure; n is an integer of 0 to 10; $X_1$ and $Y_1$ are binding groups; $Z_1$ is a polymerization-active group.

This invention also relates to the above low-birefringent organic optical component wherein a racemic mixture of the monomer with an asymmetric spiro ring is represented by any of the general formulas (2) to (4);

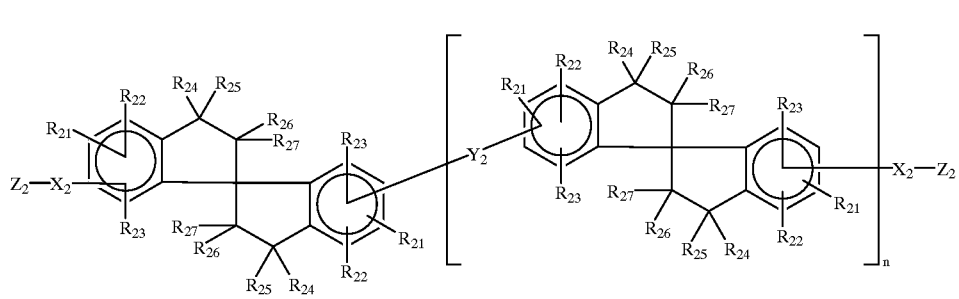

(2)

wherein $R_{21}$, $R_{22}$, $R_{23}$, $R_{24}$, $R_{25}$, $R_{26}$ and $R_{27}$ are independently hydrogen atom, a halogen atom, an alkyl group, an alkoxy group or trifluoromethyl group; n is an integer of 0 to 10; $X_2$ and $Y_2$ are bonding groups; $Z_2$ is a polymerization-active group;

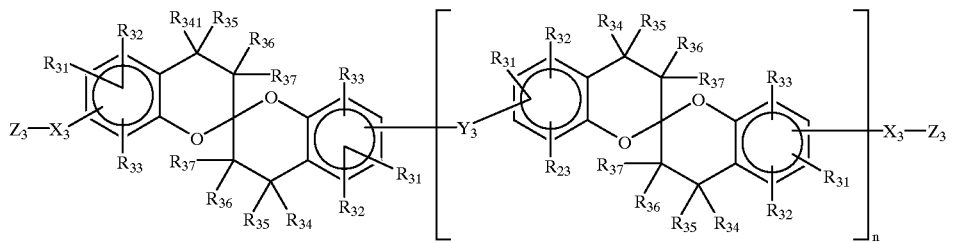

wherein $R_{31}$, $R_{32}$, $R_{33}$, $R_{34}$, $R_{35}$, $R_{36}$ and $R_{37}$ are independently hydrogen atom, a halogen atom, an alkyl group, an alkoxy group or trifluoromethyl group; n is an integer of 0 to 10; $X_3$ and $Y_3$ are bonding groups; $Z_3$ is a polymerization-active group;

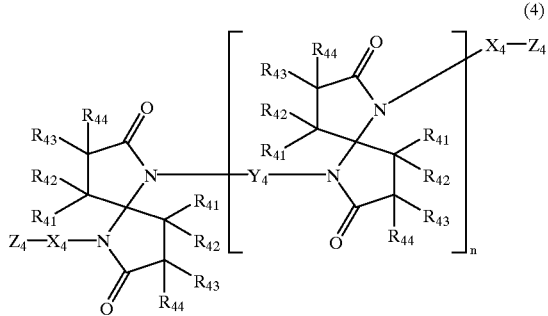

wherein $R_{41}$, $R_{42}$, $R_{43}$ and $R_{44}$ are independently hydrogen atom, a halogen atom, an alkyl group, an alkoxy group or trifluoromethyl group; n is an integer of 0 to 10; $X_4$ and $Y_4$ are bonding groups; $Z_4$ is a polymerization-active group.

This invention also relates to a low-birefringent organic optical component wherein the polymer prepared by polymerizing the racemic mixture of a monomer represented by general formula (2) as an essential ingredient is any of the following (i) to (xi);

(i) a polycarbonate comprising a structural unit derived from the dihydroxy compound represented by formula (5);

wherein $R_1$ represents an optionally substituted straight, branched or cyclic alkyl group, an optionally substituted straight, branched or cyclic alkoxy group, nitro group, or a halogen atom; $R_2$ is independently hydrogen atom or methyl group; k is an integer of 0 to 3; l and m are independently an integer of 0 to 20; and l+m is not zero;

(ii) a polymer prepared by polymerizing the acrylate compound represented by formula (6);

(5)

$$HO\left(CH-CH_2-O\right)_l \text{[structure]} \left(O-CH_2-CH\right)_m OH$$

with $R_2$ substituents, $(R_1)_k$ groups, and $H_3C$, $CH_3$ groups on indane units.

(6)

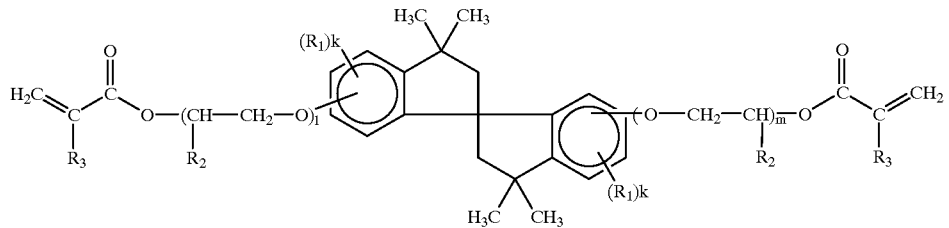

wherein $R_1$, $R_2$, k, l and m are as defined above, $R_3$ is independently hydrogen atom or methyl group;

(iii) a polyester comprising the structural unit represented by formula (7);

(7)

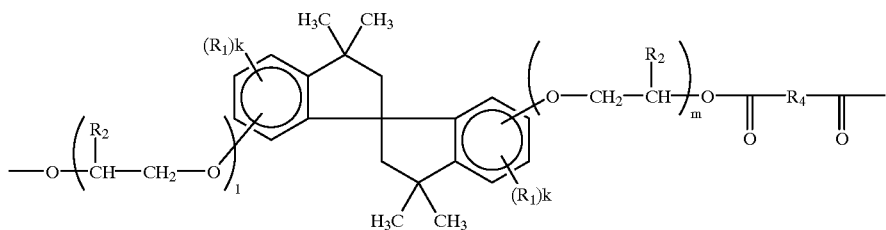

wherein $R_1$, $R_2$, k, l and m are as defined above, $R_4$ is an alkylene, aralkylene or arylene group; and l+m is not zero;

(iv) a polyurethane comprising the structural unit represented by formula (8);

(8)

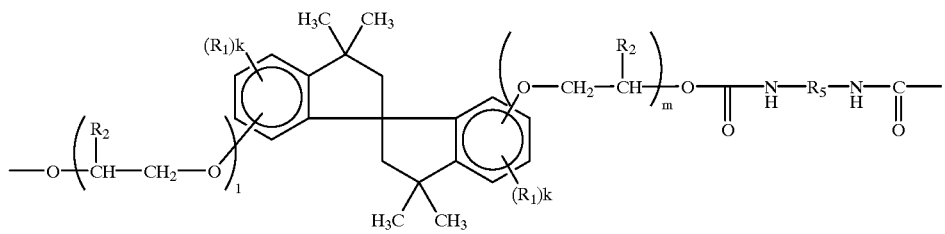

wherein $R_1$, $R_2$, k, l and m are as defined above, $R_5$ is a bivalent organic group; and l+m is not zero;

(v) a polymer prepared by polymerizing the epoxy compound represented by formula (9);

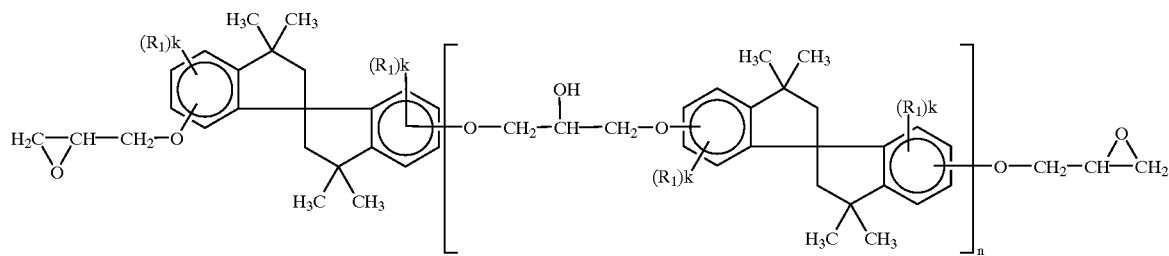

(9)

wherein $R_1$ and k are as defined above; p is an integer of 0 to 10;

(vi) a polymer prepared by polymerizing the epoxy acrylate compound represented by formula (10);

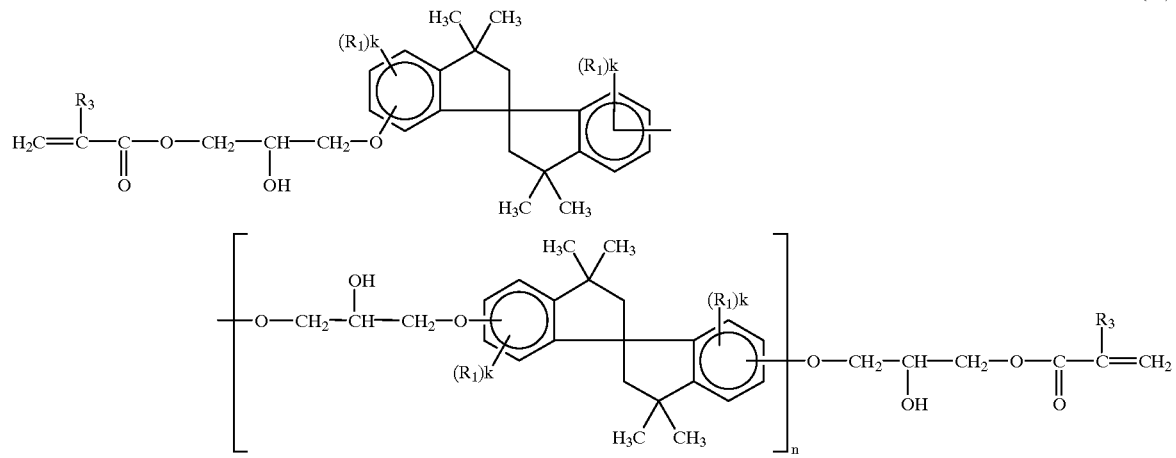

(10)

wherein $R_1$, $R_3$, k and p are as defined above;

(vii) a polymer prepared by polymerizing an acid-modified epoxy acrylate compound which is obtained by reaction of the epoxyacrylate compound represented by formula (10) with a carboxylic acid or its anhydride;

(viii) a polymer prepared by polymerizing the vinyl ether compound represented by formula (11);

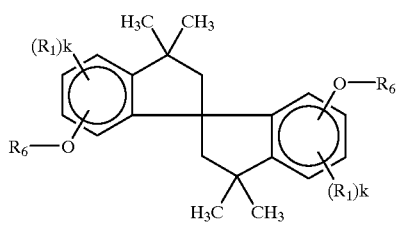

(11)

wherein $R_1$ and k are as defined above; $R_6$ is hydrogen atom or $CH_2=CH-O-R_7-$ group wherein $R_7$ represents an alkylene group with 1 to 12 carbons or 2-hydroxytrimethylene group; two $R_6$s may be the same or different although they are not simultaneously hydrogen atom;

(ix) a copolymeric polycarbonate comprising the structural unit represented by formula (12);

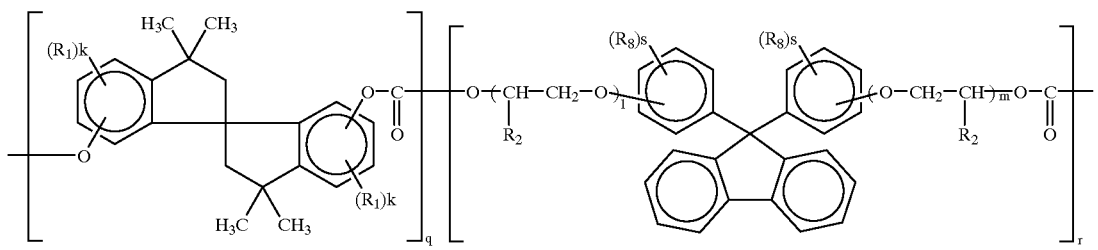

(12)

wherein $R_1$, $R_2$, k, l and m are as defined above, $R_8$ is an alkyl group; q and r are independently an integer of 0 to 20; and s is an integer of 0 to 4;

(x) a polyimide resin comprising the structural unit represented by formula (13);

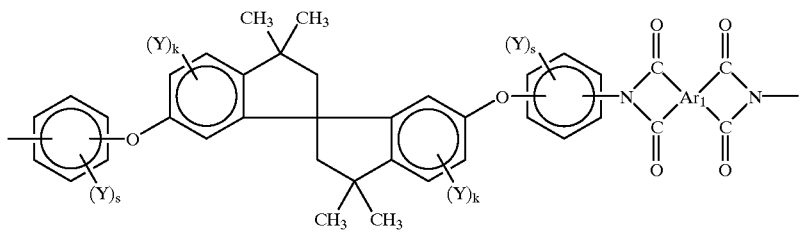

(13)

where Y is a monovalent group selected from an alkyl or alkoxy group with 1 to 3 carbons; phenyl, phenoxy, benzyl or naphthyl group; or the group represented by general formula (a) or (b);

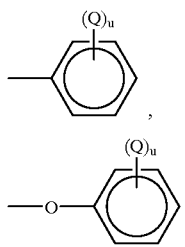

(a)

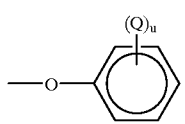

(b)

wherein Q is a monovalent group selected from a halogen atom, an alkyl or alkoxy group with 1 to 3 carbons, or the group represented by an halogenated or alkoxy group wherein hydrogen atoms are partially or completely substituted by halogen atoms; Q may be the same or different; u is an integer of 0 to 5;

Y may be the same or different; k and s are as defined above; $Ar_1$ is a tetravalent group represented by formula (c), (d) or (e);

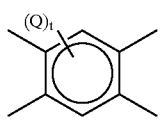

(c)

-continued

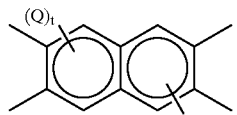

(d)

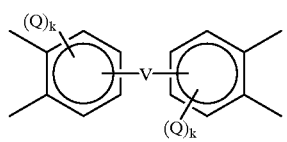

(e)

wherein Q and k are as defined above; t is an integer of 0 to 2; V is a bivalent group selected from a direct bond, —CO—, —S—, —O—, —SO$_2$—, —CH$_2$—, —C(CH$_3$)$_2$—, —C(CF$_3$)$_2$— or the group represented by general formula (f) or (g);

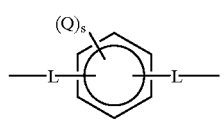

(f)

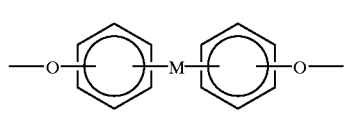

(g)

wherein Q and s are as defined above; L is a bivalent group selected from a direct bond, —CO—, —S— or —O—; M is bivalent group selected from a direct bond, —CO—, —S—, —O—, —SO$_2$—, —CH$_2$—, —C(CH$_3$)$_2$— or —C(CF$_3$)$_2$—;

(xi) a polyamide resin comprising the structural unit represented by formula (14);

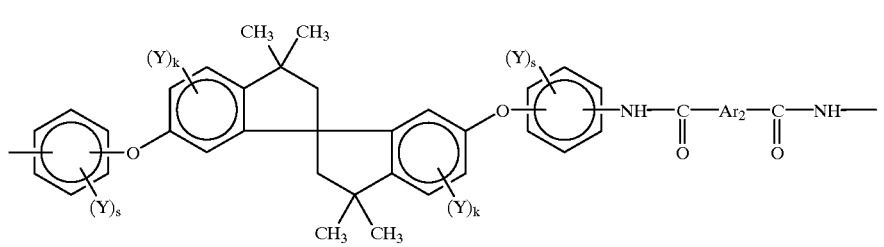
(14)

wherein Y, k and s are as defined above; Ar$_2$ is a bivalent group represented by formula (h), (i) or (j);

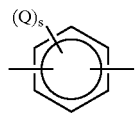
(h)

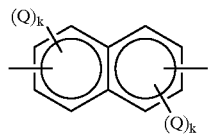
(i)

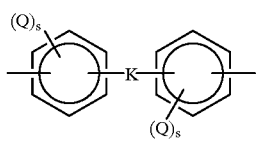
(j)

wherein Q, k and s are as defined above; K is a bivalent group selected from a direct bond, —CO—, —S—, —O—, —SO$_2$—, —CH$_2$—, —C(CH$_3$)$_2$—, —C(CF$_3$)$_2$—, or the group represented by formula (f), (g), (k) or (l);

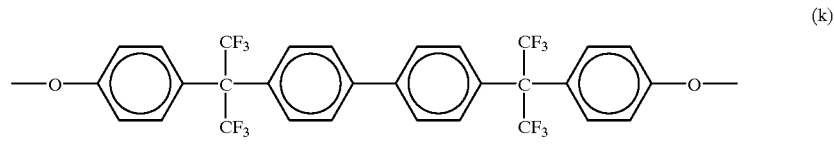
(k)

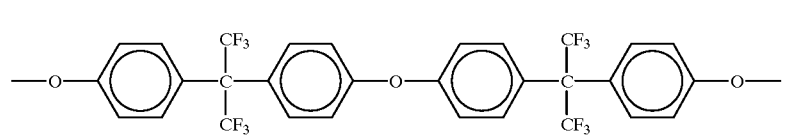
(l)

This invention also relates to;

a novel polycarbonate comprising a structural unit derived from the dihydroxy compound represented by formula (5);

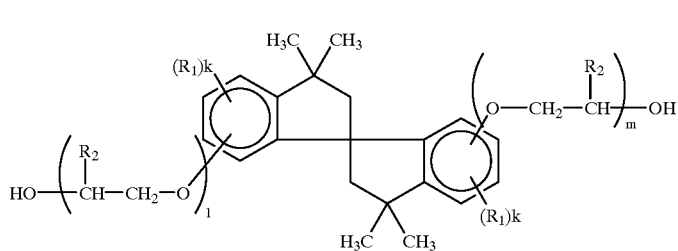

(5)

wherein $R_1$, $R_2$, k, l and m are as defined above;
a novel acrylate compound represented by formula (6);

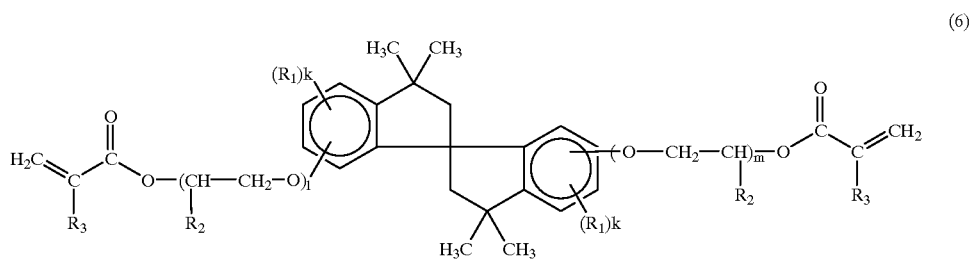

(6)

wherein $R_1$, $R_2$, $R_3$, k, l and m are as defined above;
a novel polyester comprising the structural unit represented by formula (7);

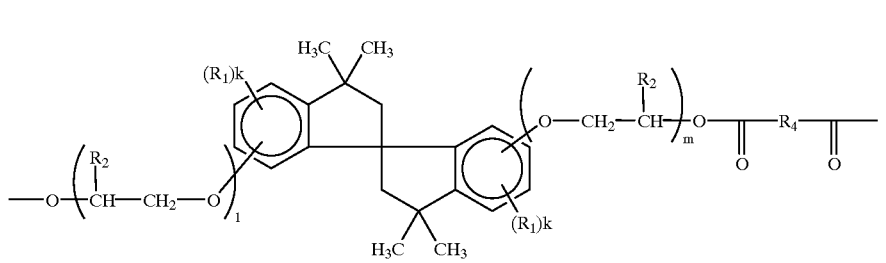

(7)

wherein $R_1$, $R_2$, $R_4$, k, l and m are as defined above.
A novel polyurethane comprising the structural unit represented by formula (8);

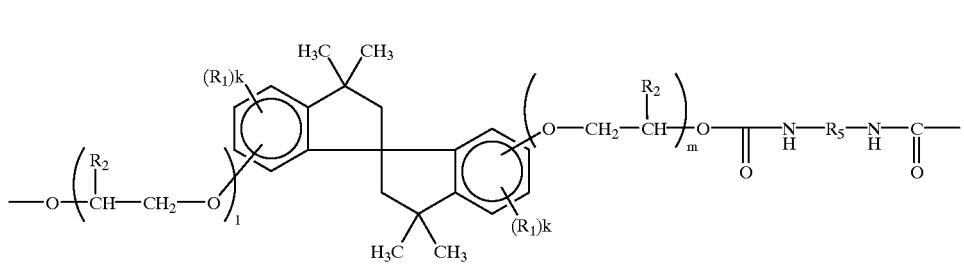

(8)

wherein $R_1$, $R_2$, $R_5$, k, l and m are as defined above;
a novel vinyl ether compound represented by formula (11);

(11)

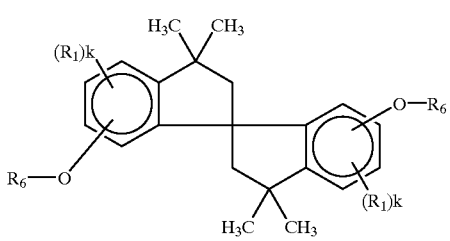

wherein $R_1$, $R_6$ and k are as defined above;
a novel copolymeric polycarbonate comprising the structural unit represented by formula (12);

wherein W is a direct bond, —O—, —S—, —CO—, —SO$_2$—, —C(CH$_3$)$_2$— or —C(CF$_3$)$_2$—; T is fluorine atom, or a fluoroalkyl or fluoroalkoxy group; T may be the same or different; k is as defined above, although W is —C(CF$_3$)$_2$— when k is zero;

(o)

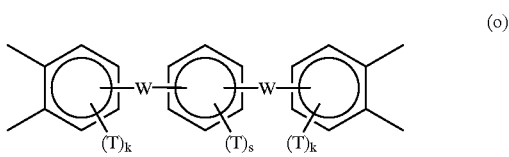

(12)

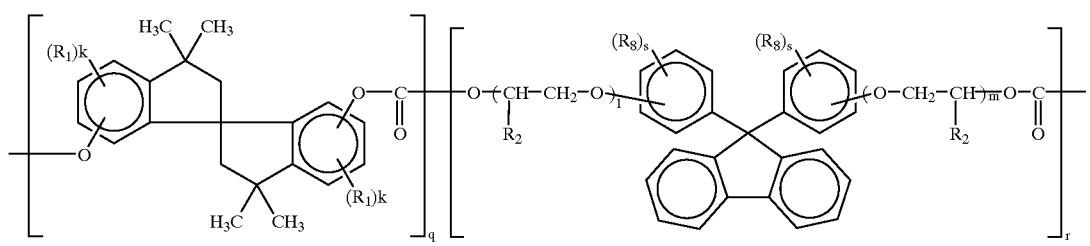

wherein $R_1$, $R_2$, $R_8$, k, l, m, q, r and s are as defined above;
a novel fluorine-containing polyimide comprising the structural unit represented by formula (15);

(15)

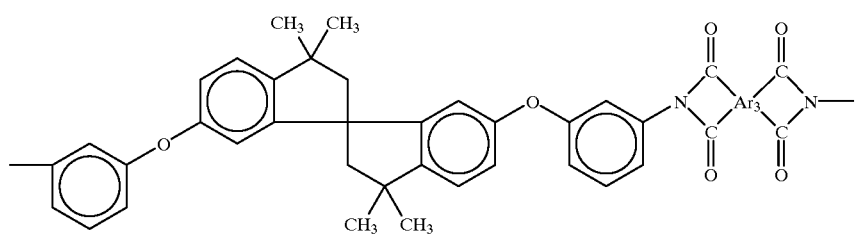

wherein Ar$_3$ is the group represented by formula (m), (n), (o) or (p);

(m)

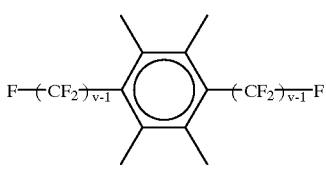

wherein v is an integer equal to or higher than 1;

(n)

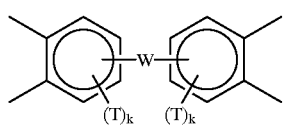

wherein W, T, k and s are as defined above, although W is —C(CF$_3$)$_2$— when k and s are simultaneously zero;

(p)

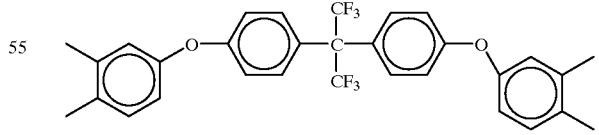

a polyimide comprising the structural unit represented by formula (16);

(16)

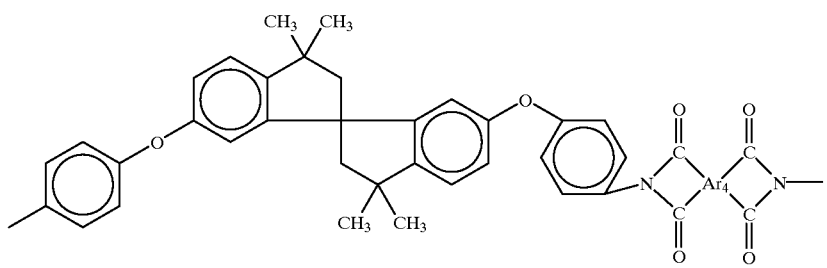

wherein Ar₄ is a tetravalent group selected from the group consisting of a monocyclic aromatic group represented by general formula (q), a fused polycyclic aromatic group represented by general formula (r) and a non-fused polycyclic aromatic group wherein the aromatic rings represented by general formula (s) is mutually linked directly or via a crosslinking member;

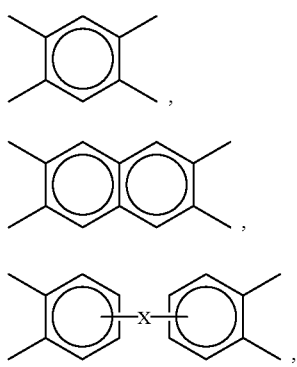

(q)

(r)

(s)

(u)

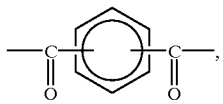

(v)

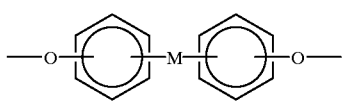

wherein M is a direct bond, —CO—, —O—, —S—, —SO₂—, —CH₂—, —C(CH₃)₂— or —C(CF₃)₂—;

a polyimide with a logarithmic viscosity of at least 0.01 dL/g and up to 3.00 dL/g, comprising the structural unit represented by formula (17);

(17)

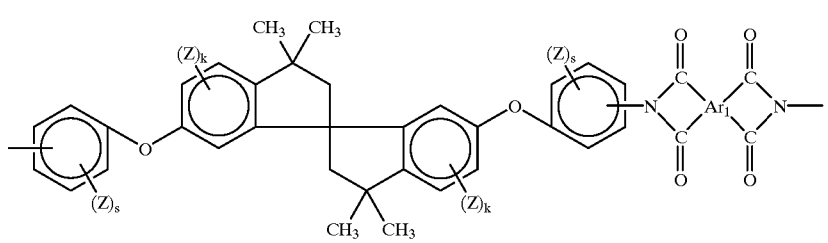

wherein X is a bivalent group selected from a direct bond, —CO—, —O—, —S—, —SO₂—, —CH₂—, —C(CH₃)₂—, —C(CF₃)₂—, or the group represented by formula (t), (u) or (v);

(t)

wherein Z is a monovalent group selected from an alkyl or alkoxy group with 1 to 3 carbons; phenyl, phenoxy, benzyl or naphthyl group; or the group represented by general formula (a), (b) or (w);

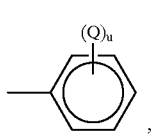

(a)

-continued

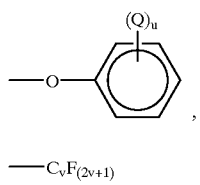

(b)

—$C_vF_{(2v+1)}$ (w)

wherein Q and u are as defined above, and v is an integer of 0 to 4;

$Ar_1$, k and s are as defined above, although the total of k and s is at least 1; and a polyamide with a logarithmic viscosity of at least 0.01 dL/g and up to 3.00 dL/g, comprising the structural unit represented by formula (18);

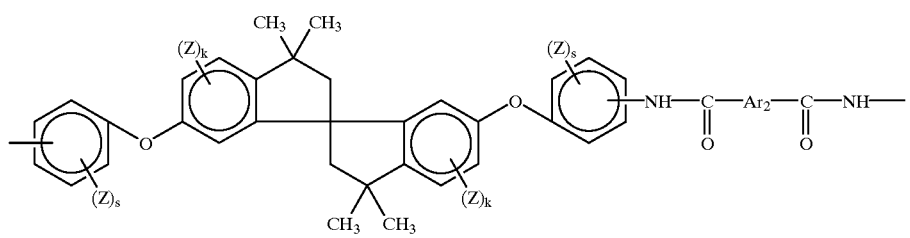

(18)

wherein $Ar_2$, Z, k and s are as defined above, although the total of k and s is at least 1.

As for the above polymers, this invention also relates to a polyimide whose polymer end represented by formula (15), (16) or (17) is an unsubstituted aromatic ring or an aromatic ring substituted by a group inert to an amine or a dicarboxylic anhydride, and relates to a polyamide whose polymer end represented by formula (18) is protected by a monoamine and/or a dicarboxylic anhydride.

This invention also relates to a curable resin composition comprising the above acrylate compound and to a photosensitive resin composition comprising the above vinyl ether compound.

This invention also relates to a polyimide resin composition comprising 100 parts by weight of one of the four different polyimides consisting of those represented by formulas (15) and (16) as well as those whose polymer end is an unsubstituted aromatic ring or an aromatic ring substituted by a group inert to an amine or a dicarboxylic anhydride, and 5 to 70 parts by weight of a fibrous reinforcing agent selected from the group consisting of carbon, glass, aromatic polyamide and potassium titanate fibers.

BRIEF DESCRIPTION OF THE DRAWINGS

FIG. 4 is a graph for relationship between the residence time at 350° C. and the melt viscosity of the polyimide powder obtained in Example 278.

DETAILED DESCRIPTION OF THE PREFERRED EMBODIMENTS

Figure 1:
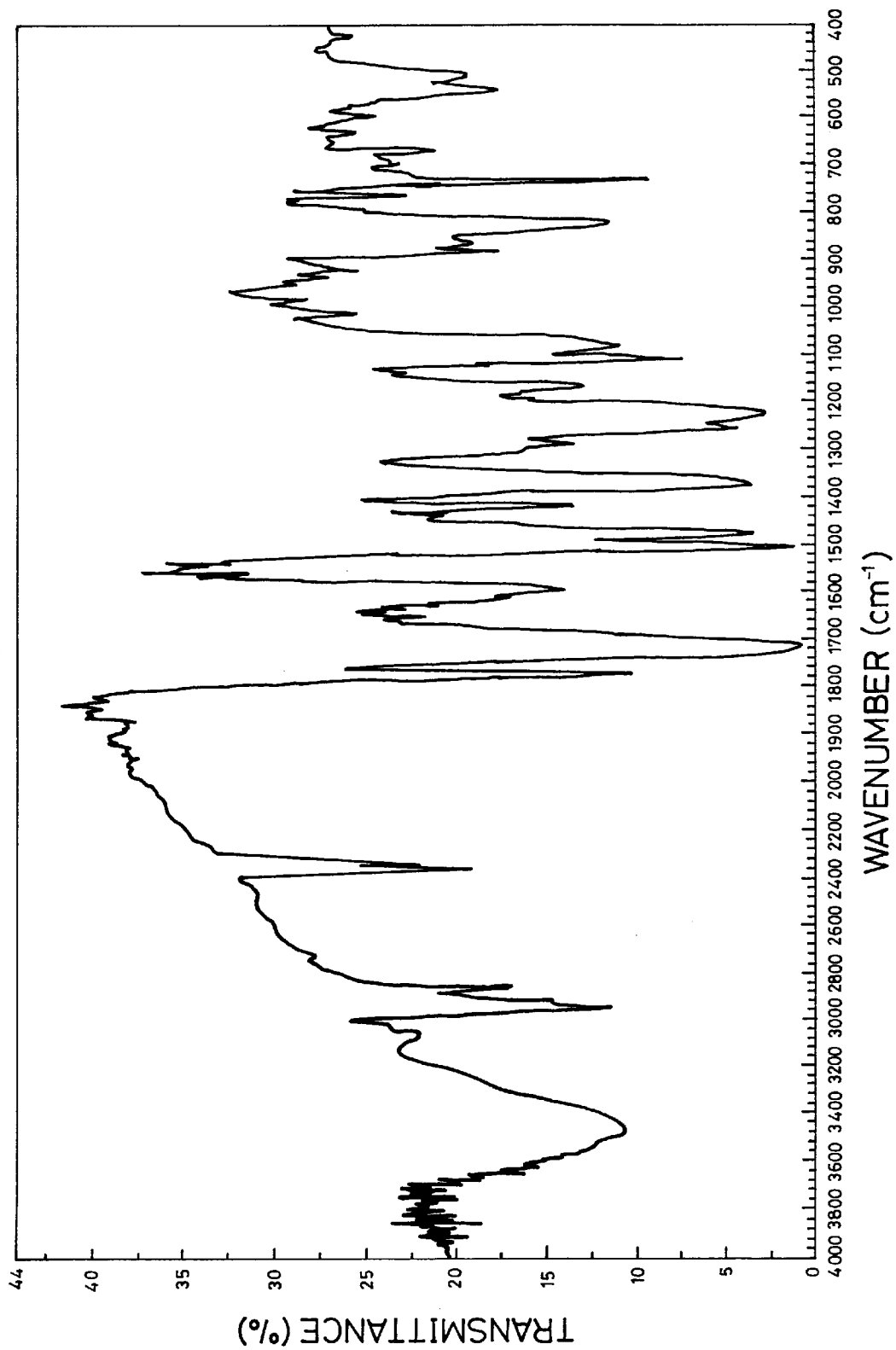
FIG. 1 shows an IR spectrum for the polyimide obtained in Example 266.

The optical component of this invention is a low-birefringent organic optical component, comprising a polymer prepared by polymerizing a racemic mixture of the monomer with an asymmetric spiro ring represented by formula (1), as an essential ingredient.

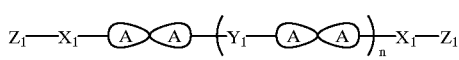

(1)

Even without asymmetric carbons, a spiro compound as shown in one of the following formulas which does not have a symmetry plane as a whole molecule can exhibit optical activity. These isomers (A) and (B) are referred to as optical isomers with a molecular asymmetry, either of which can be prepared as Nakagawa's procedure described in Bulletin of the Chemical Society of Japan, Vol. 44, pp. 496–505 (1971);

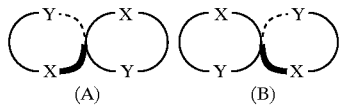

wherein X and Y are groups which are not equivalent to each other.

We have discovered that a low-birefringent polymer can be prepared by using a racemic mixture of a monomer having such a asymmetric spiro-ring structure.

A birefringence is a phenomenon caused by polarizability anisotropy of a monomeric molecule. It may be assumed that since a racemic mixture is used in this invention, the isomers delete polarizability anisotropy from each other, the product does not have polarizability anisotropy as a bulk and consequently becomes macroscopically isotropic. This is supported by the fact that using a monomer comprising one optical isomer gives a one or more digits higher birefringence, as shown in the examples later.

Specific examples of the monomer comprising an asymmetric spiro ring represented by general formula (1) of this invention are those comprising an asymmetric spiro ring represented by formula (2), (3) or (4), preferably by formula (2).

Monomers and polymers used in preparation of a low-birefringent organic optical component of this invention will be specifically described, but this invention is, of course, not limited to the specifics.

In general formulas (1) to (4) related to this invention, $n_1$, $n_2$, $n_3$ and $n_4$ are an integer of 0 to 10, preferably 0 to 5, more preferably 0 to 3, most preferably 0 or 1.

In general formulas (1) to (4), binding groups $X_1$ to $X_4$ include ether, thioether, imino, N-methylimino, carbonyloxy, oxycarbonyl, carbonylimino, iminocarbonyl, sulfone, methylene, 1,2-ethylene, 1,3-trimethylene, 2,2-propylidene, 1-methyl-1,2-ethylene, 2-methyl-1,2-ethylene, ethylenoxy, propylenoxy, bis(ethylenoxy), tris(ethylenoxy), oxyethylene, oxypropylene, bis(oxyethylene), tris (oxyethylene), 1,2-ethylenedioxy, 1,3-trimethylenedioxy, 2,2-propylidenedioxy, 1-methyl-1,2-ethylenedioxy, 2-methyl-1,2-ethylenedioxy, 2-hydroxy-1,3-trimethylenedioxy, difluoromethylene, perfluoroethylene, 1-trifluoromethyl-1,2-ethylene, 2-trifluoromethyl-1,2-ethylene, 2-trifluoromethyloxyethylene, bis(2-trifluoromethyloxyethylene), perfluoroethylenedioxy, 1-trifluoromethyl-1,2-ethylenedioxy, 2-trifluoromethyl-1,2-ethylenedioxy, 1,4-phenylene, 1-oxy-4-phenylene, 1-oxy-3-phenylene, bis(1-oxy-4-phenylene), 1,3,4-phenyltriyl, 1-oxy-3,4-phenyltriyl, 4-(3',4'-phenylenetriyl-1'-oxy) phenylenoxy and 3-(3',4'-phenylenetriyl-1'-oxy) phenylenoxy groups, as well as binding groups wherein at least two of the same or-different groups of those set forth above are linked.

The binding groups may preferably include ether, ethylenoxy, propylenoxy, bis(ethylenoxy), tris(ethylenoxy), oxyethylene, oxypropylene,. bis(oxyethylene), tris (oxyethylene), 1,2-ethylenedioxy, 1,3-trimethylenedioxy, 2,2-propylidenedioxy, 1-methyl-1,2-ethylenedioxy, 2-methyl-1,2-ethylenedioxy, 2-hydroxy-1,3-trimethylenedioxy, 1-oxy-4-phenylene, 1-oxy-3-phenylene, bis(1-oxy-4-phenylene), 1-oxy-3,4-phenyltriyl, 4-(3',4'-phenylenetriyl-1'-oxy)phenylenoxy and 3-(3',4'-phenylenetriyl-1'-oxy)phenylenoxy groups, as well as binding groups wherein at least two of the same or different groups of those set forth above are linked; more preferably 1,2-ethylenedioxy, 1-methyl-1,2-ethylenedioxy, 2-methyl-1,2-ethylenedioxy, 1-oxy-4-phenylene, 1-oxy-3-phenylene and bis(1-oxy-4-phenylene) groups, as well as binding groups wherein at least two of the same or different groups of the above are linked.

In general formulas (1) to (4), binding groups $Y_1$ to $Y_4$ include ether, thioether, imino, N-methylimino, carbonyloxy, oxycarbonyl, carbonylimino, aminocarbonyl, sulfone, methylene, 1,2-ethylene, 1,3-trimethylene, 2,2-propylidene, 2-hydroxy-1,3-trimethylenedioxy, difluoromethylene, perfluoroethylene, 1-trifluoromethylethylene, oxyethylene, oxypropylene, bis (oxyethylene), tris(oxyethylene), 2-trifluoromethyloxyethylene, bis(2-trifluoromethyloxyethylene), 1,4-phenylene, 1,3,4-phenyltriyl, 1-oxy-4-phenylene, 1-oxy-3-phenylene, bis(1-oxy-4-phenylene) and 3-(3,4-phenylenetriyloxy) phenylenoxy groups, particularly 2-hydroxy-1,3-trimethylenedioxy group.

In general formulas (1) to (4) related to this invention, the polymerization active groups $Z_1$ to $Z_4$ include groups having polycondensing property such as hydroxy, thiol, formyl, chloro, bromo, oxychloro, thiochloro, carbonylchloride, amino, isocyanate and dicarboxylic anhydride groups, as well as groups having addition-polymerizing property such as vinyl, vinyloxy, acryloxy, methacryloxy, acryloyloxy, methacryloyloxy, glycidyl, glycidyloxy and maleimide groups.

Among these polymerization active groups, preferable $Z_1$ to $Z_4$ include groups having polycondensating property such as hydroxy, carbonylchloro, amino and dicarboxylic anhydride groups, as well as groups having addition-polymerizing property such as vinyl, vinyloxy, acryloyl, methacryloyl, acryloyloxy, methacryloyloxy, glycidyl and glycidyloxy groups.

$R_{21}$ to $R_{27}$ in general formula (2), $R_{31}$ to $R_{37}$ in general formula (3) or $R_{41}$ to $R_{44}$ in general formula (4) are hydrogen, fluorine, chlorine or bromine atom, or methyl, ethyl, n-propyl, isopropyl, methoxy, ethoxy, n-propoxy, iso-propoxy or trifluoromethyl group; preferably hydrogen, fluorine or chlorine atom, or methyl group; more preferably hydrogen or chlorine atom, or methyl group; particularly hydrogen atom.

The monomer comprising an asymmetric spiro ring represented by general formula (1) related to this invention, may be suitably prepared according to a known process. For example, the spirobiindanol derivatives represented by general formula (2) may be prepared as described in U.S. Pat. No. 3,544,638 or JP-A 62-10030.

The spirobichroman derivatives may be according to a known process such as one described in Journal of Chemical Society, Vol. 111, 4953–4959 (1989), JP-A 60-130735 or JP-A 3-163413.

The spirodilactam derivatives represented by formula (4) may be prepared according to a known process such as one described in Chemical & Engineering News, p. 41, July (1), (1991).

A racemic mixture of the monomer comprising an asymmetric spiro ring represented by general formula (1) as an essential ingredient among monomers to be polymerized to prepare the polymer related to this invention, may be contained in a proportion of at least 10% by weight, preferably at least 20% by weight, more preferably at least 30% by weight, and particularly at least 50% by weight.

The polymers related to this invention include;

(1) polymers prepared by polycondensation of a monomer having one of the above polycondensing group as a polymerization group with a monomer having another polycondensing group capable of being subject to polycondensation with the above monomer; and (2) a polymer prepared by addition polymerization reaction of a monomer comprising one of the above addition-polymerizing group solely, or with a monomer comprising another addition-polymerizing group capable of being subject to addition polymerization with the above monomer. We will describe each type of the polymers in detail.

The polymers prepared by polycondensation of a monomer having one of the above polycondensing group as a polymerization group with a monomer having another polycondensing group capable of being subject to polycondensation with the above monomer, include polycarbonates, polyesters, polyethers, polysulfides, polyketones, polysulfoxides, polysulfones, polyimides, polyamides, polyureas and polyurethanes, as well as multi-component combinations of the polymers such as polyester carbonates, polyether ketones, polyether ether ketones, polyetherimides and polyamide imides.

The polymers prepared by the above polycondensation reaction include copolymers as long as they do not adversely affect the desired effect of this invention. For example, the polyimide may be a copolymer made from a diamine compound and at least two dicarboxylic anhydrides. Here, a copolymer may have any of the structures of random, block, alternating and graft copolymers.

Next, there will be described polymers prepared by addition polymerization reaction of a monomer comprising one of the above groups having addition-polymerizing property solely, or with a monomer comprising another group having addition-polymerizing property capable of being subject to addition polymerization with the above monomer.

The polymers may include those prepared by homopolymerizing a monomer comprising a group having addition-polymerizing property such as vinyl, acryloyloxy and methacryloyloxy groups as a polymerization active group by a radical polymerization process with light or heat, or copolymering the monomer with another monomer comprising the above addition-polymerizing group.

The polymers may include those prepared by homopolymerizing a monomer comprising epoxy or vinyloxy group as a polymerization active group in general formulas (1) to (4) by a cation polymerization with light, or copolymering the monomer with another monomer comprising another epoxy or vinyloxy group.

The polymers may include those prepared by copolymerizing a monomer comprising epoxy or maleimide group as a polymerization active group in general formulas (1) to (4) with a bifunctional compound such as polyhydroxy or polyamino compounds.

Monomers comprising a group having addition-polymerizing property such as vinyl, acryloyl and methacryloyl groups, used in copolymerization by a light- or thermally-induced radical polymerization process, may be known photopolymerizable monomers including monofunctional (meth)acrylates such as 2-ethylhexyl (meth)acrylate, ethylcarbitol (meth)acrylate, lauryl (meth)acrylate, phenoxyethyl (meth)acrylate, nonylphenoxyethyl (meth)acrylate, 2-hydroxy-3-phenoxypropyl (meth)acrylate, dicyclopentenyl (meth)acrylate, isobornyl (meth)acrylate, N-n-butyl-O-(meth)acryloyloxy ethyl carbamate, acryloylmorpholine, trifluoroethyl (meth)acrylate, tribromobenzyl (meth)acrylate and perfluorooctyl (meth)acrylate; silicon-containing (meth)acrylates such as (meth) acryloxypropyl-tris(methoxy)silane; monofunctional vinyl compounds such as N-vinylpyrrolidone and N-vinylcaprolactam; alkylene glycol di(meth)acrylates such as 1,6-hexanediol di(meth)acrylate, ethyleneglycol di(meth) acrylate, propyleneglycol di(meth)acrylate and neopentylglycol di(meth)acrylate; polyalkyleneglycol di(meth) acrylates such as triethyleneglycol di(meth)acrylate, tripropyleneglycol di(meth)acrylate, polyethyleneglycol di(meth)acrylate and polypropyleneglycol di(meth)acrylate; di(meth)acrylates of an alkylene oxide adduct of a bisphenol derivative such as bisphenol-A and bisphenol-A hydride; epoxy acrylates such as ethyleneglycol diglycidyl ether di(meth)acrylate, propyleneglycol diglycidylether di(meth) acrylate and bisphenol-A diglycidylether di(meth)acrylate, polyfunctional (meth)acrylates such as trimethylolpropane tri(meth)acrylate, dipentaerythritol pentacrylate, pentaerythritol triacrylate, pentaerythritol tetracrylate, ditrimethylol tetracrylate and dipentaerythritol hexacrylate; and allyl-containing compounds such as triallyl trimellitate and triallyl isocyanurate, as well as known photopolymerizable oligomers including polyurethane (meth)acrylate, epoxy (meth)acrylate, polyester (meth)acrylate and polyether (meth)acrylate.

Other monomers comprising epoxy or vinyloxy group used in copolymerization by a photo-induced cation polymerization may be epoxy compounds such as phenyl glycidyl ether, ethyleneglycol diglycidyl ether, triethyleneglycol divinyl ether, polyethyleneglycol diglycidyl ether, polypropyleneglycol diglycidyl ether, glycerol diglycidyl ether, neopentylglycol diglycidyl ether, glycerol triglycidyl ether, trimethylolpropane triglycidyl ether, sorbitol polyglycidyl ether, bisphenol-A diglycidyl ether and 4-vinyl-1-cyclohexenediepoxide; as well as known vinyl ether compounds such as ethyl vinyl ether, isobutyl vinyl ether, 2-chloroethyl vinyl ether, ethyleneglycol monovinyl ether, butanediol monovinyl ether, ethyleneglycol divinyl ether, cyclohexanedimethanol divinyl ether, trimethylolpropane trivinylether, and divinyl ether compounds of alkyleneoxide adducts of propenyl ether propylene carbonate, divinylbenzene and bisphenol A.

As described above, when copolymerizing a monomer comprising epoxy or maleimide group as a polymerization active group with a multi-functional compound such as polyhydroxy and polyamino compounds, the polyhydroxy compounds include phenol novolac resin, cresol novolac resin, cyclopentadiene-modified phenol resin, p-xylene-modified phenol resin, naphthol-modified phenol resin, a condensation product of a phenol derivative with benzaldehyde or naphthylaldehyde and triphenolmethanes, and the polyamino compounds include ethylenediamine, propylenediamine, isophoronediamine, diaminocyclohexane, xylylenediamine, diaminodiphenylmethane, diaminobenzene, tris (dimethylaminomethyl)phenol, benzyldimethylamine, modified polyamines such as amine adducts with an epoxy resin, cyanoethylated amines, Mannich-reaction amines and ketimines, and heterocyclic amines.

The low-birefringent organic optical component may be formed and prepared according to a variety of known molding processes. The following will describe typical processes for preparation of an optical component using the above polymers.

A substrate for an optical disk or a magneto-optical disk may be formed by a well-known process; for example, a process comprising pouring a polymerizable composition comprising a monomer into a cavity for a disk substrate, polymerizing it by, for example, a radical polymerization process, and if necessary post-heating the mold as described in JP-As 58-130450, 58-137150 or 62-280008; a process comprising photopolymerizing a composition in a double-glass mold as described in JP-A 60-202557; a process comprising vacuum injection or injection of a solution and then compressing a liquid resin to be subject to thermal polymerization as described in JP-A 60-203414; or a process comprising injection molding of a thermoplastic polymer such as polycarbonate and polyester.

An optical lens may be readily molded usually by cast polymerization when using a thermoplastic polymer such as polyurethanes and poly(meth)acrylates, as described in JP-A 60-135901. Specifically, an isocyanate is blended with a compound having an active hydrogen such as hydroxy or thiol hydrogen, the mixture is, if necessary, degassed in an appropriate manner, the mixture is poured into a mold, and it is polymerized usually by heating gradually from a low temperature to a high temperature.

When a thermoplastic polymer such as polycarbonates, polyesters and polyimides is used, generally a lens may be suitably prepared by injection molding as described in JP-A 60-135901.

When molding an optical component using the above thermoplastic polymer, a plurality of different polymers can be blended, or there can be blended a polymer or polymers other than a polymer prepared by polymerizing a racemic mixture of the monomer comprising an asymmetric spiro ring represented by any of general formulas (1) to (4) related to this invention as an essential ingredient, as long as they do not adversely affect the desired effect of this invention.

The low-birefringent organic optical component molded as described above, using a polymer prepared by polymerizing a racemic mixture of the monomer comprising an asymmetric spiro ring represented by any of general formulas (1) to (4) related to this invention as an essential ingredient, are excellent in transparency, mechanical strength and heat resistance, and has a low birefringence, which is useful for many applications such as an optical disk substrate, a pick-up lens, a plastic substrate for a liquid crystal cell and a prism.

As described above, the monomer comprising an asymmetric spiro ring represented by general formula (1) related to this invention, is preferably one comprising an asymmetric spiro ring represented by general formula (2). Particularly preferable embodiments of a polymer prepared by polymerizing a racemic mixture of the monomer comprising an asymmetric spiro ring represented by general formula (2) related to this invention, may include the following polymers of (i) to (xi);

(i) a polycarbonate comprising a structural unit derived from the dihydroxy compound represented by formula (5);

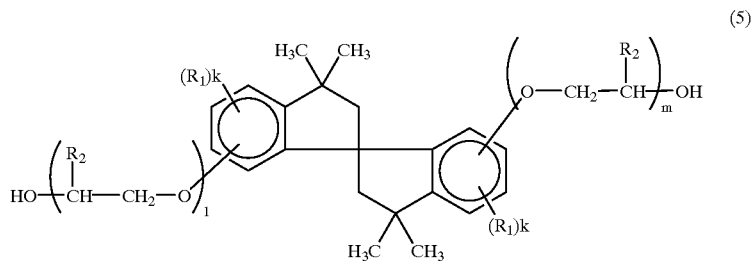

(5)

wherein $R_1$ represents an optionally substituted straight, branched or cyclic alkyl group, an optionally substituted straight, branched or cyclic alkoxy group, nitro group, or a halogen-atom; $R_2$ is independently hydrogen atom or methyl group; k is an integer of 0 to 3; l and m are independently an integer of 0 to 20; and l+m is not zero;

(ii) a polymer prepared by polymerizing the acrylate compound represented by formula (6);

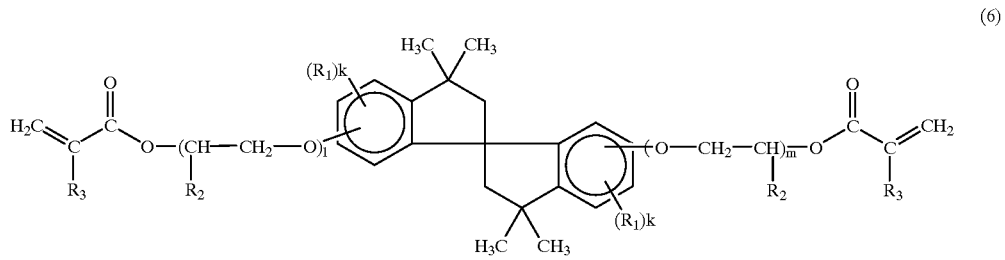

(6)

wherein $R_1$, $R_2$, k, l and m are as defined above, $R_3$ is independently hydrogen atom or methyl group;

(iii) a polyester comprising the structural unit represented by formula (7);

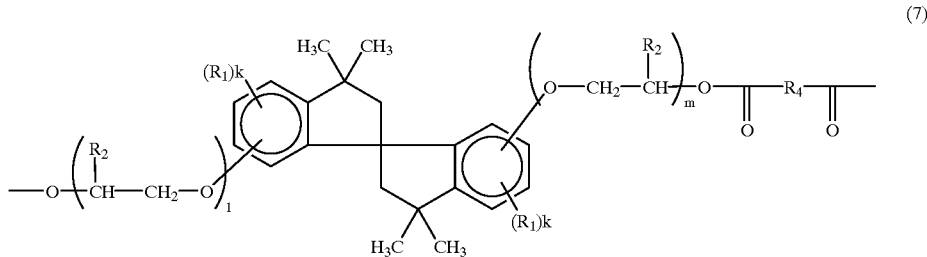

(7)

wherein $R_1$, $R_2$, k, l and m are as defined above, $R_4$ is an alkylene, aralkylene or arylene group; and l+m is not zero;

(iv) a polyurethane comprising the structural unit represented by formula (8);

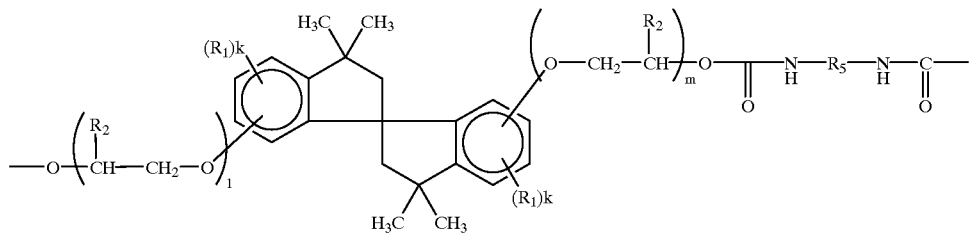
(8)

wherein $R_1$, $R_2$, k, l and m are as defined above, $R_5$ is a bivalent organic group; and l+m is not zero;

(v) a polymer prepared by polymerizing the epoxy compound represented by formula (9);

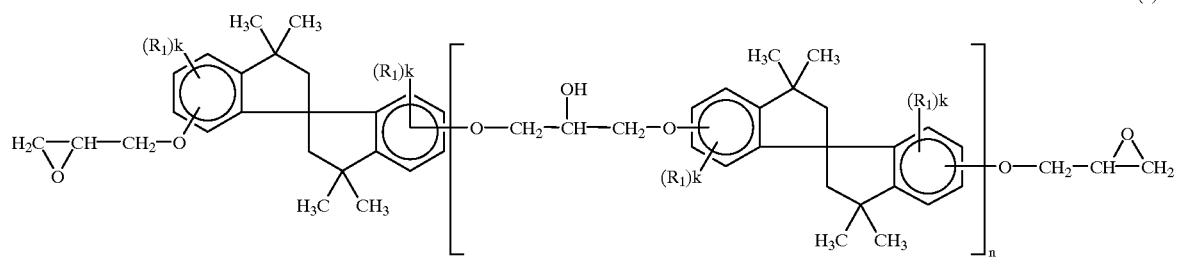
(9)

wherein $R_1$ and k are as defined above; n is an integer of 0 to 10;

(vi) a polymer prepared by polymerizing the epoxy acrylate compound represented by formula (10);

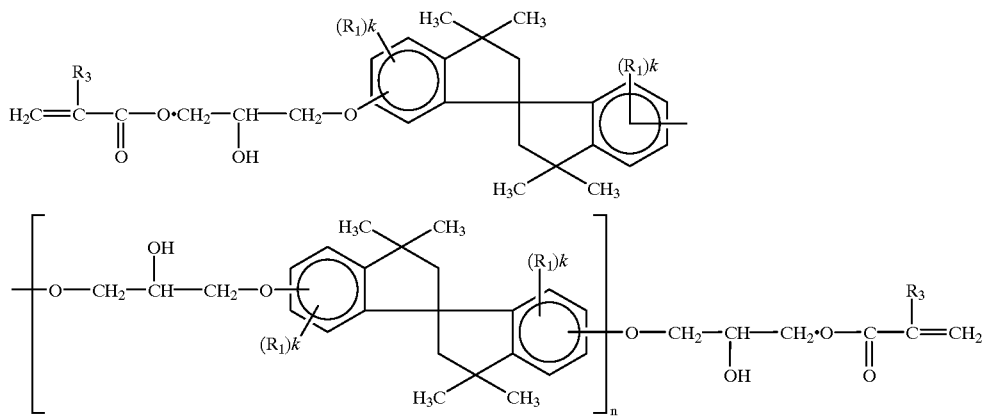
(10)

wherein $R_1$, $R_3$, k and n are as defined above;

(vii) a polymer prepared by polymerizing an acid-modified epoxy acrylate compound which is obtained by a reaction of the epoxyacrylate compound represented by formula (10) with a carboxylic acid or its anhydride;

(viii) a polymer prepared by polymerizing the vinyl ether compound represented by formula (11);

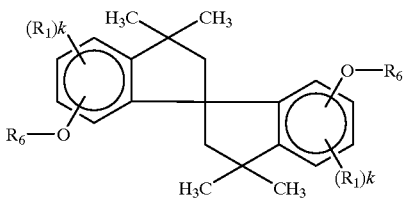
(11)

wherein $R_1$ and k are as defined above; $R_6$ is hydrogen atom or $CH_2=CH-O-R_7$ group wherein $R_7$ represents an alkylene group with 1 to 12 carbons or 2-hydroxytrimethylene group; two $R_6$s may be the same or different although they are not simultaneously hydrogen atom;

(ix) a copolymeric polycarbonate comprising the structural unit represented by formula (12);

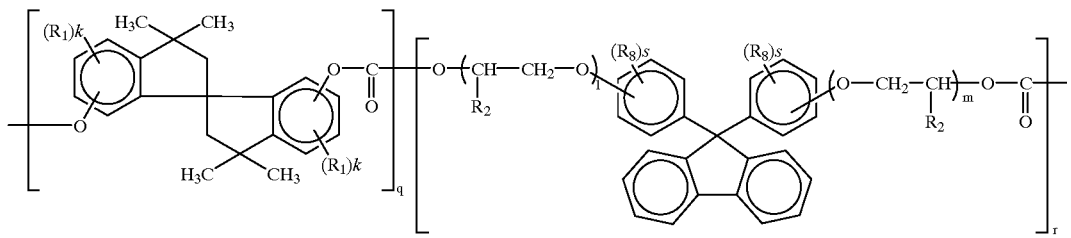
(12)

wherein $R_1$, $R_2$, k, l and m are as defined above, $R_8$ is an alkyl group; q and r are independently an integer of 0 to 20; and s is an integer of 0 to 4;

(x) a polyimide resin comprising the structural unit represented by formula (13);

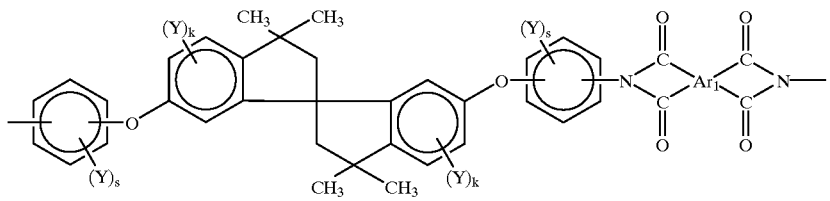
(13)

wherein Y is a monovalent group selected from an alkyl or alkoxy group with 1 to 3 carbons; phenyl, phenoxy, benzyl or naphthyl group; or the group represented by general formula (a) or (b);

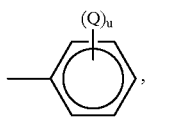
(a)

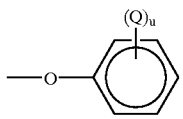
(b)

wherein Q is a monovalent group selected from a halogen atom, an alkyl or alkoxy group with 1 to 3 carbons, or the group represented by an halogenated or alkoxy group wherein hydrogen atoms are partially or completely substituted by halogen atoms; Q may be the same or different; u is an integer of 0 to 5;

Y may be the same or different; k and s are as defined above; $Ar_2$ is a tetravalent group represented by formula (c), (d) or (e);

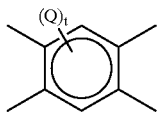
(c)

(d)

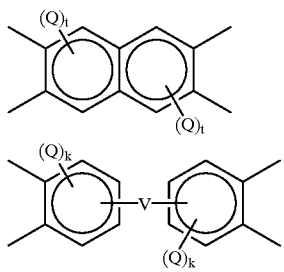

(e)

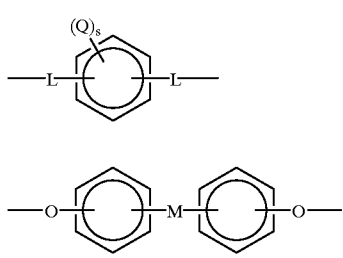

wherein Q and k are as defined above; t is an integer of 0 to 2; V is a bivalent group selected from a direct bond, —CO—, —S—, —O—, —SO$_2$—, —CH$_2$—, —C(CH$_3$)$_2$—, —C(CF$_3$)$_2$— or the group represented by general formula (f) or (g);

(f)

—L—⟨(Q)$_s$⟩—L—

(g)

—O—⟨⟩—M—⟨⟩—O— wherein Q and s are as defined above; L is a bivalent group selected from a direct bond, —CO—, —S— or —O—; M is a bivalent group selected from a direct bond, —CO—, —S—, —O—, —SO$_2$—, —CH$_2$—, —C(CH$_3$)$_2$— or —C(CF$_3$)$_2$—;

(xi) a polyamide resin comprising the structural unit represented by formula (14);

(14)

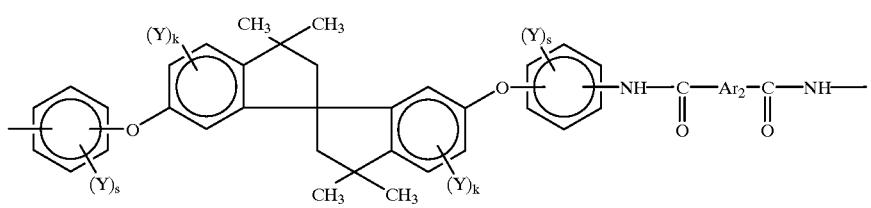

wherein Y, k and s are as defined above; Ar$_2$ is a bivalent group represented by formula (h), (i) or (j);

(h)

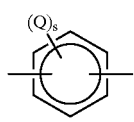

(i)

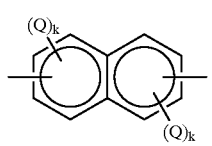

(j)

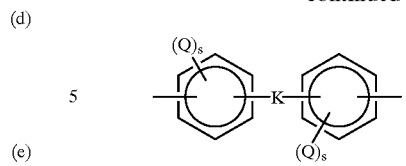

wherein Q, k and s are as defined above; K is a bivalent group selected from a direct bond, —CO—, —S—, —O—, —SO$_2$—, —CH$_2$—, —C(CH$_3$)$_2$—, —C(CF$_3$)$_2$—, or the group represented by formula (f), (g), (k) or (l).

This invention also encompasses the compounds or the polymers represented by formulas (5) to (18), in addition to a low-birefringent organic optical component from a polymer prepared by polymerizing the above monomer, as an essential ingredient, comprising a racemic mixture of a monomer having an asymmetric spiro ring. The following will detail the compound and the polymer as well as the low-birefringent organic optical component, of this invention.

First, a polycarbonate comprising a structural unit derived from the dihydroxy compound represented by formula (5) of this invention will be described.

The polycarbonate of this invention may be a homopolycarbonate or a copolymeric polycarbonate comprising a structural unit derived from the dihydroxy compound represented by formula (5).

In formula (5), R$_1$ represents an optionally substituted straight, branched or cyclic alkyl, an optionally substituted straight, branched or cyclic alkoxy, nitro or halogen atom; preferably an optionally substituted straight, branched or cyclic alkyl with 1 to 20 carbons, an optionally substituted straight, branched or cyclic alkoxy with 1 to 20 carbons, nitro or halogen atom. An alkyl moiety of an alkyl or alkoxy group in R$_1$ may be substituted by one or more groups such as alkoxy, alkoxyalkoxy, cycloalkyl, cycloalkyl containing hetero atoms, cycloalkoxy, cycloalkoxy containing hetero atoms, aryloxy and aryloxyalkoxy groups as well as halogen atoms.

R$_1$ may preferably be methyl, ethyl, n-propyl, isopropyl, n-butyl, isobutyl, sec-butyl, tert-butyl, n-pentyl, n-hexyl, 2-ethylhexyl, n-octyl, n-decyl, n-dodecyl, n-tetradecyl, n-octadecyl, cyclopentyl, cyclohexyl, 4-tert-butylcyclohexyl, cycloheptyl, cyclooctyl, cyclohexylmethyl, cyclohexylethyl, tetrahydrofurfuryl, 2-methoxyethyl, 2-ethoxyethyl, 2-n-butoxyethyl, 3-methoxyropyl, 3-ethoxypropyl, 3-n-propoxypropyl, 3-n-butoxypropyl, 3-n-hexyloxypropyl, 2-methoxyethoxyethyl, 2-ethoxyethoxyethyl, 2-phenoxymethyl, 2-phenoxyethoxyethyl, chloromethyl, 2-chloroethyl, 3-chloropropyl, 2,2,2-trichloroethyl, methoxy, ethoxy, n-propoxy, isopropoxy, n-butoxy, isobutoxy, sec-butoxy, n-pentyloxy, n-hexyloxy, 2-ethylhexyloxy, n-octyloxy, n-decyloxy, n-dodecyloxy, n-tetradecyloxy, n-octadecyloxy, cyclopentyloxy, cyclohexyloxy, 4-tert-butylcyclohexyloxy, cycloheptyloxy, cyclooctyloxy, cyclohexylmethoxy, cyclohexylethoxy, 2-methoxyethoxy, 2-ethoxyethoxy, 2-n-butoxyethoxy, 3-methoxypropoxy, 3-ethoxypropoxy, 3-n-propoxypropoxy, 3-n-butoxypropoxy, 3-n-hexyloxypropoxy, 2-methoxyethoxyethoxy, 2-phenoxymethoxy, 2-phenoxyethoxyethoxy, chloromethoxy, 2-chloroethoxy, 3-chloropropoxy, 2,2,2-trichloroethoxy and nitro groups, as well as fluorine, chlorine, bromine and iodine atoms.

The substituent $R_1$ is preferably an unsubstituted straight or branched alkyl group with 1 to carbons, an unsubstituted straight or branched alkoxy group with 1 to carbons, or chlorine atom; more preferably, methyl, ethyl, n-propyl, isopropyl, n-butyl, isobutyl, tert-butyl, methoxy, ethoxy, n-propoxy, isopropoxy, n-butoxy, isobutoxy or tert-butoxy group, or chlorine atom; most preferably, methyl group or chlorine atom.

In formula (5), $R_2$ independently represents hydrogen atom or methyl group; k is an integer of 0 to 3, preferably 0, 1 or 2, and more preferably 0; l and m are independently an integer of 0 to 20, preferably 0 to 10.

In the polycarbonate of this invention, l and m are more preferably an integer of 0 to 6, more preferably 0 to 4, most preferably 0 to 2, although l+m is not zero.

The dihydroxy compound as a starting material may be prepared by reacting the spirobiindanol derivative represented by formula (19) with an alkylene oxide such as ethylene oxide and propylene oxide; a cyclic carbonate such as ethylene carbonate and propylene carbonate; a β-halohydrin such as 2-bromoethanol, 2-chloroethanol and 2-bromo-1-propanol; for example, reaction of a spirobiindanol derivative with an alkylene oxide may be conducted as described in U.S. Pat. No. 3,794,617, JP-B 60-5578 or JP-A 6-10151.

The spirobiindanol derivative represented by formula (19) may be prepared by a known process such as one described in JP-A 62-10030;

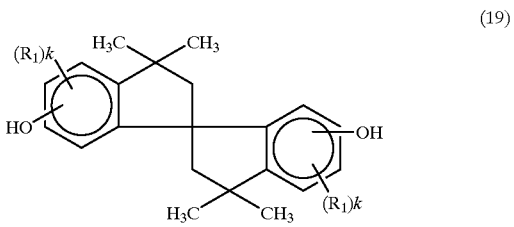

(19)

wherein $R_1$ and k are as defined above.

The dihydroxy compound represented by formula (5) as a starting material may be purified by a variety of known processes such as column chromatography, distillation and recrystallization.

The dihydroxy compound represented by formula (5) as a starting material may be obtained as a mixture of dihydroxy compounds which have different l and m in formula (5), depending on reaction conditions. The mixture can be suitably used, without separation, as a starting material for the low-birefringent organic optical component of this invention.

In the compound represented by formula (5), the one substituent comprising a hydroxy group may be at 4, 5, 6 or 7 position on the spirobiindan ring, and the other substituent may be at 4', 5', 6' or 7' position.

The dihydroxy compound represented by formula (5) is preferably that represented by any of formulas (5-A) to (5-D), more preferably formula (5-A), (5-C) or (5-D), and most preferably formula (5-C) or (5-D);

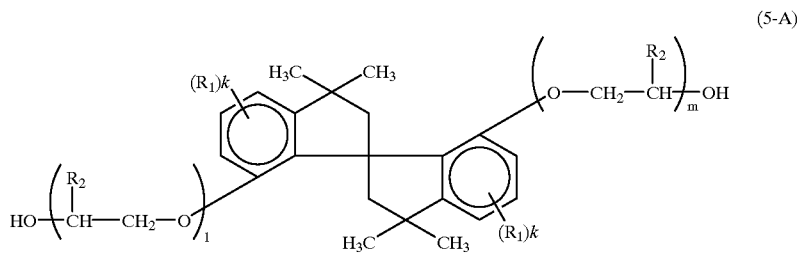

(5-A)

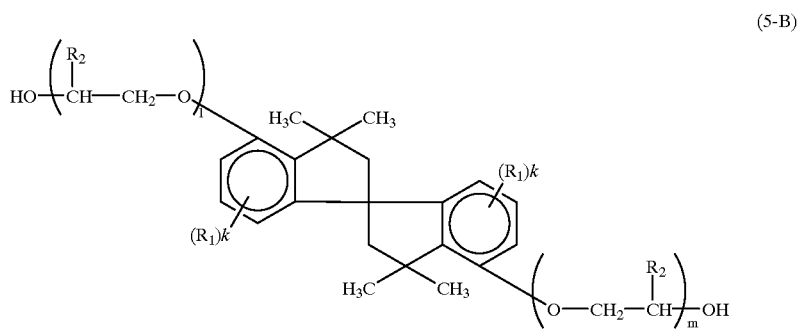

(5-B)

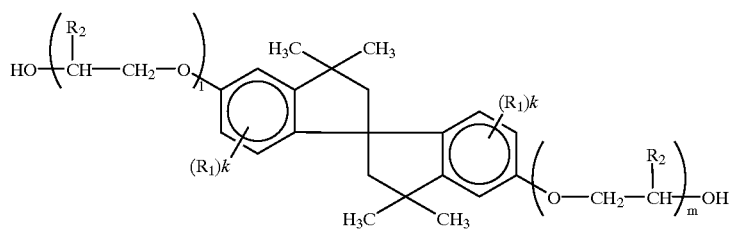
(5-C)
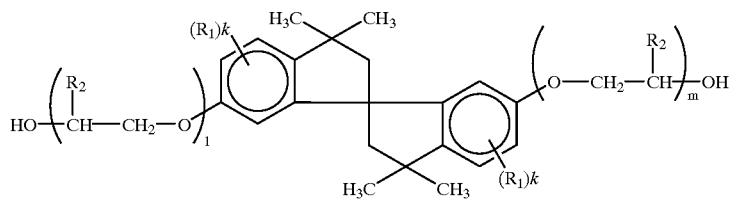
(5-D)
wherein $R_1$, $R_2$, k, l and m are as defined above.
Examples of the dihydroxy compound represented by formula (5) include those shown in Table 1, but, of course, are not limited to them.
TABLE 1
| Compd. No. | Structural Formula |
|---|---|
| 1 | ![structure 1] |
| 2 | ![structure 2] |
| 3 | ![structure 3] |
| 4 | ![structure 4] |

TABLE 1-continued

| Compd. No. | Structural Formula |
|---|---|
| 5 | HO−(CH₂−CH₂−O)₅−[spirobiindane(CH₃)₄]−(O−CH₂−CH₂)₅−OH |
| 6 | HO−(CH₂−CH₂−O)₈−[spirobiindane(CH₃)₄]−(O−CH₂−CH₂)₈−OH |
| 7 | HO−(CH₂−CH₂−O)₁₀−[spirobiindane(CH₃)₄]−(O−CH₂−CH₂)₁₀−OH |
| 8 | HO−(CH₂−CH₂−O)₁₂−[spirobiindane(CH₃)₄]−(O−CH₂−CH₂)₁₂−OH |
| 9 | HO−CH₂−CH₂−O−[spirobiindane(CH₃)₄]−(O−CH₂−CH₂)₂−OH |
| 10 | HO−(CH₂−CH₂−O)₂−[spirobiindane(CH₃)₄]−(O−CH₂−CH₂)₃−OH |
| 11 | HO−CH(CH₃)−CH₂−O−[spirobiindane(CH₃)₄]−O−CH₂−CH(CH₃)−OH |

TABLE 1-continued

| Compd. No. | Structural Formula |
|---|---|
| 12 | (structure) |
| 13 | (structure) |
| 14 | (structure) |
| 15 | (structure) |
| 16 | (structure) |
| 17 | (structure) |
| 18 | (structure) |

TABLE 1-continued

| Compd. No. | Structural Formula |
| --- | --- |
| 19 | (structure: spirobiindane with 1,1,3,3-tetramethyl groups, bearing O—CH₂—CH₂—OH substituents on each aromatic ring) |
| 20 | (structure: spirobiindane with 1,1,3,3-tetramethyl groups, bearing HO—CH₂—CH₂—O— substituents on each aromatic ring at different positions) |
| 21 | (structure: spirobiindane with methyl substituents on aromatic rings and 1,1,3,3-tetramethyl groups, bearing HO—(CH₂—CH₂—O)₂— and —(O—CH₂—CH₂)₂—OH substituents) |
| 22 | (structure: spirobiindane with Cl substituents on aromatic rings and 1,1,3,3-tetramethyl groups, bearing HO—CH₂—CH₂—O— and —O—CH₂—CH₂—OH substituents) |
| 23 | (structure: spirobiindane with methyl substituents and 1,1,3,3-tetramethyl groups, bearing HO—CH(CH₃)—CH₂—O— and —O—CH₂—CH(CH₃)—OH substituents) |
| 24 | (structure: spirobiindane with methyl substituents and 1,1,3,3-tetramethyl groups, bearing HO—CH(CH₃)—CH₂—O— and —O—CH₂—CH(CH₃)—OH substituents) |
| 25 | (structure: spirobiindane with Cl substituents and 1,1,3,3-tetramethyl groups, bearing HO—(CH(CH₃)—CH₂—O)₂— and —(O—CH₂—CH(CH₃))₂—OH substituents) |

A structural unit derived from the dihydroxy compound represented by formula (5) related to this invention is the structural unit represented by formula (5-a).

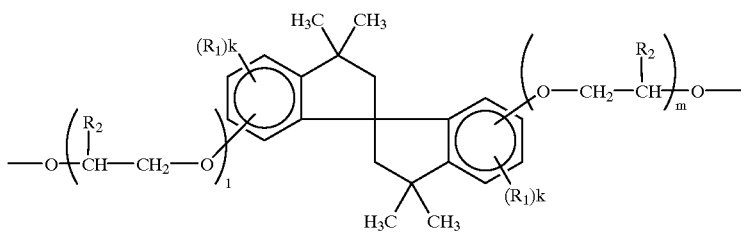

(5-a)

wherein $R_1$, $R_2$, k, l and m are as defined above.

The structural unit represented by formula (5-a) may form a polycarbonate by coupling with the carbonyl group represented by formula (I);

$$—(C=O)— \qquad (I)$$

The polycarbonate of this invention is one comprising a structural unit derived from the dihydroxy compound represented by formula (5), and may be a homopolycarbonate or a copolymeric polycarbonate.

When the polycarbonate of this invention is a copolymeric polycarbonate, it may be a copolymeric polycarbonate comprising several different kinds of the structural unit represented by formula (5-a) or a copolymeric polycarbonate comprising structural units other than that represented by formula (5-a).

When it comprises structural units other than that represented by formula (5-a), the proportion of the structural unit represented by formula (5-a) in total structural units may be, but not limited to, at least 10 mol %, preferably 20 mol %, and more preferably 30 mol %, as long as it does not adversely affect the desired effect of this invention.

The polycarbonate of this invention may comprise a structural unit derived from a dihydroxy compound other than that represented by formula (5). Examples of the dihydroxy compound may include a variety of known aromatic or aliphatic dihydroxy compounds.

The aromatic dihydroxy compounds specifically include bis(hydroxyaryl)alkanes such as bis(4-hydroxyphenyl) methane, 1,1-bis(4'-hydroxyphenyl)ethane, 1,2-bis(4'-hydroxyphenyl)ethane, bis(4-hydroxyphenyl) phenylmethane, bis(4-hydroxyphenyl)diphenylmethane, bis (4-hydroxyphenyl)-1-naphthylmethane, 1,1-bis(4'-hydroxyphenyl)-1-phenylethane, 2,2-bis(4'-hydroxyphenyl) propane ("bisphenol A"), 2-(4-hydroxyphenyl)-2-(3'-hydroxyphenyl)propane, 2,2-bis(4'-hydroxyphenyl)butane, 1,1-bis(4'-hydroxyphenyl)butane, 2,2-bis(4'-hydroxyphenyl)-3-methylbutane, 2,2-bis(4'-hydroxyphenyl) pentane, 3,3-bis(4'-hydroxyphenyl)pentane, 2,2-bis(4'-hydroxyphenyl)hexane, 2,2-bis(4'-hydroxyphenyl)octane, 2,2-bis(4'-hydroxyphenyl)-4-methylpentane, 2,2-bis(4'-hydroxyphenyl)heptane, 4,4-bis(4'-hydroxyphenyl)heptane, 2,2-bis(4'-hydroxyphenyl)tridecane, 2,2-bis(4'-hydroxyphenyl)octane, 2,2-bis(3'-methyl-4'-hydroxyphenyl)propane, 2,2-bis(3'-ethyl-4'-hydroxyphenyl) propane, 2,2-bis(3'-n-propyl-4'-hydroxyphenyl)propane, 2,2-bis(3'-isopropyl-4'-hydroxyphenyl)propane, 2,2-bis(3'-sec-butyl-4'-hydroxyphenyl)propane, 2,2-bis(3'-tert-butyl-4'-hydroxyphenyl)propane, 2,2-bis(3'-cyclohexyl-4'-hydroxyphenyl)propane, 2,2-bis(3'-allyl-4'-hydroxyphenyl) propane, 2,2-bis(3'-methoxy-4'-hydroxyphenyl)propane, 2,2-bis(3',5'-dimethyl-4'-hydroxyphenyl)propane, 2,2-bis(2', 3',5',6'-tetramethyl-4'-hydroxyphenyl)propane, bis(4-hydroxyphenyl)cyanomethane, 1-cyano-3,3-bis(4'-hydroxyphenyl)butane and 2,2-bis(4'-hydroxyphenyl) hexafluoropropane;

bis(hydroxyaryl)cycloalkanes such as 1,1-bis(4'-hydroxyphenyl)cyclopentane, 1,1-bis(4'-hydroxyphenyl) cyclohexane, 1,1-bis(4'-hydroxyphenyl)cycloheptane, 1,1-bis(3'-methyl-4'-hydroxyphenyl)cyclohexane, 1,1-bis(3',5'-dimethyl-4'-hydroxyphenyl)cyclohexane, 1,1-bis(3',5'-dichloro-4'-hydroxyphenyl)cyclohexane, 1,1-bis(3'-methyl-4'-hydroxyphenyl)-4-methylcyclohexane, 1,1-bis(4'-hydroxyphenyl)-3,3,5-trimethylcyclohexane, 2,2-bis(4'-hydroxyphenyl)norbornane and 2,2-bis(4'-hydroxyphenyl) adamantane;

bis(hydroxyaryl) ethers such as 4,4'-dihydroxydiphenyl ether, 4,4'-dihydroxy-3,3'-dimethyldiphenyl ether and ethyleneglycol bis(4-hydroxyphenyl) ether;

bis(hydroxyaryl) sulfides such as 4,4'-dihydroxydiphenyl sulfide, 3,3'-dimethyl-4,4'-dihydroxydiphenyl sulfide, 3,3'-dicyclohexyl-4,4'-dihydroxydiphenyl sulfide and 3,3'-diphenyl-4,4'-dihydroxydiphenyl sulfide;

bis(hydroxyaryl) sulfoxides such as 4,4'-dihydroxydiphenyl sulfoxide and 3,3'-dimethyl-4,4'-dihydroxydiphenyl sulfoxide;

bis(hydroxyaryl) sulfones such as 4,4'-dihydroxydiphenyl sulfone and 3,3'-dimethyl-4,4'-dihydroxydiphenyl sulfone;

bis(hydroxyaryl) ketones such as bis(4-hydroxyphenyl) ketone and bis(4-hydroxy-3-methylphenyl) ketone;

6,6'-dihydroxy-3,3,3',3'-tetramethyl-1,1'-spirobiindan; 7,7'-dihydroxy-3,3',4,4'-tetrahydro-4,4,4',4'-tetramethyl-2, 2'-spirobi(2H-1-benzopyrane); trans-2,3-bis(4'-hydroxyphenyl)-2-butene; 9,9-bis(4'-hydroxyphenyl) fluorene; 3,3-bis(4'-hydroxyphenyl)-2-butanone; 1,6-bis(4'-hydroxyphenyl)-1,6-hexanedione; α,α,α',α'-tetramethyl-α, α'-bis(4-hydroxyphenyl)-p-xylene; α,α,α',α'-tetramethyl-α, α'-bis (4-hydroxyphenyl)-m-xylene; 4,4'-dihydroxybiphenyl; hydroquinone; and resorcinol.

An aromatic dihydroxy compound comprising an ester bond is also useful, which may be prepared by reacting 2 mol of bisphenol A with 1 mol of isophthaloyl or terephthaloyl chloride.

Specifically, the aliphatic compound may be preferably a dihydroxyalkane with 2 to 20 carbons, a dihydroxycycloalkane with 4 to 12 carbons, and the dihydroxy compound represented by general formula (20);

$$HO—R_9—R_{10}—R_9—OH \qquad (20)$$

wherein $R_9$ is an alkylene group with 1 to 6 carbons and $R_{10}$ is a bivalent aromatic group with 6 to 20 carbons.

The aliphatic compounds may include dihydroxy alkanes such as 1,2-dihydroxyethane, 1,3-dihydroxypropane, 1,4- dihydroxybutane, 1,5-dihydroxypentane, 3-methyl-1,5-dihydroxypentane, 1,6-dihydroxyhexane, 1,7-dihydroxyheptane, 1,8-dihydroxyoctane, 1,9-dihydroxynonane, 1,10-dihydroxydecane, 1,11-dihydroxyundecane, 1,12-dihydroxydodecane, dihydroxyneopentyl, 2-ethyl-1,2-dihydroxyhexane and 2-methyl-1,3-dihydroxypropane; dihydroxy cycloalkanes such as 1,3-dihydroxycyclohexane, 1,4-dihydroxycyclohexane and 2,2-bis(4'-hydroxycyclohexyl) propane; o-dihydroxyxylylene, m-dihydroxyxylylene, p-dihydroxyxylylene; 1,4-bis(2'-hydroxyethyl)benzene, 1,4-bis(3'-hydroxypropyl)benzene, 1,4-bis(4'-hydroxybutyl) benzene, 1,4-bis(5'-hydroxypentyl)benzene, 1,4-bis(6'-hydroxyhexyl)benzene; and 2,2-bis[4'-(2"-hydroxyethyloxy)phenyl]propane.

The dihydroxy compound other than that represented by formula (5) may be most preferably 6,6'-dihydroxy-3,3,3',3'-tetramethyl-1,1'-spirobiindan or 9,9-bis(4'-hydroxyphenyl)fluorene.

The dihydroxy compounds other than that represented by formula (5) may be used solely or in combination of two or more.

Furthermore, the polycarbonate of this invention may comprise a structural unit other than that derived from the above dihydroxy compound, as well as a group other than the carbonyl group represented by formula (1).

The structural unit other than that derived from the above dihydroxy compound may be a structural unit derived from a bifunctional compound other than the above dihydroxy compound, or an end group. The bifunctional compounds other than the above dihydroxy compound include aromatic carboxylic acids, aliphatic dicarboxylic acids, aromatic diamines, aliphatic diamines, aromatic diisocyanates and aliphatic diisocyanates. The structural unit other than the carbonyl group represented by formula (1) may be an imino, an ester, an ether, an imide or an amide group.

The structural unit derived from a bifunctional compound other than the above dihydroxy compound may be contained in a proportion of up to 20 mol %, preferably up to 15 mol %, more preferably up to 10 mol %, to the molar amount of the total structural units. The group other than the carbonyl group represented by formula (1) may be contained in a proportion of up to 20 mol %, preferably up to 15 mol %, more preferably up to 10 mol %, to the molar amount of the carbonyl group represented by formula (2) in the copolymeric polycarbonate.

In the polycarbonate of this invention, an end group may be a reactive group such as hydroxy, haloformate and carbonate groups, or an inert group protected by a molecular-weight regulating agent. Examples of the molecular-weight regulating agent may include monovalent hydroxy aliphatic or aromatic compounds, alkaline or alkaline-earth metal salts of monovalent hydroxy aliphatic or aromatic compounds, haloformates of monovalent hydroxy aliphatic or aromatic compounds, carbonates of monovalent hydroxy aliphatic or aromatic compounds, monovalent carboxylic acids, alkaline or alkaline-earth metal salts of monovalent carboxylic acids, acid halides of monovalent carboxylic acids and esters of monovalent carboxylic acids.

Examples of such a molecular-weight regulating agent are as follows. The monovalent hydroxy aliphatic or aromatic compounds include methanol, ethanol, butanol, octanol, lauryl alcohol, methoxyethanol, propyleneglycol monomethyl ether, cyclohexanol, benzyl alcohol, allyl alcohol, phenol, 4-tert-butylphenol, 2-cresol, 3-cresol, 4-cresol, 2-ethylphenol, 4-ethylphenol, 4-cumylphenol, 4-phenylphenol, 4-cyclohexylphenol, 4-n-octylphenol, 4-isooctylphenol, 4-nonylphenol, 4-methoxyphenol, 4-n-hexyloxyphenol, 4-isopropenylphenol, 2-chlorophenol, 3-chlorophenol, 4-chlorophenol, 2-bromophenol, 3-bromophenol, 4-bromophenol, 2,4-dichlorophenol, 2,4-dibromophenol, pentachlorophenol, pentabromophenol, 1-naphthol, α-naphthol and 2-(4'-methoxyphenyl)-2-(4'-hydroxyphenyl)propane.

The alkaline or alkaline-earth metal salts of monovalent hydroxy aliphatic or aromatic compounds include sodium, potassium and calcium salts of the above monovalent hydroxy aliphatic or aromatic compounds.

The haloformate derivatives of monovalent hydroxy aliphatic or aromatic compounds include chloroformate and bromoformates of the above monovalent hydroxy aliphatic or aromatic compounds.

The monovalent carboxylic acids include aliphatic carboxylic acids such as acetic acid, propionic acid, butyric acid, valeric acid, caproic acid, heptanoic acid, caprylic acid, 2,2-dimethylpropionic acid, 3-methylbutyric acid, 3,3-dimethylbutyric acid, 4-methylvaleric acid, 3,3-dimethylvaleric acid, 4-methylcaproic acid, 2,4-dimethylvaleric acid, 3,5-dimethylcaproic acid and phenoxyacetic acid; benzoic acid derivatives such as benzoic acid, 4-propoxybenzoic acid, 4-butoxybenzoic acid, 4-pentyloxybenzoic acid, 4-hexyloxybenzoic acid and 4-octyloxybenzoic acid.

The alkaline or alkaline-earth metal salts of monovalent carboxylic acids include sodium, potassium and calcium salts of the above monovalent carboxylic acids. The acid halides of monovalent carboxylic acids include chlorides and bromides of the above monovalent carboxylic acids.

The end group in the polycarbonate may be about 1 to 10 mol %, preferably 1.5 to 8 mol %, and more preferably 2 to 5 mol %, to the molar amount of the total structural units.

Furthermore, examples of the polycarbonate of this invention include aromatic polyester carbonates, which may be suitably prepared using the dihydroxy compound represented by formula (5) or another dihydroxy compound, a carbonate precursor such as phosgene, an aliphatic or aromatic bivalent carboxylic acid or acid chloride derivative thereof including isophthalic acid, terephathalic acid, isophthalic dichloride and terephthalic dichloride as described in U.S. Pat. No. 3,169,121, and adipic acid, pimelic acid, suberic acid, azelaic acid, sebacic acid and dodecanoic diacid.

The aliphatic or aromatic bivalent carboxylic acid or acid chloride derivative thereof may be used in a proportion of about 5 to 20 mol % to the dihydroxy compound.

The polycarbonate of this invention may be prepared by reacting a carbonate precursor with the dihydroxy compound represented by formula (5), in combination with another dihydroxy compound other than the dihydroxy compound represented by formula (5).

The carbonate precursor is a compound which can react with a hydroxyl group of the dihydroxy compound to form a carbonate bond; for example, a carbonyl halide compound, a haloformate or carbonic diester.

The preparation processes can be classified into the following categories according to the type of the compound used as a carbonate precursor;

A: a process using a dihydroxy compound and a carbonyl halide or a haloformate compound as a carbonate precursor, and B: a process using an aromatic dihydroxy compound and a carbonic diester as a carbonate precursor.

Examples of the carbonyl halide compound herein include carbonyl chloride (phosgene), carbonyl bromide, carbonyl iodide and a mixture thereof; trichloromethyl chloroformate which is a dimer of carbonyl chloride; bis(trichloromethyl) carbonate which is a trimer of carbonyl chloride, preferably carbonyl chloride.

Examples of the haloformate compound include bis or monohaloformates, oligomer type of bis or monohaloformates, and a mixture thereof. Typically, the compounds represented by formula (21) and general formula (22);

bis (4-chlorophenyl) carbonate; dialkyl carbonates such as dimethyl carbonate, diethyl carbonate and di-n-propyl carbonate; and alkyl aryl carbonates such as methyl phenyl carbonate, ethyl phenyl carbonate and butyl phenyl carbonate.

The preparation process A is usually referred to as a solution polymerization or an interfacial polymerization. The solution polymerization is a process wherein a dihydroxy compound is reacted with a carbonyl halide com-

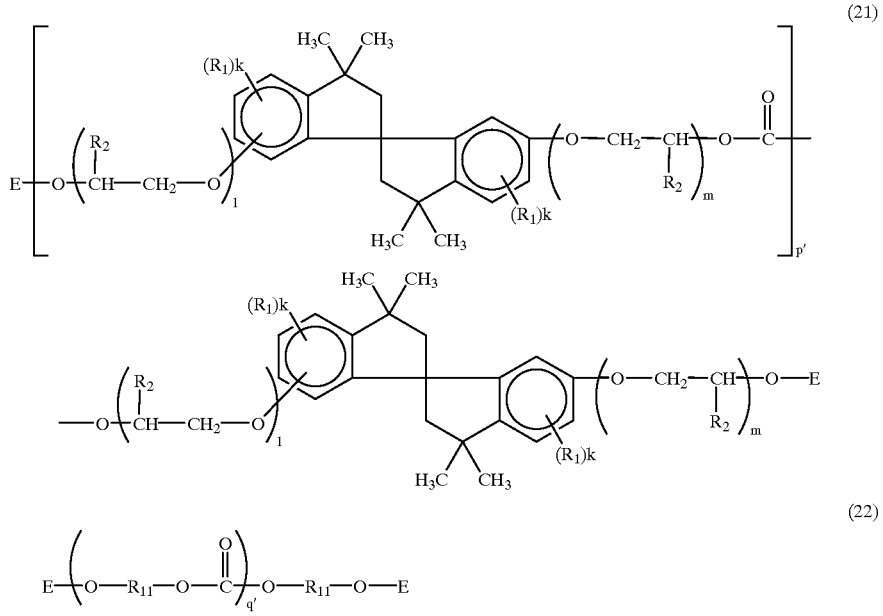

wherein E is hydrogen atom or halocarbonyl group; at least one of E is a halocarbonyl group; $R_1$, $R_2$, k, l and mare as defined above; $R_{11}$ is an aliphatic or aromatic group; and p' and q' are zero or a positive integer.

Examples of the compound represented by formula (21) include bis or monohaloformates and oligomer type of bis or monohalomates derived from the dihydroxy compound represented by formula (5).

Examples of the compound represented by formula (22) include bis or monohaloformates and oligomer type of bis or monohalomates derived from an aliphatic dihydroxy compound; and bis or monohaloformates and oligmer type of bis or monohaloformates derived from an aromatic dihydroxy compound.

$R_{11}$ is a bivalent group derived from an aliphatic or aromatic dihydroxy compound. Examples of the aliphatic dihydroxy compound include dihydroxyalkane, dihydroxycycloalkane and the dihydroxy compound represented by formula (20) as described above. Examples of the aromatic dihydroxy compound include aromatic dihydroxy compounds as described above as well.

The oligomer type of bis or monohaloformate compound may intramolecularly comprise a plurality of $R_{11}$ groups with different structures. These haloformate compounds may be used solely or in combination thereof, or in combination with a carbonyl halide compound.

Examples of the carbonic diester herein include dialkyl carbonates, diaryl carbonates, alkyl aryl carbonates and a mixture thereof. Specific examples of the carbonic diester include diaryl carbonates such as diphenyl carbonate, bis(4-methylphenyl) carbonate, bis(2-nitrophenyl) carbonate and pound such as carbonyl chloride in a presence of an organic base such as pyridine, in an organic solvent. The interfacial polymerization is a process wherein a dihydroxy compound is reacted with a carbonyl halide compound in an interface between an aqueous solution of dihydroxy compound and an alkaline or alkaline-earth metal base and an organic solvent, and is then, if desired, subject to a condensation polymerization in the presence of catalyst such as triethylamine.

The preparation process B is usually referred to as a transesterification, wherein an aromatic dihydroxy compound and a carbonic diester such as diphenyl carbonate are reacted in a melted or solution state under heating, if desired, in-the presence of a catalyst.

The process for preparation of the polycarbonate of this invention may be, not limited to, a known process such as transesterification, interfacial polymerization and solution polymerization.

In the interfacial polymerization, in addition to the dihydroxy and the carbonyl halide compounds, an organic solvent, a catalyst, water an alkaline or alkaline-earth metal base and, if desired, a molecular-weight regulating agent may be used.

An organic solvent herein may be selected without limitation when it can solubilize a haloformate of the dihydroxy compound represented by formula (5) and a polycarbonate derived therefrom, and is inert to the reaction; it may be selected from aliphatic halogenated hydrocarbons such as dichloromethane, chloroform, 1,2-dichloroethane, 1,2-dichloroethylene, trichloroethane, tetrachloroethane and dichloropropane; aromatic halogenated hydrocarbons such as chlorobenzene and dichlorobenzene; and a mixture thereof, preferably an aliphatic halogenated hydrocarbon; more preferably dichloromethane.

A catalyst which may be used in the interfacial polymerization, may be a tertiary amine, a quaternary ammonium salt, a tertiary phosphine, a quaternary phosphonium salt or a nitrogen-containing heterocyclic compound; preferably a tertiary amine; more preferably a trialkyl amine; and most preferably triethylamine.

The amount of the catalyst may be, but not limited to, usually about 0.005 to 1.5 mol % to the total molar amount of the dihydroxy compound used in the polymerization. Examples of the alkaline or alkaline-earth metal base (herein referred to as "base") may include hydroxides or carbonates of an alkaline or alkaline-earth metal such as sodium, potassium and calcium.

In terms of the conditions when the polycarbonate of this invention is prepared by the preparation process A, an interfacial polymerization, a basic aqueous solution or suspension comprising a dihydroxy compound, a base and water is prepared; the solution is then contacted with a carbonyl halide compound in the presence of an organic solvent to prepare an oligomer whose end group is a haloformate group; then, if desired, a catalyst is added; and the mixture is subject to an interfacial reaction with stirring until a polycarbonate with a desired molecular weight is obtained.

The reaction temperature is about 5° C. to a boiling point of the organic solvent used, preferably about 10 to 40° C. The reaction is generally conducted under atmospheric pressure, but can be conducted under an elevated pressure or a reduced pressure. The reaction time may vary depending on various conditions such as the amount of the catalyst and temperature, but a period of about 5 to 120 minutes is generally adequate. Then, the organic-solvent solution of the polycarbonate is neutralized with an acid, it is washed with a deionized water until substantially no electrolytes remain, the organic solvent is evaporated or a poor solvent such as methanol or toluene is added, and then the mixture is heated to be condensed under stirring in an aqueous medium to isolate a solid polycarbonate.

When the polycarbonate of this invention is prepared by the preparation process B, a transesterification, a dihydroxy compound, a carboxylic diester, an organic solvent, a molecular-weight regulating agent and, if desired, a catalyst are used.

The catalyst optionally used in the process B may be any catalyst generally used in a transesterification reaction; for example, alkaline or alkaline-earth metal compounds such as elemental sodium, potassium and lithium, and hydroxides, borohydrides, benzoates and phenoxides thereof; boric acid or borate; nitrogen-containing basic compounds; and elemental metals belonging to 2B, 3B, 4A or 4B group in the periodic table (ed. Japan Chemical Society, Kagaku-Binran, $3^{rd}$ rev., Fundamental, Maruzen (1983)) and their derivatives such as carbonates, halides, inorganic acid salts, complexes, oxides and hydroxides.

In terms of the conditions when a polycarbonate is prepared by the preparation process B, 1 to 1.5 equivalents of a carboxylic diester is used to 1 equivalent of a dihydroxy compound. A little excess amount of the carboxylic diester, i.e., about 1.02 to 1.2 equivalents, is preferably used to the dihydroxy compound.

The reaction is preferably conducted, but not limited to, under heating. The reaction temperature is preferably 60 to 350° C., more preferably 80 to 300° C., more preferably 100 to 280° C. Furthermore, it may be preferable that as the reaction proceeds, the temperature is increasingly raised to about 180 to 300° C. While a temperature significantly lower than about 60° C. may reduce the reaction speed, a temperature significantly higher than about 350° C. may cause heat deterioration of a polymer produced.

A pressure during the reaction can be set to provide an efficient reaction, and is not limited. In general, the pressure is maintained at about 760 to 38000 mmHg, i.e., atmosphere to pressurized state, in the initial phase of the reaction, and then is made to a reduced-pressure, preferably a final pressure of about 0.01 to 100 mmHg. Furthermore, the reaction may be continued until a desired molecular weight is obtained, generally for about 0.2 to 10 hours.

The reaction may be conducted in the air atmosphere, but is conducted preferably in an atmosphere of an inert gas such as nitrogen, helium and argon.

When the polycarbonate of this invention is prepared as a copolymer, the copolymer may have a structure of an alternating, random or block copolymer, as long as it does not adversely affect the effect of this invention.

When the polycarbonate of this invention is prepared as a random copolymer, the dihydroxy compound represented by formula (5) and a dihydroxy compound other than that represented by formula (5) are mixed, and the mixture is treated with a carbonate precursor to give the desired polycarbonate.

When the polycarbonate of this invention is prepared as a block copolymer, either of the dihydroxy compound represented by formula (5) or a dihydroxy compound other than that represented by formula (5) is solely reacted with a carbonate precursor to form an oligomer of an polycarbonate, most ends of which are a haloformate or carbonate, and then the product is treated with the other dihydroxy compound or an polycarbonate oligomer derived from the dihydroxy compound to provide the desired copolymer.

When the polycarbonate of this invention is prepared as an alternating copolymer, either of the dihydroxy compound represented by formula (5) or a dihydroxy compound other than that represented by formula (5) is solely reacted with a carbonate precursor to form an intermediate monomer, whose end is a haloformate or carbonate, and then the product is treated with the other dihydroxy compound to provide the desired copolymer.

The molecular weight of the polycarbonate of this invention is generally, but not limited to, 5000 to 100000, preferably 10000 to 90000, more preferably 15000 to 80000, as a weight-average molecular weight based on a standard polystyrene determined by GPC (gel permeation chromatography).

A polydispersity index represented by a ratio of a weight-average to a number-average molecular weights, is not limited, but preferably 1.5 to 6.0, more preferably 2.0 to 5.0, most preferably 2.0 to 4.5.

The polycarbonate of this invention can be used as a molding material by blending with an aromatic polycarbonate derived from 2,2-bis(4'-hydroxyphenyl)propane, or in combination with another polymer. The polymers which may be combined include polyethylene, polypropylene, polystyrene, ABS resin, poly(methyl methacrylate), polytrifluoroethylene, polytetrafluoroethylene, polyacetal, polyphenylene oxide, polybutylene terephthalate, polyamides, polyimides, polyamide imides, polyetherimides, polysulfones, polyethersulfones, paraoxybenzoyl polyesters, polyarylates and polysulfides.

To the polycarbonate of this invention solely or in combination with another polymer may be added known additives such as a pigment, a dye, a thermal stabilizer, an antioxidant, an ultraviolet absorber, a mold release agent, a halogenated organic compound, an alkaline metal sulfonate, glass fiber, carbon fiber, glass beads, barium sulfate and $TiO_2$, in a known manner, during or after forming the polycarbonate.

The polycarbonate of this invention may be used solely or in combination with another polymer and, if desired, with any of the above additives, as a molding material to be molded into a product such as a chassis for an electric device, a housing material, an electronic component, an automobile component, a substrate for an information recording medium such as an optical disk, an optical material for a lens for a camera or glasses and a construction material as an alternative to glass.

The polyester of this invention is thermoplastic, which can be subject to injection molding, extrusion molding, blow molding or impregnation into, for example, fillers, in a melted state, and can be readily molded by a variety of known processes such as compression molding and solution casting.

A low-birefringent organic optical component from the polycarbonate of this invention may be suitably prepared by a variety of known processes described above, typically by injection molding.

The following will describe the acrylate of this invention represented by formula (6), a curable resin composition comprising the acrylate, and a polymer comprising a polymer prepared by polymerizing the acrylate, respectively.

In formula (6), $R_1$, $R_2$ and k are as defined above; l and m are independently an integer of 0 to 20, preferably 0 to 10; each $R_3$ is independently hydrogen atom or methyl group.

In the compound represented by formula (6), a substituent comprising one acrylate group is at 4, 5, 6 or 7 position, while a substituent comprising the other acrylate group is at 4', 5', 6', or 7' position. The acrylate is preferably the compound represented by any of formulas (6-A) to (6-D), more preferably (6-A), (6-C) or (6-D) most preferably (6-C) or (6-D).

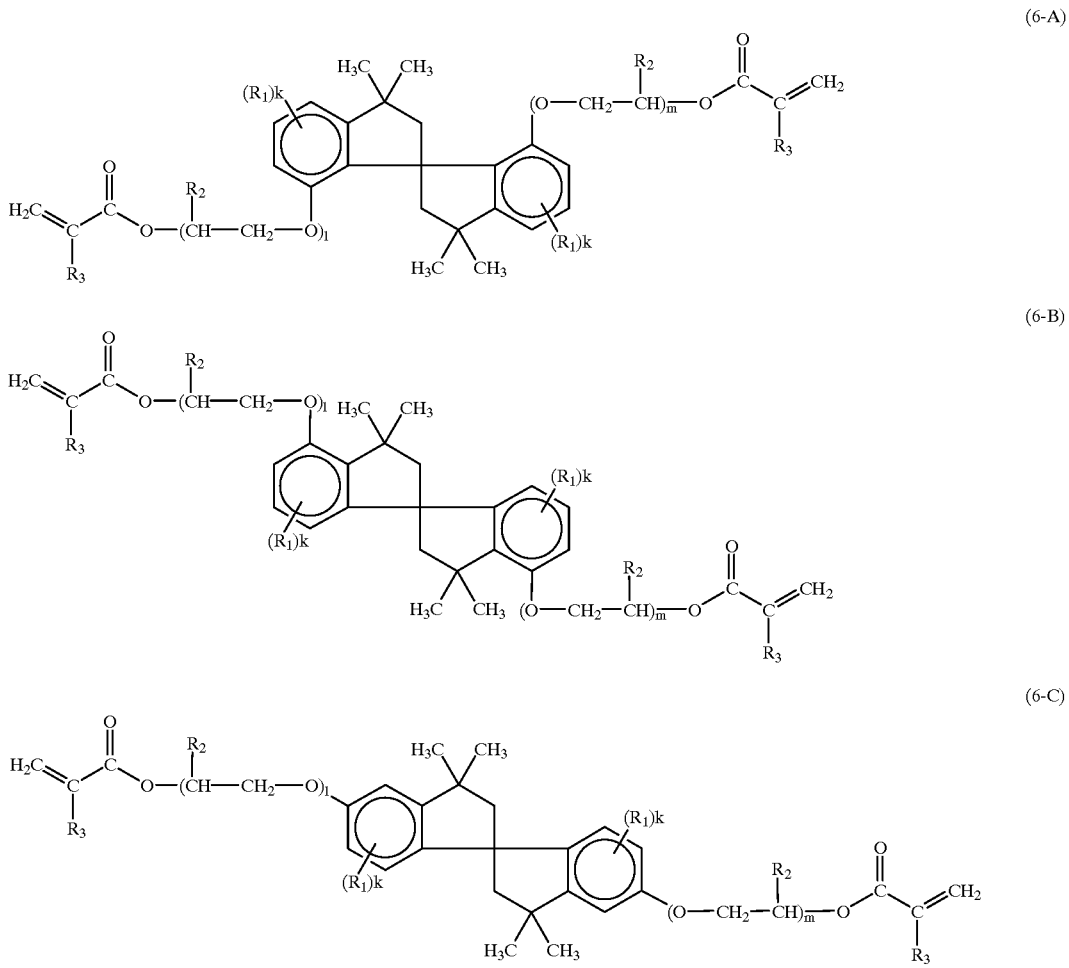

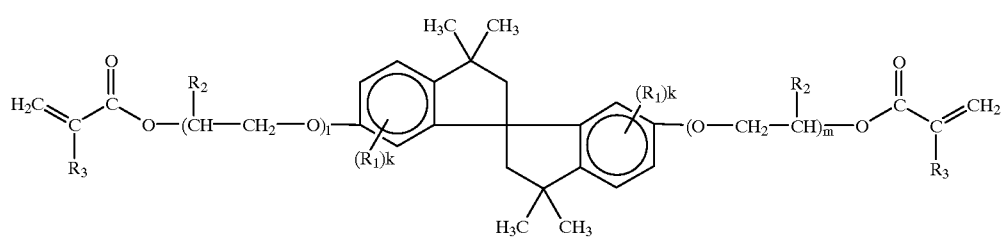

(6-D)

Specific examples of the acrylate represented by formula (6) represented by the formulas below and shown in Table 2, wherein a substitution position of each substituent is shown in a number, and l and m are an integer of 0 to 20.

TABLE 2

| Comd. No. | Positions of X and Y | $R_2$ | Position of $R_1$ | $R_1$ | l + m |
|---|---|---|---|---|---|
| 1 | 4,4'- | H | — | — | 3 |
| 2 | 4,4'- | $CH_3$ | — | — | 4 |
| 3 | 4,4'- | H | 6,6'- | methyl | 3 |
| 4 | 4,4'- | $CH_3$ | 7,7'- | n-propyl | 2 |
| 5 | 4,4'- | H | 5,5'- | tert-butyl | 3 |
| 6 | 4,4'- | $CH_3$ | 6,6'- | n-decyl | 3 |
| 7 | 4,4'- | H | 6,6'- | cyclohexyl | 5 |
| 8 | 4,4'- | $CH_3$ | 7,7'- | methoxy | 3 |
| 9 | 4,4'- | H | 6,6'- | isopropoxy | 2 |
| 10 | 4,4'- | $CH_3$ | 7,7'- | n-hexyloxy | 4 |
| 11 | 4,4'- | H | 5,5'- | cyclohexyloxy | 1 |
| 12 | 4,4'- | $CH_3$ | 6,6'- | methoxyethoxy | 3 |
| 13 | 4,4'- | H | 7,7'- | chloro | 4 |
| 14 | 5,5'- | $CH_3$ | — | — | 3 |
| 15 | 5,5'- | H | — | — | 5 |
| 16 | 5,5'- | $CH_3$ | 7,7'- | n-propyl | 3 |
| 17 | 5,5'- | H | 4,4'- | ethyl | 4 |
| 18 | 5,5'- | $CH_3$ | 6,6'- | isopropyl | 2 |
| 19 | 5,5'- | H | 6,6'- | n-hexyl | 3 |
| 20 | 5,5'- | $CH_3$ | 7,7'- | n-nonyl | 4 |
| 21 | 5,5'- | $CH_3$ | 7,7'- | cyclopentyl | 4 |
| 22 | 5,5'- | H | 4,4'- | ethoxy | 6 |
| 23 | 5,5'- | $CH_3$ | 7,7'- | tert-butoxy | 3 |
| 24 | 5,5'- | H | 4,4'- | ethoxypropoxy | 4 |
| 25 | 5,5'- | $CH_3$ | 6,6'- | cyclohexyloxy | 3 |
| 26 | 5,5'- | H | 6,6'- | 2,2,2-trichloroethoxy | 4 |
| 27 | 5,5'- | $CH_3$ | 7,7'- | chloro | 3 |
| 28 | 6,6'- | H | — | — | 3 |
| 29 | 6,6'- | $CH_3$ | — | — | 5 |
| 30 | 6,6'- | H | 4,4'- | methyl | 6 |
| 31 | 6,6'- | $CH_3$ | 4,4'- | methyl | 3 |
| 32 | 6,6'- | H | 5,5'- | methyl | 2 |
| 33 | 6,6'- | $CH_3$ | 5,5'- | methyl | 3 |
| 34 | 6,6'- | H | 7,7'- | methyl | 3 |
| 35 | 6,6'- | $CH_3$ | 7,7'- | methyl | 6 |
| 36 | 6,6'- | H | 4,4'- | ethyl | 3 |
| 37 | 6,6'- | $CH_3$ | 4,4'- | ethyl | 5 |
| 38 | 6,6'- | H | 5,5'- | ethyl | 2 |
| 39 | 6,6'- | $CH_3$ | 5,5'- | ethyl | 3 |
| 40 | 6,6'- | H | 7,7'- | ethyl | 4 |
| 41 | 6,6'- | $CH_3$ | 7,7'- | ethyl | 3 |
| 42 | 6,6'- | H | 5,5'- | n-propyl | 5 |
| 43 | 6,6'- | $CH_3$ | 5,5'- | n-propyl | 3 |
| 44 | 6,6'- | H | 7,7'- | n-propyl | 4 |
| 45 | 6,6'- | $CH_3$ | 7,7'- | n-propyl | 5 |
| 46 | 6,6'- | H | 4,4'- | isopropyl | 6 |
| 47 | 6,6'- | $CH_3$ | 5,5'- | isopropyl | 3 |
| 48 | 6,6'- | H | 7,7'- | isopropyl | 3 |
| 49 | 6,6'- | H | 4,4'- | n-butyl | 2 |
| 50 | 6,6'- | $CH_3$ | 5,5'- | n-butyl | 3 |
| 51 | 6,6'- | H | 5,5'- | tert-butyl | 4 |
| 52 | 6,6'- | $CH_3$ | 7,7'- | tert-butyl | 4 |
| 53 | 6,6'- | H | 5,5'- | isobutyl | 3 |
| 54 | 6,6'- | $CH_3$ | 7,7'- | isobutyl | 4 |
| 55 | 6,6'- | H | 4,4'- | n-pentyl | 6 |
| 56 | 6,6'- | $CH_3$ | 5,5'- | isopentyl | 4. |
| 57 | 6,6'- | H | 7,7'- | isoamyl | 2 |
| 58 | 6,6'- | $CH_3$ | 4,4'- | n-hexyl | 3 |
| 59 | 6,6'- | $CH_3$ | 5,5'- | 2-ethylhexyl | 4 |
| 60 | 6,6'- | H | 7,7'- | n-octyl | 4 |
| 61 | 6,6'- | $CH_3$ | 5,5'- | n-decyl | 2 |
| 62 | 6,6'- | H | 5,5'- | cyclopentyl | 4 |
| 63 | 6,6'- | $CH_3$ | 7,7'- | cyclopentyl | 3 |
| 64 | 6,6'- | H | 5,5'- | cyclohexyl | 4 |
| 65 | 6,6'- | H | 7,7'- | cyclohexyl | 2 |
| 66 | 6,6'- | $CH_3$ | 4,4'- | cyclohexyl | 6 |
| 67 | 6,6'- | $CH_3$ | 5,5'- | cyclohexyl | 3 |
| 68 | 6,6'- | $CH_3$ | 7,7'- | cyclohexyl | 1 |
| 69 | 6,6'- | H | 5,5'- | cyclohexylmethyl | 3 |
| 70 | 6,6'- | H | 7,7'- | cyclohexylethyl | 4 |
| 71 | 6,6'- | $CH_3$ | 5,5'- | cyclooctyl | 2 |
| 72 | 6,6'- | $CH_3$ | 7,7'- | tetrahydrofuryl | 4 |
| 73 | 6,6'- | H | 4,4'- | methoxymethyl | 4 |
| 74 | 6,6'- | $CH_3$ | 5,5'- | methoxyethyl | 6 |
| 75 | 6,6'- | H | 7,7'- | 3-ethoxypropyl | 4 |
| 76 | 6,6'- | $CH_3$ | 5,5'- | 2-n-butoxyethyl | 4 |
| 77 | 6,6'- | H | 4,4'- | 3-n-propoxypropyl | 8 |
| 78 | 6,6'- | $CH_3$ | 5,5'- | 3-n-hexyloxypropyl | 4 |
| 79 | 6,6'- | H | 7,7'- | 2-methoxyethoxyethyl | 4 |
| 80 | 6,6'- | $CH_3$ | 5,5'- | 2-ethoxyethoxyethyl | 4 |
| 81 | 6,6'- | $CH_3$ | 4,4'- | 2-phenoxymethyl | 3 |
| 82 | 6,6'- | H | 5,5'- | 2-phenoxymethyl | 4 |
| 83 | 6,6'- | $CH_3$ | 5,5'- | 2-chloroethyl | 6 |
| 84 | 6,6'- | H | 7,7'- | 3-chloropropyl | 4 |
| 85 | 6,6'- | $CH_3$ | 5,5'- | 2,2,2-trichloroethyl | 2 |
| 86 | 6,6'- | H | 4,4'- | methoxy | 4 |
| 87 | 6,6'- | $CH_3$ | 4,4'- | methoxy | 1 |
| 88 | 6,6'- | H | 5,5'- | methoxy | 4 |
| 89 | 6,6'- | $CH_3$ | 5,5'- | methoxy | 6 |
| 90 | 6,6'- | H | 7,7'- | methoxy | 4 |
| 91 | 6,6'- | $CH_3$ | 7,7'- | methoxy | 4 |
| 92 | 6,6'- | H | 4,4'- | ethoxy | 4 |
| 93 | 6,6'- | $CH_3$ | 5,5'- | n-propoxy | 6 |
| 94 | 6,6'- | H | 7,7'- | n-propoxy | 3 |
| 95 | 6,6'- | $CH_3$ | 7,7'- | isopropoxy | 2 |
| 96 | 6,6'- | H | 4,4'- | isopropoxy | 1 |
| 97 | 6,6'- | $CH_3$ | 5,5'- | n-butoxy | 4 |
| 98 | 6,6'- | H | 7,7'- | n-butoxy | 4 |
| 99 | 6,6'- | H | 4,4'- | isobutoxy | 4 |
| 100 | 6,6'- | $CH_3$ | 5,5'- | tert-butoxy | 6 |
| 101 | 6,6'- | H | 7,7'- | tert-butoxy | 8 |
| 102 | 6,6'- | $CH_3$ | 4,4'- | sec-butoxy | 10 |
| 103 | 6,6'- | H | 5,5'- | n-pentyloxy | 4 |
| 104 | 6,6'- | $CH_3$ | 7,7'- | n-hexyloxy | 6 |
| 105 | 6,6'- | H | 4,4'- | 2-ethylhexyloxy | 4 |
| 106 | 6,6'- | $CH_3$ | 5,5'- | n-octyloxy | 4 |
| 107 | 6,6'- | H | 7,7'- | n-decyloxy | 4 |
| 108 | 6,6'- | $CH_3$ | 4,4'- | cyclopentyloxy | 2 |
| 109 | 6,6'- | $CH_3$ | 4,4'- | cyclohexyloxy | 4 |

TABLE 2-continued

| Comd. No. | Positions of X and Y | $R_2$ | Position of $R_1$ | $R_1$ | $l + m$ |
|---|---|---|---|---|---|
| 110 | 6,6'- | $CH_3$ | 5,5'- | cyclohexyloxy | 2 |
| 111 | 6,6'- | H | 7,7'- | cyclohexyloxy | 3 |
| 112 | 6,6'- | H | 4,4'- | 4-tert-butylcyclohexyloxy | 4 |
| 113 | 6,6'- | $CH_3$ | 5,5'- | cycloheptyloxy | 4 |
| 114 | 6,6'- | H | 7,7'- | cyclooctyloxy | 4 |
| 115 | 6,6'- | $CH_3$ | 7,7'- | cyclohexylmethoxy | 3 |
| 116 | 6,6'- | H | 4,4'- | cyclohexylethoxy | 4 |
| 117 | 6,6'- | $CH_3$ | 5,5'- | 2-methoxyethoxy | 1 |
| 118 | 6,6'- | H | 7,7'- | 2-ethoxyethoxy | 4 |
| 119 | 6,6'- | H | 4,4'- | 2-n-butoxyethoxy | 6 |
| 120 | 6,6'- | $CH_3$ | 5,5'- | 3-methoxypropoxy | 4 |
| 121 | 6,6'- | H | 7,7'- | 3-n-propoxypropoxy | 4 |
| 122 | 6,6'- | $CH_3$ | 4,4'- | 3-n-butoxypropoxy | 4 |
| 123 | 6,6'- | H | 5,5'- | 2-methoxyethoxyethoxy | 3 |
| 124 | 6,6'- | $CH_3$ | 7,7'- | 2-phenoxy | 4 |
| 125 | 6,6'- | H | 4,4'- | 2-phenoxyethoxyethoxy | 4 |
| 126 | 6,6'- | $CH_3$ | 5,5'- | chloromethoxy | 4 |
| 127 | 6,6'- | H | 7,7'- | chloromethoxy | 4 |
| 128 | 6,6'- | $CH_3$ | 4,4'- | 2-chloroethoxy | 4 |
| 129 | 6,6'- | $CH_3$ | 5,5'- | 2-chloroethoxy | 6 |
| 130 | 6,6'- | $CH_3$ | 5,5'- | 2-chloropropoxy | 6 |
| 131 | 6,6'- | H | 7,7'- | 3-chloropropoxy | 6 |
| 132 | 6,6'- | H | 4,4'- | 2,2,2-trichloroethoxy | 6 |
| 133 | 6,6'- | $CH_3$ | 5,5'- | 2,2,2-trichloroethoxy | 4 |
| 134 | 6,6'- | H | 7,7'- | 2,2,2-trichloroethoxy | 4 |
| 135 | 6,6'- | $CH_3$ | 7,7'- | 2,2,2-trichloroethoxy | 2 |
| 136 | 6,6'- | H | 4,4'- | 2,2,2-trifluoroethoxy | 2 |
| 137 | 6,6'- | $CH_3$ | 5,5'- | 2,2,2-trifluoroethoxy | 2 |
| 138 | 6,6'- | H | 7,7'- | 2,2,2-trifluoroethoxy |  |
| 139 | 6,6'- | H | 4,4'- | nitro | 4 |
| 140 | 6,6'- | $CH_3$ | 5,5'- | fluoro | 4 |
| 141 | 6,6'- | H | 7,7'- | fluoro | 6 |
| 142 | 6,6'- | H | 4,4'- | chloro | 6 |
| 143 | 6,6'- | $CH_3$ | 5,5'- | chloro | 6 |
| 144 | 6,6'- | H | 7,7'- | chloro | 4 |
| 145 | 6,6'- | $CH_3$ | 7,7'- | chloro | 2 |
| 146 | 6,6'- | H | 4,4'- | bromo | 2 |
| 147 | 6,6'- | $CH_3$ | 5,5'- | bromo | 2 |
| 148 | 6,6'- | H | 7,7'- | iodo | 2 |
| 149 | 7,7'- | H | — | — | 4 |
| 150 | 7,7'- | $CH_3$ | — | — | 4 |
| 151 | 7,7'- | $CH_3$ | 6,6'- | ethyl | 4 |
| 152 | 7,7'- | H | 4,4'- | isopropyl | 6 |
| 153 | 7,7'- | $CH_3$ | 6,6'- | tert-butyl | 4 |
| 154 | 7,7'- | H | 6,6'- | n-hexyl | 8 |
| 155 | 7,7'- | $CH_3$ | 5,5'- | n-decyl | 4 |
| 156 | 7,7'- | $CH_3$ | 5,5'- | cyclohexyl | 4 |
| 157 | 7,7'- | H | 4,4'- | methoxy | 6 |
| 158 | 7,7'- | $CH_3$ | 5,5'- | n-propoxy | 4 |
| 159 | 7,7'- | H | 4,4'- | methoxypropoxy | 4 |
| 160 | 7,7'- | $CH_3$ | 6,6'- | cyclooctyloxy | 6 |
| 161 | 7,7'- | H | 5,5'- | 2,2,2-trichloroethyloxy | 4 |
| 162 | 7,7'- | $CH_3$ | 6,6'- | fluoro | 4 |
| 163 | 4,4'- | H | 5,5',6,6'- | methyl | 4 |
| 164 | 4,4'- | $CH_3$ | 5,5',7,7'- | ethoxy | 8 |
| 165 | 4,4'- | H | 6,6',7,7'- | chloro | 4 |
| 166 | 5,5'- | $CH_3$ | 4,4',7,7'- | ethyl | 4 |
| 167 | 5,5'- | H | 4,4',6,6'- | n-propyl | 2 |
| 168 | 5,5'- | $CH_3$ | 6,6',7,7'- | fluoro | 6 |
| 169 | 6,6'- | H | 4,4',5,5'- | methyl | 5 |
| 170 | 6,6'- | $CH_3$ | 4,4',5,5'- | methyl | 4 |
| 171 | 6,6'- | H | 5,5',7,7'- | methyl | 4 |
| 172 | 6,6'- | $CH_3$ | 5,5',7,7'- | methyl | 3 |
| 173 | 6,6'- | H | 4,4',7,7'- | methyl | 4 |
| 174 | 6,6'- | $CH_3$ | 4,4',7,7'- | methyl | 2 |
| 175 | 6,6'- | $CH_3$ | 4,4',7,7'- | tert-butyl | 2 |
| 176 | 6,6'- | H | 5,5',7,7'- | cyclohexyl | 1 |
| 177 | 6,6'- | H | 4,4',5,5'- | 2-methoxyethyl | 4 |
| 178 | 6,6'- | H | 4,4',5,5'- | methoxy | 4 |
| 179 | 6,6'- | $CH_3$ | 4,4',5,5'- | methoxy | 10 |
| 180 | 6,6'- | H | 4,4',7,7'- | methoxy | 12 |
| 181 | 6,6'- | $CH_3$ | 5,5',7,7'- | methoxy | 4 |
| 182 | 6,6'- | H | 4,4',5,5'- | ethoxy | 4 |
| 183 | 6,6'- | $CH_3$ | 4,4',7,7'- | n-propoxy | 4 |
| 184 | 6,6'- | H | 5,5',7,7'- | isobutoxy | 4 |
| 185 | 6,6'- | $CH_3$ | 4,4',5,5'- | tert-butoxy | 6 |
| 186 | 6,6'- | H | 4,4',7,7'- | octyloxy | 6 |
| 187 | 6,6'- | H | 4,4',5,5'- | cyclohexyloxy | 4 |
| 188 | 6,6'- | H | 4,4',5,5'- | chloro | 4 |
| 189 | 6,6'- | H | 5,5',7,7'- | fluoro | 4 |
| 190 | 6,6'- | H | 4,4',5,5',7,7'- | chloro | 2 |
| 191 | 6,6'- | $CH_3$ | 4,4',5,5',7,7 | fluoro | 4 |
| 192 | 7,7'- | H | 4,4',6,6'- | ethyl | 4 |
| 193 | 7,7'- | $CH_3$ | 4,4',7,7'- | methoxy | 4 |
| 194 | 7,7'- | H | 4,4',6,6'- | chloro | 4 |
| 195 | 7,7'- | H | 4,4',5,5',6,6'- | fluoro | 4 |

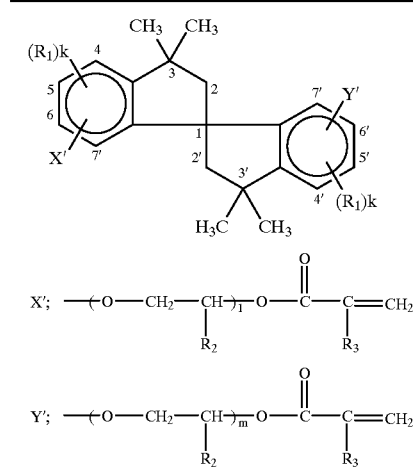

The acrylate of this invention may be prepared by a known process itself, for example the process described in JP-A 4-324408. Typically, it can be prepared by reacting the dihydroxy compound represented by formula (5) with (meth)acrylic acid or (meth)acrylic chloride.

A process for preparing the acrylate of this invention represented by formula (6) will be described.

Reaction of the dihydroxy compound represented by formula (5) with (meth)acrylic acid or (meth)acrylic chloride, may be conducted, for example, as described in J. Org. Chem., 45, 5364 (1980) or Eur. Polym. J., 19, 399 (1983). Typically, examples of such a process may include one wherein (meth)acrylic chloride is dropped into the dihydroxy compound represented by formula (5) with stirring, or dehydration reaction of the dihydroxy compound represented by formula (5) and (meth)acrylic acid.

The following will describe the process in which (meth)acrylic chloride is dropped into the dihydroxy compound represented by formula (5).

In this process, the amount of (meth) acrylic chloride used in the reaction may be generally 1.5 to 6 mol, preferably 2 to 4 mol, more preferably 2 to 3 mol to 1 mol of the dihydroxy compound.

The reaction may be conducted without or with a solvent. Solvents which may be used in the reaction include hydrocarbons such as n-hexane, benzene and toluene; ketones such as acetone, methyl ethyl ketone or methyl isobutyl ketone; esters such as ethyl acetate and butyl acetate; ethers such as diethyl ether, tetrahydrofuran and dioxane; halogenated hydrocarbons such as dichloromethane, chloroform, carbon tetrachloride, 1,2-dichloroethane and percrene. Also, a mixture thereof may be suitably used.

The reaction temperature is generally 0 to 200° C., preferably 0 to 100° C. The reaction period is generally a few minutes to several tens of hours, substantially depending on the conditions such as a reaction temperature. During this reaction, hydrogen chloride is produced as a by-product, which can be trapped by an organic base such as dimethylaniline, or an inorganic base such as sodium bicarbonate, sodium carbonate and potassium carbonate.

It is preferable to use an inhibitor for preventing polymerization during the reaction. Preferable inhibitors include metoquinone, hydroquinone and phenothiazine. The amount of the inhibitor may be preferably 0.01 to 3%, more preferably 0.05 to 1%, to a mixture of starting materials.

The following will describe a dehydration reaction of a mixture of dihydroxy compound represented by formula (5) and (meth)acrylic acid to provide the acrylate of this invention represented by formula (6).

In this process, the amount of (meth)acrylic acid reacted with the dihydroxy compound represented by formula (5) may be generally 1.5 to 6 mol, preferably 2 to 4 mol, more preferably 2 to 3 mol to 1 mol of the dihydroxy compound.

Preferably the reaction is conducted in the presence of a variety of known esterification catalysts. Preferable catalysts include inorganic acids such as hydrochloric acid and sulfuric acid; organic acids such as methanesulfonic acid, benzenesulfonic acid and p-toluenesulfonic acid; and Lewis acids such as boron trifluoride and aluminum trichloride.

The amount of the catalyst may be preferably 0.1 to 50% by weight, more preferably 0.3 to 30% by weight, to a mixture of the starting materials.

The reaction may be conducted with or without a solvent, preferably with a solvent. Solvents which may be used are, but not limited to, those generally used in esterification including hydrocarbons such as n-hexane, benzene, toluene and xylenes; ethers such as diethyl ether, tetrahydrofuran and dioxane; halogenated hydrocarbons such as dichloromethane, chloroform, carbon tetrachloride, 1,2-dichloroethane and percrene. Also, a mixture thereof may be suitably used.

It is preferable to remove water generated as a by-product from the reaction system for accelerating the reaction, by using, for example, one of the above solvents which can be azeotropically distilled with water, or a dehydrating agent such as molecular sieves.

It is preferable to use an inhibitor for preventing polymerization during the reaction. Preferable inhibitors include metoquinone, hydroquinone and phenothiazine. The amount of the inhibitor may be preferably 0.01 to 3%, more preferably 0.05 to 1%, to a mixture of starting materials.

The reaction temperature is generally 0° C. to the boiling point of the solvent used, preferably 30° C. to the boiling point of the solvent used. The reaction period is generally a few minutes to several tens of hours, substantially depending on the conditions such as a reaction temperature.

At the end of the reaction, the acrylate compound represented by formula (6) is subject to a post-treatment such as neutralization, solvent extraction and separation of liquid phases as usual. Furthermore, if necessary, it is possible that it is purified according to a known process such as recrystallization, column chromatography and charcoal treatment, to provide a highly pure compound.

When the dihydroxy compound represented by formula (5) is a mixture of dihydroxy compounds which are different from each other in l and m, it gives a mixture of acrylates which are different from each other in l and m. Of course, such a mixture can be suitably used in preparation of the low-birefringent organic optical component of this invention.

The following will describe a curable resin composition comprising the acrylate represented by formula (6), and a low-birefringent organic optical component which is prepared using a polymer formed by polymerizing an acrylate represented by formula (6).

The low-birefringent organic optical component of this invention may be formed by preparing a curable resin composition comprising an acrylate, and molding a polymer prepared by polymerizing the curable resin composition as described later.

The curable resin composition of this invention comprises the acrylate of this invention represented by formula (6), and may additionally comprise a reaction diluent and a known resin described later, photo- and/or thermal polymerization initiators. The amount of the acrylate of this invention in the curable resin composition of this invention may be preferably 10 to 99% by weight, more preferably 20 to 90% by weight. Using a plurality of the acrylates represented by formula (6) does not adversely affect the effect of this invention.

Such curable resin compositions may comprise, besides the acrylates of this invention, an epoxy compound such as phenol novolac type of epoxy resins, cresol novolac type of epoxy resins, bisphenol type of epoxy resins, phenol aralkyl type of epoxy resins, tris(2,3-epoxypropyl) isocyanurate and 6,6'-dihydroxy-3,3,3',3-tetramethylspirobiindan glycidyl ether; an epoxy(meth)acrylate as a reaction product of any of these epoxy compounds with (meth)acrylic acid; a polyester acrylate; and/or a reactive monomer such as styrene, vinyl acetate, N-vinylpyrrolidone, butyl acrylate, carbitol (meth) acrylate, phenoxyethyl (meth)acrylate, tripropyleneglycol (meth)acrylate, 1,6-hexanediol di(meth)acrylate, tetraethyleneglycol di(meth)acrylate, pentaerythritol tetra(meth) acrylate, trimethylolpropane tri(meth)acrylate, tris (hydroxyethyl)isocyanurate tri(meth)acrylate and dipentaerythritol hexa(meth)acrylate. The amount of these may be preferably 0 to 200 parts by weight, more preferably 0 to 100 parts by weight, to 100 parts of the acrylate of this invention represented by general formula (6).

When using an epoxy compound, an epoxy-resin curing agent may be used; for example, dicyane diamide and its derivatives, imidazoles, triazines, ureas, aromatic amines, polyphenols and cationic photopolymerization catalysts. The amount of the epoxy-resin curing agent may be preferably 0.1 to 50 parts by weight, more preferably 0.5 to 30 parts by weight, to 100 parts of the above epoxy compound.

The photoinitiator may be selected from a variety of known photoinitiators. Preferable photoinitiators include benzoin, benzil, benzoin methyl ether, benzoin ethyl ether, benzoin isopropyl ether, benzoin isobutyl ether, acetophenone, 2,2-dimethoxy-2-phenylacetophenone, 1,1-dichloroacetophenone, 1-hydroxycyclohexyl phenyl ketone, 2-methyl-1-(4-methylthiophenyl)-2-morpholinopropan-1-one, N,N-dimethylamino-acetophenone, 4,4'-diethylaminobenzophenone, 2-methylanthraquinone, 2-ethylanthraquinone, 2-tert-butylanthraquinone, 1-chloroanthraquinone, 2-amylanthraquinone, 2,4-dimethylthioxanthone, 2,4-diethylthioxanthone, 2-isopropylthioxanthone, 2,4-diisopropylthioxanthone, acetophenone dimethyl ketal, benzophenone, 4-methylbenzophenone, 4,4'-dichlorobenzophenone, 4,4'-bis(diethylamino)benzophenone, Michler's ketone, methyl o-benzoylacetate, 2-hydroxy-2-methyl-1-phenylpropan-1-one and acylphosphine oxide, which can be solely or in combination of two or more.

The amount of the initiator may be preferably 0 to 50 parts by weight, more preferably 5 to 35 parts by weight, to 100 parts of the acrylate of this invention.

It is preferable to concomitantly use the photoinitiator and one or more of known photosensitizer. Examples of the photosensitizer may include methyl N,N-dimethylaminobenzoate, ethyl N,N-dimethylaminobenzoate, isoamyl N,N-dimethylaminobenzoate, triethanolamine and triethylamine. A preferable combination of the photoinitiator and the photosensitizer may be, for example, 2,4-diethylthioxanthone or 2-isopropylthioxanthone and ethyl N,N-dimethylaminobenzoate.

A preferable combination of the photoinitiators may be, for example, 2-methyl-1-(4-methylthiophenyl)-2-morpholinopropan-1-one and 2,4-diethylthioxanthone or 2-isopropylthioxanthone.

Examples of the radical polymerization initiator used in thermal polymerization may include, but not limited to, known peroxides such as benzoyl peroxide, p-chlorobenzoyl peroxide, diisopropyl peroxycarbonate, di-2-ethylhexyl peroxycarbonate and tert-butyl peroxypivalate; and azo compounds such as azobisisobutyronitrile. The amount of the thermal polymerization initiator may be preferably 0 to 50 parts by weight, more preferably 0.01 to 35 parts by weight, to 100 parts of the (meth)acrylate of this invention.

In preparing the curable resin composition of this invention, if necessary, there may be added inorganic fillers such as talc, alumina, barium sulfate and magnesium oxide; thixotropy agents such as aerogel; melamine resins such as hexamethoxy melamine and hexabutoxy melamine; leveling agents such as silicone, fluorinated polymers and acrylate copolymers; color pigments such as cyanine green and cyanine blue; defoaming agent; ultraviolet absorbers; anti-oxidants; polymerization inhibitors; flow regulating agents; and blueing agents.

A polymer prepared by polymerizing the acrylate of this invention represented by formula (6) may be obtained by curing the curable resin composition prepared by the above process, according to a known curing process such as those using light including electron beam and UV rays or heat. Preferably, the composition may be, if necessary, post-cured after curing by electron beam or UV rays, or may be cured by heat curing, to provide a polymer.

The conditions for photo-curing may vary depending on a variety of variants such as a photopolymerization initiator, a photosensitizer, a reactive monomer, a distance of a light source and its intensity, but may be acceptable if they are sufficient to cure the above curable resin composition.

In post-curing or heat curing, the heating temperature may vary depending on variants such as a thermal polymerization initiator and a reactive monomer, and is preferably 50 to 180° C., more preferably 60 to 170° C. The temperature can be gradually increased. The heating period may be preferably 10 min to 20 hours, more preferably 30 min to 10 hours.

A low-birefringent organic optical component formed from a polymer prepared by polymerizing the acrylate of this invention represented by formula (6) may be preferably prepared according to a variety of known molding processes described below.

For example, an optical or magneto-optical disk substrate may be prepared by a process comprising pouring a polymerizable composition comprising monomer into, for example, the cavity of a template for a disk substrate, polymerizing it by an appropriate process such as radical polymerization, and then, if necessary, post-heating it as described in JP-A60 58-130450, 58-137150 or 62-280008; a process comprising photopolymerization of the composition in a double-glass template as described in JP-A 202557; and a process comprising vacuum injection or injection of a solution and then compressing the liquid resin to be subject to thermal polymerization as described in JP-A 60-203414.

An optical lens may be suitably formed by casting polymerization as described in JP-A 60-135901. Preferably, a polymerizable resin composition comprising the above epoxy resin, an epoxyacrylate resin or an acid-modified epoxyacrylate resin may be, if necessary, defoamed according to an appropriate manner, is poured into a mold, and generally is gradually heated from a lower temperature to a higher temperature to be polymerized.

The polyester of this invention will be described below.

The polyester of this invention is one comprising the structural unit represented by formula (7);

In formula (7), $R_1$, $R_2$ and k are as defined above.

In formula (7), l and m are independently an integer of 0 to 20, preferably 0 to 10, more preferably 0 to 6, more preferably 0 to 4, most preferably 0 to 2, although l+m is not zero.

In formula (7), $R_4$ is an alkylene, aralkylene or arylene group; preferably a straight, branched or cyclic alkyl group with 1 to 20 carbons, an aralkylene group with 8 to 12 carbons, or an arylene group with 6 to 20 carbons; more preferably a straight, branched or cyclic alkyl group with 1 to 12 carbons, an optionally substituted xylylene group with 8 to 12 carbons, or an optionally substituted phenylene, naphthylene or biphenylene group with 6 to 12 carbons in total.

Specifically, $R_4$ may include alkylene groups such as methylene, ethylene, trimethylene, butylene, pentamethylene and octamethylene;

cycloalkylenes such as 1,4-cyclohexylene, 1,3-cyclohexylene, 1,2-cyclohexylene, 5-norbornen-2,3-yl, norbornan-2,3-yl, norbornan-2,5-yl, norbornan-2,6-yl and norbornan-3,6-yl;

arylalkylene groups such as 1,4-xylynene, 1,3-xylylene and 1,2-xylylene; and arylene groups such as 1,4-phenylene, 1,3-phenylene, 1,2-phenylene, 1,5-naphthylene, 1,8-naphthylene, 2,3-naphthylene, 2,6-naphthylene, 4,4'-biphenylene.

Among these substituents, in the light of various properties such as optical properties and heat resistance when used as the low-birefringent organic optical component of this invention, $R_4$ is preferably a bicycloalkylene or arylene group, most preferably 5-norbornen-2,3-yl, norbornan-2,3-yl, norbornan-2,5-yl, norbornan-2,6-yl, norbornan-3,6-yl, 1,4-phenylene, 1,3-phenylene or 1,2-phenylene.

In the structural unit represented by formula (7), a substitute comprising the hydroxy moiety constituting the ester bond is at 4, 5, 6 or 7 position, while the other substituent is at 4', 5', 6' or 7' position.

Among these, preferable units are those represented by formulas (7-A) to (7-D), more preferably (7-A), (7-C) and (7-D), most preferably (7-C) and (7-D);

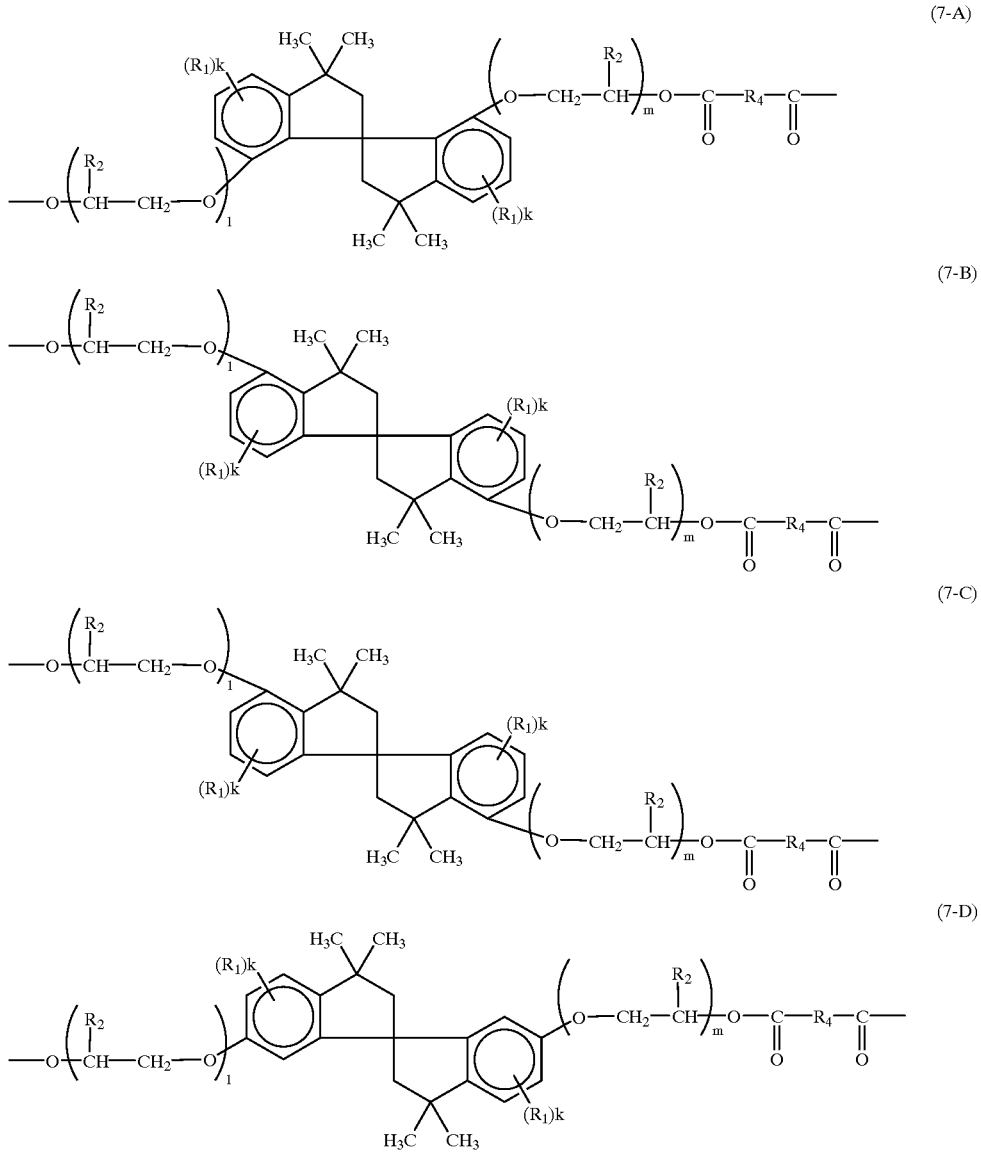

wherein $R_1$, $R_2$, $R_4$, k, l and m are as defined above.

The polyester of this invention may be suitably prepared from the dihydroxy compound represented by formula (5) and the dicarboxylic acid represented by formula (23) or its derivative, according to a variety of known polyester-producing processes such as transesterification, melt polymerization, solution polymerization and interfacial polymerization;

$$HOOC-R_4COOH \quad (23)$$

wherein $R_4$ is as defined above.

The dicarboxylic acid represented by formula (23) or its derivative to be a starting material for the polyester of this invention is selected from the dicarboxylic acid represented by formula (23), dicarboxylates, dicarboxylic halides such as dicarboxylic chlorides and dicarboxylic anhydrides.

Examples of the dicarboxylic acid represented by formula (23) include aromatic dicarboxylic acids such as phthalic acid, methylphthalic acid, ethylphthalic acid, methoxyphthalic acid, ethoxyphthalic acid, chlorophthalic acid, bromophthalic acid, isophthalic acid, methylisophthalic acid, ethylisophthalic acid, methoxyisophthalic acid, ethoxyisophthalic acid, chloroisophthalic acid, bromoisophthalic acid, terephthalic acid, methylterephthalic acid, ethylterephthalic acid, methoxyterephthalic acid, ethoxyterephthalic acid, chloroterephthalic acid, bromoterephthalic acid, 1,4-naphthalene dicarboxylic acid, 1,5-naphthalene dicarboxylic acid, 1,8-naphthalene dicarboxylic acid, 2,3-naphthalene dicarboxylic acid and 2,6-naphthalene dicarboxylic acid, 2,2'-biphenyl dicarboxylic acid, 4,4'-biphenyl dicarboxylic acid, 4,4'-diphenyl ether dicarboxylic acid, 4,4'-diphenyl sulfide dicarboxylic acid, 4,4'-benzophenone dicarboxylic acid, 4,4'-diphenyl sulfone dicarboxylic acid, 4,4'-diphenylmethane dicarboxylic acid, 2,2-bis(carboxyphenyl) propane and 2,2-bis(carboxyphenyl)-1,1,1,3,3,3-hexafluoropropane;

aliphatic dicarboxylic acids such as malonic acid, succinic acid, adipic acid, pimelic acid, suberic acid, azelaic acid, sebacic acid, decamethylene dicarboxylic acid, 1,4-cyclohexane dicarboxylic acid, 1,3-cyclohexane dicarboxylic acid, 1,2-cyclohexane dicarboxylic acid, norbornane 2,3-dicarboxylic acid, norbornane 2,5-dicarboxylic acid, norbornane 2,6-dicarboxylic acid, norbornane 3,6-dicarboxylic acid and 5-norbornene 2,3-dicarboxylic acid; and 1,4-xylylene dicarboxylic acid, 1,3-xylylene dicarboxylic acid and 1,2-xylylene dicarboxylic acid.

Among these dicarboxylic acids, in the light of various properties such as optical properties and heat resistance when being used as the low-birefringent organic optical component of this invention, norbornane 2,3-dicarboxylic acid, norbornane 2,5-dicarboxylic acid, norbornane 2,6-dicarboxylic acid, norbornane 3,6-dicarboxylic acid, 5-norbornene 2,3-dicarboxylic acid, phthalic acid and isophthalic acid, are most preferable.

These dicarboxylic acids may be used solely or in combination of different two or more.

The polyester of this invention is one comprising the structural unit represented by formula (7), and may be a homopolyester or a copolymeric polyester.

When the polyester of this invention is a copolymer, it may comprise two or more different structural units represented by formula (7), or different structural units other than that represented by formula (7). Examples of the structural unit other than that represented by formula (7) include one prepared from a dihydroxy compound other than that represented by formula (5) and the dicarboxylic acid represented by formula (23) or its derivative.

When a structural unit other than that represented by formula (7) is contained, the structural unit represented by formula (7) is contained in the proportion of at least 30 mol %, preferably at least 50 mol %, more preferably at least 60 mol % to the total structural units, but not limited as long as it does not adversely affect the desired effect of this invention.

A dihydroxy compound other than that represented by formula (5) which is used in preparing a copolymeric polyester comprising a structural unit other than that represented by formula (7), may be a variety of known aromatic or aliphatic dihydroxy compounds already described in terms of the polycarbonate of this invention.

The most preferable dihydroxy compounds other than that represented by formula (5) are 6,6'-dihydroxy-3 3,3,3',3'-tetramethyl-1,1'-spirobiindan or 9,9-bis(4'-hydroxyphenyl)fluorene.

These dihydroxy compounds may be used solely or in combination of two or more.

When the polyester of this invention is a copolymer, a structural unit other than that represented by formula (7) may be one comprising a bond other than an ester bond.

Such bonds include carbonate, amide and imide bonds. Such a structural unit is derived from the above dihydroxy compound or a bifunctional compound other than dicarboxylic acid derivatives, including aromatic diamines, aliphatic diamines, aromatic chloroformates, aliphatic chloroformates, aromatic diisocyanates and aliphatic diisocyanates.

In the polyester of this invention, the end group may be a reactive group such as hydroxy and carboxyl groups, or an inert group protected by a molecular-weight regulating agent.

Examples of the molecular-weight regulating agent may include monovalent hydroxy aliphatic or aromatic compounds, alkaline or alkaline-earth metal salts of monovalent hydroxy aliphatic or aromatic compounds, haloformates of monovalent hydroxy aliphatic or aromatic compounds, carbonates of monovalent hydroxy aliphatic or aromatic compounds, monovalent carboxylic acids, alkaline or alkaline-earth metal salts of monovalent carboxylic acids, acid halides of monovalent carboxylic acids and esters of monovalent carboxylic acids.

Specific examples of such a molecular-weight regulating agent are as follows. Monovalent hydroxy aliphatic or aromatic compounds include methanol, ethanol, butanol, octanol, lauryl alcohol, methoxyethanol, propyleneglycol monomethyl ether, cyclohexanol, benzyl alcohol, allyl alcohol, phenol, 4-tert-butylphenol, 2-cresol, 3-cresol, 4-cresol, 2-ethylphenol, 4-ethylphenol, 4-cumylphenol, 4-phenylphenol, 4-cyclohexylphenol, 4-n-octylphenol, 4-isooctylphenol, 4-nonylphenol, 4-methoxyphenol, 4-n-hexyloxyphenol, 4-isopropenylphenol, 2-chlorophenol, 3-chlorophenol, 4-chlorophenol, 2-bromophenol, 3-bromophenol, 4-bromophenol, 2,4-dichlorophenol, 2,4-dibromophenol, pentachlorophenol, pentabromophenol, β-naphthol, α-naphthol and 2-(4'-methoxyphenyl)-2-(4"-hydroxyphenyl)propane.

The alkaline or alkaline-earth metal salts of monovalent hydroxy aliphatic or aromatic compounds include sodium, potassium and calcium salts of the above monovalent hydroxy aliphatic or aromatic compounds.

The haloformates of monovalent hydroxy aliphatic or aromatic compounds include chloroformates and bromoformates of the above monovalent hydroxy aliphatic or aromatic compounds.

The monovalent carboxylic acids include aliphatic carboxylic acids such as acetic acid, propionic acid, butyric acid, valeric acid, caproic acid, heptanoic acid, caprylic acid, 2,2-dimethylpropionic acid, 3-methylbutyric acid, 3,3-dimethylbutyric acid, 4-methylvaleric acid, 3,3-dimethylvaleric acid, 4-methylcaproic acid, 2,4-dimethylvaleric acid, 3,5-dimethylcaproic acid and phenoxyacetic acid; and benzoic acids such as benzoic acid, 4-propoxybenzoic acid, 4-butoxybenzoic acid, 4-pentyloxybenzoic acid, 4-hexyloxybenzoic acid and 4-octyloxybenzoic acid benzoic acid benzoic acid.

The alkaline or alkaline-earth metal salts of monovalent carboxylic acids include sodium, potassium and calcium salts of the above monovalent carboxylic acids. The acid halides of monovalent carboxylic acids include chlorides and bromides of the above monovalent carboxylic acids.

The molecular weight of the polyester of this invention is generally, but not limited to, 5000 to 200000, preferably 10000 to 150000, more preferably 15000 to 100000, as a weight-average molecular weight based on a standard polystyrene determined by GPC (gel permeation chromatography).

The polyester of this invention can be used as a molding material by blending with another known polyester, and/or another polymer, as long as it does not adversely affect the desired effect of this invention. Other polymers which may be used include polyethylene, polypropylene, polystyrene, ABS resin, poly(methyl methacrylate), polytrifluoroethylene, polytetrafluoroethylene, polyacetal, polyphenylene oxide, polycarbonates, polyamides, polyimides, polyamide imides, polyetherimides, polysulfones, polyethersulfones and polysulfides.

To the polyester of this invention solely or in combination with another polymer may be added known additives such as a pigment, a dye, a thermal stabilizer, an antioxidant, an ultraviolet absorber, a mold release agent, a halogenated organic compound, an alkaline metal sulfonate, glass fiber, carbon fiber, glass beads, barium sulfate and $TiO_2$, in a known manner, during or after forming the polyester.

The polyester of this invention may be used solely or in combination with another polymer and, if desired, with any of the above additives, as a molding material to be molded into a product such as a component for an electric device, an electronic component, an automobile component, a substrate for an information recording medium such as an optical disk, an optical material for a lens for a camera or glasses and a construction material as an alternative to glass.

The polyester of this invention is thermoplastic, which can be subject to injection molding, extrusion molding, blow molding or impregnation into, for example, fillers, in a melted state, and can be readily molded by a variety of known processes such as compression molding and solution casting.

A low-birefringent organic optical component from the polyester of this invention may be suitably prepared by a variety of known processes described above, typically by injection molding.

A polyurethane comprising the structural unit represented by formula (8) of this invention will be described.

In formula (8), $R_1$, $R_2$ and k are as defined above.

In formula (8), l and m are independently an integer of 0 to 20, preferably 0 to 10, more preferably 0 to 6, more preferably 0 to 4, most preferably 0 to 3, although l+m is not zero.

In formula (8), $R_5$ is a bivalent organic group, preferably an alkylene, alkenylene, aralkylene or arylene group, or the group represented by formula (II);

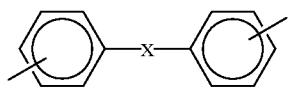
(II)

wherein X is methylene, —O—, —CO— or —SO$_2$—.

The substituent $R_5$ is more preferably a straight, branched or cyclic alkylene group with 1 to 2.0 carbons, a straight, branched or cyclic alkenylene group with 2 to 20 carbons, an aralkylene group with 8 to 20 carbons, an arylene group with 6 to 20 carbons, or the group represented by formula (II); more preferably a straight, branched or cyclic alkylene group with 1 to 12 carbons, an optionally substituted xylylene group with 8 to 12 carbons in total, an optionally substituted phenylene, naphthylene or biphenylene group with 6 to 12 carbons in total, or the group represented by formula (II).

In the group represented by formula (II), X is methylene, —O—, —CO— or —SO$_2$—, preferably methylene, —O— or —CO—, more preferably methylene or —O—.

The organic group $R_3$ includes alkylene groups such as methylene, ethylene, trimethylene, tetramethylene, pentamethylene, hexamethylene, octamethylene, nonamethylene, 2,2'-dimethylpentamethylene, 2,2,4-trimethylhexanemethylene, isophorone-diyl, cyclohexane-1,4-dimethylene, cyclohexane-1,3-dimethylene, cyclohexane-1,2-dimethylene, dicyclohexylmethane-4,4'-diyl, 1,4-cyclohexylene, 2-methyl-1,2-cyclohexylene, bicyclo[2,2,1]-heptane-2,5-dimethylene and bicyclo[2,2,1]-heptane-2,6-dimethylene;

alkenylene groups such as 1,2-ethenyl, butenediyl and 1,3-butene-1,4-diyl;

aralkylene groups such as 1,4-xylylene, 1,3-xylylene and 1,2-xylylene;

arylene groups such as 1,4-phenylene, 1,3-phenylene, 1,2-phenylene, tolylene, ethylphenylene, isopropylphenylene, dimethylphenylene, diethylphenylene, diisopropylphenylene, 1,5-naphthylene, 1,8-naphthylene, 2,3-naphthylene, 2,6-naphthylene, methylnaphthylene and 4,4'-biphenylene; and 4,4'-diphenylmethane-diyl, 3,3'-dimethylphenylmethane-4,4'-diyl, diphenyl ether-4,4'-diyl and benzophenone-4,4'-diyl.

Among these substituents, in the light of various properties such as optical properties and heat resistance when being used as the low-birefringent organic optical component of this invention, $R_5$ is preferably a bicycloalkylene, most preferably bicyclo[2,2,1]-heptane-2,5-dimethylene and bicyclo[2,2,1]-heptane-2,6-dimethylene.

In formula (8), a substitute comprising the hydroxy moiety constituting the urethane bond is at 4, 5, 6 or 7 position, while the other substituent is at 4', 5', 6' or 7' position on the benzene ring.

Among these, a unit represented by formula (8) is preferably selected from those represented by formulas (8-A) to (8-D), more preferably (8-A), (8-C) and (8-D),most preferably (8-C) and (8-D).

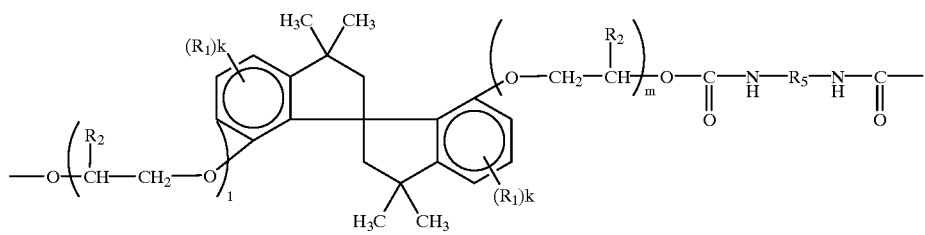
(8-A)

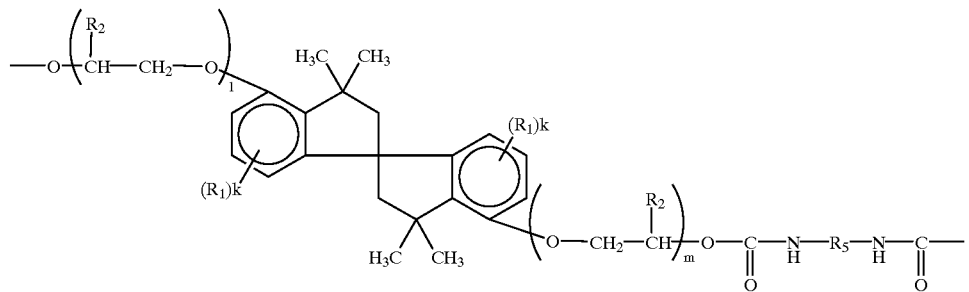

(8-B)

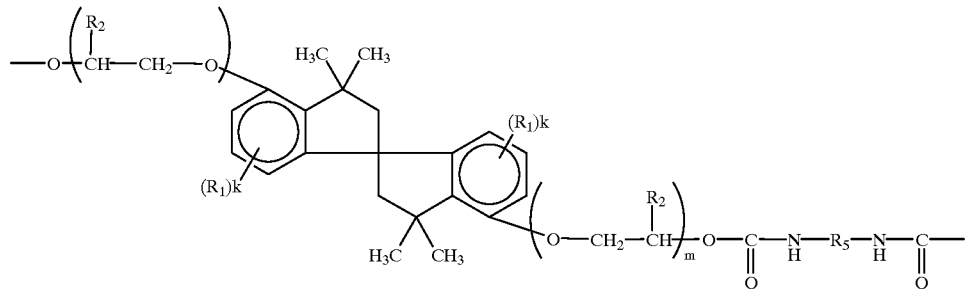

(8-C)

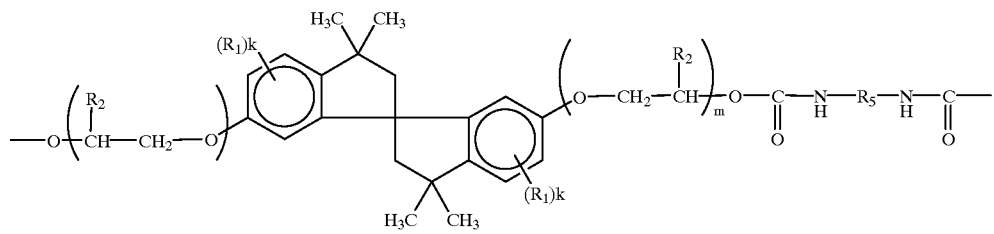

(8-D)

wherein $R_1$, $R_2$, $R_5$, k, l and m are as defined above.

The polyurethane of this invention may be prepared from the dihydroxy compound represented by formula (5) and the isocyanate derivative represented by general formula (24). The preparation process used may be a variety of known polyurethane polymerization processes such as one described in Jikken Kagaku Koza, $4^{th}$ ed., Vol. 29, Kobunshi Zairyo, pp. 307–312 (1988);

$$OCN-R_5-NCO \qquad (24)$$

wherein $R_5$ is as defined above.

The isocyanate compound represented by formula (24) to be a starting material for the polyurethane of this invention, is well-known, which may be available as an industrial material or prepared according to a known process. Typically, it can be prepared by reacting the diamine derivative represented by formula (25) with phosgene;

$$H_2N-R_3-NH_2 \qquad (25)$$

wherein $R_5$ is as defined above.

Examples of the diisocyanate derivative represented by formula (24) include alkylene diisocyanates such as ethylene diisocyanate, trimethylene diisocyanate, tetramethylene diisocyanate, hexamethylene diisocyanate, octamethylene diisocyanate, nonamethylene diisocyanate, 2,2'-dimethyl diisocyanate, 2,2,4-trimethylhexane diisocyanate, isophorone diisocyanate, bis(isocyanatemethyl)cyclohexane, dicyclohexylmethane diisocyanate, cyclohexane diisocyanate, methylcyclohexane diisocyanate, bis(4-isocyanate-n-butylidene) pentaerythritol, dimer acid diisocyanate, 2-isocyanatemethyl-5-isocyanatemethyl-bicyclo[2,2,1]-heptane and 2-isocyanatemethyl-6-isocyanatemethyl-bicyclo[2,2,1]-heptane;

alkenylene diisocyanates such as butene diisocyanate and 1,3-butadiene-1,4-diisocyanate;

aralkylene diisocyanates such as xylylene diisocyanate; and aromatic isocyanates such as phenylene diisocyanate, tolylene diisocyanate, ethylphenylene diisocyanate, isopropylphenylene diisocyanate, dimethylphenylene diisocyanate, diethylphenylene diisocyanate, diisopropylphenylene diisocyanate, naphthalene diisocyanate, methylnaphthalene diisocyanate, biphenyl diisocyanate, 4,4'-diphenylmethane diisocyanate, 3,3'-dimethylphenylmethane-4,4'-diisocyanate, diphenyl ether diisocyanate and benzophenone diisocyanate.

Among these diisocyanates, in the light of various properties such as optical properties and heat resistance when being used as the low-birefringent organic optical component, it may be preferably a cyclic alkylene diisocyanate, more preferably a bicycloalkylene diisocyanate, most preferably 2-isocyanatemethyl-5-isocyanatemethyl-bicyclo[2,2,1]-heptane or 2-isocyanatemethyl-6-isocyanatemethyl-bicyclo[2,2,1]-heptane.

These diisocyanates may be used solely or in combination of two or more.

The polyurethane may be a homopolyurethane or a copolymeric polyurethane comprising the structural unit represented by formula (8).

When the polyurethane of this invention is a copolymeric polyurethane, it may be one comprising the structural unit represented by formula (8), or one comprising a structural unit other than that represented by formula (8).

The structural unit other than that represented by formula (8) is one prepared from a dihydroxy compound other than that represented by formula (5) and the isocyanate represented by formula (24).

When a structural unit other than that represented by formula (8) is contained, the structural unit represented by formula (8) is contained in a proportion of at least 30 mol %, preferably at least 50 mol %, more preferably at least 60 mol % to the total structural units, but not limited as long as it does not adversely affect the desired effect of this invention.

A dihydroxy compound other than that represented by formula (5) which is used in preparing a copolymeric polyurethane comprising a structural unit other than that represented by formula (8), may be a variety of known aromatic or aliphatic dihydroxy compounds.

Examples of the dihydroxy compound may include dihydroxy alkanes such as 1,2-dihydroxyethane, 1,3-dihydroxypropane, 1,4-dihydroxybutane, 1,5-dihydroxypentane, 3-methyl-1,5-dihydroxypentane, 1,6-dihydroxyhexane, 1,7-dihydroxyheptane, 1,8-dihydroxyoctane, 1,9-dihydroxynonane, 1,10-dihydroxydecane, 1,11-dihydroxyundecane, 1,12-dihydroxydodecane, dihydroxyneopentyl, 2-ethyl-1,2-dihydroxyhexane and 2-methyl-1,3-dihydroxypropane;

dihydroxy cycloalkanes such as 1,3-dihydroxycyclohexane, 1,4-dihydroxycyclohexane, 1,4-cyclohexane dimethanol and 2,2-bis(4'-hydroxycyclohexyl)propane; o-dihydroxyxylylene, m-dihydroxyxylylene, p-dihydroxyxylylene; 1,4-bis(2'-hydroxyethyl)benzene, 1,4-bis(3'-hydroxypropyl)benzene, 1,4-bis(4'-hydroxybutyl)benzene, 1,4-bis(5'-hydroxypentyl)benzene, 1,4-bis(6'-hydroxyhexyl)benzene; and 2,2-bis[4'-(2"-hydroxyethyloxy)phenyl]propane. These dihydroxy compounds may be used solely or in combination of two or more.

When preparing the polyurethane of this invention, in addition to the diisocyanate represented by formula (24), a tri- or more functional polyisocyanate may be used, in order to improve the polymer properties as long as it does not adversely affect the effect of this invention.

Such polyisocyanates include trimethylbenzene triisocyanate, benzene triisocyanate, triphenylmethane triisocyanate, naphthalene triisocyanate, diphenylmethane-2,4,4'-triisocyanate, 3-methyldiphenylmethane-4,4',6'-triisocyanate, 4-methyldiphenylmethane-3,5,2',4',6'-pentaisocyanate; and halogenated (e.g., chlorinated or brominated), alkylated, alkoxylated and nitrated derivatives of these polyisocyanates; and trimerization products of the above diisocyanates.

When preparing the polyurethane of this invention, in addition to the dihydroxy compound, a tri- or more functional polyhydroxy compound may be used in order to improve the polymer properties as long as it does not adversely affect the effect of this invention.

Such polyhydroxy compounds include trimethylol propane, trimethylol ethane, glycerin and pentaerythritol.

When the polyurethane of this invention is a copolymer, a structural unit other than that represented by formula (8) may be one comprising a bond other than urethane bond. Such bonds include ester, carbonate, amide, urea and imide bonds.

Such a structural unit may be derived from a bifunctional compound other than the above dihydroxy compound or diisocyanate derivative. Examples of the bifunctional compound include aliphatic multivalent carboxylic acids or their derivatives, aromatic multivalent carboxylic acids or their derivatives, aliphatic diamines, aromatic diamines, aliphatic chloroformates and aromatic chloroformates.

In the polyurethane of this invention, an end group may be a reactive group such as hydroxy and isocyanate groups, or an inert group protected by a molecular-weight regulating agent.

The molecular-weight regulating agent may be, without limitation, a variety of known compounds including monovalent hydroxy aliphatic or aromatic compounds, or their derivatives (e.g., alkaline or alkaline-earth metal salts of monovalent hydroxy aliphatic or aromatic compounds, haloformates of monovalent hydroxy aliphatic or aromatic compounds, carbonates of monovalent hydroxy aliphatic or aromatic compounds); monovalent carboxylic acids, alkaline or alkaline-earth metal salts of monovalent carboxylic acids, acid halides of monovalent carboxylic acids, esters of monovalent carboxylic acids, and monovalent aliphatic or aromatic isocyanates.

Examples of such a molecular-weight regulating agent include monovalent aliphatic hydroxy compounds such as methanol, ethanol, butanol, octanol, lauryl alcohol, methoxyethanol, propyleneglycol monomethyl ether, cyclohexanol, benzyl alcohol and allyl alcohol;

aromatic hydroxy compounds such as phenol, 4-tert-butylphenol, 2-cresol, 3-cresol,- 4-cresol, 2-ethylphenol, 4-ethylphenol, 4-cumylphenol, 4-phenylphenol, 4-cyclohexylphenol, 4-n-octylphenol, 4-isooctylphenol, 4-nonylphenol, 4-methoxyphenol, 4-n-hexyloxyphenol, 4-isopropenylphenol, 2-chlorophenol, 3-chlorophenol, 4-chlorophenol, 2-bromophenol, 3-bromophenol, 4-bromophenol, 2,4-dichlorophenol, 2,4-dibromophenol, pentachlorophenol, pentabromophenol, β-naphthol, α-naphthol and 2-(4'-methoxyphenyl)-2-(4"-hydroxyphenyl)propane; or sodium, potassium or calcium salts of these monovalent aliphatic or aromatic hydroxy compounds;

chloroformates and bromoformates of the above monovalent hydroxy aliphatic or aromatic compounds;

aliphatic carboxylic acids such as acetic acid, propionic acid, butyric acid, valeric acid, caproic acid, heptanoic acid, caprylic acid, 2,2-dimethylpropionic acid, 3-methylbutyric acid, 3,3-dimethylbutyric acid, 4-methylvaleric acid, 3,3-dimethylvaleric acid, 4-methylcaproic acid, 2,4-dimethylvaleric acid, 3,5-dimethylcaproic acid and phenoxyacetic acid; and aromatic carboxylic acids such as benzoic acid, 4-propoxybenzoic acid, 4-butoxybenzoic acid, 4-pentyloxybenzoic acid, 4-hexyloxybenzoic acid and 4-octyloxybenzoic acid;

alkaline or alkaline-earth metal salts, acid halides and esters of the above monovalent carboxylic acids;

monovalent aliphatic isocyanates such as butyl isocyanate, octyl isocyanate, cyclohexyl isocyanate, benzyl isocyanate and allyl isocyanate; and monovalent aromatic isocyanates such as phenyl isocyanate, 4-methylphenyl isocyanate and 4-tert-butylphenyl isocyanate.

The molecular weight of the polyurethane of this invention is generally, but not limited to, 5000 to 500000, preferably 10000 to 300000, more preferably 15000 to 200000, as a weight-average molecular weight based on a standard polystyrene determined by GPC (gel permeation chromatography).

The polyurethane of this invention can be used as various materials by blending with another known polyurethane, and also in combination with another polymer. The polymers which may be combined include polyethylene, polypropylene, polystyrene, ABS resin, poly(methyl methacrylate), polytrifluoroethylene, polytetrafluoroethylene, polyacetal, polyphenylene oxide, polycarbonates, polyesters, polyamides, polyimides, polyamide imides, polyetherimides, polysulfones, polyethersulfones and polysulfides.

To the polyurethane of this invention solely or in combination with another polymer may be added known additives such as a pigment, a dye, a thermal stabilizer, an antioxidant, an ultraviolet absorber, a mold release agent, a halogenated organic compound, an alkaline metal sulfonate, glass fiber, carbon fiber, glass beads, barium sulfate and $TiO_2$, in a known manner, during or after forming the polyurethane.

The polyurethane of this invention may be molded as a thermosetting or thermoplastic material, and may be, if necessary, suitably molded in various manners.

When the polyurethane of this invention is used as a thermosetting material, it is generally prepared as a molding material typically by cast polymerization. For example, the dihydroxy compound represented by formula (5) is blended with the above diisocyanate derivative, the mixture is, if necessary, defoamed in an appropriate manner, it is poured into a mold, the mold is heated gradually from a lower temperature to a higher temperature to be suitably polymerized. The temperature and the period of the polymerization may vary depending on a monomer composition, the type and amount of the additives, and in general the mold is heated from an initial temperature of 20° C. to 120° C. over 8 to 24 hours. Here, the mold may be subject to mold-release treatment in order to improve its releasability. Furthermore, a variety of known additives such as an internal mold release agent, a chain extender, a crosslinking agent, a photostabilizer, an ultraviolet absorber, an antioxidant, a lipophilic dye, an oil soluble dye and a filler, may be added. Furthermore, if necessary, a known reaction catalyst used in preparation of a polyurethane may be added to regulate the reaction rate.

When the polyurethane of this invention is used as a thermoplastic material, it can be subject to injection molding, extrusion molding, blow molding or impregnation into, for example, fillers, in a melted state, and can be readily molded by a variety of known processes such as compression molding and solution casting.

A low-birefringent organic optical component formed from the polyurethane of this invention may be suitably formed by a variety of known molding processes described above (typically, injection molding).

The following will describe a polymer prepared by polymerization of the epoxy resin represented by formula (9) or the epoxyacrylate resin represented by formula (10); an acid-modified epoxyacrylate resin prepared by reacting the epoxyacrylate resin represented by formula (10) with a carboxylic acid or its anhydride; as well as the low-birefringent organic optical component of this invention from these polymers.

In formulas (9) and (10), $R_1$ and k are as defined above.

In formula (10), each $R_3$ is independently hydrogen atom or methyl group.

In formulas (9) and (10), n is an integer of 0 to 10.

The following will describe a process for preparing the above epoxy, the epoxyacrylate or the acid-modified epoxyacrylate resin related to this invention.

The epoxy resin represented by formula (9) related to this invention itself is known, and may be prepared as described in, for example, JP-A 63-150270, wherein an epihalohydrin is reacted with 6,6'-dihydroxy-3,3,3',3'-tetramethyl-1,1'-spirobiindan in the presence of a de-hydrohalogenating agent.

The epoxyacrylate resin related to this invention may be typically prepared by reacting the epoxy resin represented by formula (9) with acrylic acid, methacrylic acid or a mixture thereof. The acid-modified epoxyacrylate resin related to this invention may be prepared by reacting the epoxyacrylate resin obtained as described above, with a carboxylic acid or its anhydride.

Carboxylic acids which may be used are monovalent or multivalent carboxylic acids, preferably monovalent or multivalent aliphatic or aromatic carboxylic acids, more preferably monovalent or bivalent aliphatic or aromatic carboxylic acids. The carboxylic acids or their anhydrides include acetic acid, propionic acid, butyric acid, valeric acid, trimethylacetic acid, hexanoic acid, heptanoic acid, octanoic acid, 2-ethylhexanoic acid, myristic acid, cyclohexane carboxylic acid, 4-methylcyclohexane carboxylic acid, methoxyacetic acid, phenoxyacetic acid, phenylacetic acid, acrylic acid, methacrylic acid, benzoic acid, 4-methylbenzoic acid, 4-tert-butylbenzoic acid, 3-methoxybenzoic acid, 2,4-dimethylbenzoic acid, 4-biphenyl carboxylic acid, 1-naphthoic acid, 2-naphthoic acid, maleic acid, succinic acid, itaconic acid, phthalic acid, tetrahydrophthalic acid, hexahydrophthalic acid, methylhexahydrophthalic acid, endomethylene-tetrahydrophthalic acid, chlorendic acid, methyltetrahydrophathalic acid, trimellitic acid, pyromellitic acid, benzophenone tetracarboxylic acid and their anhydrides.

The low-birefringent organic optical component is a molding comprising a polymer prepared by preparing a polymerizable resin composition comprising the epoxy resin represented by formula (9), the epoxyacrylate resin represented by formula (10) or an acid-modified epoxyacrylate resin formed by reaction of the epoxyacrylate resin with a caboxylic acid or its anhydride, and then polymerizing the polymerizable resin component by a polymerization process using light and/or heating. The polymer may be molded by a variety of known molding processes as described later.

The epoxy resin, the epoxyacrylate resin or the acid-modified epoxyacrylate resin may be used solely or in combination of two or more.

The polymers related to this invention and a process for preparing the low-birefringent organic optical component of this invention will be described in detail.

The above polymerizable resin composition may comprise, besides the epoxy resin, the epoxyacrylate resin or the acid-modified epoxyacrylate resin, a variety of known compounds/materials including known resins, polymerizable monomers, polymerizable oligomers, and polymerization initiators such as thermal polymerization initiators and photopolymerization initiators as described later. Furthermore, if necessary, a variety of known additives such as inorganic fillers and color pigments may be added.

The polymerizable resin component may contains the epoxy resin represented by formula (9), the epoxyacrylate resin represented by formula (10) or an acid-modified epoxyacrylate resin formed by reaction of the epoxyacrylate resin with a caboxylic acid or its anhydride, preferably in the amount of at least 10% by weight, more preferably at least 20% by weight, more preferably at least 30% by weight.

A polymerizable resin composition comprising the epoxy resin represented by formula (9) may be suitably prepared by, but not limited to, a variety of known processes such as blending the epoxy resin and an epoxy-resin curing agent to polymerize, i.e., cure the resin, or photopolymerizing the resin.

When blending the epoxy resin and an epoxy-resin curing agent to polymerize, i.e., cure the resin, the epoxy-resin curing agent may include a variety of known compounds including polyhydroxy compounds such as phenol novolac resin, cresol novolac resin, cyclopentadiene-modified phenol resin, p-xylene-modified phenol resin, naphthol-modified phenol resin, a condensation product of a phenol derivative with benzaldehyde or naphthylaldehyde and triphenolmethanes; and polyamine compounds such as ethylenediamine, propylenediamine, isophoronediamine, diaminocyclohexane, xylylenediamine, diaminodiphenylmethane, diaminobenzene, tris(dimethylaminomethyl)phenol, benzyldimethylamine, modified polyamines such as amine adducts with an epoxy resin, cyanoethylated amines, Mannich-reaction amines and ketimines, and heterocyclic amines.

The amount of the epoxy-resin curing agent may be, but not limited to, preferably 0.1 to 50 parts by weight, more preferably 0.5 to 30 parts by weight, to 100 parts of the above epoxy compound.

The cationic photopolymerization may be suitably conducted by using a variety of known materials such as photopolymerization initiators or procedures.

When the epoxy resin is polymerized, another known compound having an epoxy group or epoxy resin may be used for copolymerization as long as it does not adversely affect the effect of this invention. Such compounds comprising an epoxy group or epoxy resins include epoxy compounds such as phenyl glycidyl ether, ethyleneglycol diglycidyl ether, triethyleneglycol divinyl ether, polyethyleneglycol diglycidyl ether, polypropyleneglycol diglycidyl ether, glycerol diglycidyl ether, neopentylglycol diglycidyl ether, glycerol triglycidyl ether, trimethylolpropane triglycidyl ether, sorbitol polyglycidyl ether, bisphenol-A diglycidyl ether and 4-vinyl-1-cyclohexenediepoxide; and epoxy resins such as phenol novolac, cresol novolac and bisphenol-A types of epoxy resins.

In the case of cationic photopolymerization, in addition to the known epoxy compound or epoxy resin, copolymerization may be conducted using a compound which can be subject to cationic photopolymerization. Such compounds which can be subject to cationic photopolymerization, include known vinyl ether compounds such as ethyl vinyl ether, isobutyl vinyl ether, 2-chloroethyl vinyl ether, ethyleneglycol monovinyl ether, butanediol monovinyl ether, ethyleneglycol divinyl ether, cyclohexanedimethanol divinyl ether, trimethylolpropane trivinylether, and divinyl ether compounds of alkyleneoxide adducts of propenyl ether propylene carbonate, divinylbenzene and bisphenol A.

A polymerizable resin composition comprising the epoxyacrylate resin represented by formula (10) or an acid-modified epoxyacrylate resin formed by reaction of the epoxyacrylate resin with a caboxylic acid or its anhydride, may be suitably polymerized by, but not limited to, a process comprising polymerization of the polymerizable resin composition using light and/or heating.

Here, the optical component of this invention may be suitably formed as a molding of a polymer prepared by polymerizing the polymerizable resin composition by a variety of known molding process described later.

The above polymerizable resin composition may comprise, in addition to the above epoxyacrylate resin or acid-modified epoxyacrylate resin, a known polymerizable compound such as epoxy resins, epoxyacrylate resins, acid-modified epoxyacrylate resins, photo or heat polymerizable monomers or oligomers.

Such polymerizable compounds include known polymerizable monomers; for example, epoxy compounds such as phenol novolac, cresol novolac and bisphenol types of epoxy resins, epoxy compounds such as tris(2,3-epoxypropyl) isocyanurate, epoxyacrylates as reaction products of these epoxy compounds with acrylic acid or methacrylic acid;

monofunctional (meth)acrylates such as 2-ethylhexyl (meth)acrylate, ethylcarbitol (meth)acrylate, lauryl (meth)acrylate, phenoxyethyl (meth)acrylate, nonylphenoxyethyl (meth)acrylate, 2-hydroxy-3-phenoxypropyl (meth)acrylate, dicyclopentenyl (meth)acrylate, isobornyl (meth)acrylate, N-n-butyl-O-(meth)acryloyloxy ethyl carbamate, acryloylmorpholine, trifluoroethyl (meth)acrylate, tribromobenzyl (meth)acrylate and perfluorooctyl (meth)acrylate; silicon-containing (meth)acrylates such as (meth)acryloxypropyl-tris(methoxy)silane; monofunctional vinyl compounds such as N-vinylpyrrolidone and N-vinylcaprolactam;

alkylene glycol di(meth)acrylates such as 1,6-hexanediol di(meth)acrylate, ethyleneglycol di(meth)acrylate, propyleneglycol di(meth)acrylate and neopentylglycol di(meth)acrylate; polyalkyleneglycol di(meth)acrylates such as triethyleneglycol di(meth)acrylate, tripropyleneglycol di(meth)acrylate, polyethyleneglycol di(meth)acrylate and polypropyleneglycol di(meth)acrylate; di(meth)acrylates of an alkylene oxide adduct of a bisphenol derivative such as bisphenol A and bisphenol-A hydride;

epoxy acrylates such as ethyleneglycol diglycidyl ether di(meth)acrylate, propyleneglycol diglycidylether di(meth)acrylate and bisphenol-A diglycidylether di(meth)acrylate; polyfunctional (meth)acrylates such as trimethylolpropane tri(meth)acrylate, dipentaerythritol pentacrylate, pentaerythritol triacrylate, pentaerythritol tetracrylate, ditrimethylol tetracrylate and dipentaerythritol hexacrylate; and allyl-containing compounds such as triallyl trimellitate and triallyl isocyanurate; as well as known polymerizable oligomers including polyurethane (meth)acrylate, epoxy (meth)acrylate, polyester (meth)acrylate and polyether (meth)acrylate.

The amount of these compounds may be preferably up to 200 parts by weight, more preferably up to 100 parts by weight, to 100 parts of the epoxyacrylate resin represented by formula (10) or the acid-modified epoxyacrylate resin formed by reaction of the epoxyacrylate resin with a carboxylic acid or its anhydride When the epoxy compound and the epoxy resin are concomitantly used, the above epoxy-resin curing agent may be used. The amount of the epoxy-resin curing agent may be, but not limited to, preferably 0.1 to 50 parts by weight, more preferably 0.5 to 30 parts by weight, to 100 parts of the above epoxy compound.

The initiator in the photopolymerization may be selected from a variety of known photoinitiators without limitation. Preferable photoinitiators include benzoin, benzil, benzoin methyl ether, benzoin isopropyl ether, acetophenone, 2,2-dimethoxy-2-phenylacetophenone, 1,1-dichloroacetophenone, 1-hydroxycyclohexyl phenyl ketone, 2-methyl-1-(4-methylthiophenyl)-2-morphorlinopropan-1-one, N,N-dimethylamino-acetophenone, 2-methylanthraquinone, 2-ethylanthraquinone, 2-tert-butylanthraquinone, 1-chloroanthraquinone, 2-amylanthraquinone, 2-isopropylthioxanthone, 2,4-dimethylthioxanthone, 2,4-diethylthioxanthone, 2,4- diisopropylthioxanthone, acetophenone dimethyl ketal, benzophenone, 4-methylbenzophenone, 4,4'-dichlorobenzophenone, 4,4'-bis(diethylamino) benzophenone and Michler's ketone, which can be solely or in combination with two or more.

The amount of the photoinitiator may be preferably 0.01 to 50 parts by weight, more preferably 4 to 35 parts by weight, to 100 parts of the epoxyacrylate or the acid-modified epoxyacrylate related to this invention.

It is preferable to concomitantly use these photoinitiators and one or more of known photosensitizer. Examples of the photosensitizer may include ethyl N,N-dimethylaminobenzoate, isoamyl N,N-dimethylaminobenzoate, triethanolamine and triethylamine.

A preferable combination of the photoinitiator and the photosensitizer may be, for example, 2,4-diethylthioxanthone or 2-isopropylthioxanthone and ethyl N,N-dimethylamino acetate.

A preferable combination of the photoinitiators may be, for example, 2-methyl-1-(4-methylthiophenyl)-2-morphorlinopropan-1-one and 2,4-diethylthioxanthone or 2-isopropylthioxanthone.

Examples of the polymerization initiator used in thermal polymerization may include, but not limited to, a variety of known thermal polymerization initiators such as peroxides including benzoyl peroxide, p-chlorobenzoyl peroxide, diisopropyl peroxycarbonate, di-2-ethylhexyl peroxycarbonate and tert-butyl peroxypivalate; and azo compounds such as azobisisobutyronitrile.

The amount of the thermal polymerization initiator may be preferably 0.001 to 50 parts by weight, more preferably 0.01 to 35 parts by weight, to 100 parts of the epoxyacrylate resin or the acid-modified epoxyacrylate resin of this invention.

In preparing the polymerizable resin composition, if necessary, there may be added inorganic fillers such as talc, silica, alumina, barium sulfate and magnesium oxide; thixotropy agents such as aerogel; melamine resins such as hexamethoxy melamine and hexabutoxy melamine; leveling agents such as silicone, fluorinated polymers and acrylate copolymers; color pigments such as cyanine green and cyanine blue; defoaming agent; ultraviolet absorbers; antioxidants; polymerization inhibitors; flow regulating agents; and blueing agents.

A low-birefringent organic optical component formed by polymerizing the epoxy resin represented by formula (9), the epoxyacrylate resin represented by formula (10) or the acid-modified epoxyacrylate resin, may be suitably formed according to a variety of known molding-processes as shown below.

A substrate for an optical disk or a magneto-optical disk may be formed by, for example, a process comprising pouring a polymerizable composition comprising a monomer into a cavity for a disk substrate, polymerizing it by, for example, a radical polymerization process, and if necessary post-heating the mold as described in JP-As 58-130450, 58-137150 or 62-280008; a process comprising photopolymerizing a composition in a double-glass mold as described in JP-A 60-202557; a process comprising vacuum injection or injection of a solution and then compressing a liquid resin to be subject to thermal polymerization as described in JP-A 60-203414.

An optical lens may be suitably molded by, for example, cast polymerization as described in JP-A 60-135901. Specifically, a polymerizable resin composition comprising the above epoxy resin, the epoxyacrylate resin or the acid-modified epoxyacrylate resin is, if necessary, degassed in an appropriate manner and is poured into a mold to be suitably polymerized usually by heating gradually from a low temperature to a high temperature.

The vinyl ether compound represented by formula (11) will be described.

In formula (11), $R_1$ and k are as defined above.

In formula (11), each $R_6$ is hydrogen atom or $CH_2=CH-O-R_7-$ group and may be the same or different, although both $R_6$s are not simultaneously hydrogen atom.

In the substituent $R_6$, $R_7$ is an alkylene group with 1 to 12 carbons, or 2-hydroxytrimethylene group. $R_7$ is preferably an alkyl group with 1 to 8 carbons or 2-hydroxytrimethylene group, more preferably an alkyl group with 1 to 4 carbons or 2-hydroxytrimethylene group.

In the compound represented by formula (11), $R_6O$-group including a vinyl ether group is at 4, 5, 6 or 7 position, while the other substituent is at 4',5',6' or 7' position on the benzene ring.

Among these, preferable structural units represented by formula (11) are those represented by formulas (11-A) to (11-D), more preferably (11-A), (11-C) and (11-D), most preferably (11-A) and (11-C);

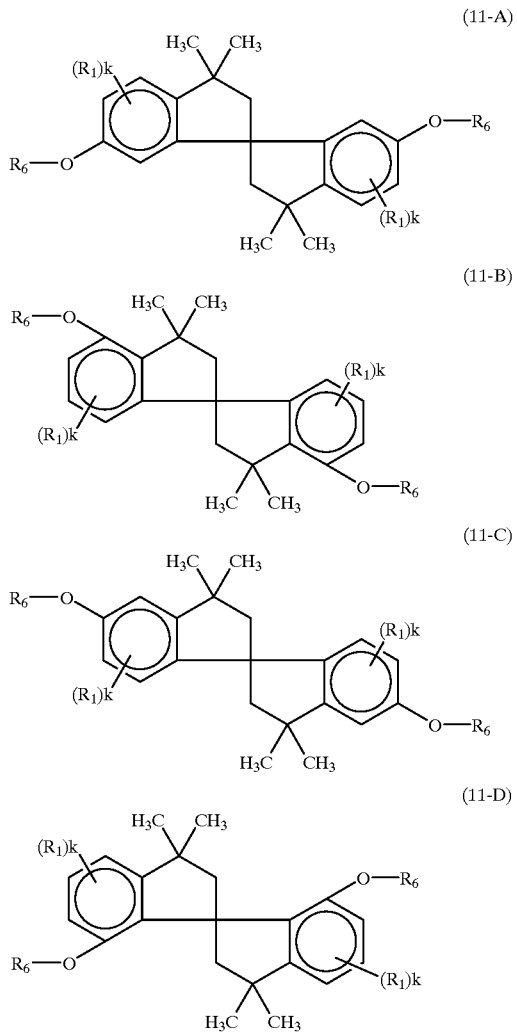

wherein $R_1$, $R_6$ and k are as defined above.

The vinyl ether compound may be suitably prepared by reacting the spirobiindanol derivative represented by formula (19) with the compound represented by formula (26) or glycidyl vinyl ether;

$$CH_2\!=\!CH\!-\!O\!-\!R_7\!-\!X \qquad (26)$$

wherein $R_7$ is as defined above and X is a halogen atom.

The one material, the compound represented by formula (26) or glycidyl vinyl ether, is a known compound, which may be available as an industrial material or agent, or may be prepared according to a known process.

The compound represented by formula (26) or glycidyl vinyl ether may be used generally in the amount of, but not limited to, 0.5 to 4 mol, preferably 0.6 to 3 mol, more preferably 0.7 to 2.5 mol, to 1 mol of the spirobiindanol derivative represented by formula (19).

In the reaction of the spirobiindanol derivative represented by formula (19) with the haloalkyl vinyl ether compound represented by formula (26), a reaction accelerator may be used. Reaction accelerators which may be used, include, but not limited to, alkaline or alkaline-earth metal compounds such as sodium hydroxide, potassium hydroxide, sodium hydride, metallic sodium, sodium methoxide, sodium carbonate, potassium carbonate, sodium bicarbonate and sodium acetate; nitrogen-containing basic compounds such as ammonia, triethylamine, piperidine, pyridine, pyrrolidine, aniline, N,N-dimethylaniline and N,N-diethylaniline; and quarternary ammonium salts such as triethylbenzylammonium chloride, tetraethylbenzylammonium chloride and tributylbenzylammonium chloride.

The reaction accelerator may be used generally in the amount of, but not limited to, 0.1 to 10 mol, preferably 0.2 to 5 mol, more preferably 0.3 to 4 mol, to 1 mol of the spirobiindanol derivative represented by formula (19).

In the reaction of the spirobiindanol derivative represented by formula (19) with glycidyl vinyl ether, a reaction accelerator may be used. Such accelerators include, but not limited to, inorganic or organic basic compounds such as sodium hydroxide, potassium hydroxide, sodium hydride, metallic sodium, sodium methoxide, sodium carbonate, potassium carbonate, sodium bicarbonate, sodium acetate, ammonia, triethylamine, piperidine, pyridine, pyrrolidine, aniline, N,N-dimethylaniline, N,N-diethylaniline, 4-methylimidazole, 2-methylimidazole and 1,8-diazabicyclo[5.4.0]-7-undecene; organo-phosphorus compounds such as triphenyl phosphine; inorganic or organic acids such as hydrochloric acid, sulfuric acid, methanesulfonic acid, p-toluenesulfonic acid, acetic acid, trifluoroacetic acid, trifluoromethanesulfonic acid and acetic anhydride; and Lewis acids such as aluminum chloride, zinc chloride, stannic chloride and titanium tetrachloride.

The reaction accelerator may be generally used, but not limited to, in the amount of 0.01 to 100 parts by weight, preferably 0.02 to 10 parts by weight, to 100 parts of the spirobiindanol derivative.

The reaction may be conducted without or with a solvent. Solvents which may be used include inert solvents including hydrocarbons such as toluene and xylenes; halogenated hydrocarbons such as dichloromethane, chloroform and 1,2-dichloroethane; ethers such as diethyl ether, tetrahydrofuran and dioxane; and aprotic polar solvents such as dimethylsulfoxide, N,N-dimethylformamide, N,N-dimethylacetamide, N,N-dimethylimidazolidine and diethyleneglycol dimethyl ether. These solvents may be used solely or in combination of two or more, or may be used in the presence of water.

The amount of the solvent used may be generally, but not limited to, up to 300-fold by weight, preferably up to 100-fold by weight, to the total weight of the spirobiindanol derivative represented by formula (19) and the vinyl ether compound represented by formula (26) or glycidyl vinyl ether, in the light of the fact that an excessive amount will adversely affect a production efficiency.

The reaction temperature is preferably, but not limited to, −20° C. to the boiling point of the solvent used. The reaction period is generally a few minutes to several tens hours, depending on the reaction temperature. The reaction can be terminated at the stage when a desired reaction rate is achieved, by following it up by means of a known analytical method such as liquid chromatography and thin layer chromatography.

At the end of the reaction, a reaction product is obtained by a post-treatment such as neutralization, filtration, solvent extraction, separation of liquid phases and evaporation as usual. Furthermore, if necessary, it can be purified by a known purification process such as recrystallization and column chromatography, to provide a highly pure compound.

The low-birefringent organic optical component of this invention may be formed by preparing a photosensitive resin composition comprising at least one vinyl ether compound represented by formula (11), and then polymerizing it typically via cationic photopolymerization. Molding may be conducted according to a variety of known molding process.

The photosensitive resin composition of this invention comprises the vinyl ether compound represented by formula (11) as an essential ingredient and a cationic photopolymerization initiator.

Here, the vinyl ether compound represented by formula (11) may be used solely or in combination of two or more.

The amount of vinyl ether compound represented by formula (11) in the above photosensitive resin composition is not limited as long as it gives a desired effect, and may be preferably at least 10% by weight, more preferably at least 20% by weight, more preferably at least 30% by weight, most preferably at least 50% by weight.

The cationic photopolymerization initiator may be suitably selected from a variety of known cationic photopolymerization initiators without limitation. Such cationic photopolymerization initiators include diaryl iodonium compounds such as diphenyl iodonium methanesulfonate, 4-methoxyphenyl-phenyl iodonium hexafluoroantimonate, 4-methoxyphenyl-phenyl iodonium methanesulfonate, bis(4-tertbutylphenyl) iodonium tetrafluoroborate, bis(4-tertbutylphenyl) iodonium hexafluorophosphate, bis(4-tertbutylphenyl) iodonium hexafluoroantimonate, bis(4-tertbutylphenyl) iodonium trifluoromethanesulfonate;

triaryl sulfonium compounds such as triphenyl sulfonium hexafluorophosphate, triphenyl sulfonium hexafluoroantimonate and triphenyl sulfonium methanesulfonate;

aryl diazonium compounds such as phenyl diazonium hexafluoroantimonate, phenyl diazonium hexachloroantimonate and phenyl diazonium tetrafluoroborate.

The amount of the cationic photopolymerization initiator is generally, but not limited to, 0.01 to 25 parts by weight, preferably 0.1 to 5 parts by weight, in 100 parts by weight of the photosensitive resin composition.

The photosensitive resin composition of this invention may comprise a known cationic photopolymerizable compound other than the vinyl ether compound represented by formula (11). Such cationic photopolymerizable compounds include epoxy compounds such as phenyl glycidyl ether, ethyleneglycol diglycidyl ether, triethyleneglycol diglycidyl ether, polyethyleneglycol diglycidyl ether, polypropyleneglycol diglycidyl ether, glycerol diglycidyl ether, neopentylglycol diglycidyl ether, glycerol triglycidyl ether, trimethylolpropane triglycidyl ether, sorbitol polyglycidyl ether, bisphenol-A diglycidyl ether and 4-vinyl-1-cyclohexenediepoxide;

epoxy resins such as phenol novolac, cresol novolac and bisphenol-A types of epoxy resins; as well as known vinyl ether compounds such as ethyl vinyl ether, isobutyl vinyl ether, 2-chloroethyl vinyl ether, ethyleneglycol monovinyl ether, butanediol monovinyl ether, ethyleneglycol divinyl ether, cyclohexanedimethanol divinyl ether, trimethylolpropane trivinylether, and divinyl ether compounds of alkyleneoxide adducts of propenyl ether propylene carbonate, divinylbenzene and bisphenol-A.

Besides the vinyl ether compound represented by formula (1), a cationic photopolymerization initiator and a known cationic photopolymerizable compound, the photosensitive resin composition may comprise, if necessary, a variety of known materials such as a sensitizer, a solvent, a reactive diluent, a leveling agent, a tackifier, a thickener, a flow modifier, a plasticizer, a filler and a pigment.

A low-birefringent organic optical component of this invention formed by polymerizing the vinyl ether compound represented by formula (11) may be suitably formed according to a variety of known molding processes typically as shown below.

Typically, a substrate for an optical disk or a magneto-optical disk may be formed by, for example, a process comprising photopolymerizing a composition in a double-glass mold as described in JP-A 60-202557.

A copolymeric polycarbonate comprising the structural unit represented by formula (12), and a low-birefringent organic optical component from the copolymeric polycarbonate will be described.

In formula (12), $R_1$, $R_2$ and k are as defined above.

In formula (12), $R_8$ is an alkyl group, preferably an alkyl group with 1 to 8 carbons or a cycloalkyl group with 6 to 12 carbons, more preferably an alkyl group with 1 to 4 carbons or cyclohexyl group, most preferably methyl group.

In formula (12), and m are independently an integer of 0 to 20, preferably 0 to 10, more preferably 0 to 5, more preferably 0 to 2, most preferably zero. Furthermore, in formula (12), q and r are independently an integer of 1 to 20.

In formula (12), each s is independently an integer of 1 to 3, preferably 0, 1 or 2, more preferably 0 or 1, most preferably zero.

The structural units represented by formula (12) may be preferably those represented by formulas (12-A) to (12-I), most preferably that represented by formula (12-A);

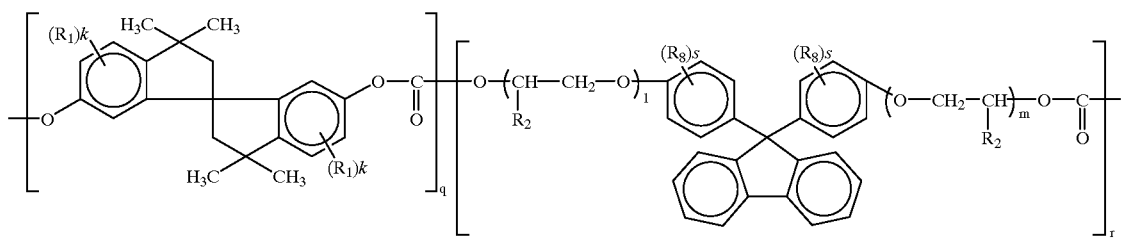

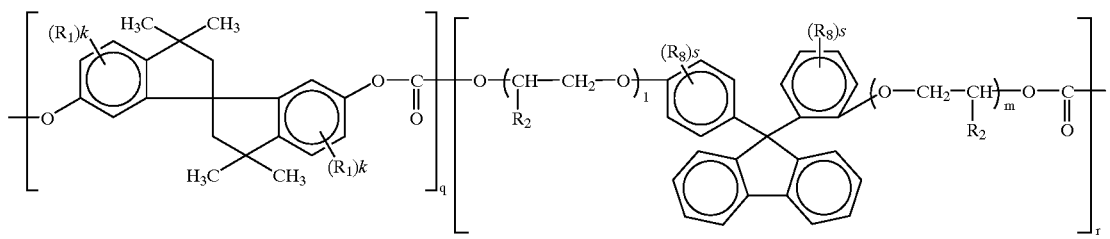

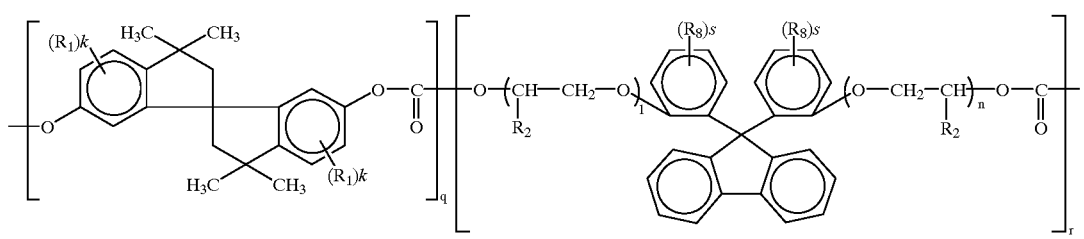

-continued
(12-D)
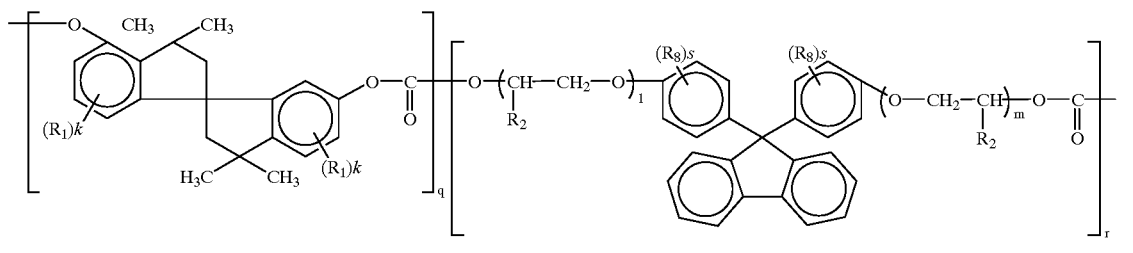
(12-E)
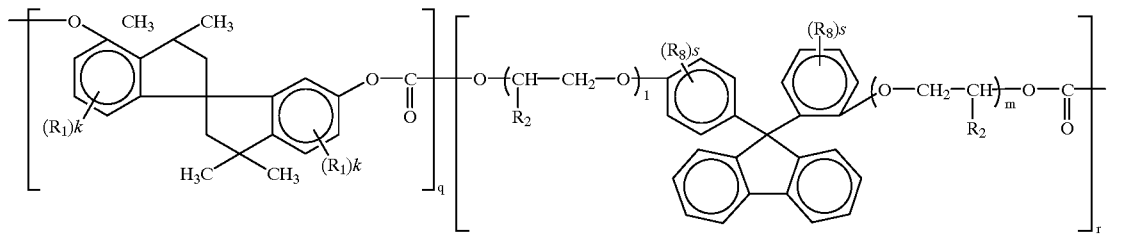
(12-F)
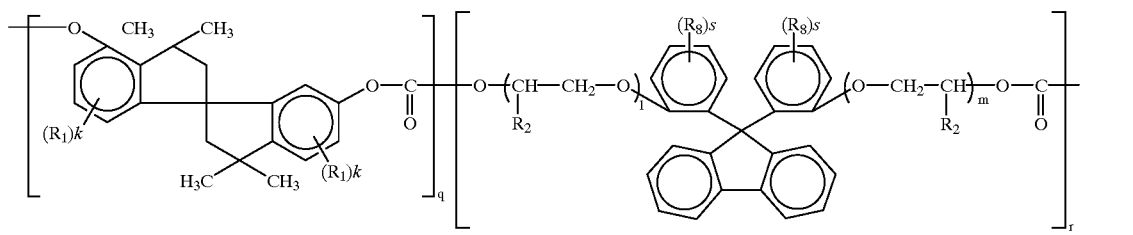
(12-G)
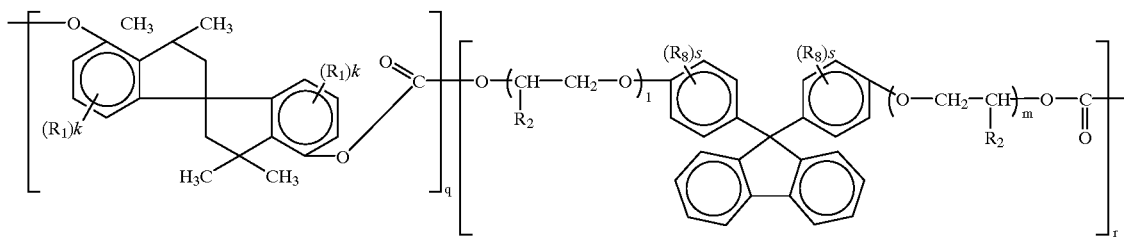
(12-H)
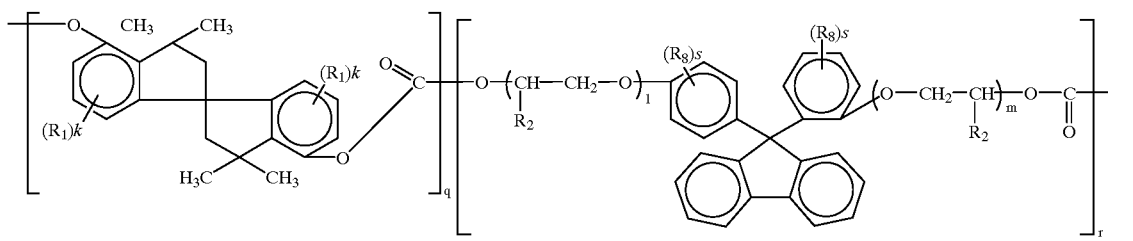

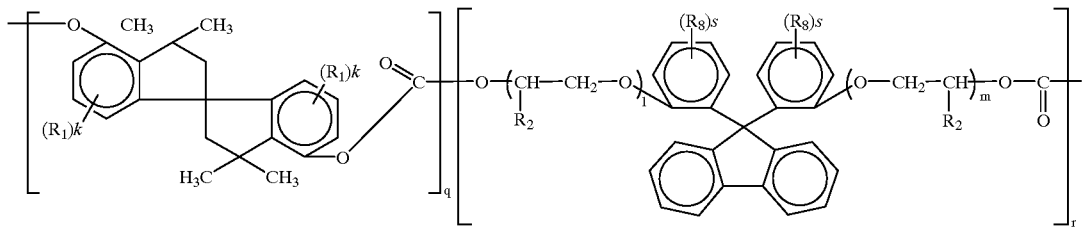

(12-A)–(12-I)
wherein $R_1$, $R_2$, $R_8$, k, l, m, q, r and s are as defined above.

The polycarbonate of this invention may be prepared by copolymerizing the dihydroxy compound represented by formula (19) with the dihydroxy compound represented by formula);

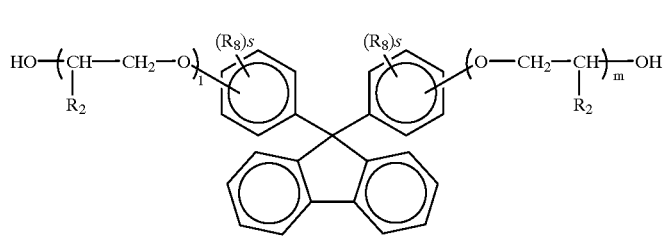

wherein $R_2$, $R_8$, l, m and s are as defined above.

The dihydroxy compound represented by formula (19) may be prepared by the above process. The compound represented by formula (27) is a known compound, and may be available as an industrial material, or may be prepared according to a known process.

The copolymeric polycarbonate of this invention may be suitably prepared by a variety of known polycarbonate polymerization processes (e.g., those described in Jikken Kagaku Koza $4^{th}$ ed., (28), Kobunshi Gosei, pp.231–242, Maruzen Shuppan (1988)) including transesterification, solution polymerization and interfacial polymerization; typically by reacting the dihydroxy compound represented by formula (19) and the dihydroxy compound represented by formula (27), with a carbonate precursor such as carbonates including dimethyl carbonate, diethyl carbonate and diphenyl carbonate, and carbonyl halides including phosgene.

The solution polymerizaton is one wherein the above dihydroxy compound is reacted with a carbonyl halide such as phosgene in an organic solvent, in the presence of an organic base such as pyridine. The interfacial polymerization is one wherein the dihydroxy compound is reacted with a carbonyl halide under interfacial conditions generated by an aqueous solution of alkaline or alkaline-earth metal base and an organic solvent such as aliphatic halogenated hydrocarbons including dichloromethane, chloroform, 1,2-dichloroethane, 1,2-dichloroethylene, trichloroethane, tetrachloroethane and dichloropropane; aromatic halogenated hydrocarbon including chlorobenzene and dichlorobenzene; and a mixture thereof, and then the product is subject to polycondensation reaction, if desired, in the presence of a catalyst such as triethylamine.

The transesterification is one wherein the dihydroxy compound and a carboxylic diester such as diphenyl carbonate in a melted or solution state, under heating and, if desired, in the presence of a catalyst.

In the interfacial polymerization, in addition to the dihydroxy and the carbonyl halide compounds, an organic solvent, a catalyst, water, an alkaline or alkaline-earth metal base and, if desired, a molecular-weight regulating agent may be used.

The copolymeric polycarbonate of this invention may be an alternating, random or block copolymer, as long as it does not adversely affect the desired effect of this invention.

When the polycarbonate of this invention is prepared as a random copolymer, the dihydroxy compounds represented by formula (19) and (27) are mixed, and the mixture of the dihydroxy compounds is treated with a carbonate precursor to give the desired polycarbonate.

When the polycarbonate of this invention is prepared as an alternating copolymer, either of the dihydroxy compound represented by formula (19) or (27) is reacted with a carbonate precursor to form an intermediate monomer, whose end is a haloformate or carbonate, and then the intermediate is treated with the other dihydroxy compound to provide the desired copolymer.

When the polycarbonate of this invention is prepared as a block copolymer, either of the dihydroxy compound represented by formula (19) or (27) is solely reacted with a carbonate precursor to form an oligomer of an polycarbonate, most ends of which are a haloformate or carbonate, and then the product is treated with the other dihydroxy compound or an polycarbonate oligomer derived from the dihydroxy compound to provide the desired copolymer.

The molecular weight of the polycarbonate of this invention is generally, but not limited to, 5000 to 100000, preferably 10000 to 90000, more preferably 15000 to 80000, as a weight-average molecular weight based on a standard polystyrene determined by GPC (gel permeation chromatography).

A polydispersity index represented by a ratio of a weight-average to a number-average molecular weights, is not limited, but preferably 1.5 to 6.0, more preferably 2.0 to 5.0, most preferably 2.0 to 4.5.

The copolymeric polycarbonate of this invention may be one comprising a plurality of the different structural units represented by formula (12), or a copolymeric polycarbonate comprising a structural unit other than that represented by formula (12).

When it comprises a structural unit other than that represented by formula (12), the proportion of the structural unit represented by formula (12) may be, not limited to, generally at least 30 mol %, preferably at least 50 mol %, more preferably at least 70 mol %, as long as it does not adversely affect the desired effect of this invention. Such a structural unit is one derived from a dihydroxy compound other than those represented by formulas (19) and (27), which may be, for example, selected from a variety of known aromatic or aliphatic hydroxy compounds as described in terms of the polycarbonate comprising a structural unit derived from the dihydroxy compound represented by formula (5).

Furthermore, the structural unit other than that represented by formula (12) may be one derived from a bifunctional compound other than the above dihydroxy compound. The bifunctional compounds other than the above dihydroxy compound may include aromatic dicarboxylic acids, aliphatic dicarboxylic acids, aromatic diisocyanates and aliphatic diisocyanates. By using the bifunctional compound, there may be provided a copolymeric polycarbonate comprising, besides a carbonate group, another group such as imino, ester, ether, imide and amide groups, which is encompassed by this invention.

In the polycarbonate of this invention, an end group may be a reactive group such as hydroxy, haloformate and carbonate groups, or an inert group protected by a molecular-weight regulating agent. Examples of the molecular-weight regulating agent may include monovalent hydroxy aliphatic or aromatic compounds, alkaline or alkaline-earth metal salts of monovalent hydroxy aliphatic or aromatic compounds, haloformates of monovalent hydroxy aliphatic or aromatic compounds, carbonates of monovalent hydroxy aliphatic or aromatic compounds, monovalent carboxylic acids, alkaline or alkaline-earth metal salts of monovalent carboxylic acids, acid halides of monovalent carboxylic acids and esters of monovalent carboxylic acids.

The polycarbonate of this invention can be used as a molding material by blending with an aromatic polycarbonate derived from 2,2-bis(4'-hydroxyphenyl)propane, as long as it does not adversely affect the desired effect of this invention. Other polymers which may be used include polyethylene, polypropylene, polystyrene, ABS resin, poly (methyl methacrylate), polytrifluoroethylene, polytetrafluoroethylene, polyacetal, polyphenylene oxide, polybutylene terephthalate, polyethylene terephthalate, polyamides, polyimides, polyamide imides, polyetherimides, polysulfones, polyethersulfones, para-oxybenzoyl polyesters, polyarylates and polysulfides.

To the polycarbonate of this invention solely or in combination with another polymer may be added known additives such as a pigment, a dye, a thermal stabilizer, an antioxidant, an ultraviolet absorber, a mold release agent, a halogenated organic compound, an alkaline metal sulfonate, glass fiber, carbon fiber, glass beads, barium sulfate and $TiO_2$, in a known manner, during or after forming the polycarbonate.

The polycarbonate of this invention may be used solely or in combination with another polymer and, if desired, with any of the above additives, as a molding material to be molded into a product such as a chassis for an electric device and a housing material, an electronic component, an automobile component, a substrate for an information recording medium such as an optical disk, an optical material for a lens for a camera or glasses and a construction material as an alternative to glass.

The polycarbonate of this invention is thermoplastic, which can be subject to injection molding, extrusion molding, blow molding or impregnation into, for example, fillers, in a melted state, and can be readily molded by a variety of known processes such as compression molding and solution casting.

A low-birefringent organic optical component from the polycarbonate of this invention may be suitably prepared by a variety of known processes described above, typically by injection molding.

A low-birefringent organic optical component from a polyimide or polyamide resin will be described.

We have discovered that a polyimide and a polyamide essentially comprising the repetitive structural unit represented by formula (1), preferably one of formulas (2) to (4), more preferably formula (2), most preferably formula (13) or (14) is suitable for an organic optical material, particularly a low-birefringent organic optical component. The following will describe a polyimide resin (referred to as "polyimide for an optical component") and a polyamide resin (referred to as "polyamide for an optical component") used for a low-birefringent organic optical component.

The polyimide for an optical component can be prepared by condensation reaction of the diamine represented by general formula (28);

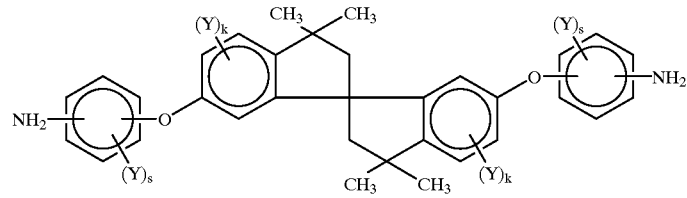

(28)

wherein Y, k and s are as defined above;

with the tetracarboxylic acid dianhydride represented by general formula (29);

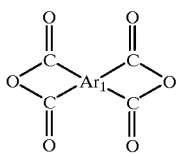
(29)

wherein Ar₁ is as defined above;
in a solvent.

The polyamide for an optical component can be prepared by condensation reaction of the diamine represented by formula (28) with the dicarboxylic dihalide represented by general formula (30) in the presence of a de-hydrohalogenating agent, in a solvent.

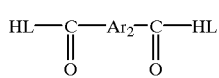
(30)

wherein Ar₂ is as defined above, and HL is a monovalent group representing a halogen.

Examples of the diamine represented by general formula (2) which can be used in preparation of a polyimide or polyamide for an optical component include the following, wherein x and y are different from each other and represent an integer of 2 to 6; z- represents o-, m- or p-; x' and y' are, independently of x and y, different from each other and represents an integer of 2 to 6;

6,6'-bis(2-aminophenoxy)-3,3,3',3'-tetramethyl-1,1'-spirobiindan;
6,6'-bis(3-aminophenoxy)-3,3,3',3'-tetramethyl-1,1'-spirobiindan;
6,6'-bis(4-aminophenoxy)-3,3,3',3'-tetramethyl-1,1'-spirobiindan;
6,6'-bis(x-amino-y-methylphenoxy)-3,3,3',3'-tetramethyl-1,1'-spirobiindans;
6,6'-bis(x-amino-y-ethylphenoxy)-3,3,3',3'-tetramethyl-1,1'-spirobiindans;
6,6'-bis(x-amino-y-propylphenoxy)-3,3,3',3'-tetramethyl-1,1'-spirobiindans;
6,6'-bis(x-amino-y-isopropylphenoxy)-3,3,3',3'-tetramethyl-1,1'-spirobiindans;
6,6'-bis(x-amino-y-methoxyphenoxy)-3,3,3',3'-tetramethyl-1,1'-spirobiindans;
6,6'-bis(x-amino-y-ethoxyphenoxy)-3,3,3',3'-tetramethyl-1,1'-spirobiindans;
6,6'-bis(x-amino-y-propoxyphenoxy)-3,3,3',3'-tetramethyl-1,1'-spirobiindans;
6,6'-bis(x-amino-y-isopropoxyphenoxy)-3,3,3',3'-tetramethyl-1,1'-spirobiindans;
6,6'-bis(x-amino-y-phenylphenoxy)-3,3,3',3'-tetramethyl-1,1'-spirobiindans; 6,6'-bis(x-amino-y-phenoxyphenoxy)-3,3,3',3'-tetramethyl-1,1'-spirobiindans;
6,6'-bis(x-amino-y-benzylphenoxy)-3,3,3',3'-tetramethyl-1,1'-spirobiindans;
6,6'-bis[x-amino-y-(1-naphthyl)phenoxy]-3,3,3',3'-tetramethyl-1,1'-spirobiindans;
6,6'-bis[x-amino-y-(2-naphthyl)phenoxy]-3,3,3',3'-tetramethyl-1,1'-spirobiindans;
6,6'-bis[x-amino-y-(2,3,4,5,6-pentafluorophenyl)phenoxy]-3,3,3',3'-tetramethyl-1,1'-spirobiindans;
6,6'-bis[x-amino-y-(z-tolyl)phenoxy]-3,3,3',3'-tetramethyl-1,1'-spirobiindans;
6,6'-bis[x-amino-y-(x',y'-xylyl)phenoxy]-3,3,3',3'-tetramethyl-1,1'-spirobiindans;
6,6'-bis(x-amino-y-mesitylphenoxy)-3,3,3,',3'-tetramethyl-1,1'-spirobiindans;
6,6'-bis[x-amino-y-(z-propylphenyl)phenoxy]-3,3,3',3'-tetramethyl-1,1'-spirobiindans;
6,6'-bis[x-amino-y-(z-cumenyl)phenoxy]-3,3,3',3'-tetramethyl-1,1'-spirobiindans;
6,6'-bis[x-amino-y-(2,3,4,5,6-pentafluorophenoxy)phenoxy]-3,3,3',3'-tetramethyl-1,1'-spirobiindans;
6,6'-bis[x-amino-y-(z-methylphenoxy)phenoxy]-3,3,3',3'-tetramethyl-1,1'-spirobiindans;
6,6'-bis[x-amino-y-(z-ethylphenoxy)phenoxy]-3,3,3',3'-tetramethyl-1,1'-spirobiindans;
6,6'-bis[x-amino-y-(z-isopropylphenoxy)phenoxy]-3,3,3',3'-tetramethyl-1,1'-spirobiindans;
6,6'-bis[x-amino-y-(x',y'-dimethylphenoxy)phenoxy]-3,3,3',3'-tetramethyl-1,1'-spirobiindans;
6,6'-bis[x-amino-y-(z-methoxyphenoxy)phenoxy]-3,3,3',3'-tetramethyl-1,1'-spirobiindans;
6,6'-bis[x-amino-y-(z-methoxyphenoxy)phenoxy]-3,3,3',3'-tetramethyl-1,1'-spirobiindans;
6,6'-bis[x-amino-y-(z-trifluoromethylphenyl)phenoxy]-3,3,3',3'-tetramethyl-1,1'-spirobiindans;
6,6'-bis[x-amino-y-(z-trifluoromethylphenoxy)phenoxy]-3,3,3',3'-tetramethyl-1,1'-spirobiindans;
6,6'-bis[x-amino-y-(z-trifluoromethoxyphenyl)phenoxy]-3,3,3',3'-tetramethyl-1,1'-spirobiindans; and
6,6'-bis[x-amino-y-(z-trifluoromethoxyphenoxy)phenoxy]-3,3,3',3'-tetramethyl-1,1'-spirobiindans.

A diamine used is not limited to these as long as it is within the scope of this invention. These diamines may be concomitantly used in any combination. Furthermore, another generally known diamine may be concomitantly used as long as it does not adversely affect the good properties of the polyimide or polyamide for an optical component of this invention, wherein its amount may be below 50 equivalents, preferably below 30 equivalents, more preferably 10 equivalents to the diamine represented by formula (2).

Other generally known diamines include m-phenylenediamine, o-phenylenediamine, p-phenylenediamine, m-aminobenzylamine, p-aminobenzylamine, 3,3'-diaminobiphenyl, 4,4'-diaminobiphenyl, 4,4'-diaminodiphenyl ether, 3,3'-diaminodiphenyl ether, 3,4'-diaminodiphenyl ether, bis(3-aminophenyl) sulfide, (3-aminophenyl)(4-aminophenyl) sulfide, bis(4-aminophenyl) sulfide, bis(3-aminophenyl) sulfoxide, (3-aminophenyl)(4-aminophenyl) sulfoxide, bis(4-aminophenyl) sulfoxide, bis(3-aminophenyl) sulfone, (3-aminophenyl)(4-aminophenyl) sulfone, 3,3'-diaminobenzophenone, 3,4'-diaminobenzophenone, 4,4'-diaminobenzophenone, 3,3'-diamino-4,4'-diphenoxybenzophenone, 3,3'-diaminodiphenylmethane, 3,4'-diaminodiphenylmethane, 4,4'-diaminodiphenylmethane, bis[4-(3-aminophenoxy)phenyl]methane, bis[4-(4-aminophenoxy)phenyl]methane, 1,1-bis[4-(3-aminophenoxy)phenyl]ethane, 1,1-bis[4-(4-aminophenoxy)phenyl]ethane, 1,2-bis[4-(3-aminophenoxy)phenyl]ethane, 1,2-bis[4-(4-aminophenoxy)phenyl]ethane, 2,2-bis[4-(3-aminophenoxy)phenyl]propane, 2,2-bis[4-(4-aminophenoxy)phenyl]propane, 2,2-bis[4-(3- aminophenoxy)phenyl]butane, 2,2-bis[4-(3-aminophenoxy) phenyl]-1,1,1,3,3,3-hexafluoropropane, 2,2-bis[4-(4-aminophenoxy)phenyl]-1,1,1,3,3,3-hexafluoropropane, 1,3-bis(3-aminophenoxy)benzene, 1,4-bis(3-aminophenoxy) benzene, 1,4-bis(4-aminophenoxy)benzene, 1,3-bis(3-aminophenoxy)-2-trifluoromethylbenzene, 1,3-bis(3-aminophenoxy)-5-trifluoromethylbenzene, 1,3-bis(3-amino-5-trifluoromethylphenoxy)benzene, 1,3-bis(3-amino-5-trifluoromethylphenoxy)-5-trifluoromethylbenzene, 1,3-bis(3-amino-5-trifluoromethylphenoxy)-4-trifluoromethylbenzene, 1,3-bis(3-aminobenzoyl)benzene, 1,3-bis(4-aminobenzoyl)benzene, 1,4-bis(3-aminobenzoyl) benzene, 1,4-bis(4-aminobenzoyl)benzene, 1,3-bis(3-amino-α,α-dimethylbenzyl)benzene, 1,3-bis(4-amino-α,α-dimethylbenzyl)benzene, 1,4-bis(3-amino-α,α-dimethylbenzyl)benzene, 1,4-bis(4-amino-α,α-dimethylbenzyl)benzene, 4,4'-bis(3-aminophenoxy) biphenyl, 4,4'-bis(4-aminophenoxy)biphenyl, bis[(4-(3-aminophenoxy)phenyl) ketone, bis[(4-(4-aminophenoxy) phenyl) ketone, bis[(4-(3-aminophenoxy)phenyl) sulfide, bis[(4-(4-aminophenoxy)phenyl) sulfide, bis[(4-(3-aminophenoxy)phenyl) sulfoxide, bis[(4-(4-aminophenoxy) phenyl) sulfoxide, bis[(4-(3-aminophenoxy)phenyl) sulfone, bis[(4-(4-aminophenoxy)phenyl) sulfone, bis[(4-(3-aminophenoxy)phenyl) ether, bis[(4-(4-aminophenoxy) phenyl) ether, 1,4-bis[4-(3-aminophenoxy)benzoyl] benzene, 1,3-bis[4-(3-aminophenoxy)benzoyl]benzene, 4,4'-bis[3-(4-aminophenoxy)benzoyl]diphenyl ether, 4,4'-bis[3-(3-aminophenoxy)benzoyl]diphenyl ether, 4,4'-bis[4-(4-amino-α,α-dimethylbenzyl)phenoxy]benzophenone, 4,4'-bis[4-(4-amino-α,α-dimethylbenzyl)phenoxy]diphenyl sulfone, bis[4-{4-(aminophenoxy)phenoxy}phenyl] sulfone, 1,4-bis[4-(4-aminophenoxy)-α,α-dimethylbenzyl] benzene, 1,4-bis[4-(3-aminophenoxy)-α,α-dimethylbenzyl] benzene, 1,3-bis[4-(4-aminophenoxy)-α,α-dimethylbenzyl] benzene, 1,3-bis[4-(3-aminophenoxy)-α,α-dimethylbenzyl] benzene, 3,3'-diamino-4,4'-difluorobenzophenone, 3,3'-diamino-5,5'-bis(trifluoromethyl)diphenyl ether and 4,4'-diamino-5,5'-bis(trifluoromethyl)diphenyl ether.

Examples of the tetracarboxylic dianhydride represented by general formula (29) include pyromellitic dianhydride,
  3,3',4,4'-benzophenonetetracarboxylic dianhydride,
  2,2',3,3'-benzophenonetetracarboxylic dianhydride,
  3,3',4,4'-biphenyltetracarboxylic dianhydride,
  2,2',3,3'-biphenyltetracarboxylic dianhydride,
  2,2-bis(3,4-dicarboxyphenyl)propane dianhydride,
  2,2-bis(2,3-dicarboxyphenyl)propane dianhydride,
  2,2-bis(3,4-dicarboxyphenyl)-1,1,1,3,3,3-hexafluoropropane dianhydride,
  2,2-bis(2,3-dicarboxyphenyl)-1,1,1,3,3,3-hexafluoropropane dianhydride,
  3,3',4,4'-diphenyl ether tetracarboxylic dianhydride,
  3,3',4,4'-diphenyl sulfone tetracarboxylic dianhydride,
  bis(2,3-dicarboxyphenyl)methane dianhydride,
  bis(3,4-dicarboxyphenyl)methane dianhydride,
  1,3-bis[(3,4-dicarboxy)benzoyl]benzene dianhydride,
  1,4-bis[(3,4-dicarboxy)benzoyl]benzene dianhydride,
  1,3-bis[(3,4-dicarboxy)phenoxy]benzene dianhydride,
  1,4-bis[(3,4-dicarboxy)phenoxy]benzene dianhydride,
  2,2-bis[4-(3,4-dicarboxyphenoxy)phenyl]propane dianhydride,
  2,2-bis[4-(2,3-dicarboxyphenoxy)phenyl]propane dianhydride,
  2,2-bis[4-(3,4-dicarboxyphenoxy)phenyl]-1,1,1,3,3,3-hexafluoropropane dianhydride,
  2,2-bis[4-(2,3-dicarboxyphenoxy)phenyl]-1,1,1,3,3,3-hexafluoropropane dianhydride,
  bis[4-(3,4-dicarboxyphenoxy)phenyl] ketone dianhydride,
  bis[4-(2,3-dicarboxyphenoxy)phenyl] ketone dianhydride,
  4,4'-bis(3,4-dicarboxyphenoxy)biphenyl dianhydride,
  4,4'-bis(2,3-dicarboxyphenoxy)biphenyl dianhydride,
  bis[4-(3,4-dicarboxyphenoxy)phenyl] sulfone dianhydride,
  bis[4-(2,3-dicarboxyphenoxy)phenyl] sulfone dianhydride,
  bis[4-(3,4-dicarboxyphenoxy)phenyl] sulfide dianhydride,
  bis[4-(2,3-dicarboxyphenoxy)phenyl] sulfide dianhydride,
  2,3,6,7-naphthalenetetracarboxylic dianhydride, and
  1,2,3,4-benzenetetracarboxylic dianhydride.

A tetracarboxylic dianhydride used is not limited to these as long as it is within the scope of this invention. These may be used solely or in combination of two or more.

The dicarboxylic dihalide represented by general formula (30) may be a derivative in which two —OH groups of the corresponding dicarboxylic acid are replaced by a halogen atom such as —F, —Cl and —Br. Examples are phathalic halides, terephthalic halides, isophthalic halides, methylphthalic halides, methylterephthalic halides, methylisophthalic halides, ethylphthalic halides, ethylterephthalic halides, ethylisophthalic halides, methoxyphthalic halides, methoxyterephthalic halides, methoxyisophthalic halides, ethoxyphthalic halides, ethoxyterephthalic halides, ethoxyisophthalic halides, chlorophthalic halides, chloroterephthalic halides, chloroisophthalic halides, bromophthalic halides, bromoterephthalic halides, bromoisophthalic halides, tetrafluorophthalic halides, tetrafluoroterephthalic halides, tetrafluoroisophthalic halides, 1,2-naphthalenedicarboxylic halides, 1,4-naphthalenedicarboxylic halides, 1,5-naphthalenedicarboxylic halides, 2,3-naphthalenedicarboxylic halides, 2,6-naphthalenedicarboxylic halides, 3,3'-biphenyldicarboxylic halides, 4,4'-biphenyldicarboxylic halides, 4,4'-diphenyl ether dicarboxylic halides, 3,3'-diphenyl ether dicarboxylic halides, 3,4'-diphenyl ether dicarboxylic halides, bis(3-carboxyphenyl) sulfide halides, (3-carboxyphenyl)(4-carboxyphenyl) sulfide halides, bis(4-carboxyphenyl) sulfide halides, bis(3-carboxyphenyl) sulfone halides, (3-carboxyphenyl)(4-carboxyphenyl) sulfone halides, bis(4-carboxyphenyl) sulfone halides, 3,3'-benzophenonedicarboxylic halides, 3,4'-benzophenonedicarboxylic halides, 4,4'-benzophenonedicarboxylic halides, 3,3'-diphenylmethanedicarboxylic halides, 3,4'-diphenylmethanedicarboxylic halides, 4,4'-diphenylmethanedicarboxylic halides, bis[4-(3-carboxyphenoxy)phenyl]methane halides, bis[4-(4-carboxyphenoxy)phenyl]methane halides, 2,2-bis[4-(3-carboxyphenoxy)phenyl]propane halides, 2,2-bis[4-(4-carboxyphenoxy)phenyl]propane halides, 2,2-bis[4-(3-carboxyphenoxy)phenyl]-1,1,1,3,3,3-hexafluoropropane halides, 2,2-bis[4-(4-carboxyphenoxy)phenyl]-1,1,1,3,3,3-hexafluoropropane halides, 1,3-bis(3-carboxyphenoxy)benzene halides, 1,3-bis(4-carboxyphenoxy)benzene halides, 1,4-bis(3-carboxyphenoxy)benzene halides, 1,4-bis(4-carboxyphenoxy)benzene halides, 1,3-bis(3- carboxyphenoxy)-2-trifluoromethylbenzene halides, 1,3-bis (3-carboxyphenoxy)-4-trifluoromethylbenzene halides, 1,3-bis(3-carboxyphenoxy)-5-trifluoromethylbenzene halides, 1,3-bis(3-carboxy-5-trifluoromethylphenoxy)benzene halides, 1,3-bis(3-carboxy-5-trifluoromethylphenoxy)-5-trifluoromethylbenzene halides, 1,3-bis(3-carboxy-5-trifluoromethylphenoxy)-4-trifluoromethylbenzene halides, 1,3-bis(3-carboxybenzoyl)benzene halides, 1,3-bis(4-carboxybenzoyl)benzene halides, 1,4-bis(3-carboxybenzoyl)benzene halides, 1,4-bis(4-carboxybenzoyl)benzene halides, 4,4'-bis(3-carboxyphenoxy)biphenyl halides, 4,4'-bis(4-carboxyphenoxy)biphenyl halides, bis[4-(3-carboxyphenoxy)phenyl] ether halides, bis[4-(4-carboxyphenoxy)phenyl] ether halides, 3,3'-dicarboxy-4,4'-difluorobenzophenone halides, 3,3'-dicarboxy-5,5'-bis (trifluoromethyl)diphenyl ether halides, 4,4'-dicarboxy-5,5'-bis(trifluoromethyl)diphenyl ether halides, 4,4'-bis[2-(4-carboxyphenylphenoxy)-1,1,1,3,3,3-hexafluoroisopropyl] diphenyl ether halides and 4,4'-bis[2-(4-carboxyphenylphenoxy)-1,1,1,3,3,3-hexafluoroisopropyl] biphenyl ether halides.

In this invention, the dicarboxylic halide is not limited to these examples, and may be used solely or in combination of two or more.

In general, a polyimide or polyamide for an optical component is preferably prepared in a solvent. Solvents which may be used, include N,N-dimethylformamide, N,N-dimethylacetamide, N,N-diethylacetamide, N,N-dimethylmethoxyacetamide, N-methyl-2-pyrrolidone, 1,3-dimethyl-2-imidazolidinone, N-methylcaprolactam, 1,2-dimethoxyethane-bis(2-methoxyethyl) ether, 1,2-bis(2-methoxyethoxy)ethane, bis[2-(2-methoxyethoxy)ethyl] ether, tetrahydrofuran, 1,3-dioxane, 1,4-dioxane, xylenes, pyridine, picoline, dimethyl sulfoxide, dimethyl sulfone, tetramethylurea, hexamethylphosphoramide, phenol, o-cresol, m-cresol, p-cresol, m-cresylic acid, p-chlorophenol and anisole. These organic solvents can be used solely or in combination of two or more.

In preparation of a polyimide for an optical component, any organic base catalyst which is generally used in polyimide synthesis, may be employed without limitation. Organic base catalysts which can be used, include triethylamine, tributylamine, tripentylamine, N,N-dimethylaniline, N,N-diethylaniline, pyridine, α-picoline, β-picoline, γ-picoline, 2,4-lutidine, 2,6-lutidine, quinoline and isoquinoline, preferably pyridine and γ-picoline.

In preparing the polyimide, the reaction may be conducted in an organic solvent, according to any known process; for example, 1) blending monomers in the organic solvent to form a polyamic acid; removing the solvent at a lower temperature by some procedure such as vacuum distillation, or extracting the polyamic acid solution into a poor solvent, to isolate the polyamic acid; and then heating the product to be converted to a polyimide;

2) preparing a polyamic acid solution as described in the above 1); adding a dehydrating agent represented by acetic anhydride to the solution; chemically converting the acid into an imide, if necessary, in the presence of a catalyst; isolating the polyimide according to a known procedure; and washing and drying the polyimide;

3) preparing a polyamic acid solution as described in the above 1); and then thermally converting the acid into an imide, while removing the solvent under a reduced pressure or by heating; and 4) charging materials into the solvent; and heating the mixture to form a polyamic acid and convert it into an imide simultaneously, if necessary, in the presence of a catalyst, an azeotropic agent and/or a dehydrating agent.

When polymerizing the polyimide, its end can be suitably protected by conducting the reaction in the presence of an aromatic dicarboxylic anhydride or an aromatic monoamine, according to, for example, any of the following procedures;

(a) reacting a tetracarboxylic dianhydride and a diamine; and then adding a dicarboxylic anhydride or an aromatic monoamine;

(b) adding a dicarboxylic anhydride to a diamine and then adding a tetracarboxylic dianhydride, or adding an aromatic monoamine to a tetracarboxylic dianhydride and then adding a diamine; and (c) simultaneously adding a tetracarboxylic dianhydride, a diamine and a dicarboxylic anhydride.

Aromatic dicarboxylic anhydrides which can be used in the reaction, include phthalic anhydride, 2,3-benzophenonedicarboxylic anhydride, 3,4-benzophenonedicarboxylic anhydride, 2,3-dicarboxyphenyl phenyl ether anhydride, 3,4-dicarboxyphenyl phenyl ether anhydride, 2,3-biphenyldicarboxylic anhydride, 3,4-biphenyldicarboxylic anhydride, 2,3-dicarboxyphenyl phenyl sulfone anhydride, 3,4-dicarboxyphenyl phenyl sulfone anhydride, 2,3-dicarboxyphenyl phenyl sulfide anhydride, 3,4-dicarboxyphenyl phenyl sulfide anhydride, 1,2-naphthalenedicarboxylic anhydride, 2,3-naphthalenedicarboxylic anhydride, 1,8-naphthalenedicarboxylic anhydride, 1,2-anthracenedicarboxylic anhydride, 2,3-anthracenedicarboxylic anhydride and 1,9-anthracenedicarboxylic anhydride. These dicarboxylic anhydride may be used solely or in combination of two or more. Among these dicarboxylic anhydride, phthalic anhydride is most preferable in the light of performance and practicability of a resin produced.

The amount of a dicarboxylic anhydride used is 0.001 to 1.00 mol per 1 mol of an aromatic diamine. If it is less than 0.001 mol, a viscosity will be increased during hot molding, leading to deterioration of moldability and processability. If it is over 1.00 mol, mechanical properties will be deteriorated. It is preferably 0.01 to 0.50 mol.

Monoamines which may be used, include aniline, o-toluidine, m-toluidine, p-toluidine, 2,3-xylidine, 2,4-xylidine, 2,5-xylidine, 2,6-xylidine, 3,4-xylidine, 3,5-xylidine, o-chloroaniline, m-chloroaniline, p-chloroaniline, o-bromoaniline, m-bromoaniline, p-bromoaniline, o-nitroaniline, m-nitroaniline, p-nitroaniline, o-anisidine, m-anisidine, p-anisidine, o-phenetidine, m-phenetidine, p-phenetidine, o-aminophenol, m-aminophenol, p-aminophenol, o-aminobenzaldehyde, m-aminobenzaldehyde, p-aminobenzaldehyde, o-aminobenzonitrile, m-aminobenzonitrile, p-aminobenzonitrile, 2-aminobiphenyl, 3-aminobiphenyl, 4-aminobiphenyl, 2-aminophenyl phenyl ether, 3-aminophenyl phenyl ether, 4-aminophenyl phenyl ether, 2-aminobenzophenone, 3-aminobenzophenone, 4-aminobenzophenone, 2-aminophenyl phenyl sulfide, 3-aminophenyl phenyl sulfide, 4-aminophenyl phenyl sulfide, 2-aminophenyl phenyl sulfone, 3-aminophenyl phenyl sulfone, 4-aminophenyl phenyl sulfone, α-naphthylamine, β-naphthylamine, 1-amino-2-naphthol, 2-amino-1-naphthol, 4-amino-1-naphthol, 5-amino-1-naphthol, 5-amino-2-naphthol, 7-amino-2-naphthol, 8-amino-1-naphthol, 8-amino-2-naphthol, 1-aminoanthracene, 2-aminoanthracene, 9-aminoanthracene, methylamine, dimethylamine, ethylamine, diethylamine, propylamine, dipropylamine, isopropylamine, diisopropylamine, butylamine, dibutylamine, isobutylamine, diisobutylamine, pentylamine, dipentylamine, benzylamine, cyclopropylamine, cyclobutylamine, cyclopentylamine and cyclohexylamine. These monoamines may be used solely or in combination of two or more.

The amount of a monoamine used is 0.001 to 1.00 mol per 1 mol of an aromatic dicarboxylic acid. If it is less than 0.001 mol, a viscosity will be increased during hot molding, leading to deterioration of moldability and processability. If it is over 1.00 mol, mechanical properties will be deteriorated. It is preferably 0.01 to 0.50 mol.

A logarithmic viscosity of a polyimide for an optical component is at least 0.01 dL/g and up to 3.00 dL/g, preferably at least 0.05 dL/g and up to 2.5 dL/g, more preferably at least 0.10 dL/g and up to 2.0 dL/g, in the light of its mechanical properties and processability. The logarithmic viscosity can be determined after dissolving 0.50 g of a sample in 100 mL of a mixture (90:10 by weight) of p-chlorophenol and phenol by heating, and cooling it to 35° C.

A reaction temperature and reaction period in preparing the polyimide are generally, but not limited to, 100° C. to 250° C. and 1 to 24 hours.

A process for preparing a polyamide for an organic component is not limited, and a variety of known processes can be applied. For example, the polymerization may be conducted using a dicarboxylic acid derivative instead of the above acid halide.

In preparation of the polyamide for an organic component, the end of the molecule may be protected with a monovalent carboxylic acid or its derivative, or a monovalent amine. In other words, it can be prepared in a manner that a dicarboxylic acid or its derivative is partly replaced with a monocarboxylic acid or its derivative such as monocarboxylic halides, or a diamine is partly replaced with a monoamine.

Monocarboxylic acids which may be used include benzoic acid, chlorobenzoic acids, bromobenzoic acids, methylbenzoic acids, ethylbenzoic acids, methoxybenzoic acids, ethoxybenzoic acids, nitrobenzoic acids, acetylbenzoic acids, acetoxybenzoic acids, hydroxybenzoic acids, biphenylcarboxylic acids, benzophenonecarboxylic acids, diphenyl ether carboxylic acids, diphenyl sulfide carboxylic acids, diphenyl sulfone carboxylic acids, 2,2-diphenylpropanecarboxylic acids, 2,2-diphenyl-1,1,1,3,3,3-hexafluoropropanecarboxylic acids, naphthalenecarboxylic acids, acetic acid, chloroacetic acid, dichloroacetic acid, trichloroacetic acid, fluoroacetic acid, difluoroacetic acid, trifluoroacetic acid, nitroacetic acid, propionic acid, butyric acid, valeric acid, caproic acid and cyclohexanecarboxylic acid. These monocarboxylic acids may be used solely or in combination of two or more. Monocarboxylic acids include acid chlorides and acid bromides of these monocarboxylic acids, which may be used solely or in combination of two or more.

The amount of a monocarboxylic acid used is 0.001 to 1.00 mol per 1 mol of an aromatic diamine. If it is less than 0.001 mol, a viscosity will be increased during hot molding, leading to deterioration of moldability and processability. If it is over 1.00 mol, mechanical properties will be deteriorated. It is preferably 0.01 to 0.50 mol.

A monovalent amine for protecting the end of the molecule may be selected from the monoamines described in terms of the above polyimide.

These monovalent amines may be used solely or in combination of two or more. The amount of a monovalent amine used is 0.001 to 1.00 mol per 1 mol of an aromatic dicarboxylic acid. If it is less than 0.001 mol, a viscosity will be increased during hot molding, leading to deterioration of moldability and processability. If it is over 1.00 mol, mechanical properties will be deteriorated. It is preferably 0.01 to 0.50 mol.

A logarithmic viscosity of the polyamide is at least 0.01 dL/g and up to 3.00 dL/g, preferably at least 0.05 dL/g and up to 2.5 dL/g, more preferably at least 0.10 dL/g and up to 2.0 dL/g, in the light of its mechanical properties and processability. The logarithmic viscosity can be determined after dissolving 0.50 g of the polyamide powder in 100 mL of N-methyl-2-pyrrolidone and measuring it at 35° C.

The polyamide for an optical component may be prepared by polycondensing a diamine with a dicarboxylic acid in an organic solvent. Organic solvents which may be used in this reaction, include, but not limited to, those used in the above preparation of the polyimide. These organic solvents may be solely or in combination of two or more, depending on the type of the monomer as a reaction material and a polymerization procedure.

When a dicarboxylic dihalide is a starting monomer, a de-hydrohalogenating agent is concomitantly used in general. De-hydrohalogenating agents which may be used include trimethylamine, triethylamine, tripropylamine, tributylamine, tripentylamine, N,N-dimethylbenzylamine, N,N-diethylbenzylamine, N,N-dimethylcyclohexylamine, N,N-diethylcyclohexylamine, N,N-dimethylaniline, N,N-diethylaniline, N-methylpyrrolidine, N-ethylpyrrolidine, N-methylpiperidine, N-ethylpiperidine, N-methylmorpholine, N-ethylmorpholine, pyridine, α-picoline, β-picoline, γ-picoline, 2,4-lutidine, 2,6-lutidine, quinoline, isoquinoline, sodium hydroxide, potassium hydroxide, calcium hydroxide, lithium hydroxide, sodium carbonate, potassium carbonate, lithium carbonate, calcium carbonate, sodium bicarbonate, potassium bicarbonate, calcium oxide, lithium oxide, sodium acetate, potassium acetate, ethylene oxide and propylene oxide.

When a dicarboxylic acid is used as a starting monomer, a condensing agent is generally used. Condensing agents which may be used include sulfuric anhydride, thionyl chloride, sulfites, picryl chloride, phosphorus pentoxide, phosphorus oxychloride, phosphite-pyridine condensing agent, triphenylphosphine-hexachloroethane condensing agent and propylphosphoric anhydride-N-methyl-2-pyrrolidone condensing agent.

A reaction temperature is generally equal to or below 300° C., depending on some factors such as a polymerization procedure and the type of the solvent. A reaction pressure is not limited, and the atmospheric pressure may be adequate.

A reaction period may vary depending on some factors such as the types of starting monomers, a polymerization procedure, the type of a solvent, the type of a de-hydrohalogenating agent, the type of the condensing agent and a reaction temperature; generally 10 min to 24 hours is adequate.

The following will describe a process for preparing an optical component from the above polyimide or polyamide.

A substrate for an optical disk or magneto-optical disk may be molded according to a known process such as a melting injection molding, as in the case of a conventional thermoplastic polymer such as polycarbonate and polyester.

Furthermore, an optical lens may be suitably formed according to a known process such as a melting injection molding as in the case of, for example, polycarbonate or polyester (See, e.g. JP-A 60-135901). An organic optical component which is formed according to the above process from a polyimide or polyamide comprising the repeating structural unit represented by formula (1) has excellent transparency, mechanical strength and heat resistance, and a low birefringence, which is useful as an optical disk substrate, a pickup lens, a plastic board for a liquid crystal cell or a prism.

The following will describe a novel polyimide used for a low-birefringent organic optical component.

The polyimide of this invention is a fluorine-containing polyimide comprising the repeating structural unit represented by general formula (15); a polyimide comprising the repeating structural unit represented by general formula (16); a novel polyimide comprising the repeating structural unit represented by general formula (17), having a logarithmic viscosity of at least 0.01 dL/g and up to 3.00 dL/g; and a polyimide comprising any of the repeating structural units whose polymer end is an unsubstituted aromatic ring or an aromatic ring substituted by a group or groups inert to an amine or a dicarboxylic anhydride; specifically an aromatic fluorine-containing polyimide prepared by protecting a polyimide comprising the repeating structural unit represented by any of formulas (15), (16) and (17), with an aromatic dicarboxylic anhydride represented by general formula (31) or an aromatic monoamine represented by general formula (32). Most preferably, an aromatic dicarboxylic anhydride and an aromatic monoamine for the protection are phthalic anhydride and aniline, respectively;

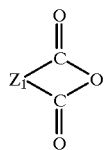
(31)

wherein $Z_1$ is a bivalent group with 6 to 15 carbons selected from the group of a monocyclic aromatic group, a fused polycyclic aromatic group and a non-fused polycyclic aromatic group in which aromatic groups are mutually linked directly or via a cross-linking moiety;

$$Z_2\text{—}NH_2 \qquad (32)$$

wherein $Z_2$ is a monovalent group with 6 to 15 carbons selected from the group of a monocyclic aromatic group, a fused polycyclic aromatic group and a non-fused polycyclic aromatic group in which aromatic groups are mutually linked directly or via a cross-linking moiety.

The fluorine-containing polyimide represented by the formula (15) of this invention, the polyimide represented by formula (16) and the polyimide represented by formula (17) are prepared from, as essential starting monomers, 6,6'-bis(3-aminophenoxy)-3,3,3',3'-tetramethyl-1,1'-spirobiindan, 6,6'-bis(4-aminophenoxy)-3,3,3',3'-tetramethyl-1,1'-spirobiindan, and the diamine represented by formula (35), respectively.

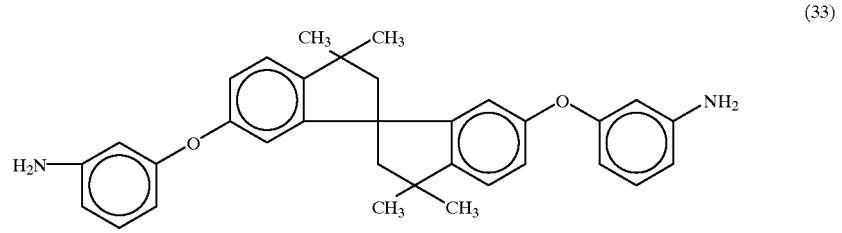
(33)

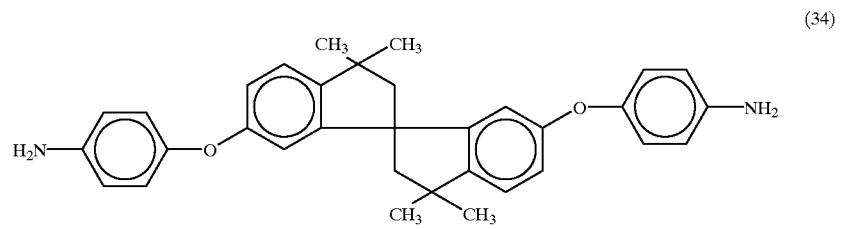
(34)

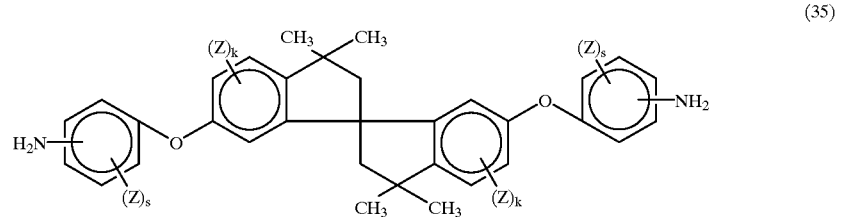
(35)

wherein Z, k and s are as defined above.

Examples of the diamine represented by formula (35) include the following, wherein x and y are different from each other and represent an integer of 2 to 6; z- represents o-, m- or p-; x' and y' are, independently of x and y, different from each other and represents an integer of 2 to 6;

6,6'-bis(x-amino-y-methylphenoxy)-3,3,3',3'-tetramethyl-1,1'-spirobiindans;

6,6'-bis(x-amino-y-ethylphenoxy)-3,3,3',3'-tetramethyl-1,1'-spirobiindans;

6,6'-bis(x-amino-y-propylphenoxy)-3,3,3',3'-tetramethyl-1,1'-spirobiindans;

6,6'-bis(x-amino-y-isopropylphenoxy)-3,3,3',3'-tetramethyl-1,1'-spirobiindans;

6,6'-bis(3-amino-2,4,5,6-tetrafluorophenoxy)-3,3,3',3'-tetramethyl-1,1'-spirobiindan;

6,6'-bis(x-amino-y-trifluoromethylphenoxy)-3,3,3',3'-tetramethyl-1,1'-spirobiindans;
6,6'-bis(x-amino-y-methoxyphenoxy)-3,3,3',3'-tetramethyl-1,1'-spirobiindans;
6,6'-bis(x-amino-y-ethoxyphenoxy)-3,3,3',3'-tetramethyl-1,1'-spirobiindans;
6,6'-bis(x-amino-y-propoxyphenoxy)-3,3,3',3'-tetramethyl-1,1'-spirobiindans;
6 6'-bis(x-amino-y-isopropoxyphenoxy)-3,3,3',3'-tetramethyl-1,1'-spirobiindans;
6,6'-bis(x-amino-y-phenylphenoxy)-3,3,3',3'-tetramethyl-1,1'-spirobiindans; 6,6'-bis(x-amino-y-phenoxyphenoxy)-3,3,3',3'-tetramethyl-1,1'-spirobiindans;
6,6'-bis(x-amino-y-benzylphenoxy)-3,3,3',3'-tetramethyl-1,1'-spirobiindans;
6,6'-bis[x-amino-y-(1-naphthyl)phenoxy]-3,3,3',3'-tetramethyl-1,1'-spirobiindans;
6,6'-bis[x-amino-y-(2-naphthyl)phenoxy]-3,3,3',3'-tetramethyl-1,1'-spirobiindans;
6,6'-bis[x-amino-y-(2,3,4,5,6-pentafluorophenyl)phenoxy]-3,3,3',3'-tetramethyl-1,1'-spirobiindans;
6,6'-bis[x-amino-y-(z-tolyl)phenoxy]-3,3,3',3'-tetramethyl-1,1'-spirobiindans;
6,6'-bis[x-amino-y-(x',y'-xylyl)phenoxy]-3,3,3',3'-tetramethyl-1,1'-spirobiindans;
6,6'-bis(x-amino-y-mesitylphenoxy)-3,3,3',3'-tetramethyl-1,1'-spirobiindans;
6,6'-bis[x-amino-y-(z-propylphenyl)phenoxy]-3,3,3',3'-tetramethyl-1,1'-spirobiindans;
6,6'-bis[x-amino-y-(z-cumenyl)phenoxy]-3,3,3',3'-tetramethyl-1,1'-spirobiindans;
6,6'-bis[x-amino-y-(2,3,4,5,6-pentafluorophenoxy)phenoxy]-3,3,3',3'-tetramethyl-1,1'-spirobiindans;
6,6'-bis[x-amino-y-(z-methylphenoxy)phenoxy]-3,3,3',3'-tetramethyl-1,1'-spirobiindans;
6,6'-bis[x-amino-y-(z-ethylphenoxy)phenoxy]-3,3,3',3'-tetramethyl-1,1'-spirobiindans;
6,6'-bis[x-amino-y-(z-isopropylphenoxy)phenoxy]-3,3,3',3'-tetramethyl-1,1'-spirobiindans;
6,6'-bis[x-amino-y-(x',y'-dimethylphenoxy)phenoxy]-3,3,3',3'-tetramethyl-1,1'-spirobiindans;
6,6'-bis[x-amino-y-(z-methoxyphenyl)phenoxy]-3,3,3',3'-tetramethyl-1,1'-spirobiindans;
6,6'-bis[x-amino-y-(z-methoxyphenoxy)phenoxy]-3,3,3',3'-tetramethyl-1,1'-spirobiindans;
6,6'-bis[x-amino-y-(z-trifluoromethylphenyl)-phenoxy]-3,3,3',3'-tetramethyl-1,1'-spirobiindans;
6,6'-bis[x-amino-y-(z-trifluoromethylphenoxy)-phenoxy]-3,3,3',3'-tetramethyl-1,1'-spirobiindans;
6,6'-bis[x-amino-y-(z-trifluoromethoxyphenyl)-phenoxy]-3,3,3',3'-tetramethyl-1,1'-spirobiindans; and
6,6'-bis[x-amino-y-(z-trifluoromethoxyphenoxy)-phenoxy]-3,3,3',3'-tetramethyl-1,1'-spirobiindans.

A diamine used is not necessarily limited to these examples as long as it is within this invention. These diamines may be concomitantly used in any combination. Furthermore, another aromatic diamine may be concomitantly used as long as it does not adversely affect the good properties of the polyimide, wherein its amount may be below 50 equivalents, preferably below 30 equivalents, more preferably 10 equivalents to the total amount of diamines used.

Aromatic diamines which may be concomitantly used include those represented by the above m-phenylenediamine, which may be used solely or in combination of two or more.

Examples of a tetracarboxylic dianhydride used in the fluorine-containing polyimide represented by formula (15) include 1,4-difluoropyromellitic dianhydride (P2FDA) represented by formula (37), 1,4-bis(trifluoromethyl)-pyromellitic dianhydride (P6FDA) represented by formula (38), 2,2-bis(3,4-dicarboxyphenyl)-1,1,1,3,3,3-hexafluoropropane dianhydride (6FDA) represented by formula (39), 1,4-bis( 3,4-dicarboxytrifluoro-phenoxy)tetrafluorobenzene dianhydride (10FEDA) represented by formula (40) and 2,2-bis[4-(3,4-dicarboxyphenoxy)benzene]-1,1,1,3,3,3-hexafluoropropane dianhydride (6FBisADA) represented by formula (41). These may be used solely or in combination of two or more.

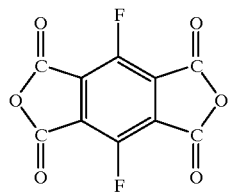

(37)

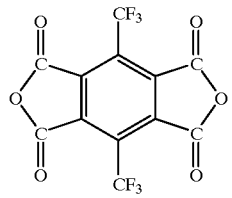

(38)

(39)
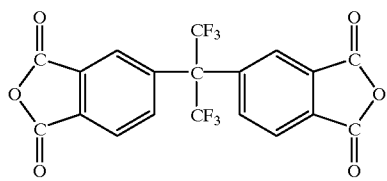

(40)
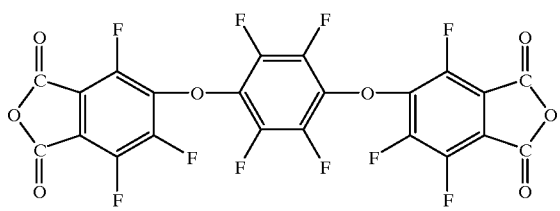

(41)
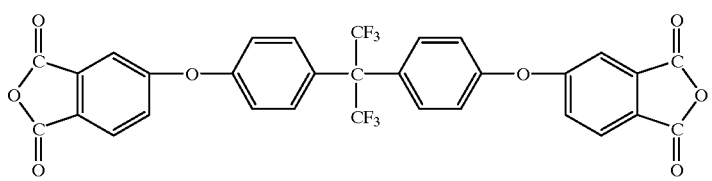

An essential tetracarboxylic dianhydride used in the fluorine-containing polyimide represented by formula (15) is the above fluorine-containing tetracarboxylic dianhydride, and another tetracarboxylic dianhydride may be concomitantly used as long as the good physical properties of the polyimide are not deteriorated, wherein its amount may be below 50 equivalents, preferably below 30 equivalents, more preferably 10 equivalents to the total amount of tetracarboxylic dianhydrides used.

Tetracarboxylic dianhydrides which may be used include pyromellitic dianhydride, 3,3',4,4'-benzophenone-tetracarboxylic dianhydride, 2,2',3,3'-benzophenone-tetracarboxylic dianhydride, 3,3',4,4'-biphenyl-tetracarboxylic dianhydride, 2,2',3,3'-biphenyl-tetracarboxylic dianhydride, 2,2-bis(2,3-dicarboxy-phenyl)propane dianhydride, bis(3,4-dicarboxyphenyl) ether dianhydride, bis(3,4-dicarboxy-phenyl) sulfone dianhydride, 1,1-bis(2,3-dicarboxy-phenyl) ethane dianhydride, bis(2,3-dicarboxyphenyl) methane dianhydride, bis(3,4-dicarboxyphenyl) methane dianhydride, 2,3,6,7-naphthalenetetracarboxylic dianhydride, 1,4,5,8-naphthalenetetracarboxylic dianhydride, 1,2,5,6-naphthalenetetracarboxylic dianhydride, 1,2,3,4-benzenetetracarboxylic dianhydride, 3,4,9,10-perylene-tetracarboxylic dianhydride, 2,3,6,7-anthracene-tetracarboxylic dianhydride and 1,2,7,8-phenanthrene-tetracarboxylic dianhydride, which may be used solely or in combination of two or more.

Tetracarboxylic dianhydrides which may be used for the polyimide represented by formula (17) include pyromellitic dianhydride, 3,3',4,4'-benzophenone-tetracarboxylic dianhydride, 2,2',3,3'-benzophenone-tetracarboxylic dianhydride, 3,3',4,4'-biphenyl-tetracarboxylic dianhydride, 2,2',3,3'-biphenyltetracarboxylic dianhydride, 2,2-bis(2,3-dicarboxyphenyl)propane dianhydride, bis(3,4-dicarboxyphenyl) ether dianhydride, bis(3,4-dicarboxyphenyl) sulfone dianhydride, 1,1-bis(2,3-dicarboxyphenyl) ethane dianhydride, bis(2,3-dicarboxyphenyl) methane dianhydride, bis(3,4-dicarboxyphenyl) methane dianhydride, 2,2-bis(3,4-dicarboxyphenyl)-1,1,1,3,3,3-hexafluoropropane dianhydride, 1,4-difluoropyromellitic dianhydride, 1,4-bis(trifluoromethyl)pyromellitic dianhydride,1,4-bis(3,4-dicarboxytrifluorophenoxy)tetrafluorobenzene dianhydride, 2,2-bis[4-(3,4-dicarboxyphenoxy)benzene]-1,1,1,3,3,3-hexafluoropropane dianhydride, 2,3,6,7-naphthalenetetracarboxylic dianhydride, 1,4,5,8-naphthalenetetracarboxylic dianhydride, 1,2,5,6-naphthalenetetracarboxylic dianhydride, 1,2,3,4-benzenetetracarboxylic dianhydride, 3,4,9,10-perylenetetracarboxylic dianhydride, 2,3,6,7-anthracenetetracarboxylic dianhydride and 1,2,7,8-phenanthrenetetracarboxylic dianhydride, which may be used solely or in combination of two or more.

Tetracarboxylic dianhydrides used for the polyimide represented by formula (17) include at least one of the fluorine-containing tetracarboxylic dianhydride represented by formula (3), examples of which include pyromellitic dianhydride, 3,3',4,4'-benzophenonetetracarboxylic dianhydride, 2,2',3,3'-benzophenonetetracarboxylic dianhydride, 3,3',4,4'-biphenyltetracarboxylic dianhydride, 2,2',3,3'-biphenyltetracarboxylic dianhydride, 2,2-bis(3,4-dicarboxyphenyl)propane dianhydride, 2,2-bis(2,3-dicarboxyphenyl)propane dianhydride, 2,2-bis(3,4-dicarboxyphenyl)-1,1,1,3,3,3-hexafluoropropane dianhydride, 2,2-bis(2,3-dicarboxyphenyl)-1,1,1,3,3,3-hexafluoropropane dianhydride, 3,3',4,4'-diphenyl ether tetracarboxylic dianhydride, 3,3',4,4'-diphenyl sulfone tetracarboxylic dianhydride, bis(2,3-dicarboxyphenyl)methane dianhydride, bis(3,4-dicarboxyphenyl)methane dianhydride, 1,3-bis[(3,4-dicarboxy)benzoyl]benzene dianhydride,1,4-bis[(3,4-dicarboxy)benzoyl]benzene dianhydride, 1,3-bis[(3,4-dicarboxy)phenoxy]benzene dianhydride,1,4-bis[(3,4-dicarboxy)phenoxy]benzene dianhydride, 2,2-bis[4-(3,4-dicarboxyphenoxy)phenyl]propane dianhydride,2,2-bis[4-(2,3-dicarboxyphenoxy)phenyl]propane dianhydride,2,2-bis[4-(3,4-dicarboxyphenoxy)phenyl]-1,1,1,3,3,3- hexafluoropropane dianhydride, 2,2-bis[4-(2,3-dicarboxyphenoxy)phenyl]-1,1,1,3,3,3-hexafluoropropane dianhydride,bis[4-(3,4-dicarboxyphenoxy)phenyl] ketone dianhydride,bis[4-(2,3-dicarboxyphenoxy)phenyl] ketone dianhydride,4,4'-bis(3,4-dicarboxyphenoxy)biphenyl dianhydride, 4,4'-bis(2,3-dicarboxyphenoxy)biphenyl dianhydride,bis[4-(3,4-dicarboxyphenoxy)phenyl] sulfone dianhydride,bis[4-(2,3-dicarboxyphenoxy)phenyl] sulfone dianhydride,bis[4-(3,4-dicarboxyphenoxy)phenyl] sulfide dianhydride,bis[4-(2,3-dicarboxyphenoxy)phenyl] sulfide dianhydride,2,3,6,7-naphthalenetetracarboxylic dianhydride, and 1,2,3,4-benzenetetracarboxylic dianhydride.

A tetracarboxylic acid used is not limited to these, as long as it is within this invention. These may be used solely or in combination of two or more.

The polyimide of this invention is one comprising the repeating structural unit represented by formula (15), (16) or (17). This invention also encompasses any of these polyimides whose molecular end has an unsubstituted aromatic ring or an aromatic ring substituted by a group or groups inert to an amine or a dicarboxylic anhydride, as well as a composition comprising any of these polyimides.

The polyimide whose molecular end has an unsubstituted aromatic ring or an aromatic ring substituted by a group or groups inert to an amine or a dicarboxylic anhydride, may be prepared by reacting a diamine and a tetracarboxylic dianhydride as essential starting monomers in the presence of an aromatic dicarboxylic anhydride represented by general formula (31) or an aromatic monoamine represented by general formula (32), and then thermally or chemically imidating a resulting polyamic acid.

Among dicarboxylic anhydrides represented by general formula (31), phthalic anhydride is most preferable in the light of performance and practicability of a polyimide produced. Specifically, a polyimide produced from phthalic anhydride has an excellent molding stability during hot molding. Thus, in the light of the stability together with the above excellent processability, it may be a significantly useful polyimide as, for example, a structural material, a base material for an aerospace plane, an electric or electronic component, or an adhesive. When phthalic anhydride is used, it may be partly replaced with another dicarboxylic anhydride of those described above, without limitation, as long as it does not adversely affect the excellent physical properties of the polyimide.

The amount of a dicarboxylic anhydride used is 0.001 to 1.0 mol per 1 mol of the diamine represented by formula (33), (34) or (35). If it is less than 0.001 mol, a viscosity will be increased during hot molding, leading to deterioration of moldability and processability. If it is over 1.0 mol, mechanical properties will be deteriorated. It is preferably 0.01 to 0.5 mol.

Examples of the compound represented by formula (32) include the above aromatic monoamines such as aniline.

The amount of an aromatic monoamine used is, as is in the case of the aromatic dicarboxylic anhydride, 0.001 to 1.0 mol per 1 mol of the tetracarboxylic dianhydride represented by general formula (3). If it is less than 0.001 mol, a viscosity will be increased during hot molding, leading to deterioration of moldability and processability. If it is over 1.0 mol, mechanical properties will be deteriorated. It is preferably 0.01 to 0.50 mol.

In preparing the polyimide of this invention, it is usual to adjust the ratio between the tetracarboxylic dianhydride and the diamine for controlling the molecular weight of the polyimide produced.

An appropriate molar ratio between the diamine and the tetracarboxylic dianhydride should be within 0.9 to 1.1 for providing the polyimide of this invention. When the end of the polyimide of this invention is an unsubstituted or substituted aromatic ring, a molar ratio between the aromatic diamine and the tetracarboxylic dianhydride is 0.9 to 1.0 mol of the tetracarboxylic dianhydride and 0.001 to 1.0 mol of dicarboxylic anhydride per 1 mol of the aromatic diamine when the aromatic diamine is excessive, while it is 0.9 to 1.0 mol of the aromatic diamine and 0.001 to 1.0 mol of the aromatic monoamine per 1 mol of the tetracarboxylic dianhydride when the aromatic tetracarboxylic dianhydride is excessive.

A polyamic acid as a precursor for the fluorine-containing polyimide of this invention gives a logarithmic viscosity of 0.01 to 3.0 dL/g determined at 35° C. after dissolving it in N,N-dimethylacetamide in concentration of 0.5 g/dL, while the polyimide gives a logarithmic viscosity of 0.01 to 3.0 dL/g determined at 35° C. after dissolving by heating its powder in a mixture of p-chlorophenol (9 parts by weight) and phenol (1 part by weight) in concentration of 0.5 g/dL.

A polyamic acid as a precursor for the polyimide represented by formula (16) gives a logarithmic viscosity of 0.01 to 3.0 dL/g determined at 35° C. after dissolving it in N,N-dimethylacetamide in concentration of 0.5 g/dL, while the polyimide gives a logarithmic viscosity of 0.01 to 3.0 dL/g determined at 35° C. after dissolving by heating its powder in a mixture of p-chlorophenol (9 parts by weight) and phenol (1 part by weight) in concentration of 0.5 g/dL.

In the light of mechanical properties and processability, the logarithmic viscosity of the polyimide represented by formula (17) is at least 0.01 dL/g and up to 3.00 dL/g, preferably at least 0.05 dL/g and up to 2.5 dL/g, more preferably at least 0.10 dL/g and up to 2.0 dL/g.

The polyimide of this invention may be prepared according to any process which can give a polyimide including known processes, preferably according to the above process. Briefly, it may be preferably the process for preparing the above low-birefringent organic optical component of this invention, although there are no limitations for solvents used, an aromatic dicarboxylic anhydride or an aromatic monoamine, their addition procedures, an imidation procedure, a reaction temperature, a reaction pressure and a reaction period.

The polyimide of this invention may be provided as a film by applying a varnish of a polyamic acid as a precursor for the polyimide of this invention on a glass plate, and then imidating it by heating, or by heating and compressing a polyimide powder directly. Since the polyimide of this invention is very soluble in a universal organic solvent, it may be given as a film by dissolving a polyimide powder in an organic solvent, applying the solution on a glass plate and removing the solvent. The universal organic solvent used here may be that used during the polymerization described above. Thus, a powder or film form of polyimide can be prepared according to a known procedure.

When the polyimide of this invention is subject to melt molding, another thermoplastic resin may be blended in an appropriate amount depending on its purpose, as long as it does not adversely affect the objective of this invention; examples of such a resin include polyethylene, polypropylene, polycarbonates, polyalylates, polyamides, polysulfones, polyether sulfones, polyether ketones, polyphenyl sulfides, polyamide imides, polyetherimides, modified polyphenylene oxides and polyimides other than that of this invention.

Furthermore, various materials such as the following fillers which can be used for a usual resin composition may be used as long as it does not adversely affect the objective of this invention; abrasion resistance improvers such as graphite, Carborundum, silica power, molybdenum disulfide and fluorinated resins; reinforcing materials such as glass fiber and carbon fiber; incombustibility improvers such as antimony trioxide, magnesium carbonate and calcium carbonate; electric characteristic improvers such as clay and mica; tracking resistance improvers such as asbestos, silica and graphite; acid resistance improvers such as barium sulfate, silica and calcium meta-silicate; heat conductivity improvers such as iron powder, zinc powder, aluminum powder and copper powder; glass beads; glass balls; talc; diatomaceous earth; alumina; silasbalun; hydrated alumina; metal oxides; and pigments.

The fluorine-containing polyimide of this invention may be in a various form such as different molding materials, a film or a fiber.

A polyamide for a low-birefringent organic optical component will be described.

The polyamide of this invention is a novel polyamide comprising the repeating structural unit represented by general formula (18), having a logarithmic viscosity of at least 0.01 dL/g and up to 3.00 dL/g. The polyamide may be prepared, for example, by condensing the diamine represented by general formula (42) with the dicarboxylic dihalide represented by formula (43) in the presence of a de-hydrohalogenating agent, in a solvent;

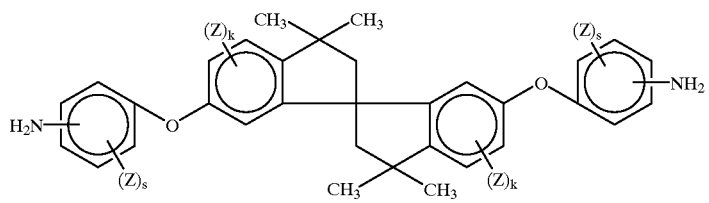

(42)

wherein Z, k and s are as defined above;

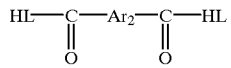

(43)

wherein Ar$_2$ and HL are as defined above.

The aromatic diamine represented by formula (42) may be, for example, the above-mentioned diamines such as 6,6'-bis(x-amino-y-methylphenoxy)-3,3,3',3'-tetramethyl-1,1'-spirobiindans wherein x and y are independently an integer of 2 to 6, although a diamine used is not limited to these as long as it is within this invention. These diamines may be used in any combination thereof.

Furthermore, generally known other diamines may be concomitantly used as long as they do not adversely affect the excellent physical properties of the product of this invention, the amount of which may be below 50 equivalents, preferably below 30 equivalents, more preferably below 10 equivalents to the essential diamine. Examples of the additional aromatic diamines include the above-mentioned diamines such as m-phenylenediamine.

The dicarboxylic dihalide represented by general formula (43) may be a derivative in which two —OH groups of the corresponding dicarboxylic acid are replaced by a halogen atom such as —F, —Cl and —Br. Examples are phathalic halides, terephthalic halides, isophthalic halides, methylphthalic halides, methylterephthalic halides, methylisophthalic halides, ethylphthalic halides, ethylterephthalic halides, ethylisophthalic halides, methoxyphthalic halides, methoxyterephthalic halides, methoxyisophthalic halides, ethoxyphthalic halides, ethoxyterephthalic halides, ethoxyisophthalic halides, chlorophthalic halides, chloroterephthalic halides, chloroisophthalic halides, bromophthalic halides, bromoterephthalic halides, bromoisophthalic halides, tetrafluorophthalic halides, tetrafluoroterephthalic halides, tetrafluoroisophthalic halides, 1,2-naphthalenedicarboxylic halides, 1,4-naphthalenedicarboxylic halides, 1,5-naphthalenedicarboxylic halides, 2,3-naphthalenedicarboxylic halides, 2,6-naphthalenedicarboxylic halides, 3,3'-biphenyldicarboxylic halides, 4,4'-biphenyldicarboxylic halides, 4,4'-diphenyl ether dicarboxylic halides, 3,3'-diphenyl ether dicarboxylic halides, 3,4'-diphenyl ether dicarboxylic halides, bis(3-carboxyphenyl) sulfide halides, (3-carboxyphenyl)(4-carboxyphenyl) sulfide halides, bis(4-carboxyphenyl) sulfide halides, bis(3-carboxyphenyl) sulfone halides, (3-carboxyphenyl)(4-carboxyphenyl) sulfone halides, bis(4-carboxyphenyl) sulfone halides, 3,3'-benzophenonedicarboxylic halides, 3,4'-benzophenonedicarboxylic halides, 4,4'-benzophenonedicarboxylic halides, 3,3'-diphenylmethanedicarboxylic halides, 3,4'-diphenylmethanedicarboxylic halides, 4,4'-diphenylmethanedicarboxylic halides, bis[4-(3-carboxyphenoxy)phenyl]methane halides, bis[4-(4-carboxyphenoxy)phenyl]methane halides, 2,2-bis[4-(3-carboxyphenoxy)phenyl]propane halides, 2,2-bis[4-(4-carboxyphenoxy)phenyl]propane halides, 2,2-bis[4-(3-carboxyphenoxy)phenyl]-1,1,1,3,3,3-hexafluoropropane halides, 2,2-bis[4-(4-carboxyphenoxy)phenyl]-1,1,1,3,3,3-hexafluoropropane halides, 1,3-bis(3-carboxyphenoxy)benzene halides, 1,3-bis(4-carboxyphenoxy)benzene halides, 1,4-bis(3-carboxyphenoxy)benzene halides, 1,4-bis(4-carboxyphenoxy)benzene halides, 1,3-bis(3-carboxyphenoxy)-2-trifluoromethylbenzene halides, 1,3-bis(3-carboxyphenoxy)-4-trifluoromethylbenzene halides, 1,3-bis(3-carboxyphenoxy)-5-trifluoromethylbenzene halides, 1,3-bis(3-carboxy-5-trifluoromethylphenoxy)benzene halides, 1,3-bis(3-carboxy-5-trifluoromethylphenoxy)-5-trifluoromethylbenzene halides, 1,3-bis(3-carboxy-5-trifluoromethylphenoxy)-4-trifluoromethylbenzene halides, 1,3-bis(3-carboxybenzoyl)benzene halides, 1,3-bis(4-carboxybenzoyl)benzene halides, 1,4-bis(3-carboxybenzoyl)benzene halides, 1,4-bis(4-carboxybenzoyl)benzene halides, 4,4'-bis(3-carboxyphenoxy)biphenyl halides, 4,4'-bis(4-carboxyphenoxy)biphenyl halides, bis[4-(3-carboxyphenoxy)phenyl] ether halides, bis[4-(4-carboxyphenoxy)phenyl] ether halides, 3,3'-dicarboxy-4,4'-difluorobenzophenone halides, 3,3'-dicarboxy-5,5'-bis(trifluoromethyl)diphenyl ether halides, 4,4'-dicarboxy-5,5'-bis(trifluoromethyl)diphenyl ether halides, 4,4'-bis[2-(4-carboxyphenylphenoxy)-1,1,1,3,3,3-hexafluoroisopropyl] diphenyl ether halides and 4,4'-bis[2-(4-carboxyphenylphenoxy)-1,1,1,3,3,3-hexafluoroisopropyl] biphenyl ether halides. In this invention, the dicarboxylic halide is, however, not limited to these examples, and may be used solely or in combination of two or more.

The polyamide of this invention may be prepared according to a variety of known processes without limitation. Therefore, starting monomers are also not limited, and a non-halide type of dicarboxylic acid derivative may be used instead of the above dihalide. The amount of the dicarboxylic acid derivative used may be preferably, but not limited to, 0.5 to 1.8 mol, more preferably 0.7 to 1.5 mol, most preferably 0.75 to 1.35 mol per 1 mol of the diamine. Departing from the limits, mechanical properties will be deteriorated due to reduction in the molecular weight of the product. The molecular weight may be controlled by adjusting the molar ratio depending on the monomers used.

The molecular weight in this invention depends on a logarithmic viscosity. Specifically, the polyamide of this invention should have a logarithmic viscosity of at least 0.01 dL/g and up to 3.00 dL/g, preferably at least 0.05 dL/g and up to 2.5 dL/g, more preferably at least 0.10 dL/g and up to 2.0 dL/g, in the light of its mechanical properties and processability. The logarithmic viscosity can be determined at 35° C. after dissolving 0.50 g of the polyamide resin in 100 mL of N-methyl-2-pyrrolidone.

In preparation of the polyamide resin used in this invention, a monovalent carboxylic acid or its derivative or a monovalent amine can be used for protecting the molecular end. Specifically, it can be prepared by partially replacing a dicarboxylic acid or its derivative with a monocarboxylic acid or its derivative such as a monocarboxylic halide, or partly replacing a diamine with a monoamine.

Examples of monocarboxylic acids which may be used in the process, include benzoic acid, chlorobenzoic acids, bromobenzoic acids, methylbenzoic acids, ethylbenzoic acids, methoxybenzoic acids, ethoxybenzoic acids, nitrobenzoic acids, acetylbenzoic acids, acetoxybenzoic acids, hydroxybenzoic acids, biphenylcarboxylic acids, benzophenonecarboxylic acids, diphenyl ether carboxylic acids, diphenyl sulfide carboxylic acids, diphenyl sulfone carboxylic acids, 2,2-diphenylpropanecarboxylic acids, 2,2-diphenyl-1,1,1,3,3,3-hexafluoropropanecarboxylic acids, naphthalenecarboxylic acids, acetic acid, chloroacetic acid, dichloroacetic acid, trichloroacetic acid, fluoroacetic acid, difluoroacetic acid, trifluoroacetic acid, nitroacetic acid, propionic acid, butyric acid, valeric acid, caproic acid and cyclohexanecarboxylic acid. These monocarboxylic acids may be used solely or in combination of two or more.

Examples of the monocarboxylic halide include acid chlorides and bromides of the above monocarboxylic acids. These monocarboxylic halides may be used solely or in combination of two or more.

Among these monocarboxylic acids or their derivatives, benzoyl chloride is most preferable, in the light of its availability and performance.

The amount of a monocarboxylic acid derivative used is 0.001 to 1.00 mol per 1 mol of the aromatic diamine. If it is less than 0.001 mol, a viscosity will be increased during hot molding, leading to deterioration of moldability and processability. If it is over 1.00 mol, mechanical properties will be deteriorated. It is preferably 0.01 to 0.50 mol.

Examples of the monovalent amine include the above monoamines such as aniline, which may be used solely or in combination of two or more.

Among these monoamines, aniline is the most preferable, in the light of its availability and general performance of the polyamide produced.

The amount of a monovalent amine (monoamine) used is 0.001 to 1.00 mol per 1 mol of an aromatic dicarboxylic acid derivative. If it is less than 0.001 mol, a viscosity will be increased during hot molding, leading to deterioration of moldability and processability. If it is over 1.00 mol, mechanical properties will be deteriorated. It is preferably 0.01 to 0.50 mol.

A polyamide resin may be produced by polycondensation of a diamine and a dicarboxylic acid derivative, in an organic solvent. Here, solvents which may be used include, but not limited to, the solvents such as N,N-dimethylformamide as described in terms of the above polyimide.

These solvents may be used solely or in combination of two or more, depending on the types of reaction monomers and a polymerization procedure.

When a dicarboxylic dihalide is used as a starting monomer, a de-hydrohalogenating agent is concomitantly used in general. De-hydrohalogenating agents which may be used include trimethylamine, triethylamine, tripropylamine, tributylamine, tripentylamine, N,N-dimethylbenzylamine, N,N-diethylbenzylamine, N,N-dimethylcyclohexylamine, N,N-diethylcyclohexylamine, N,N-dimethylaniline, N,N-diethylaniline, N-methylpyrrolidine, N-ethylpyrrolidine, N-methylpiperidine, N-ethylpiperidine, N-methylmorpholine, N-ethylmorpholine, pyridine, α-picoline, β-picoline, γ-picoline, 2,4-lutidine, 2,6-lutidine, quinoline, isoquinoline, sodium hydroxide, potassium hydroxide, calcium hydroxide, lithium hydroxide, sodium carbonate, potassium carbonate, lithium carbonate, calcium carbonate, sodium bicarbonate, potassium bicarbonate, calcium oxide, lithium oxide, sodium acetate, potassium acetate, ethylene oxide and propylene oxide.

When a dicarboxylic acid is used as a starting monomer, a condensing agent is generally used. Condensing agents which may be used include sulfur trioxide, thionyl chloride, sulfites, picryl chloride, phosphorus pentoxide, phosphorus oxychloride, phosphite-pyridine condensing agent, triphenylphosphine-hexachloroethane condensing agent and propylphosphoric anhydride-N-methyl-2-pyrrolidone condensing agent.

A reaction temperature is generally equal to or below 300° C., depending on some factors such as a polymerization procedure and the type of the solvent. A reaction pressure is not limited, and the atmospheric pressure may be adequate. A taking procedure is also not limited, and any known procedure such as pouring into a poor solvent may be applied.

A reaction period may vary depending on some factors such as the types of starting monomers, a polymerization procedure, the type of a solvent, the type of a de-hydrohalogenating agent, the type of the condensing agent and a reaction temperature; generally 10 min to 24 hours is adequate.

A polyamide prepared by the above process which comprises the repeating structural unit represented by general formula (1), having a logarithmic viscosity of at least 0.01 dL/g and up to 3.00 dL/g, has good transparency, mechanical strength and heat resistance as well as a low birefringence and a low optical loss, which is useful as, for example, a substrate for an optical disk, a pick-up lens, a plastic substrate for a liquid cell and a resin for a prism.

EXAMPLES

The spirobiindan polymer and the low-birefringent organic optical component will be specifically described, but not limited to, by means of the following examples. Molecular weights of the polymers prepared by the examples and the comparative examples were determined by the procedure below.

Determination of a Molecular Weight

Weight-average molecular weights (Mw) were determined by measuring 0.2% by weight solution of an aromatic polycarbonate in chloroform by GPC (Gel Permeation Chromatography) with System-11 (Showa Denko). Measurements are shown as values converted to the standard polystyrene.

Preparation Example 1
Preparation of the Dihydroxy Compound Represented by Formula (5-1)

Into a reaction vessel were charged 152 g of 6,6'-dihydroxy-3,3,3',3'-tetramethyl-1,1'-spirobiindan (0.5 mol), 97 g of ethylene carbonate (1.1 mol), 3.5 g of potassium carbonate (25 mmol) and 200 g of xylenes, and the mixture was heated under reflux for 10 hours.

After cooling, the solid precipitate was filtered, and purified by recrystallization from a mixture of methanol and water, to provide 169 g (yield: 85%) of the desired dihydroxy compound represented by formula (5-1) as a white solid with a melting point of 154 to 158° C.

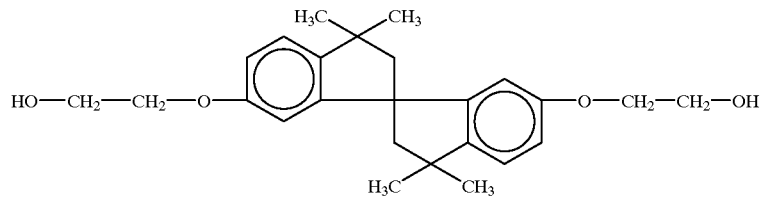

(5-1)

Preparation Example 2

Preparation of the Dihydroxy Compound Represented by Formula (5-2)

Into a reaction vessel were charged 182 g of 6,6'-dihydroxy-3,3,3',3',5,5',7,7'-octamethyl-1,1'-spirobiindan (0.5 mol), 97 g of ethylene carbonate (1.1 mol), 3.5 g of potassium carbonate (25 mmol) and 200 g of p-xylene, and the mixture was heated under reflux for 12 hours. After cooling, the solid precipitate was filtered, and purified by recrystallization from a mixture of methanol and water, to provide 203 g (yield: 89%) of the desired dihydroxy compound represented by formula (5-2) as a white solid with a melting point of 181 to 183° C.

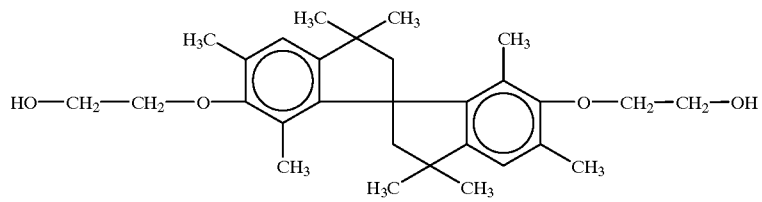

(5-2)

Preparation Example 3
Preparation of the Dihydroxy Compound Represented by Formula (5-3)

Into a reaction vessel were charged 80 g of the dihydroxy compound obtained in Preparation Example 1, 19 g (0.44 mol) of sodium hydroxide and 200 g of toluene, and the mixture was subject to azeotropic dehydration to provide a disodium salt. After cooling, 55 g of 2-bromoethanol (0.44 mol) was added dropwise, and the mixture was refluxed for 5 hours. After cooling, the solid precipitate was filtered, and purified by recrystallization from a mixture of methanol and water, to provide 89 g (yield: 92%) of the desired dihydroxy compound represented by formula (5-3) as a white solid with a melting point of 128 to 130° C.

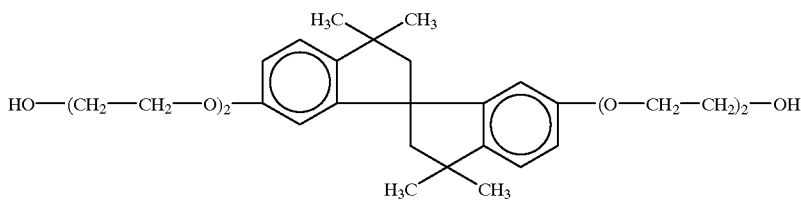
(5-3)

Preparation Example 4
Preparation of a Mixture of the Dihydroxy Compounds Represented by Formulas (5-1) and (5-3) to (5-7)

Into a reaction vessel were charged 154 g of 6,6'-dihydroxy-3,3,3',3'-tetramethyl-1,1'-spirobiindan (0.5 mol), 194 g of ethylene carbonate (2.2 mol), 6.9 g of potassium carbonate (50 mmol) and 200 g of xylenes, and the mixture was heated under reflux for 28 hours. After cooling, the solid precipitate was filtered, and purified by recrystallization from a mixture of methanol and water, to provide 129 g (yield: 53%) of a mixture of the dihydroxy compounds represented by formulas (5-1) and (5-3) to (5-7) as a white solid with a melting point of 103 to 120° C., in which hydroxyethyl group was added in an average number of 3.7 molecules per a molecule. The components were separated by GPC and column chromatography, showing the following proportions and melting points.

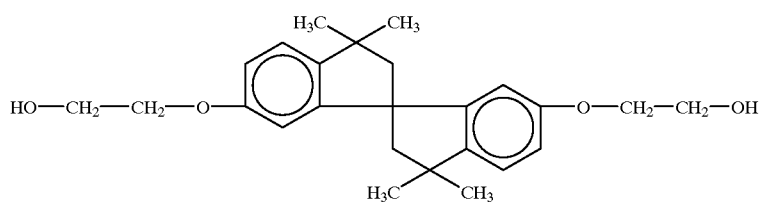
(5-1)

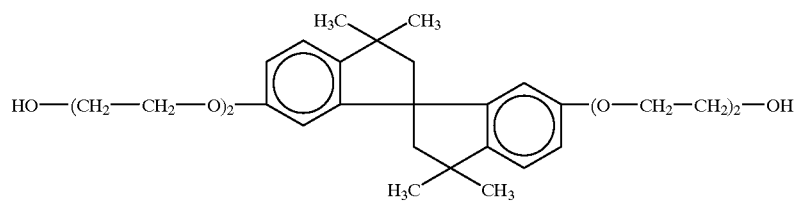
(5-3)

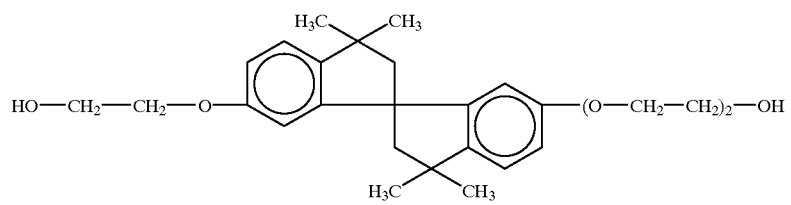
(5-4)

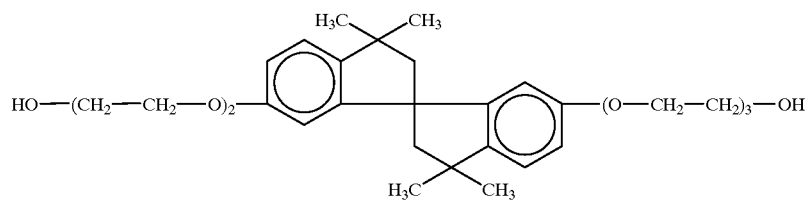
(5-5)

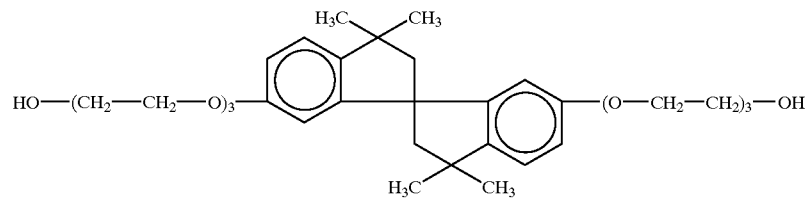
(5-6)

-continued

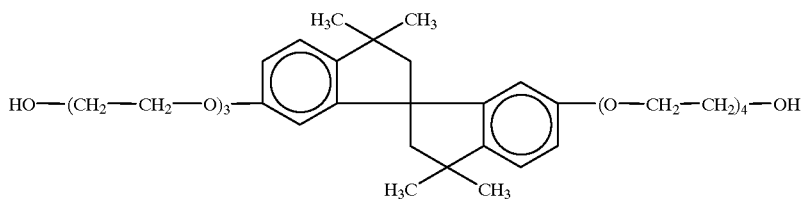
(5-7)

| Dihydroxy Compound | Proportion (%) | Melting Point (° C.) |
|---|---|---|
| Compound of formula (5-1) | 11.6 | 154–158 |
| Compound of formula (5-3) | 29.5 | 128–130 |
| Compound of formula (5-4) | 37.3 | 141–143 |
| Compound of formula (5-5) | 14.9 | 121–125 |
| Compound of formula (5-6) | 4.9 | 116–119 |
| Compound of formula (5-7) | 1.8 | 109–113 |

| Dihydroxy Compound | Proportion (%) | Melting Point (° C.) |
|---|---|---|
| Compound of formula (5-1) | 23.7 | 154–158 |
| Compound of formula (5-3) | 17.9 | 128–130 |
| Compound of formula (5-4) | 51.3 | 141–143 |
| Compound of formula (5-5) | 4.1 | 121–125 |
| Compound of formula (5-6) | 3.0 | 116–119 |

Preparation Example 5

Preparation of a Mixture of the Dihydroxy Compounds Represented by Formulas (5-1) and (5-3) to (5-6)

Into an autoclave were charged 154 g of 6,6'-dihydroxy-3,3,3',3'-tetramethyl-1,1'-spirobiindan (0.5 mol), 150 g of xylene and 2.8 g of tributylamine. After the atmosphere of the system was replaced with nitrogen, it was heated to 130° C., 97 g of ethylene oxide (2.2 mol) was gradually introduced under a pressure, and the mixture was reacted at 140° C. for 2 hours. After cooling, the solid precipitate was filtered, and purified by recrystallization from a mixture of methanol and water, to provide 216 g (yield: 98%) of a mixture of the dihydroxy compounds represented by formulas (5-1) and (5-3) to (5-6) as a white solid with a melting point of 112 to 124° C., in which hydroxyethyl group was added in an average number of 3.1 molecules per a molecule. The components were separated by GPC and column chromatography, showing the following proportions and melting points.

Preparation Example 6

Preparation of a Mixture of the Dihydroxy Compounds Represented by Formulas (5-8) to (5-11)

Into an autoclave were charged 189 g of 5,5'-dihydroxy-6,6'-dichloro-3,3,3',3'-tetramethyl-1,1'-spirobiindan (0.5 mol), 200 g of dimethyl sulfoxide and 5.6 g of benzylamine. After the atmosphere of the system was replaced with nitrogen, it was heated to 130° C., 63 g of ethylene oxide (1.1 mol) was gradually introduced under a pressure, and the mixture was reacted at 140° C. for 6 hours. After cooling, the solid precipitate was filtered, and purified by recrystallization from a mixture of methanol and water, to provide 231 g (yield: 92%) of a mixture of the dihydroxy compounds represented by formulas (5-8) to (5-11) as a white solid with a melting point of 128 to 151° C., in which hydroxyethyl group was added in an average number of 2.1 molecules per a molecule. The components were separated by GPC and column chromatography, showing the following proportions and melting points.

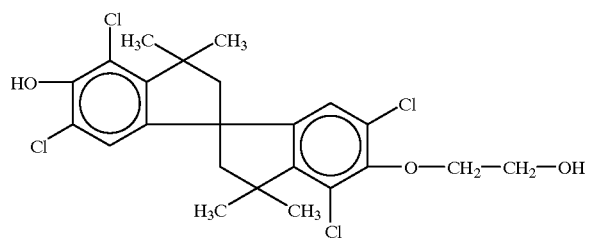
(5-8)

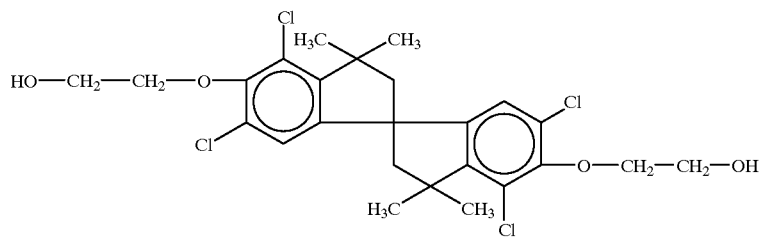
(5-9)

-continued (5-10)

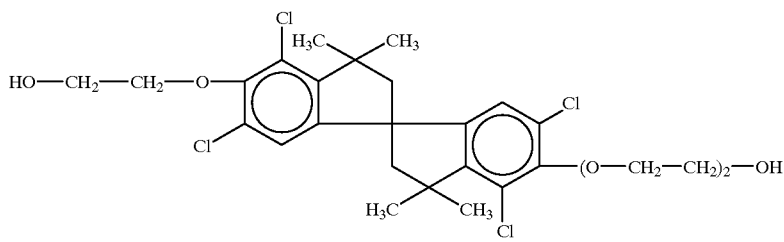

(5-11)

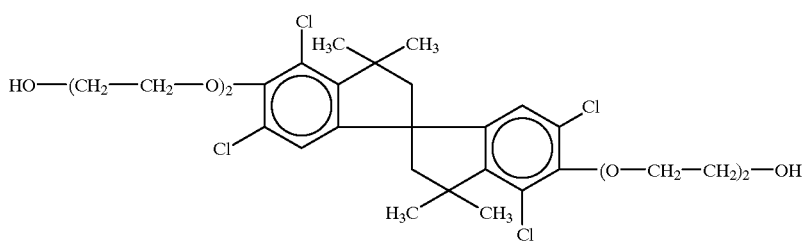

| Dihydroxy Compound | Proportion (%) | Melting Point (° C.) |
|---|---|---|
| Compound of formula (5-8) | 4.6 | 161–163 |
| Compound of formula (5-9) | 81.0 | 151–158 |
| Compound of formula (5-10) | 12.2 | 144–147 |
| Compound of formula (5-11) | 2.2 | 130–132 |

Preparation Example 7

Preparation of the Dihydroxy Compound Represented by Formula (5-12)

The dihydroxy compound represented by formula (5-12) was prepared as described in Preparation Example 1, except that ethylene carbonate was replaced with propylene carbonate. The compound had a melting point of 199 to 201° C.

Preparation Example 8

A 500 mL flask was equipped with an agitator, a reflux condenser and an immersion tube for introducing phosgene (carbonyl chloride). To the flask were added 396 g of the dihydroxy compound represented by formula (5-1) (1.00 mol) and 200 g of dichloromethane. To the mixture was added 207.9 g of carbonyl chloride (2.10 mol) under ice-cooling over 60 min, the reaction mixture was stirred and mixed for additional 2 hours. At the end of the reaction, nitrogen gas was introduced to remove the excess carbonyl chloride and hydrogen chloride as a byproduct, and dichloromethane was evaporated under a reduced pressure to provide 521 g of the bischloroformate represented by formula (5-1-a)(1.00 mol).

(5-12)

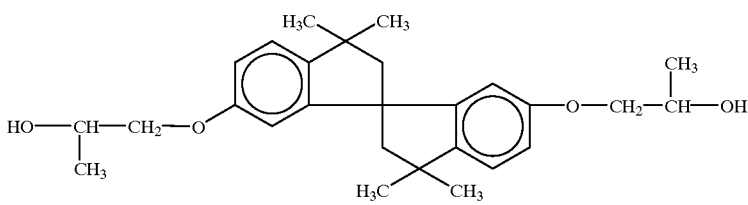

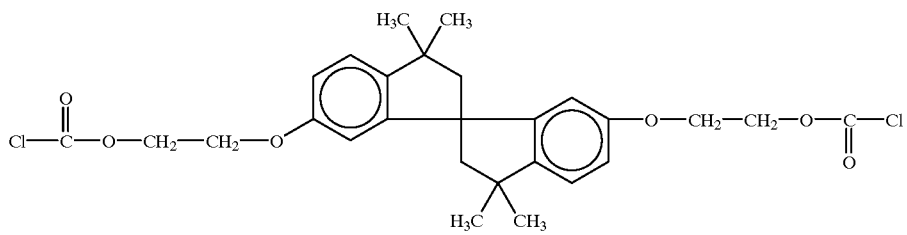

(5-1-a)

Preparation Example 9

The bischloroformate represented by formula (5-12-a) was prepared as described in Preparation Example 8, except that the dihydroxy compound represented by formula (5-1) was replaced with the dihydroxy compound represented by formula (5-12).

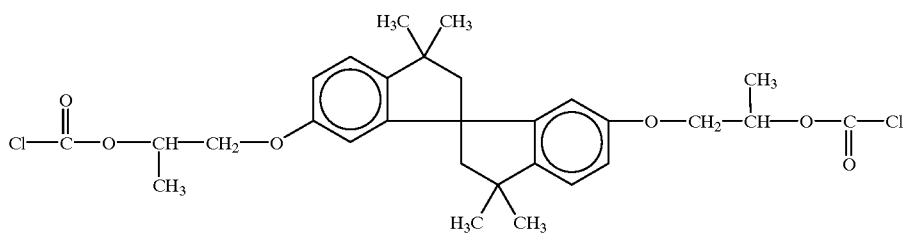

(5-12-a)

Example 1

A 500 mL flask was equipped with an agitator and a reflux condenser, to which were added 52.1 g of the bischloroformate represented by formula (5-1-a) obtained in Preparation Example 8 (0.10 mol), 39.6 g of the dihydroxy compound represented by formula (5-1) (0.10 mol) and 200 g of dichloromethane. To the mixture was added dropwise 17.4 g of pyridine (0.22 mol) under ice-cooling over 30 min, and the reaction mixture was stirred and mixed at the same temperature for additional 2 hours. At the end of the polymerization reaction, diluted hydrochloric acid was added, the mixture was stirred to remove the excess pyridine, the dichloromethane phase was washed with ion-exchanged water until the aqueous layer became neutral, and then the layers were separated. From the solution of the polycarbonate produced in dichloromethane, dichloromethane was evaporated under a reduced pressure to provide the polycarbonate as a solid. The weight-average molecular weight of the polycarbonate was 45000.

Example 2

A polycarbonate was prepared as described in Example 1, except that the bischloroformate represented by formula (5-1-a) and the dihydroxy compound represented by formula (5-1) were replaced with the bischloroformate represented by formula (5-12-a) obtained in Preparation Example 9 and the dihydroxy compound represented by formula (5-12), respectively. The polycarbonate had a weight-average molecular weight of 30000.

Example 3

A 2 liter flask was equipped with an agitator, a reflux condenser and an immersion tube for introducing phosgene (carbonyl chloride), to which were added 198 g of the dihydroxy compound represented by formula (5-1) (0.50 mol), 219 g of the dihydroxy compound represented by formula (27-2) (0.50 mol) and 500 g of pyridine (6.32 mol). The solution was vigorously stirred keeping the reaction temperature at 25° C. on a water bath, while 109 g of cabonyl chloride (1.10 mol) was introduced at the rate of 1.00 g/min. At the end of the polymerization reaction, 1000 g of methanol was added dropwise over 5 min. with vigorously stirring the reaction mixture, and then the agitation was continued for additional 30 min. After the precipitated polycarbonate was filtered, and was subject to sludge washing in 800 g of methanol three times to remove the excess pyridine and pyridine hydrochloride, to give the desired copolymeric polycarbonate of the dihydroxy compound represented by formula (5-1) and the dihydroxy compound represented by formula (27-2), whose weight-average molecular weight was 40000.

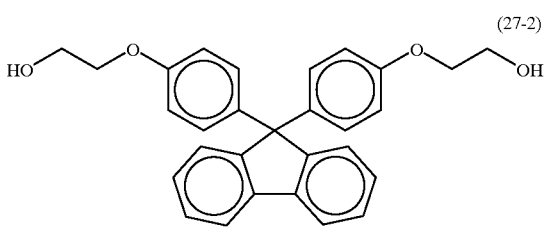

(27-2)

Example 4

An alternating copolymeric polycarbonate of the dihydroxy compound represented by formula (5-1) and the dihydroxy compound represented by formula (19-1) was prepared as described in Example 1, except that the dihydroxy compound represented by formula (5-1) was replaced with the dihydroxy compound represented by formula (19-1), whose weight-average molecular weight was 120000.

Example 5

A random copolymeric polycarbonate of the dihydroxy compound represented by formula (5-1) and the dihydroxy compound represented by formula (19-1) was prepared as described in Example 1, except that the amount of the dihydroxy compound represented by formula (5-1) was changed from 198 g (0.50 mol) to 277 g (0.70 mol), and 219 g of the dihydroxy compound represented by formula (27-a)

(0.50 mol) was replaced with 92.4 g of the dihydroxy compound represented by formula (19-1), whose weight-average molecular weight was 105000.

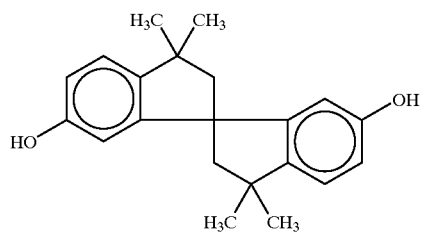
(19-1)

Examples 6 to 8

According to the procedure described in Example 3, polycarbonates were prepared from the dihydroxy compounds shown in Table 3.

Example 9

Preparation of the Acrylate Represented by Formula (6-1)

Into a reaction vessel equipped with a Dean-Stark trap were added 50 g of the dihydroxy compound represented by formula (5-1) prepared in Preparation Example 1 (0.13 mol), 42 g of acrylic acid (0.58 mol), 0.1 g of hydroquinone (0.1 wt %), 4.2 g of sulfuric acid (0.04 mol) and 200 g of p-xylene, and then the mixture was heated under reflux for 7 hours. After cooling, the solid precipitate was filtered, and purified by recrystallization from a mixture of methanol and water, to provide 34 g (yield: 94%) of the desired acrylate represented by formula (6-1) as a white solid with a melting point of 118 to 122° C.

TABLE 3

| Example | Dihydroxy Compound |
| --- | --- |
| 6 | (structure) |
| 7 | (structure) |
| 8 | (structure) |

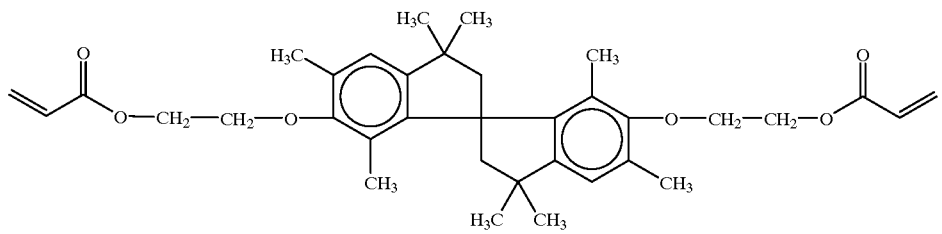

(6-1)

Example 10
Methacrylation of the Mixture of the Dihydroxy Compounds From Preparation Example 4

Into a reaction vessel equipped with a Dean-Stark trap were added 61 g of the mixture of the dihydroxy compounds obtained in Preparation Example 4 (0.1 mol), 33 g of methacrylic acid (0.5 mol), 3 g of sulfuric acid (0.03 mol), 0.1 g of hydroquinone (0.2 wt %) and 200 g of toluene, and then the mixture was heated and dehydrated at 110° C. for 6.5 hours. At the end of the reaction, the mixture was neutralized with a potassium carbonate solution, washed with water. To the toluene solution, silica gel was added, and the mixture was stirred, filtered and toluene was evaporated to provide 46 g of a mixture of the desired methacrylates represented by formulas (6-2) to (6-7) (76%) as a colorless liquid, whose ICI viscosity at 25° C. was 56 poise. Area % of its GPC chart showed that each proportion of the starting dihydroxy compounds was consistent with one of the corresponding methacrylate produced, within an allowance. The components were separated by GPC and column chromatography, showing the following proportions and melting points.

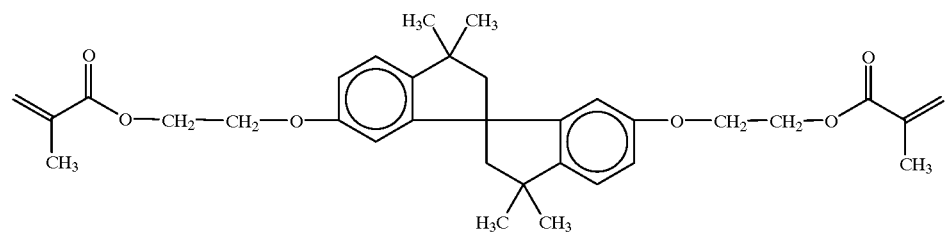

(6-2)

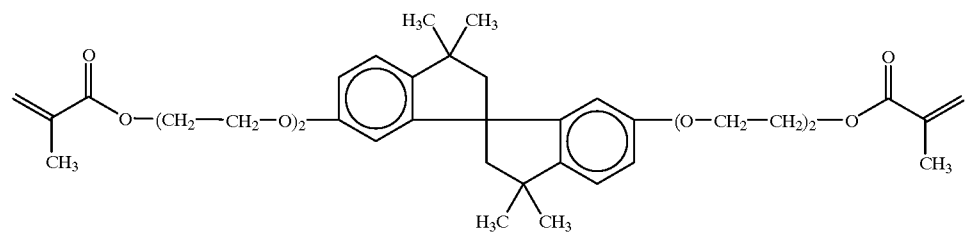

(6-3)

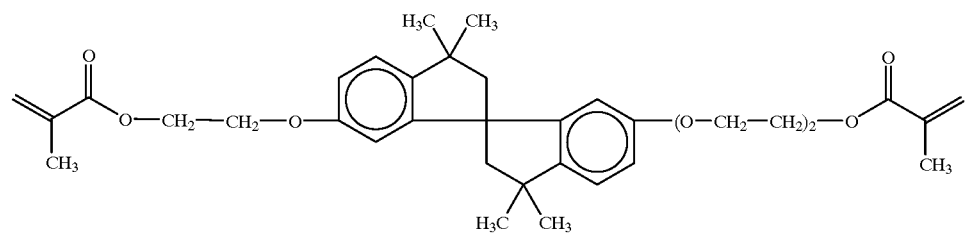

(6-4)

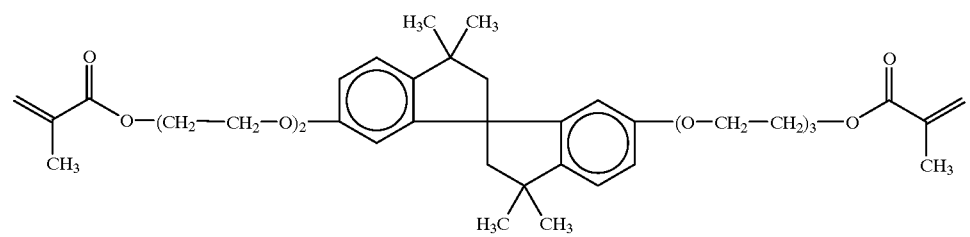

(6-5)

(6-6)

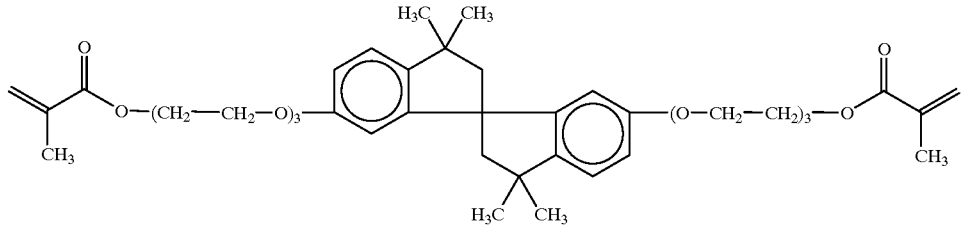

(6-7)

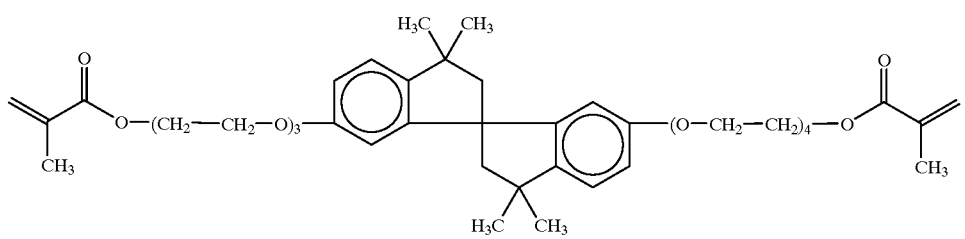

| Methacrylate | Proportion (%) | Melting Point (° C.) |
|---|---|---|
| Compound of formula (6-2) | 12.4 | 118–122 |
| Compound of formula (6-3) | 28.1 | oil |
| Compound of formula (6-4) | 36.5 | 72–89 |
| Compound of formula (6-5) | 15.1 | oil |
| Compound of formula (6-6) | 6.3 | oil |
| Compound of formula (6-7) | 1.6 | oil |

Example 11

Acrylation of the Mixture of the Dihydroxy Compounds From Preparation Example 5

Into a reaction vessel equipped with a Dean-Stark trap were added 48.5 g of the mixture of the dihydroxy compounds obtained in Preparation Example 5 (0.1 mol), 36 g of acrylic acid (0.5 mol), 3 g of sulfuric acid (0.03 mol), 0.1 g of hydroquinone (0.1 wt %) and 200 g of toluene, and then the mixture was heated and dehydrated at 110° C. for 6.5 hours. At the end of the reaction, the mixture was neutralized with a potassium carbonate solution, washed with water. To the toluene solution, silica gel was added, and the mixture was stirred, filtered and toluene was evaporated to provide 57 g of a mixture of the desired acrylates represented by formulas (6-1) and (6-8) to (6-10) (96%) as a colorless liquid, whose ICI viscosity at 25° C. was 49 poise. The components were separated by GPC and column chromatography, showing the following proportions and melting points.

(6-1)

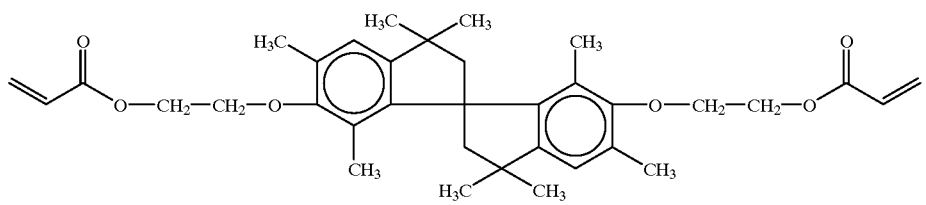

(6-2)

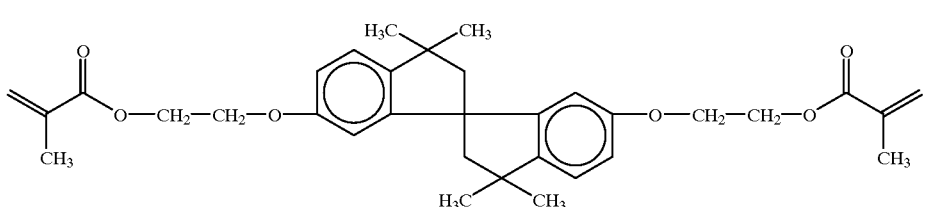

(6-3)

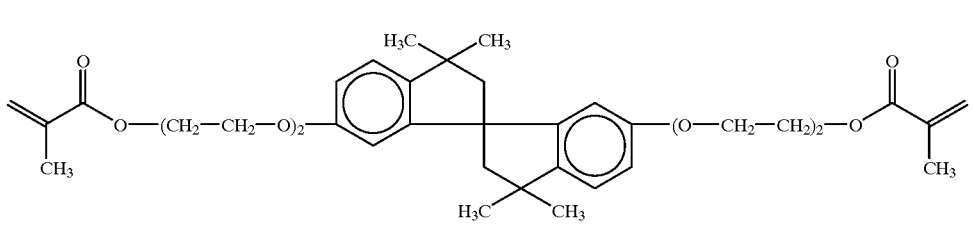

(6-4)
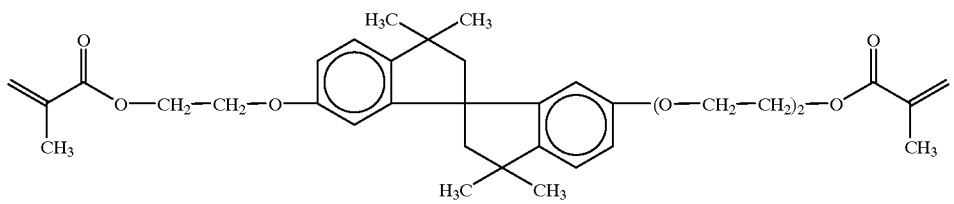
(6-5)
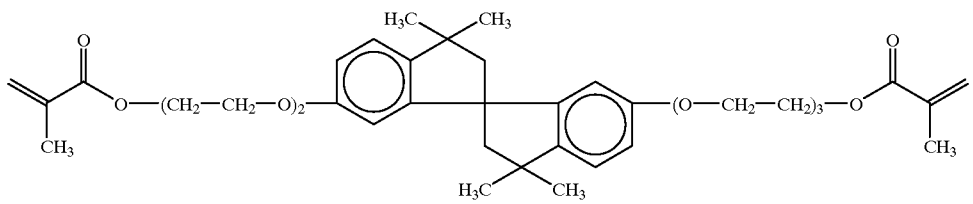
(6-6)
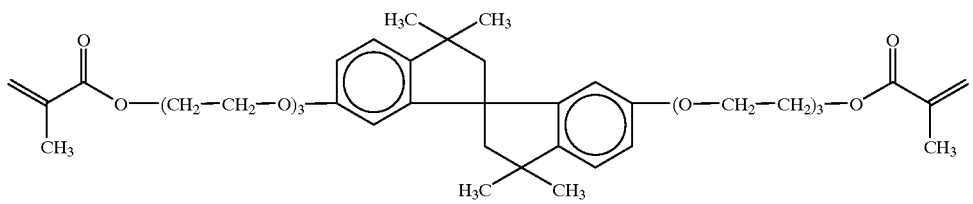
(6-7)
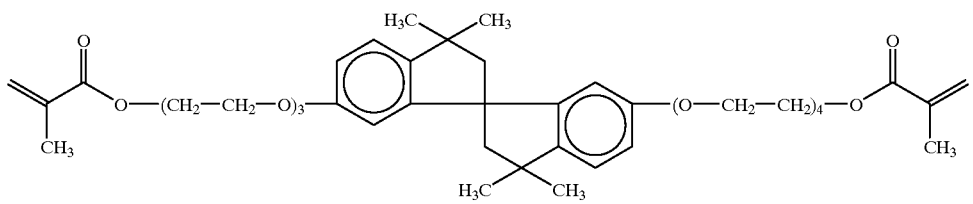
(6-8)
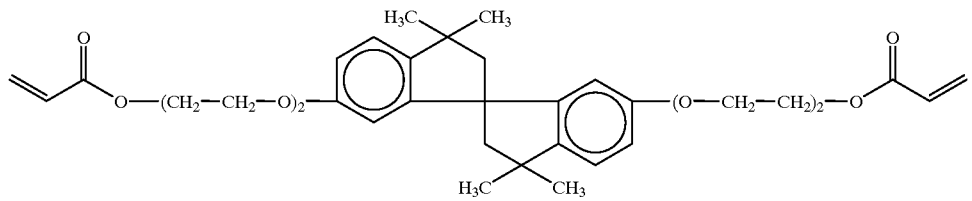
(6-9)
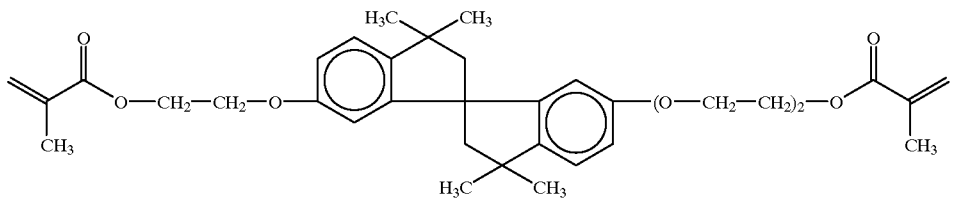
(6-10)
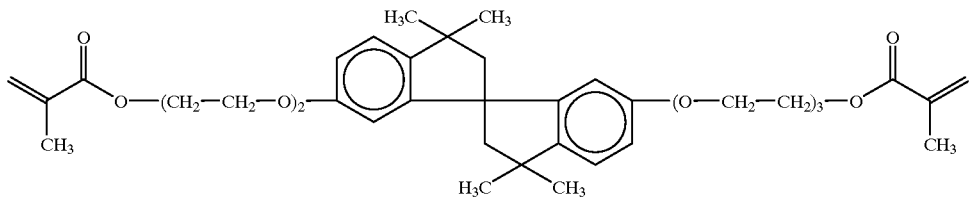

| Acrylate | Proportion (%) | Melting Point (° C.) |
|---|---|---|
| Compound of formula (6-1) | 27.1 | 118–122 |
| Compound of formula (6-8) | 17.0 | oil |
| Compound of formula (6-9) | 53.1 | 64–70 |
| Compound of formula (6-10) | 2.8 | oil |

Example 12

Methacrylation of the Mixture of the Dihydroxy Compounds From Preparation Example 6

Into a reaction vessel equipped with a Dean-Stark trap were added 44.9 g of the mixture of the dihydroxy compounds obtained in Preparation Example 6 (0.1 mol), 33 g of methacrylic acid (0.5 mol), 3 g of sulfuric acid (0.03 mol), 0.1 g of hydroquinone (0.1 wt %) and 200 g of toluene, and then the mixture was heated and dehydrated at 110° C. for 8 hours. At the end of the reaction, the mixture was neutralized with a potassium carbonate solution, washed with water. To the toluene solution, silica gel was added, and the mixture was stirred, filtered and toluene was evaporated to provide 51 g of a mixture of the desired methacrylates represented by formulas (6-11) to (6-14) (88%) as a waxy solid, whose viscosity could not be determined. Area % of its GPC chart showed that each proportion of the starting dihydroxy compounds was consistent with one of the corresponding methacrylate produced, within an allowance. The components were separated by GPC and column chromatography, showing the following proportions and melting points.

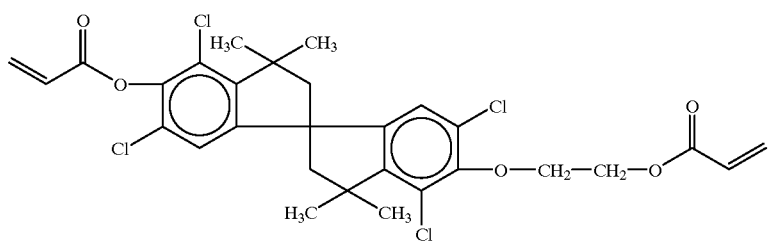

(6-11)

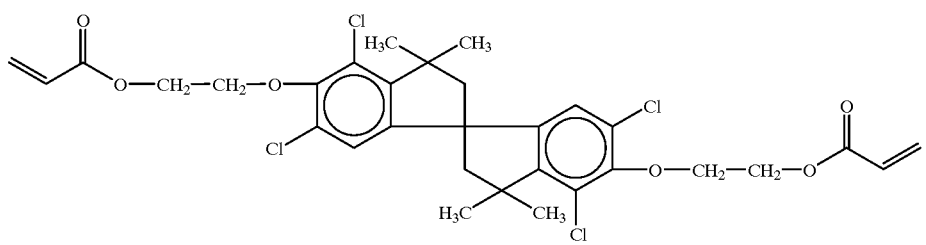

(6-12)

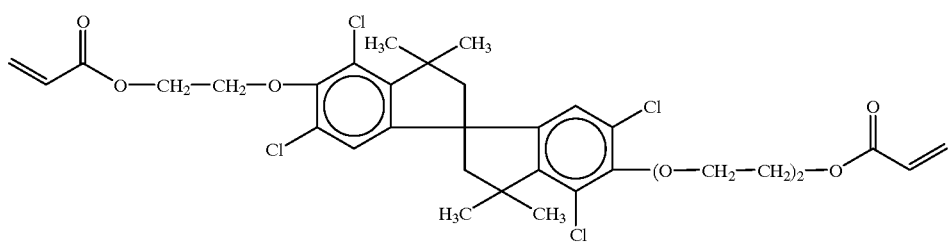

(6-13)

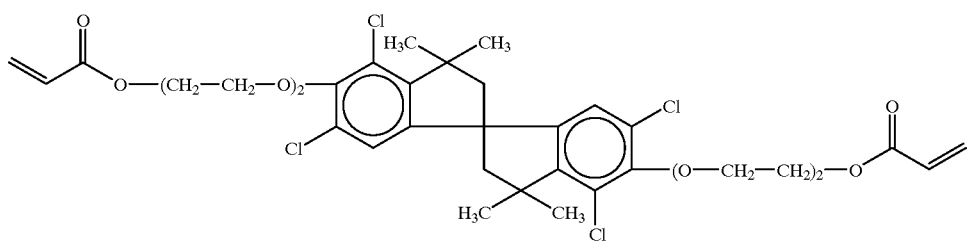

(6-14)

| Dihydroxy Compd. | Proportion (%) | Melting Point (° C.) |
|---|---|---|
| Compound of formula (6-11) | 5.4 | 131–134 |
| Compound of formula (6-12) | 80.7 | 101–112 |
| Compound of formula (6-13) | 13.0 | 51–60 |
| Compound of formula (6-14) | 0.9 | oil |

Example 13
Preparation of the Acrylate Represented by Formula (6-15)

Into a reaction vessel equipped with a Dean-Stark trap were added 47 g of the dihydroxy compound represented by formula (2-2) obtained in Preparation Example 2 (0.13 mol), 42 g of acrylic acid (0.58 mol), 0. 1 g of hydroquinone (0.1 wt %), 4.2 g of sulfuric acid (0.04 mol), and 200 g of p-xylene, and then the mixture was heated under reflux for 7 hours. At the end of the reaction, the mixture was neutralized with a potassium carbonate solution, washed with water. To the toluene solution, silica gel was added, and the mixture was stirred, filtered and toluene was evaporated to provide 61 g of the desired acrylate represented by formula (6-15) (Yield: 97%) as a white solid, whose melting point was 126 to 130° C.

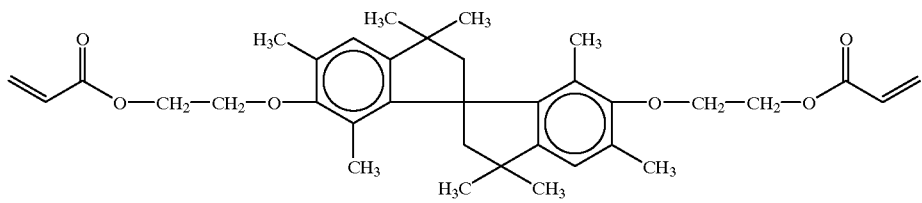

(6-15)

Examples 15 to 20

Polyesters comprising one of the structural unit listed in Table 4 were prepared as described in Example 14, except that the dihydroxy compound represented by formula (5-1) and isophthalic chloride were replaced with another dihydroxy compound and another dicarboxylic halide.

Example 14
Preparation of a Polyester From the Dihydroxy Compound Represented by Formula (5-1)

A 100 mL flask was equipped with an agitator, a reflux condenser and an immersion tube for introducing nitrogen, to which were added 40.00 g of the dihydroxy compound represented by formula (5-1) (0.101 mol) and 20.51 g of isophthalic chloride (0.101 mol). The temperature of the mixture was raised to 40° C. due to exothermic reaction, then the mixture was stirred for 10 min, and then was heated with stirring at 220° C. for 40 min. while removing hydrogen chloride as a byproduct by introducing nitrogen gas. A viscous product in a melted state was taken from the reaction vessel for analysis, to give a polyester comprising the structural unit represented by formula (7-1) with a weight-average molecular weight of 100000.

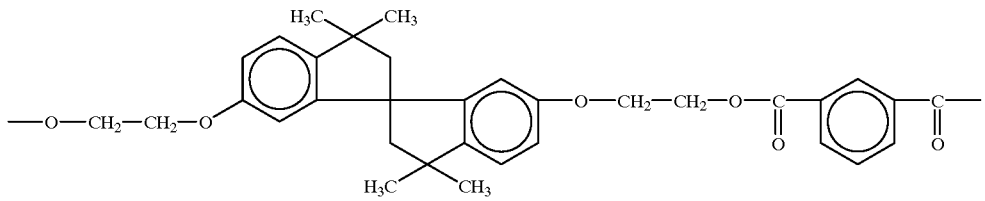

(7-1)

TABLE 4

| Example | Structural Unit |
|---|---|
| 15 | (spirobiindane diether with —O—CH₂—CH₂—O— on left and —O—CH₂—CH₂—O—C(=O)—(CH₂)₂—C(=O)— on right; indane gem-dimethyls) |
| 16 | (spirobiindane diether with —O—CH₂—CH₂—O— on left and —O—CH₂—CH₂—O—C(=O)—C₆H₁₀—C(=O)— (cyclohexane-1,4-diyl) on right) |
| 17 | (tetramethyl-substituted spirobiindane with —O—(CH(CH₃)—CH₂—O)₃— on left and —(O—CH₂—CH(CH₃))₃—O—C(=O)—C₆H₄—C(=O)— on right) |
| 18 | (spirobiindane with —O—CH₂—CH₂—O— on left and —O—CH₂—CH₂—O—C(=O)—[norbornene-diyl]—C(=O)— on right) |
| 19 | (tetrachloro spirobiindane with —O—CH₂—CH₂—O— on left and —O—CH₂—CH₂—O—C(=O)—CH₂—C₆H₄—CH₂—C(=O)— on right) |
| 20 | (spirobiindane with —O—CH₂—CH₂—O— on left and —O—CH₂—CH₂—O—C(=O)—[norbornane-diyl]—C(=O)— on right) |

Example 21

A 200 mL flask was equipped with an agitator, a reflux condenser and an immersion tube for introducing nitrogen, to which were added 20.00 g of the dihydroxy compound represented by formula (5-1) (0.05 mol), 15.40 g of the dihydroxy compound represented by formula (19-1) (0.05 mol), 20.51 g of isophthalic chloride (0.101 mol), and 100 mL of chlorobenzene. To the mixture, 22.25 g of triethylamine (0.21 mol) was added dropwise at 10° C. over 10 min, and then the mixture was stirred at room temperature for 8 hours. At the end of the reaction, chlorobenzene was evaporated under a reduced pressure from the reaction solution, the residual highly viscous solution was poured into 1000 mL of methanol to form a colorless solid, which was then filtered. The solid was triturated in 300 mL of methanol twice, and was vacuum-dried at 60° C., to give a copolymeric polyester comprising the structural unit represented by formula (7-3), having a weight-average molecular weight of 80000.

represented by formula (5-1) (0.100 mol) and 80 mL of chlorobenzene. The mixture was heated to 110° C. under nitrogen atmosphere, to which was then added dropwise a solution of 16.99 g of hexamethylene diisocyanate (0.101 mol) in 50 mL of benzene over 3 hours. The mixture was then stirred at 130° C. for additional 1 hour, chlorobenzene was evaporated under a reduced pressure from the reaction solution, the residual highly viscous reaction solution was added dropwise to 500 mL of methanol, the precipitated colorless solid was filtered and collected. The solid was triturated in 200 mL of methanol, to give a polyurethane comprising the structural unit represented by formula (8-1). GPC analysis for the product showed a weight-average molecular weight (MW) of 120000.

IR (KBr): 3300 cm$^{-1}$ (—NH—), 1710 cm$^{-1}$ (—CONH—)

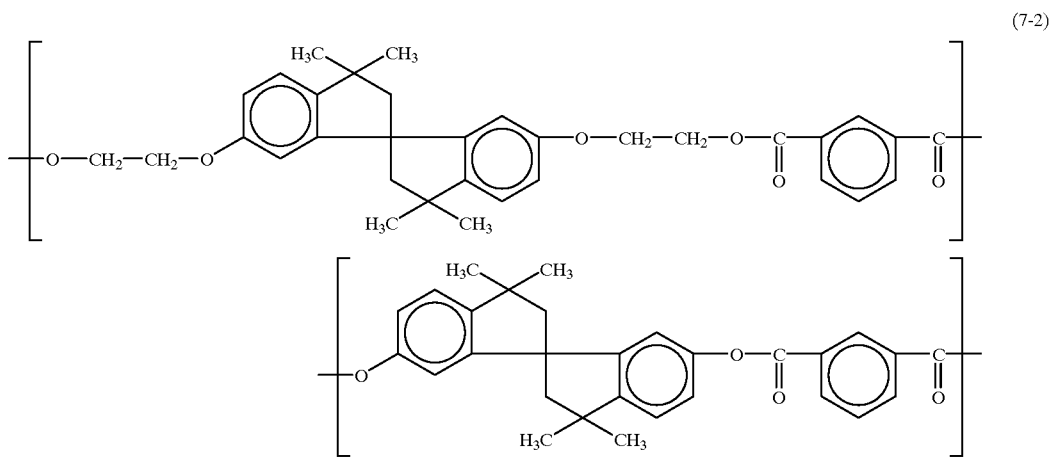

(7-2)

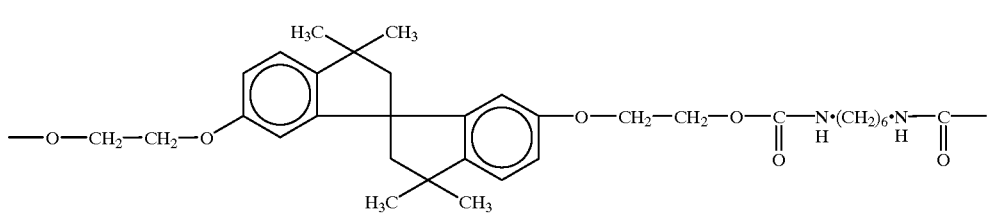

(8-1)

Example 22

Preparation of a Polyurethane From the Dihydroxy Compound Represented by Formula (5-1)

To a 200 mL flask equipped with an agitator and a reflux condenser were added 39.65 g of the dihydroxy compound

Examples 23 to 27

The polyurethanes listed in Table 5 were prepared as described in Example 22, except that the dihydroxy compound represented by formula (5-1) and hexamethylene diisocyanate were replaced with another dihydroxy compound and another diisocyanate derivative.

TABLE 5

| Example | Structural Unit |
|---------|-----------------|
| 23 | |
| 24 | |
| 25 | |
| 26 | |
| 27 | |

Preparation Example 9
Preparation of the Epoxy Resin Represented by Formula (9-1)

Into a reaction vessel were charged 154 g of 6,6'-dihydroxy-3,3,3',3'-tetramethyl-1,1'-spirobiindan and 463 g of epichlorohydrin, and the mixture was heated with stirring to 95° C. to dissolve the solid. To the solution, 110 g of 40% sodium hydroxide was added dropwise over 3 hours, and then the mixture was stirred at 90 to 100° C. for 2 hours. After cooling, 200 mL of methyl ethyl ketone was added to the mixture, which was then repeatedly washed with water until the chloride and the slightly excess sodium hydroxide were removed. Solvent and epichlorohydrin were evaporated under a reduced pressure from the organic layer, to give 211 g of the epoxy resin represented by formula (9-1).

Analysis for the epoxy resin obtained showed its composition of 86% for n=0, 8% for n=1 and 6% for n≧2 (area %; hereinafter, a percentage in a composition means area %); its epoxy equivalent of 238 g/eq., and a softening point of 50° C.

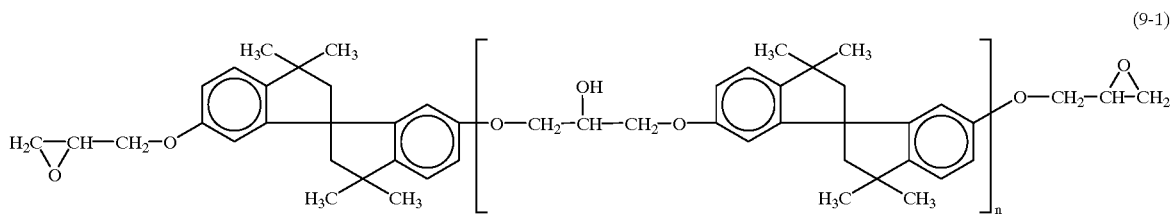

(9-1)

Preparation Example 10
Preparation of the Epoxy Resin Represented by Formula (9-2)

An epoxy resin represented by formula (9-2) was prepared as described in Preparation Example 9, except that 6,6'-dihydroxy-3,3,3',3'-tetramethyl-1,1'-spirobiindan was replaced with 6,6'-dihydroxy-3,3,3',3',5,5',7,7'-octamethyl-1,1'-spirobiindan. Analysis for the epoxy resin obtained showed its composition of 81% for n=0, 14% for n=1 and 9% for n≧2 and its epoxy equivalent of 285 g/eq.

0.1 g of hydroquinone and 31 g of styrene as a diluent, and in a stream of air, the mixture was stirred at 80° C. for a hour and then at 130° C. for 3 hours, to give 327 g of a waxy epoxyacrylate resin, whose acid number (mg KOH/g) was 3.0 and ICI viscosity was 1.8 poise at 100° C.

Liquid chromatographic analysis for the epoxyacrylate resin represented by formula (10-1) showed its composition of 86% for n=0, 8% for n=1 and 6% for n≧2 (Area %).

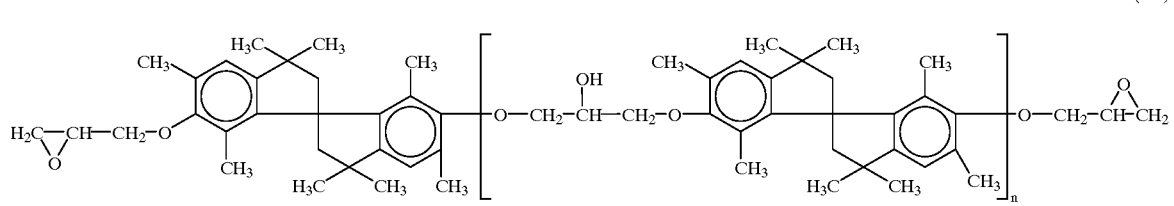

(9-2)

Preparation Example 11
Preparation of the Epoxyacrylate Resin Represented by Formula (10-1)

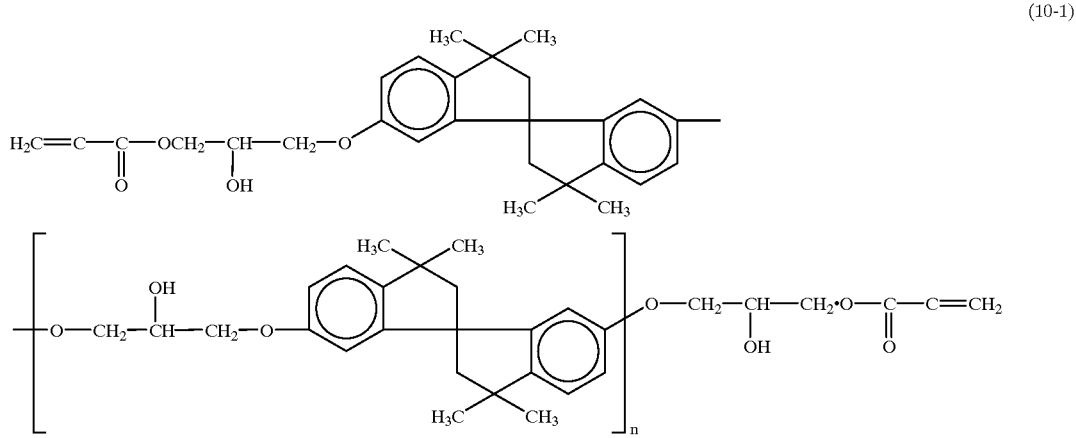

(10-1)

Into a reaction vessel were charged 238 g of the epoxy resin represented by formula (9-1) obtained in Preparation Example 9 [n=0; 86%, n=1; 8%; n≧2; 6%, epoxy equivalent: 238 g/eq], 72 g of acrylic acid, 0.9 g of triethylamine,

Preparation Example 12
Into a reaction vessel were charged 245 g of the epoxy resin represented by formula (9-1) obtained as described in Preparation Example 9 [(n=0; 84%, n=1; 7%; n≧2; 9%, epoxy equivalent: 245 g/eq], 144 g of acrylic acid, 1.2 g of triethylamine, 0.2 g of hydroquinone and 39 g of styrene as a diluent, and in a stream of air, the mixture was stirred at 80° C. for a hour and then at 130° C. for 3 hours, to give 344 g of a waxy epoxyacrylate resin, whose acid number (mg KOH/g) was 24.4 and ICI viscosity was 21.0 poise at 100° C.

Preparation Example 13

Into a reaction vessel were charged 285 g of the epoxy resin represented by formula (9-2) obtained as described in Preparation Example 10 [n=0; 81%, n=1; 14%; n≧2; 5%, epoxy equivalent: 285 g/eq], 72 g of acrylic acid, 0.9 g of triethylamine, 0.1 g of hydroquinone and 31 g of 1,6-hexanediol diacrylate as a diluent, and in a stream of air, the mixture was stirred at 80° C. for a hour and then at 130° C. for 3 hours, to give 327 g of a waxy epoxyacrylate resin, whose acid number (mg KOH/g) was 6.7 and ICI viscosity was 19.6 poise at 100° C.

Preparation Example 14

Into a reaction vessel were charged 238 g of the epoxy resin represented by formula (9-1) obtained as described in Preparation Example 9 [n=0; 86%, n=1; 8%; n≧2; 6%, epoxy equivalent: 238 g/eq], 72 g of acrylic acid, 0.9 g of triethylamine, 0.1 g of hydroquinone and 31 g of styrene as a diluent, and in a stream of air, the mixture was stirred at 80° C. for a hour and then at 130° C. for 3 hours, to give 327 g of a waxy reaction product. To the reaction product, 130 g of maleic anhydride was added and the mixture was reacted at 100° C. for 10 hours to give 412 g of an acid-modified epoxyester resin, whose acid number (mg KOH/g) was 104.3 and ICI viscosity was 8 poise at 100° C.

Preparation Example 15

Into a reaction vessel were charged 245 g of the epoxy resin represented by formula (9-1) obtained as described in Preparation Example 9 [n=0; 84%, n=1; 7%; n≧2; 9%, epoxy equivalent: 245 g/eq], 144 g of acrylic acid, 1.2 g of triethylamine, 0.2 g of methoquinone and 50 g of styrene as a diluent, and in a stream of air, the mixture was stirred at 80° C. for a hour and then at 130° C. for 3 hours, and the excess acrylic acid and styrene were evaporated to give 344 g of a waxy reaction product. To the reaction product were added 120 g of tetrahydromaleic anhydride and 80 g of carbitol acetate, and the mixture was reacted at 90° C. for 20 hours to give 498 g of an acid-modified epoxyester resin, whose acid number (mg KOH/g) was 98.4 and ICI viscosity was 17 poise at 100° C.

Preparation Example 16

Into a reaction vessel were charged 285 g of the epoxy resin composition represented by formula (9-2) obtained as described in Preparation Example 9 [n=0; 81%, n=1; 14%; n≧2; 5%, epoxy equivalent: 285 g/eq], 72 g of acrylic acid, 0.9 g of triethylamine, 0.1 g of hydroquinone and 31 g of 1,6-hexanediol diacrylate as a diluent, and in a stream of air, the mixture was stirred at 80° C. for a hour and then at 130° C. for 3 hours, to give 327 g of a waxy reaction product. To the reaction product, 190 g of trimellitic acid was added and the mixture was reacted at 90° C. for 20 hours to give 511 g of an acid-modified epoxyacrylate resin, whose acid number (mg KOH/g) was 112.1 and ICI viscosity was 24 poise at 100° C.

Preparation Example 17

An acid-modified epoxyacrylate resin (365 g) was prepared as described in Preparation Example 14, except that the amount of acrylic acid was changed from 72 g to 36 g, whose acid number (mg KOH/g) was 51.5 and ICI viscosity was 79 poise at 100° C.

Preparation Example 18

An acid-modified epoxyacrylate resin (391 g) was prepared as described in Preparation Example 14, except that the amounts of acrylic acid and maleic anhydride were changed from 72 g to 54 g and from 130 g to 150 g, respectively, whose acid number (mg KOH/g) was 74.3 and ICI viscosity was 55 poise at 100° C.

Preparation Example 19

An acid-modified epoxyacrylate resin (350 g) was prepared as described in Preparation Example 14, except that 130 g of maleic anhydride was replaced with 110 g of acetic anhydride, whose ICI viscosity was 52 poise at 100° C.

Example 28

Preparation of the Compound Represented by Formula (11-1)

Into a 1 liter glass reaction vessel equipped with an agitator, a thermometer, a reflux condenser and a nitrogen inlet tube were added 24.7 g of the spirobiindanol represented by formula (19-1)(0.08 mol), 4.4 g of trimethylammonium chloride (0.04 mol) and 50 g of dimethyl sulfoxide, and to the mixture, 6.6 g of crushed 95% sodium hydroxide (0.16 mol) was added portionwise with stirring at 60° C. The mixture was stirred at the same temperature for additional 1 hour, to which 18.8 g of 2-chloroethyl vinyl ether (0.18 mol) was added dropwise over 30 min. After stirring at 60° C. for additional 10 hours, the reaction solution was poured into 300 g of 10% phosphoric acid aq. to be acidic. The precipitated solid was filtered, washed with water, and purified by trituration in methanol, to give 30.0 g of the desired vinyl ether compound represented by formula (11-1). Its HPLC (High Performance Liquid Chromatography) analysis indicated that its purity was >99% (Area %).

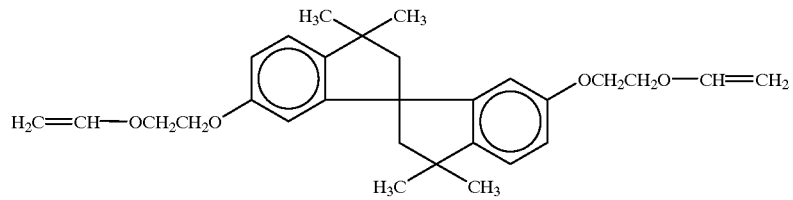

(11-1)

Melting point: 100 to 101° C.

IR (KBr): 1610 cm$^{-1}$, 1200 cm$^{-1}$, 975 cm$^{-1}$

FD-MS spectrum: 448 (M$^+$)

Example 29
Preparation of the Compound Represented by Formula (11-2)

Into a 1 liter glass reaction vessel equipped with an agitator, a thermometer, a reflux condenser and a nitrogen inlet tube were added 30.8 g of the spirobiindanol represented by formula (19-1)(0.10 mol), 0.20 g of triphenylphosphine, 40 g of methyl isobutyl ketone and 10 g of dimethyl sulfoxide, and to the mixture, 21.4 g of glycidyl vinyl ether (0.24 mol) was added portionwise with stirring at 70° C. The mixture was stirred at 90° C. for additional 20 hour, to which 20.0 g of methyl isobutyl ketone and 300 g of 20% sodium chloride aq. were added for extraction. Then, the organic layer was washed with 100 g of 20% sodium chloride aq. three times, separated and evaporated under a reduced pressure, to give 40.0 g of the desired vinyl ether compound represented by formula (11-2). Its HPLC analysis indicated that its purity was at least 99% (Area %).

IR (KBr): 1610 cm$^{-1}$, 1200 cm$^{-1}$, 975 cm$^{-1}$

FD-MS spectrum: 508 (M$^+$)

Examples 30 to 33

The vinyl ether compounds represented by formulas (11-3) to (11-6) listed in Table 6 were prepared as described in Example 28 or 29, except that the compound represented by formula (19-1) was replaced with another spirobiindanol derivative.

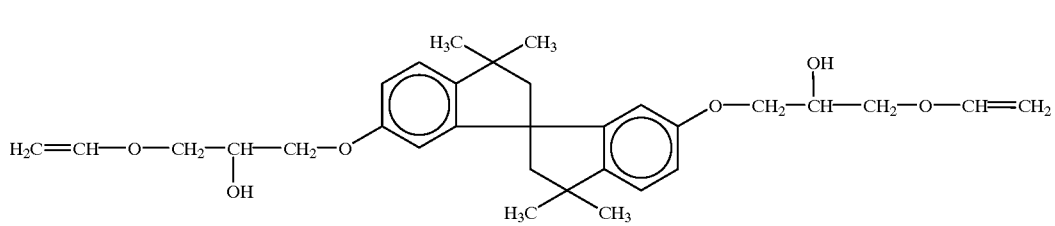

(11-2)

TABLE 6

| Example | | |
|---|---|---|
| 30 | | (11-3) |
| 31 | | (11-4) |
| 32 | | (11-5) |

TABLE 6-continued

Example

33 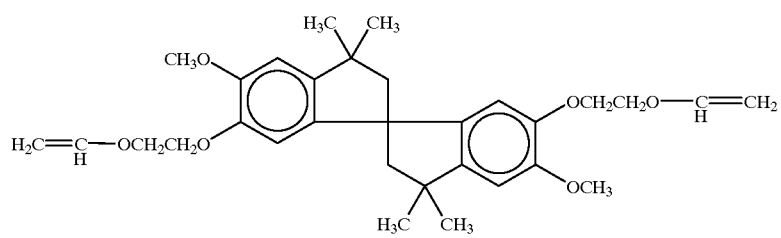 (11-6)

Example 34

A 2 liter flask with a baffle was equipped with an agitator with a grid propeller, a reflux condenser and an immersion tube for introducing phosgene (carbonyl chloride). Into the Its glass-transition temperature (Tg) was 245° C. as determined by differential thermal analysis in the range of −20° C. to 300° C. with a scanning calorimeter (DSC-3100; Mac Science).

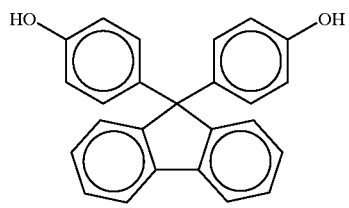 (27-1)

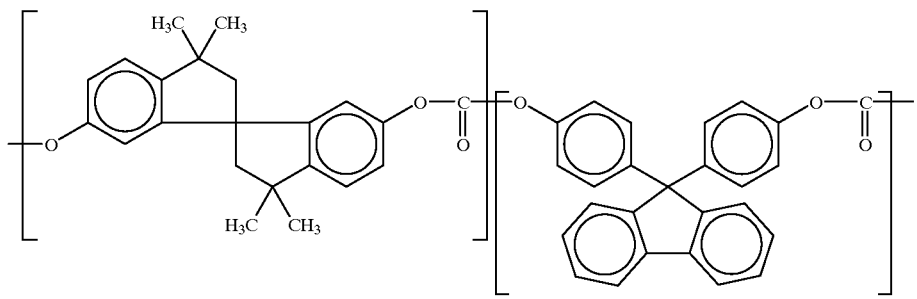 (12-1)

flask were charged 77.1 g of the spirobiindanol compound represented by formula (19-1) (0.25 mol), 87.6 g of the dihydroxy compound represented by formula (27-1) (0.25 mol), 56 g of sodium hydroxide (1.40 mol), 2.58 g of 4-tert-butylphenol and 600 mL of deionized water, to prepare an aqueous solution. Then, 600 mL of dichloromethane was added to the aqueous solution to form a two-phase mixture, into which 59.4 g of phosgene (0.60 mol) was then introduced with stirring at the rate of 9.9 g/min. At the end of the introduction of phosgene, 0.08 g of triethylamine was added to the reaction mixture, which was then stirred for additional 90 min. After the stirring, the reaction mixture was separated, the dichloromethane phase was neutralized with hydrochloric acid, and repeatedly washed with deionized water until substantially no electrolytes were detected. Dichloromethane was evaporated from the organic layer, to give a random copolymeric polycarbonate comprising the structural unit represented by formula (12-1) as a solid, whose weight-average molecular weight was 51000.

Example 35

A 2 liter flask was equipped with an agitator, a reflux condenser and an immersion tube for introducing phosgene. Into the flask were charged 77.1 g of the dihydroxy compound represented by formula (19-1) (0.25 mol), 109.6 g of the dihydroxy compound represented by formula (27-2) (0.25 mol), 87.0 g of pyridine (1.10 mol) and 700 g of dichloromethane. Into the mixture, 54.5 g of phosgene (0.55 mol) was then introduced under ice cooling over 60 min, and then the reaction mixture was mixed with stirring for additional 2 hours. At the end of the reaction, the mixture was washed with 5% hydrochloric acid to remove the excess pyridine, and then repeatedly washed with water until the solution became neutral. After separation, dichloromethane was evaporated, to give a random copolymeric polycarbonate comprising the structural unit represented by formula (12-2) as a solid, whose weight-average molecular weight was 50000.

(27-2)

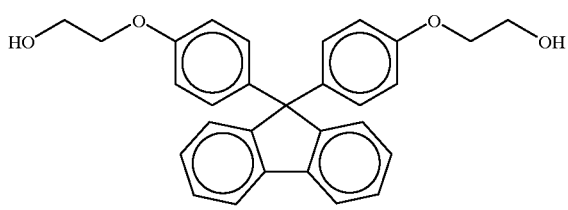

(12-2)

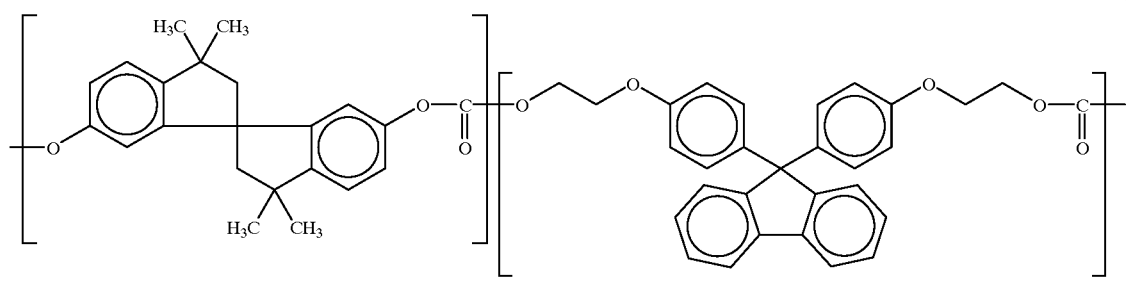

Preparation Example 20

A 500 mL flask was equipped with an agitator, a reflux condenser and an immersion tube for introducing phosgene. Into the flask were charged 396 g of the dihydroxy compound represented by formula (19-1) (1.00 mol) and 500 g of dichloromethane. Into the mixture, 207.9 g of carbonyl chloride (2.10 mol) was then introduced under ice cooling over 60 min, and then the reaction mixture was mixed with stirring for additional 2 hours. At the end of the reaction, nitrogen gas was introduced to remove the excess carbonyl chloride and hydrogen chloride as a by-product, and then dichloromethane was evaporated under a reduced pressure, to give 430 g of the bischloroformate represented by formula (19-1-a).

mixture, 17.4 g of pyridine (0.22 mol) was then added dropwise under ice cooling over 30 min, and then the mixture was stirred for additional 2 hours at the same temperature. At the end of the polymerization reaction, a diluted hydrochloric acid was added and the mixture was stirred to remove the excess pyridine, and then the dichloromethane phase was washed with ion-exchanged water until the solution became neutral. After separation, dichloromethane was evaporated from the solution of the polycarbonate produced in dichloromethane, to give an alternating copolymeric polycarbonate comprising the structural unit represented by formula (12-3) as a colorless solid, whose weight-average molecular weight was 45000.

(12-3)

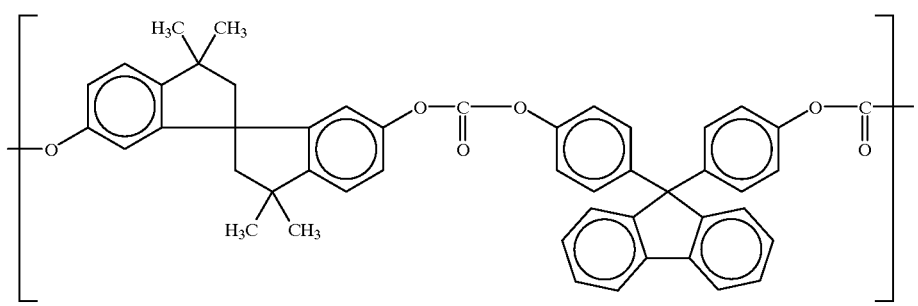

Example 36

A 500 mL flask was equipped with an agitator and a reflux condenser. Into the flask were charged 43.3 g of the bischloroformate represented by formula (19-1-a) (0.10 mol), 35.0 g of the dihydroxy compound represented by formula (27-1) (0.10 mol) and 200 g of dichloromethane. Into the

Example 37

A copolymeric polycarbonate comprising the structural unit represented by formula (12-4) was prepared as described in Example 35, except that the dihydroxy compound represented by formula (19-1) was replaced with the dihydroxy compound represented by formula (19-2), whose weight-average molecular weight was 120000.

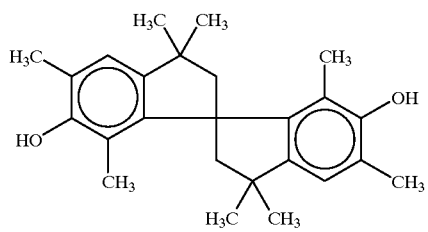
(19-2)
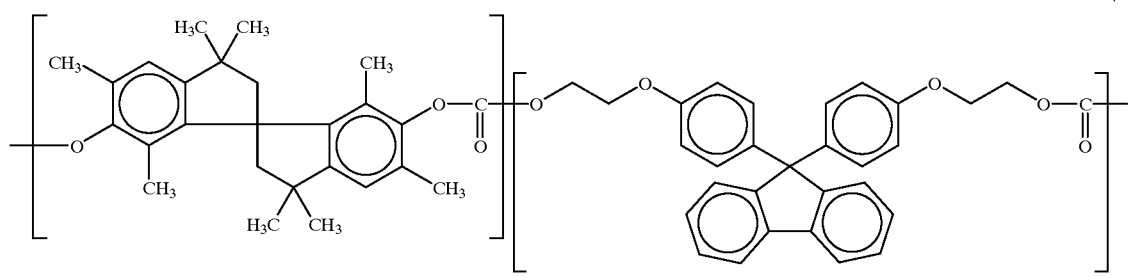
(12-4)
Example 38
A copolymeric polycarbonate comprising the structural unit represented by formula (12-5) was prepared as described in Example 35, except that the dihydroxy compounds represented by formulas (19-1) and (27-1) were replaced with the dihydroxy compounds represented by formulas (19-3) and (27-3), respectively, whose weight-average molecular weight was 80000.
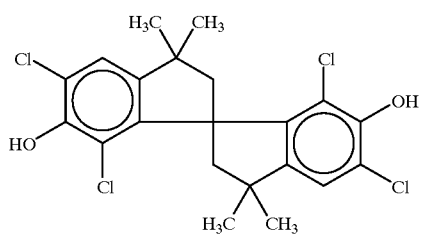
(19-3)
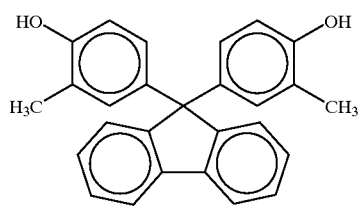
(27-3)
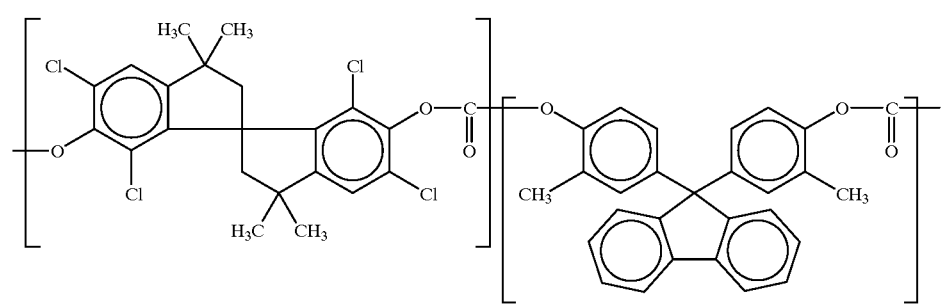
(12-5)

Example 39

A copolymeric polycarbonate comprising the structural unit represented by formula (12-6) was prepared as described in Example 35, except that the dihydroxy compound represented by formula (19-1) was replaced with the dihydroxy compound represented by formula (19-4), whose weight-average molecular weight was 100000.

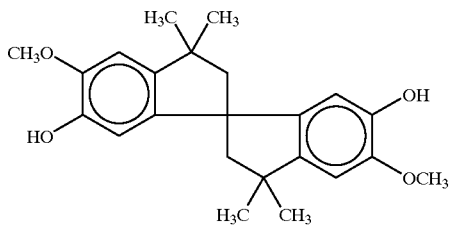

(19-4)

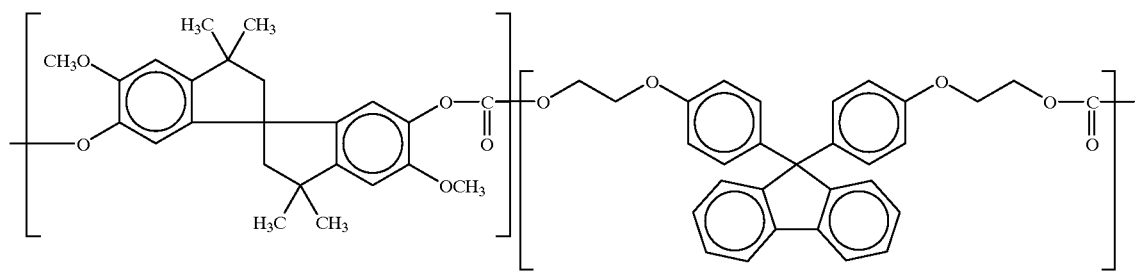

(12-6)

Preparation Example 21

The dihydroxy compound represented by formula (3-b) was prepared as described in Preparation Examples 1 to 7, using a bisphenol compound comprising the spiro structure represented by formula (3-a).

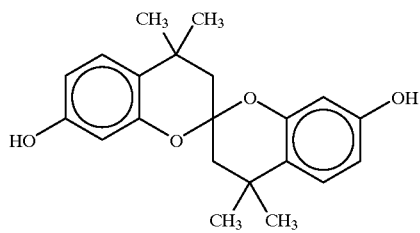

(3-a)

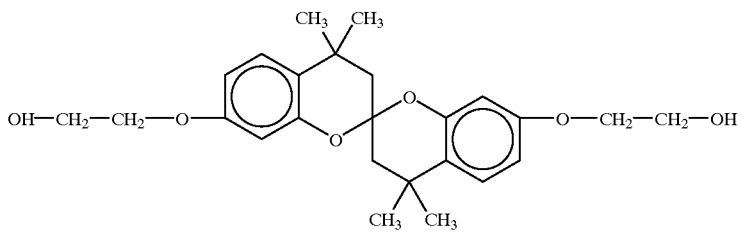

(3-b)

Preparation Example 22

The dihydroxy compound represented by formula (4-b) was prepared as described in Preparation Examples 1 to 7, using a bisphenol compound comprising the Spiro structure represented by formula (4-a).

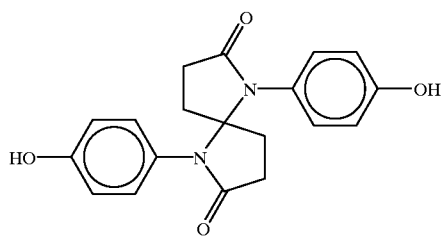

(4-a)

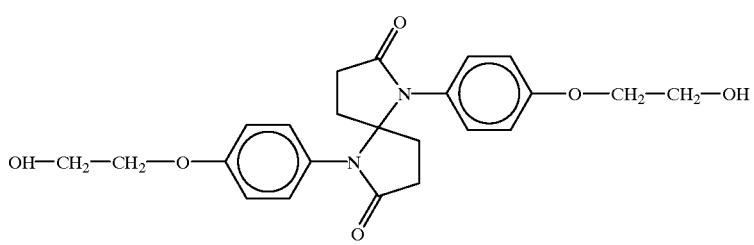

(4-b)

Preparation Example 23

A polycarbonate comprising the structural unit represented by formula (3-1) was prepared as described in Example 3 using the dihydroxy compound represented by formula (3-b), i.e., by solution polymerization in which phosgene was reacted using pyridine as a base. The weight-average molecular weight of the product was 60000.

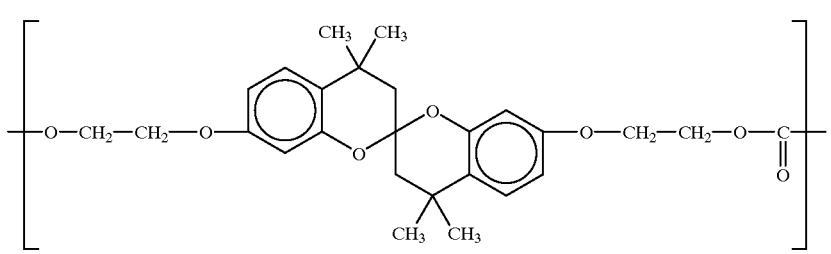

(3-1)

Preparation Example 24

A polycarbonate comprising the structural unit represented by formula (4-1) was prepared as described in Example 3 using the dihydroxy compound represented by formula (4-b), i.e., by solution polymerization in which phosgene was reacted using pyridine as a base. The weight-average molecular weight of the product was 80000.

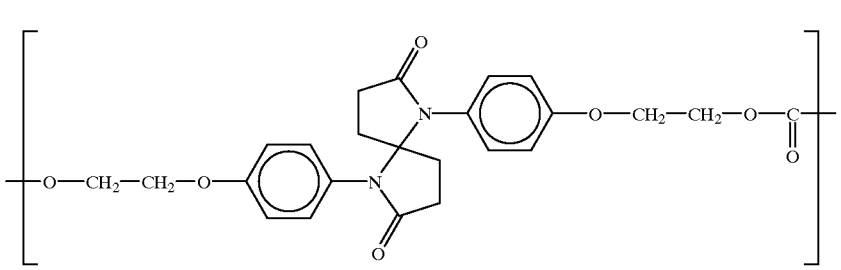

(4-1)

Examples 40 to 47

The polycarbonates prepared in Examples 1 to 8 were press-formed to give test sheets with a thickness of 1.2 mm. The test sheets were evaluated according to the following method. The results are shown in Table 10.

(1) Appearance: the test sheet was visually observed and evaluated for its transparency and optical status of its surface.

O: colorless and transparent, and good surface status without splits, cracks or rough surface X: having splits, cracks or rough surface (2) Total light transmittance (referred to as "transmittance"): determined according to ASTMD-1003 method (3) Birefringence: determined with an ellipsometer (4) Heat resistance: evaluated based on visual observation for a test sheet after placing it in a hot-air drier at 120° C. for 4 hours.

O: no staining, surface distortion or cracks of the molding

X: having staining, surface distortion or cracks of the molding

Examples 48 to 54

Preparation of cured materials (polymers) by polymerizing the acrylates obtained in Examples 9 to 13

The acrylates obtained in Examples 9 to 13 and the different materials listed in Table 7 were blended in the various compositions listed in Table 7 (The values are parts by weight), to prepare curable resin compositions. After defoaming the curable resin compositions, cured materials (polymers) were formed by photo- or heat polymerization as described later.

The cured materials (polymers) produced were evaluated as described in Examples 40 to 47. The results are shown in Table 10.

Preparation of a cured material

1. Photopolymerization

Each curable resin composition was poured into a mold consisting of two plates of glass (100 mm×100 mm×5 mm) and a gasket (thickness: 1 mm) of silicone rubber, its both sides were irradiated for 3 minutes for each with a high-pressure mercury-vapor lamp, and was subject to post-curing at 130° C. for 1 hour in an air-heating furnace, to give a cured material.

2. Heat polymerization

Each curable resin composition was poured into a mold consisting of two plates of glass (100 mm×100 mm×5 mm) and a gasket (thickness: 1 mm) of silicone rubber, and was subject to polymerization by heating with a gradient from 60° C. to 170° C. for 3 hours in an air-heating furnace, to give a cured material (polymer).

TABLE 7

| | | Example | | | | | | |
|---|---|---|---|---|---|---|---|---|
| | | 48 | 49 | 50 | 51 | 52 | 53 | 54 |
| Acrylate | Ex. 9 | 100 | — | — | — | — | — | — |
| of this | Ex. 10 | — | 100 | — | — | — | 75 | — |
| invention | Ex. 11 | — | — | 200 | — | — | 75 | — |
| | Ex. 12 | — | — | — | 100 | — | — | 100 |
| | Ex. 13 | — | — | — | — | 80 | — | — |
| | MMA | — | 50 | — | — | — | — | — |
| | PTA | — | 50 | — | — | 120 | — | — |
| | BPABM | 150 | — | — | 100 | — | — | 100 |
| | SPI-DG | — | — | — | — | — | 50 | — |
| | I-907 | — | — | — | — | 1.5 | — | — |
| | DETX | 2 | — | — | 1.0 | — | — | — |
| | C-1173 | — | 1.5 | — | — | — | — | 1.5 |
| | t-BPEH | — | — | — | — | — | 1.5 | — |
| | BPO | — | — | 1.5 | — | — | — | — |
| | DIAMID | — | — | — | — | — | 5 | — |
| | Curing method | photo | photo | heat | photo | photo | heat | photo |

MMA: methyl methacrylate
PTA: pentaerythritol tetracrylate
BPABM: bisphenol A bis(2-methacryloyloxypropyl ether)
SPI-DG: 6,6'-dihydroxy-3,3,3',3'-tetramethylspirobiindan diglycidyl ether
I-907: Irgacure-907 (Ciba-Geigy; photopolymerization initiator)
DETX: Kayacure-DETX-S (Nippon Kayaku; photopolymerization initiator)
C-1173: Drocure-1173 (Merck; photopolymerization initiator)
t-BPEH: tert-butylperoxy-2-ethylhexanoate (heat polymerization initiator)
BPO: benzoyl peroxide (heat polymerization initiator)
DIAMID: dicyandiamide (epoxy-resin curing agent)

Examples 55 to 62

The polyesters prepared in Examples 14 to 21 were press-formed to give test sheets with a thickness of 1.2 mm. The test sheets were evaluated as described in Examples 40 to 47. The results are shown in Table 10.

Examples 63 to 68

The polyurethanes prepared in Examples 22 to 27 were press-formed to give test sheets with a thickness of 1.2 mm. The test sheets were evaluated as described in Examples 40 to 47. The results are shown in Table 10.

Examples 69 to 79

The epoxy resins, the epoxy acrylate resins and the acid-modified epoxyacrylate resins were blended with different materials in the compositions shown in Table 8 (The values are parts by weight), to prepare photosetting or heat curable resin compositions.

These resin compositions were subject to photo- and/or heat polymerization as described in Examples 48 to 54, to give test sheets of polymer.

The test sheets were evaluated as described in Examples 40 to 47. The results are shown in Table 10.

TABLE 8

| Example | | 69 | 70 | 71 | 72 | 73 | 74 |
|---|---|---|---|---|---|---|---|
| Resin | Prep. Ex. 9 | 100 | | | | | |
| | Prep. Ex. 10 | | 150 | | | | |
| | Prep. Ex. 11 | | | 150 | | 100 | |
| | Prep. Ex. 12 | | | | 150 | | |
| | Prep. Ex. 13 | | | | | 50 | |
| | Prep. Ex. 14 | | | | | | 150 |
| | MMA | | | 50 | | | |
| | PTA | | | | 50 | 30 | |
| | BPABM | | | | | 20 | 40 |
| | DEG-DG | 100 | 50 | | | | |
| | R-2058 | | | | | | 10 |
| | I-907 | | | 2 | | | |
| | DETX | | | | 5 | | |
| | C-1173 | | | | | 3 | |
| | BBI-103 | 1.5 | | | | | |
| | MDS-103 | | 3 | | | | |
| | t-BPEH | | | | | | |
| | BPO | | | | | | 2 |
| Polymerization method | | photo | photo | photo | photo | photo | heat |

| Example | | 75 | 76 | 77 | 78 | 79 |
|---|---|---|---|---|---|---|
| Resin | Prep. Ex. 15 | 100 | | | | |
| | Prep. Ex. 16 | | 100 | | | |
| | Prep. Ex. 17 | | | 100 | | |
| | Prep. Ex. 18 | | | | 100 | |
| | Prep. Ex. 19 | | | | | 100 |
| | MMA | 50 | 50 | | | |
| | PTA | 30 | 50 | 80 | 100 | 80 |
| | BPABM | | | 20 | | |
| | DEG-DG | | | | | |
| | R-2058 | 20 | | | | 20 |
| | I-907 | | 2 | | | |
| | DETX | | | 2 | | |

TABLE 8-continued

| | | | | | |
|---|---|---|---|---|---|
| C-1173 | | | | 2 | |
| BBI-103 | | | | | |
| MDS-103 | | | | | |
| t-BPEH | 3 | | | | |
| BPO | | | | | 2 |
| Polymerization method | heat | photo | photo | photo | heat |

MMA: methyl methacrylate
PTA: pentaerythritol tetracrylate
BPABM: bisphenol A bis(2-methacryloyloxypropyl ether)
DEG-DG: diethyleneglycol diglycidyl ether
R-2058: phenol-novolac type of epoxyacrylate resin (containing 30% of butylcellosolve) (Nihon Kayaku)
DETX: Kayacure-DETX-S (Nippon Kayaku; photopolymerization initiator)
I-907: Irgacure-907 (Ciba-Geigy; photopolymerization initiator)
C-1173: Drocure-1173 (Merck; photopolymerization initiator)
BBI-103:bis(4-tert-butylphenyl)iodonium hexafluoroantimonate (Midori Kagaku; cationic photopolymerization initiator)
*MDS-103:(4-methoxyphenyl)diphenylsulfonium hexafluoroantimonate (Midori Kagaku; cationic photopolymerization initiator)
t-BPEH: tert-butylperoxy-2-ethylhexanoate (heat polymerization initiator)
BPO: benzoyl peroxide (heat polymerization initiator)

Examples 80 to 87

Vinyl ethers obtained in Examples 28 to 33 were blended with different materials in the compositions shown in Table 9 (The values are parts by weight), to prepare photosetting resin compositions.

These resin compositions were subject to photopolymerization as described in Examples 48 to 54, to give test sheets of polymer.

The test sheets were evaluated as described in Examples 40 to 47. The results are shown in Table 10.

TABLE 9

| | Example | | | | | | | |
|---|---|---|---|---|---|---|---|---|
| Vinyl ether | 80 | 81 | 82 | 83 | 84 | 85 | 86 | 87 |
| Ex. 28 | 150 | | | | 50 | 50 | 100 | 100 |
| Ex. 29 | | 150 | | | | | | 25 |
| Ex. 30 | | | 100 | | | | 25 | |
| Ex. 31 | | | | 100 | | | | |
| Ex. 32 | | | | | 100 | | | 25 |
| Ex. 33 | | | | | | 100 | 25 | |
| DEG-DG | 50 | | 50 | | 50 | | 25 | 20 |
| R-2058 | | | 50 | 50 | | | | |
| 2-CEVE | | 50 | | | | 40 | | 30 |
| SPI-DG | | 50 | | 50 | | | 25 | |
| BBI-103 | 3 | 2 | | | 1.5 | 1 | 5 | 3 |
| MDS-133 | | | 2 | 5 | | 1 | | |

[Known cationic photopolymerizable compound]
DEG-DG: diethyleneglycol diglycidyl ether
R-2058: phenol-novolac type of epoxyacrylate resin (containing 30% of butylcellosolve) (Nihon Kayaku)
2-CEVE: 2-chloroethyl vinyl ether-SPI-DG: 6,6'-dihydroxy-3,3,3',3'-tetramethylspirobiindan diglycidyl ether
[Cationic photopolymerization initiator]
BBI-103:bis(4-tert-butylphenyl)iodonium hexafluoroantimonate (Midori Kagaku; cationic photopolymerization initiator)
MDS-103:(4-methoxyphenyl)diphenylsulfonium hexafluoroantimonate (Midori Kagaku; cationic photopolymerization initiator)

Examples 88 to 93

The copolymeric polycarbonates prepared in Examples 34 to 39 were press-formed to give test sheets with a thickness of 1.2 mm. The test sheets were evaluated according to the following method. The results are shown in Table 10.

Examples 94 and 95

The polycarbonates prepared in Examples 24 to 25 were press-formed to give test sheets with-a thickness of 1.2 mm. The test sheets were evaluated according to the following method. The results are shown in Table 10.

Comparative Example 1

A sheet with a thickness of 1.2 mm was prepared by press-forming as described in the examples, except that an existing poly(methyl methacrylate) was used. The test sheet was evaluated as described above. The results are shown in Table 10.

Comparative Example 2

A known polycarbonate was prepared from bisphenol A and phosgene, as usual (interfacial polymerization).

A 2 liter flask with a baffle was equipped with an agitator with a grid propeller, a reflux condenser and an immersion tube for introducing phosgene. Into the flask were charged 114 g of bisphenol A (0.50 mol), 56 g of sodium hydroxide (1.40 mol), 2.58 g of 4-tert-butylphenol and 600 mL of deionized water, to prepare an aqueous solution. Then, 600 mL of dichloromethane was added to the aqueous solution to form a two-phase mixture, into which 59.4 g of carbonyl chloride (0.60 mol) was then introduced with stirring at the rate of 9.9 g/min. At the end of the introduction of carbonyl chloride, 0.08 g of triethylamine was added to the reaction mixture, which was then stirred for additional 90 min. After the stirring, the reaction mixture was separated, the dichloromethane phase was neutralized with hydrochloric acid, and repeatedly washed with deionized water until substantially no electrolytes were detected. Dichloromethane was evaporated from the organic layer, to give an aromatic polycarbonate as a solid, whose weight-average molecular weight was 51000.

Comparative Example 3

A copolymeric polycarbonate was prepared from bisphenol A and spirobiindanol as described in Example 7 in JP-A 63-314235, and its weight-average molecular weight was 44800.

A test sheet was prepared from the polycarbonate as described in the examples. The test sheet was evaluated as described above. The results are shown in Table 10.

Comparative Example 4

One optical isomer, (−)-6,6'-dihydroxy-3,3,3',3'-tetramethyl-1,1'-spirobiindan was prepared according to the procedure described in Bulletin of the Chemical Society of Japan, Vol. 44, pp.496–505 (1971). A polycarbonate was prepared from the optical isomer by polymerization as described in Example 3. The polycarbonate had a weight-average molecular weight of 68000.

A test sheet was prepared from the polycarbonate as described in the examples. The test sheet was evaluated as described above. The results are shown in Table 10.

Comparative Example 5

A polycarbonate comprising the structural unit represented by formula (3-c-1) was prepared from the dihydroxy compound represented by formula (3-c) as described in Example 4 in JP-A 3-162413.

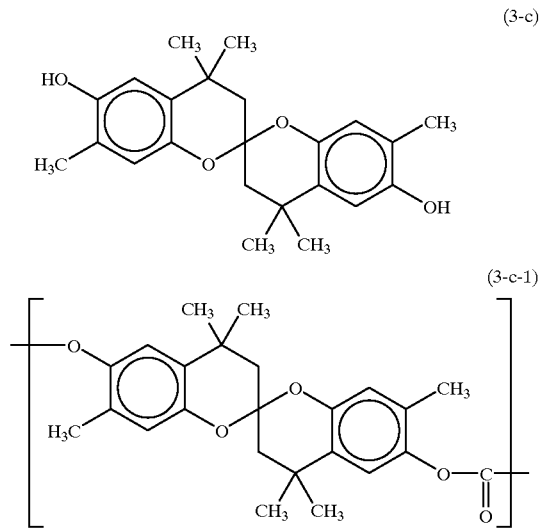

A test sheet was prepared from the polycarbonate as described in the examples. The test sheet was evaluated as described above. The results are shown in Table 10.

TABLE 10

| Example | Appearance | Total light transmittance (%) | Birefringence (nm) | Heat resistance |
|---|---|---|---|---|
| Ex. 40 | ○ | 90 | 10 | ○ |
| Ex. 41 | ○ | 90 | 9 | ○ |
| Ex. 42 | ○ | 92 | 10 | ○ |
| Ex. 43 | ○ | 90 | 8 | ○ |
| Ex. 44 | ○ | 92 | 7 | ○ |
| Ex. 45 | ○ | 91 | 8 | ○ |
| Ex. 46 | ○ | 91 | 9 | ○ |
| Ex. 47 | ○ | 92 | 10 | ○ |
| Ex. 48 | ○ | 91 | 7 | ○ |
| Ex. 49 | ○ | 89 | 9 | ○ |
| Ex. 50 | ○ | 91 | 8 | ○ |
| Ex. 51 | ○ | 91 | 9 | ○ |
| Ex. 52 | ○ | 92 | 7 | ○ |
| Ex. 53 | ○ | 92 | 8 | ○ |
| Ex. 54 | ○ | 90 | 9 | ○ |
| Ex. 55 | ○ | 90 | 10 | ○ |
| Ex. 56 | ○ | 90 | 9 | ○ |
| Ex. 57 | ○ | 92 | 10 | ○ |
| Ex. 58 | ○ | 91 | 8 | ○ |
| Ex. 59 | ○ | 91 | 9 | ○ |
| Ex. 60 | ○ | 92 | 10 | ○ |
| Ex. 61 | ○ | 90 | 9 | ○ |
| Ex. 62 | ○ | 91 | 7 | ○ |
| Ex. 63 | ○ | 90 | 9 | ○ |
| Ex. 64 | ○ | 90 | 11 | ○ |
| Ex. 65 | ○ | 92 | 10 | ○ |
| Ex. 66 | ○ | 91 | 9 | ○ |
| Ex. 67 | ○ | 91 | 9 | ○ |
| Ex. 68 | ○ | 92 | 10 | ○ |
| Ex. 69 | ○ | 92 | 8 | ○ |

TABLE 10-continued

| Example | Appearance | Total light transmittance (%) | Birefringence (nm) | Heat resistance |
|---|---|---|---|---|
| Ex. 70 | ○ | 93 | 7 | ○ |
| Ex. 71 | ○ | 92 | 10 | ○ |
| Ex. 72 | ○ | 91 | 9 | ○ |
| Ex. 73 | ○ | 92 | 10 | ○ |
| Ex. 74 | ○ | 90 | 8 | ○ |
| Ex. 75 | ○ | 92 | 7 | ○ |
| Ex. 76 | ○ | 92 | 9 | ○ |
| Ex. 77 | ○ | 91 | 8 | ○ |
| Ex. 78 | ○ | 90 | 9 | ○ |
| Ex. 79 | ○ | 91 | 7 | ○ |
| Ex. 80 | ○ | 89 | 12 | ○ |
| Ex. 81 | ○ | 90 | 11 | ○ |
| Ex. 82 | ○ | 88 | 12 | ○ |
| Ex. 83 | ○ | 90 | 9 | ○ |
| Ex. 84 | ○ | 88 | 11 | ○ |
| Ex. 85 | ○ | 89 | 10 | ○ |
| Ex. 86 | ○ | 90 | 13 | ○ |
| Ex. 87 | ○ | 91 | 14 | ○ |
| Ex. 88 | ○ | 91 | 11 | ○ |
| Ex. 89 | ○ | 90 | 11 | ○ |
| Ex. 90 | ○ | 90 | 12 | ○ |
| Ex. 91 | ○ | 90 | 11 | ○ |
| Ex. 92 | ○ | 91 | 10 | ○ |
| Ex. 93 | ○ | 90 | 11 | ○ |
| Ex. 94 | ○ | 88 | 13 | ○ |
| Ex. 95 | ○ | 88 | 13 | ○ |
| Comp. Ex. 1 | ○ | 92 | 15 | x |
| Comp. Ex. 2 | ○ | 89 | 45 | ○ |
| Comp. Ex. 3 | x | 89 | 20 | ○ |
| Comp. Ex. 4 | ○ | 93 | 40 | ○ |
| Comp. Ex. 5 | x | 89 | 15 | ○ |

As shown in Table 10, the optical component comprising a polymer of this invention prepared by polymerizing a racemic mixture of a monomer comprising an asymmetric Spiro ring has better transparency, mechanical strength and heat resistance and lower birefringence, than one from a known polymer. It has been shown that a polymer prepared by polymerizing one optical isomer of a monomer comprising anasymmetric spiro ring has a larger birefringence.

Example 96

Preparation and Evaluation of a Disk

The polycarbonate prepared in Example 1 was formed into pellets with an extruder with a pelletizer (cylinder temperature: 200° C.). Each pellet was dried at 100° C. for 4 hours, and then was subject to injection molding at 220° C. Specifically, a stamper with mirror surface was mounted on a mold and formed the material into a disk-shape molding with an outer diameter of 130 mm and a thickness of 1.2 mm. The disk was punched to provide a doughnut disk with an inner diameter of 15 mm, and then aluminum was vacuum-deposited on one side of the disk to form a reflective layer with a thickness of 600 Å. For the optical disk, a birefringence and a BER (bit error rate) were determined. The bit error rate was determined based on an incidence of record-reading error, using a laser beam with a wavelength of 780 nm, a linear velocity of 2 m/sec and a power of 0.8 mW. The results are shown in Table 11.

Examples 97 to 103

Optical disks were prepared and evaluated as described in Example 96, using the polycarbonates obtained in Examples 3 to 8. The results are shown in Table 11.

Examples 104 to 111

Optical disks were prepared and evaluated as described in Example 96, using the polyesters obtained in Examples 14 to 21. The results are shown in Table 11.

Examples 112 to 117

Optical disks were prepared and evaluated as described in Example 96, using the polyurethanes obtained in Examples 22 to 27. The results are shown in Table 11.

Examples 118 to 123

Optical disks were prepared and evaluated as described in Example 96, using the copolymeric polycarbonates obtained in Examples 34 to 39. The results are shown in Table 11.

Examples 124 and 125

Optical disks were prepared and evaluated as described in Example 96, using the polycarbonates obtained in Preparation Examples 24 and 25. The results are shown in Table 11.

Comparative Example 6

An optical disk was prepared and evaluated as described in Example 96, using the polycarbonate obtained in Comparative Example 2. The birefringence and the BER (bit error rate) were determined. The results are shown in Table 11.

Comparative Example 7

An optical disk was prepared and evaluated as described in Example 96, using the polycarbonate obtained in Comparative Example 3. The birefringence and the BER (bit error rate) were determined. The results are shown in Table 11.

TABLE 11

| Example | Birefringence (Δnd single pulse) (nm) | BER bit error rate) |
|---|---|---|
| Ex.96 | 5 | $2 \times 10^{-6}$ |
| Ex.97 | 5 | $3 \times 10^{-6}$ |
| Ex.98 | 7 | $3 \times 10^{-6}$ |
| Ex.99 | 5 | $2 \times 10^{-6}$ |
| Ex.100 | 5 | $3 \times 10^{-6}$ |
| Ex.101 | 5 | $2 \times 10^{-6}$ |
| Ex.102 | 5 | $3 \times 10^{-6}$ |
| Ex.103 | 7 | $3 \times 10^{-6}$ |
| Ex.104 | 5 | $2 \times 10^{-6}$ |
| Ex.105 | 5 | $3 \times 10^{-6}$ |
| Ex.106 | 7 | $3 \times 10^{-6}$ |
| Ex.107 | 5 | $2 \times 10^{-6}$ |
| Ex.108 | 5 | $3 \times 10^{-6}$ |
| Ex.109 | 7 | $3 \times 10^{-6}$ |
| Ex.110 | 7 | $3 \times 10^{-6}$ |
| Ex.111 | 6 | $2 \times 10^{-6}$ |
| Ex.112 | 5 | $2 \times 10^{-6}$ |
| Ex.113 | 5 | $3 \times 10^{-6}$ |
| Ex.114 | 7 | $3 \times 10^{-6}$ |
| Ex.115 | 5 | $2 \times 10^{-6}$ |
| Ex.116 | 5 | $3 \times 10^{-6}$ |
| Ex.117 | 7 | $3 \times 10^{-6}$ |
| Ex.118 | 6 | $2 \times 10^{-6}$ |
| Ex.119 | 7 | $3 \times 10^{-6}$ |
| Ex.120 | 6 | $2 \times 10^{-6}$ |
| Ex.121 | 5 | $2 \times 10^{-6}$ |
| Ex.122 | 7 | $3 \times 10^{-6}$ |
| Ex.123 | 7 | $3 \times 10^{-6}$ |
| Ex.124 | 7 | $3 \times 10^{-6}$ |
| Ex.125 | 7 | $3 \times 10^{-6}$ |
| Comp.Ex.6 | 40 | $5 \times 10^{-5}$ |
| Comp.Ex.7 | 18 | $2 \times 10^{-5}$ |

As shown in Table 11, an optical disk prepared from the polymer of this invention is improved for a BER, compared with one from an existing polycarbonate, because of reduction in a birefringence.

Example 126

Preparation of a Magneto-Optical Disk and Evaluation of its Recording Characteristics The polycarbonate prepared in Example 1 was formed into pellets with an extruder with a pelletizer (cylinder temperature: 200° C.). Each pellet was dried at 110° C. for 4 hours, and then was subject to injection molding. Specifically, a stamper with mirror surface was mounted on a mold and formed the material into a disk-shape molding with an outer diameter of 130 mm and a thickness of 1.2 mm.

On the substrate was deposited a magneto-optical recording layer with a thickness of 1000 Å in a sputtering instrument (RF sputtering instrument; Nippon Shinku), using an alloy target of Tb 23.5, Fe 64.2 and Co 12.3 (atomic %). On the recording layer was deposited an inorganic-glass protective film with a thickness of 1000 Å using a sputtering instrument as described above. For the magneto-optical disk, a birefringence, a CN ratio, a BER (bit error rate) and a CN retention were determined.

The CN ratio was determined under the conditions; a writing power: 7 mW, a reading power: 1 mW, a carrier frequency: 1 MHz, and a resolution band width: 30 KHz.

The CN retention was determined as a percentage (%) of reduction in the CN ratio compared with the initial CN ratio after 30 days under the conditions; temperature: 60° C. and RH: 90%.

The results are shown in Table 12.

Examples 127 to 133

Magneto-optical disks were prepared as described in Example 126, using the polycarbonates obtained in Examples 2 to 8. For the magneto-optical disks, a birefringence, a CN ratio, a BER (bit error rate) and a CN change rate were determined. The results are shown in Table 12.

Examples 134 to 141

Magneto-optical disks were prepared as described in Example 126, using the polyesters obtained in Examples 14 to 21. For the magneto-optical disks, a birefringence, a CN ratio, a BER (bit error rate) and a CN change rate were determined. The results are shown in Table 12.

Examples 142 to 147

Magneto-optical disks were prepared as described in Example 126, using the polyurethanes obtained in Examples 22 to 27. For the magneto-optical disks, a birefringence, a CN ratio, a BER (bit error rate) and a CN change rate were determined. The results are shown in Table 12.

Examples 148 to 153

Magneto-optical disks were prepared as described in Example 126, using the copolymeric polycarbonates obtained in Examples 34 to 39. For the magneto-optical disks, a birefringence, a CN ratio, a BER (bit error rate) and a CN change rate were determined. The results are shown in Table 12.

Examples 154 and 155

Magneto-optical disks were prepared as described in Example 126, using the polycarbonates obtained in Preparation Examples 24 and 25. For the magneto-optical disks, a birefringence, a CN ratio, a BER (bit error rate) and a CN change rate were determined. The results are shown in Table 12.

Comparative Example 8

A magneto-optical disk was prepared as described in the examples, using the polycarbonate obtained in Example 2. For the magneto-optical disk, a birefringence, a CN ratio, a BER (bit error rate) and a CN retention were determined. The results are shown in Table 12.

Comparative Example 9

A magneto-optical disk was prepared as described in the examples, using the polycarbonate obtained in Example 3. For the magneto-optical disk, a birefringence, a CN ratio, a BER (bit error rate) and a CN retention were determined. The results are shown in Table 12.

TABLE 12

| Example | Birefringence (And single pulse) (nm) | CN (dB) | BER (bit error rate) | CN retention (%) |
|---|---|---|---|---|
| Ex. 126 | 8 | 55 | $2 \times 10^{-6}$ | 93 |
| Ex. 127 | 5 | 55 | $3 \times 10^{-6}$ | 95 |
| Ex. 128 | 6 | 53 | $2 \times 10^{-6}$ | 95 |
| Ex. 129 | 8 | 55 | $2 \times 10^{-6}$ | 93 |
| Ex. 130 | 5 | 55 | $3 \times 10^{-6}$ | 95 |
| Ex. 131 | 7 | 54 | $2 \times 10^{-6}$ | 95 |
| Ex. 132 | 6 | 55 | $3 \times 10^{-6}$ | 94 |
| Ex. 133 | 5 | 55 | $2 \times 10^{-6}$ | 95 |
| Ex. 134 | 8 | 55 | $2 \times 10^{-6}$ | 93 |
| Ex. 135 | 5 | 55 | $3 \times 10^{-6}$ | 95 |
| Ex. 136 | 6 | 53 | $2 \times 10^{-6}$ | 95 |
| Ex. 137 | 7 | 54 | $2 \times 10^{-6}$ | 95 |
| Ex. 138 | 6 | 55 | $3 \times 10^{-6}$ | 94 |
| Ex. 139 | 5 | 55 | $2 \times 10^{-6}$ | 95 |
| Ex. 140 | 5 | 55 | $2 \times 10^{-6}$ | 95 |
| Ex. 141 | 7 | 56 | $2 \times 10^{-6}$ | 94 |
| Ex. 142 | 8 | 55 | $3 \times 10^{-6}$ | 93 |
| Ex. 143 | 5 | 55 | $2 \times 10^{-6}$ | 95 |
| Ex. 144 | 6 | 53 | $2 \times 10^{-6}$ | 95 |
| Ex. 145 | 7 | 54 | $3 \times 10^{-6}$ | 95 |
| Ex. 146 | 6 | 55 | $2 \times 10^{-6}$ | 94 |
| Ex. 147 | 5 | 55 | $2 \times 10^{-6}$ | 95 |
| Ex. 148 | 7 | 56 | $3 \times 10^{-6}$ | 94 |
| Ex. 149 | 5 | 55 | $2 \times 10^{-6}$ | 95 |
| Ex. 150 | 6 | 54 | $2 \times 10^{-6}$ | 95 |
| Ex. 151 | 7 | 53 | $3 \times 10^{-6}$ | 95 |
| Ex. 152 | 6 | 54 | $2 \times 10^{-6}$ | 94 |
| Ex. 153 | 5 | 55 | $2 \times 10^{-6}$ | 95 |
| Ex. 154 | 6 | 54 | $3 \times 10^{-6}$ | 94 |
| Ex. 155 | 5 | 55 | $2 \times 10^{-6}$ | 95 |
| Comp. Ex. 8 | 20 | 46 | $5 \times 10^{-5}$ | 85 |
| Comp. Ex. 9 | 14 | 48 | $2 \times 10^{-5}$ | 90 |

As shown in Table 12, a magneto-optical disk prepared from the polymer of this invention is improved for a CN ratio, a BER and a CN retention, compared with one from an existing polycarbonate, because of reduction in a birefringence.

An organic optical component comprising a polyimide will be described, and this invention is not limited to the following examples.

In the following preparation examples and comparative preparation examples, the diamines and the tetracarboxylic dianhydrides used are as follows. In the tables for these preparation examples, "acid anhydride" means a tetracarboxylic dianhydride; "$\eta_{inh}$" means a logarithmic viscosity determined in a concentration of 0.5 dL/g in a mixture of p-chlorophenol:phenol=9:1 at 35° C.; "Tg" means a glass-transition temperature determined by DSC at a warming rate of 16° C./min in an atmosphere of nitrogen; and "$Td_5$" means a 5% weight-loss temperature in the air determined by DTA-TG at a warming rate of 10° C./min in the air.

Diamines (represented by the following symbols of A) to M) in the tables)

A): 6,6'-bis(3-aminophenoxy)-3,3,3',3'-tetramethyl-1,1'-spirobiindan;

B): 6,6'-bis(4-aminophenoxy)-3,3,3',3'-tetramethyl-1,1'-spirobiindan;

C): 6,6'-bis(3-amino-4-isopropylphenoxy)-3,3,3',3'-tetramethyl-1,1-spirobiindan;

D): 6,6'-bis [3-amino-5-(p-methylphenoxy)phenoxy]-3,3,3',3'-tetramethyl-1,1'-spirobiindan;

E): 6,6'-bis[3-amino-4-(m-trifluoromethylphenyl)phenoxy]-3,3,3',3'-tetramethyl-1,1'-spirobiindan;

K): (−)-6,6'-bis(3-aminophenoxy)-3,3,3',3'-tetramethyl-1,1'-spirobiindan (one optical isomer, the (−)-isomer, was obtained according to the procedure by Nakagawa et al., Bulletin of Chemical Society of Japan, 44, 496–505 (1971));

L): 2,2-bis[4-(3-aminophenoxy)phenyl]propane;

M): 1,3-bis(3-aminophenoxy)benzene;

AA): 6,6'-bis(3-amino-5-trifluoromethylphenoxy)-3,3,3',3'-tetramethyl-1,1'-spirobiindan;

AB): 6,6'-bis(3-amino-4-isopropylphenoxy)-3,3,3',3'-tetramethyl-1,1'-spirobiindan;

AC): 6,6'-bis[3-amino-5-(p-methylphenoxy)phenoxy]-3,3,3',3'-tetramethyl-1,1'-spirobiindan;

AD): 6,6'-bis[3-amino-4-(m-trifluoromethylphenyl)phenoxy]-3,3,3',3'-tetramethyl-1,1'-spirobiindan;

AE): 2,2-bis[4-(3-aminophenoxy)phenyl]propane.

Tetracarboxylic dianhydrides (Acid anhydrides): (represented by the following symbols of T) to Z) in the tables)

T): pyromellitic dianhydride;

U): 3,3',4,4'-benzophenonetetracarboxylic dianhydride;

V): 3,3',4,4'-biphenyltetracarboxylic dianhydride;

W): 2,2-bis(3,4-dicarboxyphenyl)-1,1,1,3,3,3-hexafluoropropane dianhydride;

X): 3,3',4,4'-diphenyl ether tetracarboxylic dianhydride;

Y): 3,3',4,4'-diphenyl sulfone tetracarboxylic dianhydride;

Z): 1,4-bis(3,4-dicarboxyphenoxy)benzene dianhydride.

Preparation Examples and Comparative Preparation Examples

Preparation Examples 27 to 62

Into a vessel equipped with an agitator, a reflux condenser and a nitrogen inlet tube were charged a diamine in the amount shown in Table 13, a tetracarboxylic dianhydride ("acid anhydride") in the amount shown in Table 13, 0.70 g of phthalic anhydride and m-cresol in the amount shown in Table 13, and the mixture was heated to 200° C., at which the mixture was then reacted for 4 hours. At the end of the reaction, the reaction solution was poured into about 1 liter of methanol, to give a polyimide powder. The polyimide powder was washed with about 1 liter of methanol, and was vacuum-dried at 50° C. for 12 hours and then at 180° C. for about 6 hours, under gentle nitrogen stream. The yields, the logarithmic coefficients of viscosity, the glass-transition temperatures and the 5% weight-loss temperatures of the polyimide powders are also shown in Table 13.

Comparative Preparation Examples 1 to 12

Diamines, tetracarboxylic dianhydrides (acid anhydrides), phthalic anhydride and m-cresol were used in the amounts shown in Table 14 as described in Examples 27 to 62, to give polyimide powders. Several physical properties are shown in Table 14.

TABLE 13

| | Diamine | | Acid anhydride | | | Polymer | | | |
|---|---|---|---|---|---|---|---|---|---|
| Prep. Ex. | Compd | Amount (g) | Compd | Amount (g) | m-Cresol (g) | Yield (%) | $\eta_{inh}$ (dl/g) | Tg °C. | Td$_5$ °C. |
| 27 | A) | 24.53 | T) | 10.36 | 140 | 96.2 | 0.46 | 248 | 520 |
| 28 | A) | 24.53 | U) | 15.31 | 159 | 95.2 | 0.51 | 223 | 511 |
| 29 | A) | 24.53 | X) | 14.74 | 157 | 94.3 | 0.48 | 212 | 513 |
| 30 | A) | 24.53 | Y) | 17.02 | 166 | 95.6 | 0.47 | 227 | 509 |
| 31 | A) | 24.53 | Z) | 19.11 | 175 | 92.3 | 0.44 | 199 | 498 |
| 32 | B) | 24.53 | T) | 10.36 | 140 | 95.9 | 0.47 | 263 | 508 |
| 33 | B) | 24.53 | U) | 15.31 | 159 | 94.6 | 0.49 | 251 | 510 |
| 34 | B) | 24.53 | X) | 14.74 | 157 | 93.8 | 0.45 | 242 | 513 |
| 35 | B) | 24.53 | Y) | 17.02 | 166 | 93.0 | 0.47 | 245 | 511 |
| 36 | B) | 24.53 | Z) | 19.11 | 175 | 94.2 | 0.41 | 227 | 503 |
| 37 | C) | 28.74 | T) | 10.36 | 156 | 93.9 | 0.44 | 229 | 510 |
| 38 | C) | 28.74 | V) | 13.98 | 171 | 94.2 | 0.44 | 210 | 513 |
| 39 | D) | 35.13 | T) | 10.36 | 182 | 93.2 | 0.41 | 225 | 518 |
| 40 | D) | 35.13 | V) | 13.98 | 196 | 94.2 | 0.42 | 205 | 508 |
| 41 | E) | 38.94 | T) | 10.36 | 197 | 93.5 | 0.48 | 228 | 511 |
| 42 | E) | 38.94 | V) | 13.98 | 212 | 93.6 | 0.45 | 203 | 513 |
| 43 | A) | 24.53 | X) Y) | 7.37 8.51 | 162 | 94.8 | 0.47 | 220 | 506 |
| 44 | A) B) | 12.27 12.27 | T) | 10.36 | 140 | 95.0 | 0.45 | 225 | 507 |
| 45 | A) | 24.53 | W) | 21.10 | 182 | 94.1 | 0.58 | 222 | 514 |
| 46 | A) | 24.53 | V) | 13.98 | 182 | 95.3 | 0.60 | 228 | 529 |
| 47 | B) | 24.53 | W) | 21.10 | 182 | 94.4 | 0.48 | 262 | 499 |
| 48 | B) | 24.53 | V) | 13.98 | 182 | 96.1 | 0.42 | 260 | 500 |
| 49 | A) | 24.53 | W) V) | 10.66 6.99 | 182 | 95.5 | 0.55 | 230 | 524 |
| 50 | A) B) | 12.27 12.27 | W) | 21.10 | 182 | 94.2 | 0.51 | 225 | 528 |
| 51 | AA) | 31.05 | T) | 10.36 | 166 | 96.0 | 0.52 | 246 | 510 |
| 52 | AA) | 31.05 | U) | 15.31 | 185 | 96.2 | 0.52 | 221 | 505 |
| 53 | AA) | 31.05 | X) | 14.74 | 183 | 95.2 | 0.46 | 210 | 509 |
| 54 | AA) | 31.05 | Y) | 17.02 | 192 | 95.0 | 0.49 | 223 | 502 |
| 55 | AA) | 31.05 | Z) | 19.11 | 201 | 92.9 | 0.45 | 196 | 496 |
| 56 | AB) | 28.74 | T) | 10.36 | 156 | 93.9 | 0.44 | 229 | 510 |
| 57 | AB) | 28.74 | V) | 13.98 | 171 | 94.2 | 0.44 | 210 | 513 |
| 58 | AC) | 35.13 | T) | 10.36 | 182 | 93.2 | 0.41 | 225 | 518 |
| 59 | AC) | 35.13 | V) | 13.98 | 196 | 94.2 | 0.42 | 205 | 508 |
| 60 | AD) | 38.94 | T) | 10.36 | 197 | 93.5 | 0.48 | 228 | 511 |
| 61 | AD) | 38.94 | V) | 13.98 | 212 | 93.6 | 0.45 | 203 | 513 |
| 62 | AA) | 31.05 | X) Y) | 7.37 8.51 | 188 | 95.1 | 0.44 | 216 | 500 |

The copolymerization ratio of the copolymers is 5/5

TABLE 14

| | Diamine | | Acid anhydride | | Phthalic anhyd. | | Polymer | | | |
|---|---|---|---|---|---|---|---|---|---|---|
| Com. Prep. Ex. | Compd. | Amt. (g) | Compd. | Amt. (g) | (g) | m-Cresol (g) | Yield (%) | $\eta_{inh}$ dl/g | Tg (° C.) | Td$_5$ (° C.) |
| 1 | K) | 2.453 | T) | 1.036 | 0.070 | 14.0 | 96.1 | 0.45 | 246 | 514 |
| 2 | L) | 20.53 | T) | 10.36 | 0.70 | 124 | 95.1 | 0.47 | 236 | 521 |
| 3 | L) | 20.53 | U) | 15.31 | 0.70 | 143 | 95.5 | 0.42 | 218 | 518 |
| 4 | M) | 14.62 | T) | 10.36 | 0.70 | 100 | 95.2 | 0.44 | 226 | 550 |
| 5 | M) | 14.62 | U) | 15.31 | 0.70 | 120 | 95.5 | 0.47 | 206 | 529 |
| 6 | M) | 14.62 | V) | 13.98 | 0.70 | 114 | 96.9 | 0.49 | 207 | 549 |
| 7 | M) | 14.62 | W) | 21.10 | 0.70 | 143 | 95.0 | 0.44 | 201 | 538 |
| 8 | M) | 14.62 | X) | 14.74 | 0.70 | 117 | 94.5 | 0.44 | 194 | 539 |
| 9 | M) | 14.62 | Y) | 17.02 | 0.70 | 127 | 95.8 | 0.44 | 210 | 548 |
| 10 | M) | 14.62 | Z) | 19.11 | 0.70 | 135 | 95.3 | 0.48 | 190 | 552 |
| 11 | AE) | 20.53 | T) | 10.36 | 0.70 | 124 | 95.1 | 0.47 | 236 | 521 |
| 12 | AE) | 20.53 | U) | 15.31 | 0.70 | 143 | 95.5 | 0.42 | 218 | 518 |

Preparation Examples 63 to 94

Into a vessel equipped with an agitator and a nitrogen inlet tube were charged a diamine and N,N-dimethylacetamide in the amounts shown in Table 15, and then being careful to avoid temperature rise, was added a tetracarboxylic anhydride (acid anhydride) in the amount shown in Table 15 at room temperature in an atmosphere of nitrogen. The solution was stirred for about 30 hours at room temperature in an atmosphere of nitrogen to produce a polyamic acid varnish. The polyamic acid varnish was cast on a glass plate, and then it was heated at 100° C. for 30 min, at 200° C. for 30 min and at 250° C. for 1 hour in an atmosphere of nitrogen, for removing solvent and imidation to give a polyimide film. The logarithmic viscosity, the glass-transition temperatures and 5% weight-loss temperatures of the films produced are shown in Table 15.

Comparative Preparation Examples 13 to 24

Diamines, tetracarboxylic dianhydrides (acid anhydrides) and N,N-dimethylacetamide (N,N-DMAc) were used in the amounts shown in Table 16 as described in Examples 63 to 94, to give polyimide films. Several physical properties are shown in Table 15.

TABLE 15

| | Diamine | | Acid anhydride | | N,N-DMAc | Physical properties of a film | | |
|---|---|---|---|---|---|---|---|---|
| Prep. Ex. | Compd | Amount (g) | Compd | Amount (g) | (g) | $\eta_{inh}$ dl/g | Tg ° C. | Td$_5$ ° C. |
| 63 | A) | 24.53 | T) | 10.91 | 142 | 0.79 | 252 | 505 |
| 64 | A) | 24.53 | U) | 16.11 | 162 | 0.66 | 229 | 499 |
| 65 | A) | 24.53 | X) | 15.52 | 160 | 0.80 | 216 | 501 |
| 66 | A) | 24.53 | Y) | 17.92 | 169 | 0.88 | 230 | 489 |
| 67 | A) | 24.53 | Z) | 20.12 | 179 | 0.75 | 205 | 486 |
| 68 | B) | 24.53 | T) | 10.91 | 142 | 0.83 | 268 | 498 |
| 69 | B) | 24.53 | U) | 16.11 | 162 | 0.75 | 255 | 501 |
| 70 | B) | 24.53 | X) | 15.52 | 160 | 0.90 | 248 | 501 |
| 71 | B) | 24.53 | Y) | 17.92 | 169 | 0.99 | 249 | 497 |
| 72 | B) | 24.53 | Z) | 20.12 | 179 | 0.87 | 230 | 488 |
| 73 | C) | 28.74 | T) | 10.91 | 158 | 0.88 | 230 | 492 |
| 74 | C) | 28.74 | V) | 14.72 | 174 | 0.96 | 214 | 500 |
| 75 | D) | 35.13 | T) | 10.91 | 184 | 1.05 | 227 | 503 |
| 76 | D) | 35.13 | V) | 14.72 | 199 | 0.98 | 209 | 494 |
| 77 | E) | 38.94 | T) | 10.91 | 199 | 0.92 | 232 | 505 |
| 78 | E) | 38.94 | V) | 14.72 | 215 | 0.88 | 208 | 496 |
| 79 | A) | 24.53 | X) Y) | 7.76 8.96 | 165 | 0.78 | 225 | 490 |
| 80 | A) B) | 12.27 12.27 | T) | 10.91 | 142 | 0.69 | 228 | 489 |
| 81 | A) | 24.53 | W) | 22.21 | 182 | 0.45 | 221 | 520 |
| 82 | A) | 24.53 | V) | 14.72 | 182 | 0.63 | 228 | 531 |
| 83 | AA) | 31.05 | T) | 10.91 | 168 | 0.78 | 250 | 502 |
| 84 | AA) | 31.05 | U) | 16.11 | 189 | 0.69 | 225 | 498 |
| 85 | AA) | 31.05 | X) | 15.52 | 186 | 0.75 | 212 | 500 |
| 86 | AA) | 31.05 | Y) | 17.92 | 196 | 0.92 | 225 | 488 |
| 87 | AA) | 31.05 | Z) | 20.12 | 205 | 0.88 | 203 | 484 |
| 88 | AA) | 28.74 | T) | 10.91 | 158 | 0.88 | 230 | 492 |
| 89 | AA) | 28.74 | V) | 14.72 | 174 | 0.96 | 214 | 500 |
| 90 | AA) | 35.13 | T) | 10.91 | 184 | 1.05 | 227 | 503 |
| 91 | AA) | 35.13 | V) | 14.72 | 199 | 0.98 | 209 | 494 |
| 92 | AB) | 38.94 | T) | 10.91 | 199 | 0.92 | 232 | 505 |
| 93 | AB) | 38.94 | V) | 14.72 | 215 | 0.88 | 208 | 496 |
| 94 | AC) | 31.05 | X) Y) | 7.76 8.96 | 191 | 0.75 | 222 | 492 |

The copolymerization ratio of the copolymers is 5/5 (mol/mol).

TABLE 16

| | Diamine | | Acid anhydride | | N,N-DMAc | Physical Properties of a film | | |
|---|---|---|---|---|---|---|---|---|
| Com. Prep. Ex. | Compd. | Amt. (g) | Compd. | Amt. (g) | (g) | $\eta_{inh}$ (dl/g) | Tg (° C.) | Td$_5$ (° C.) |
| 13 | K) | 2.453 | T) | 1.091 | 14.2 | 0.70 | 250 | 502 |
| 14 | L) | 20.53 | T) | 10.91 | 126 | 0.78 | 238 | 515 |
| 15 | L) | 20.53 | U) | 16.12 | 146 | 0.81 | 222 | 510 |
| 16 | M) | 14.62 | T) | 10.91 | 102 | 0.69 | 230 | 538 |
| 17 | M) | 14.62 | U) | 16.12 | 123 | 0.82 | 209 | 515 |
| 18 | M) | 14.62 | V) | 14.72 | 117 | 0.85 | 211 | 532 |
| 19 | M) | 14.62 | W) | 22.21 | 147 | 0.75 | 206 | 529 |
| 20 | M) | 14.62 | X) | 15.52 | 120 | 0.76 | 199 | 533 |
| 21 | M) | 14.62 | Y) | 17.92 | 131 | 0.84 | 215 | 536 |

TABLE 16-continued

|  | Diamine | | Acid anhydride | | N,N-DMAc | Physical Properties of a film | | |
|---|---|---|---|---|---|---|---|---|
| Com. Prep. Ex. | Compd. | Amt. (g) | Compd. | Amt. (g) | (g) | $\eta_{inh}$ (dl/g) | Tg (°C.) | Td$_5$ (°C.) |
| 22 | M) | 14.62 | Z) | 20.12 | 139 | 0.94 | 193 | 537 |
| 23 | AE) | 20.53 | T) | 10.91 | 126 | 0.78 | 238 | 515 |
| 24 | AE) | 20.53 | U) | 16.12 | 146 | 0.81 | 222 | 510 |

Preparation process of a film

Each of the polyimide powders obtained in Preparation Examples 27 to 62 and Comparative Preparation Examples 1 to 12 was heat-pressed at 350 to 400° C., to form a film. For the polyamic acid varnishes obtained in Preparation Examples 63 to 94 and Comparative Preparation Examples 13 to 24, each of them was cast on a glass plate, and then it was heated at 100° C. for 30 min, at 200° C. for 30 min and at 250° C. for 1 hour in an atmosphere of nitrogen, for removing solvent and imidation to give a polyimide film.

Evaluation procedure for a film

Films were formed from the polyimide powders and the polyamic acid varnishes according to the above procedure, and evaluated by the procedure below.

(1) Appearance: surface status of a film was visually observed and evaluated.

O: colorless and transparent, and good surface status without splits, cracks or rough surface X: having splits, cracks or rough surface (2) Total light transmittance (referred to as "transmittance"): determined according to ASTMD-1003 method (3) Birefringence: determined with an ellipsometer (4) Heat resistance: evaluated based on visual observation for a molding after placing it in a hot-air drier at 150° C. for 4 hours.

O: no staining, surface distortion or cracks of the molding

X: having staining, surface distortion or cracks of the molding

Δ: having intermediate conditions between these O and X.

Examples 156 to 199

Films were prepared from the polyimide powders and the polyamic acid varnishes obtained in Preparation Examples 27 to 50 and 63 to 82, as described above. These films were evaluated their appearance, total light transmittance, birefringence and heat resistance as described above. The results are shown in Table 17.

Examples 200 to 223

Films were prepared from the polyimide powders and the polyamic acid varnishes obtained in Preparation Examples 51 to 62 and 83 to 94, as described above. These films were evaluated their appearance, total light transmittance, birefringence and heat resistance as described above. The results are shown in Table 18.

Comparative Examples 10 to 33

Films were prepared from the polyimide powders-and the polyamic acid varnishes obtained in Comparative Preparation Examples 1 to 24, as described above. These films were evaluated as described in Examples 156 to 199 and 200 to 223. The results are shown in Table 19.

TABLE 17

| Ex. | Prep. Ex. | Appearance | Total light transmittance (%) | Birefringence (nm) | Heat resistance |
|---|---|---|---|---|---|
| 156 | 27 | O | 85 | 10 | O |
| 157 | 28 | O | 84 | 9 | O |
| 158 | 29 | O | 86 | 8 | O |
| 159 | 30 | O | 85 | 9 | O |
| 160 | 31 | O | 86 | 7 | Δ |
| 161 | 32 | O | 85 | 9 | O |
| 162 | 33 | O | 82 | 8 | O |
| 163 | 34 | O | 87 | 6 | O |
| 164 | 35 | O | 88 | 9 | O |
| 165 | 36 | O | 85 | 10 | O |
| 166 | 37 | O | 85 | 8 | O |
| 167 | 38 | O | 85 | 9 | O |
| 168 | 39 | O | 84 | 9 | O |
| 169 | 40 | O | 86 | 7 | O |
| 170 | 41 | O | 84 | 8 | O |
| 171 | 42 | O | 87 | 11 | O |
| 172 | 43 | O | 86 | 9 | O |
| 173 | 44 | O | 83 | 8 | O |
| 174 | 45 | O | 91 | 8 | O |
| 175 | 46 | O | 88 | 9 | O |
| 176 | 47 | O | 89 | 8 | O |
| 177 | 48 | O | 87 | 11 | O |
| 178 | 49 | O | 90 | 9 | Δ |
| 179 | 50 | O | 89 | 10 | O |
| 180 | 63 | O | 86 | 9 | O |
| 181 | 64 | O | 84 | 8 | O |
| 182 | 65 | O | 88 | 8 | O |
| 183 | 66 | O | 85 | 7 | O |
| 184 | 67 | O | 88 | 9 | O |
| 185 | 68 | O | 86 | 9 | O |
| 186 | 69 | O | 87 | 8 | O |
| 187 | 70 | O | 84 | 8 | O |
| 188 | 71 | O | 87 | 10 | O |
| 189 | 72 | O | 85 | 11 | O |
| 190 | 73 | O | 86 | 8 | O |
| 191 | 74 | O | 86 | 8 | O |
| 192 | 75 | O | 84 | 10 | O |
| 193 | 76 | O | 88 | 8 | O |
| 194 | 77 | O | 88 | 8 | O |
| 195 | 78 | O | 89 | 11 | O |
| 196 | 79 | O | 86 | 10 | O |
| 197 | 80 | O | 88 | 8 | O |
| 198 | 81 | O | 92 | 7 | O |
| 199 | 82 | O | 88 | 8 | O |

TABLE 18

| Ex. | Prep. Ex. | Appearance | Total light transmittance (%) | Birefringence (nm) | Heat resistance |
|---|---|---|---|---|---|
| 200 | 51 | O | 86 | 9 | O |
| 201 | 52 | O | 86 | 9 | O |
| 202 | 53 | O | 87 | 9 | O |
| 203 | 54 | O | 87 | 8 | O |
| 204 | 55 | O | 87 | 9 | Δ |

TABLE 18-continued

| Ex. | Prep. Ex. | Appearance | Total light transmittance (%) | Birefringence (nm) | Heat resistance |
|---|---|---|---|---|---|
| 205 | 56 | ○ | 85 | 8 | ○ |
| 206 | 57 | ○ | 85 | 9 | ○ |
| 207 | 58 | ○ | 84 | 9 | ○ |
| 208 | 59 | ○ | 86 | 7 | ○ |
| 209 | 60 | ○ | 84 | 8 | ○ |
| 210 | 61 | ○ | 87 | 11 | ○ |
| 211 | 62 | ○ | 85 | 8 | ○ |
| 212 | 83 | ○ | 87 | 8 | ○ |
| 213 | 84 | ○ | 85 | 8 | ○ |
| 214 | 85 | ○ | 87 | 8 | ○ |
| 215 | 86 | ○ | 87 | 9 | ○ |
| 216 | 87 | ○ | 90 | 8 | ○ |
| 217 | 88 | ○ | 86 | 8 | ○ |
| 218 | 89 | ○ | 86 | 8 | ○ |
| 219 | 90 | ○ | 84 | 10 | ○ |
| 220 | 91 | ○ | 88 | 8 | ○ |
| 221 | 92 | ○ | 88 | 8 | ○ |
| 222 | 93 | ○ | 89 | 11 | ○ |
| 223 | 94 | ○ | 87 | 9 | ○ |

TABLE 19

| Comp. Ex. | Comp. Prep. Ex. | Appearance | Total light transmittance (%) | Birefringence (nm) | Heat resistance |
|---|---|---|---|---|---|
| 10 | 1 | ○ | 88 | 52 | ○ |
| 11 | 2 | ○ | 87 | 48 | ○ |
| 12 | 3 | ○ | 87 | 52 | ○ |
| 13 | 4 | ○ | 85 | 46 | ○ |
| 14 | 5 | ○ | 88 | 49 | Δ |
| 15 | 6 | ○ | 88 | 50 | ○ |
| 16 | 7 | ○ | 87 | 38 | Δ |
| 17 | 8 | ○ | 85 | 56 | Δ |
| 18 | 9 | ○ | 86 | 55 | ○ |
| 19 | 10 | ○ | 87 | 48 | Δ |
| 20 | 13 | ○ | 86 | 48 | ○ |
| 21 | 14 | ○ | 88 | 52 | ○ |
| 22 | 15 | ○ | 85 | 53 | ○ |
| 23 | 16 | ○ | 85 | 47 | ○ |
| 24 | 17 | ○ | 83 | 44 | ○ |
| 25 | 18 | ○ | 88 | 49 | ○ |
| 26 | 19 | ○ | 86 | 35 | Δ |
| 27 | 20 | ○ | 85 | 58 | Δ |
| 28 | 21 | ○ | 86 | 55 | ○ |
| 29 | 22 | ○ | 87 | 54 | Δ |
| 30 | 11 | ○ | 87 | 48 | ○ |
| 31 | 12 | ○ | 87 | 52 | ○ |
| 32 | 23 | ○ | 88 | 52 | ○ |
| 33 | 24 | ○ | 85 | 53 | ○ |

As shown in Tables 17 to 19, the polyimide organic optical component of this invention has excellent transparency, heat resistance and mechanical strength, and has a lower birefringence than a conventional polyimide component.

Preparation and evaluation of an optical disk

Examples 224 to 228

Each of the polyimide powders prepared in Examples 28, 29, 34, 44 and 45 was formed into a strand with a melting extruder (melting temperature: 400° C.). After cooling, the strand was formed into pellets. Each pellet was dried at 150° C. for 4 hours, and then was subject to injection molding at 380° C. Specifically, a stamper with mirror surface was mounted on a mold and formed the material into a disk-shape molding (substrate) with an outer diameter of 130 mm and a thickness of 1.2 mm.

The disk was punched to provide a doughnut disk with an inner diameter of 15 mm, and then aluminum was vacuum-deposited on one side of the disk to form a reflective layer with a thickness of 600 Å. For the optical disk, a birefringence and a BER (bit error rate) were determined. The BER was determined based on an incidence of record-reading error, using a laser beam with a wavelength of 780 nm, a linear velocity of 2 m/sec and a power of 0.8 mW. The results are shown in Table 20.

Comparative Examples 34 to 36

Optical disks from the polyimide powders of Comparative Preparation Examples 2, 5 and 6 were prepared and evaluated as described in Examples 224 to 228. The results are shown in Table 20.

TABLE 20

| Ex./ Comp.Ex. | Prep.Ex./ Comp. Prep.Ex. | Birefringence Δnd (single pulse; nm) | BER (bit error rate) |
|---|---|---|---|
| Ex.224 | Prep.Ex.28 | 6 | $7 \times 10^{-6}$ |
| Ex.225 | Prep.Ex.29 | 6 | $8 \times 10^{-6}$ |
| Ex.226 | Prep.Ex.34 | 8 | $9 \times 10^{-6}$ |
| Ex.227 | Prep.Ex.44 | 7 | $7 \times 10^{-6}$ |
| Ex.228 | Prep.Ex.45 | 7 | $3 \times 10^{-6}$ |
| Comp.Ex. 34 | Comp.Prep. Ex.2 | 18 | $4 \times 10^{-4}$ |
| Comp.Ex. 35 | Comp.Prep. Ex.5 | 24 | $8 \times 10^{-4}$ |
| Comp.Ex. 36 | Comp.Prep. Ex.6 | 23 | $7 \times 10^{-4}$ |

As shown in Table 20, an optical disk prepared from the polyimide of this invention is improved for a BER, compared with one from any of the polyimides of the comparative examples, because of reduction in a birefringence.

Preparation and evaluation of a magneto-optical disk

Examples 229 to 233

Each of the polyimide powders prepared in Examples 28, 29, 34, 44 and 45 was formed into a strand with a melting extruder (melting temperature: 400° C.). After cooling, the strand was formed into pellets. Each pellet was dried at 150° C. for 4 hours, and then was subject to injection molding at 380° C. Specifically, a stamper with mirror surface was mounted on a mold and formed the material into a disk-shape molding (substrate) with an outer diameter of 130 mm and a thickness of 1.2 mm.

On the substrate was deposited a magneto-optical recording layer with a thickness of 1000 Å in a sputtering instrument (RF sputtering instrument; Nippon Shinku), using an alloy target of Tb 23.5, Fe 64.2 and Co 12.3 (atomic %). On the recording layer was deposited an inorganic-glass protective film with a thickness of 1000 Å using a sputtering instrument as described above. For the magneto-optical disk, a birefringence, a CN ratio, BER (bit error rate) and a CN change rate were determined.

The CN ratio was determined under the conditions; a writing power: 7 mW, a reading power: 1 mW, a carrier frequency: 1 MHz, and a resolution band width: 30 KHz.

The CN change rate was determined as a percentage (%) of reduction in the CN ratio compared with the initial CN ratio after 30 days under the conditions; temperature: 60° C. and RH: 90%.

The results are shown in Table 21.

Comparative Examples 37 to 39

Magneto-optical disks from the polyimide powders of Comparative Preparation Examples 2, 5 and 6 were prepared and evaluated as described in Examples 229 to 233. The results are shown in Table 21.

TABLE 21

| Ex./ Comp. Ex. | Prep. Ex./ Comp. Prep. Ex. | Birefringence (And single pulse) (nm) | CN (dB) | BER (bit error rate) | CN retention (%) |
|---|---|---|---|---|---|
| Ex. 229 | Prep. Ex. 28 | 7 | 56 | $8 \times 10^{-6}$ | 92 |
| Ex. 230 | Prep. Ex. 29 | 6 | 55 | $8 \times 10^{-6}$ | 93 |
| Ex. 231 | Prep. Ex. 34 | 7 | 57 | $8 \times 10^{-6}$ | 93 |
| Ex. 232 | Prep. Ex. 44 | 8 | 56 | $7 \times 10^{-6}$ | 92 |
| Ex. 233 | Prep. Ex. 45 | 7 | 57 | $3 \times 10^{-6}$ | 95 |
| Comp. Ex. 37 | Comp. Prep. Ex. 2 | 20 | 47 | $6 \times 10^{-4}$ | 86 |
| Comp. Ex. 37 | Comp. Prep. Ex. 5 | 25 | 44 | $7 \times 10^{-4}$ | 83 |
| Comp. Ex. 37 | Comp. Prep. Ex. 6 | 22 | 43 | $9 \times 10^{-4}$ | 85 |

As shown in Table 21, a magneto-optical disk prepared from the polyimide of this invention is improved for a CN ratio, a BER and CN retention, compared with one from any of the polyimides of the comparative examples, because of reduction in a birefringence.

An organic optical component comprising a polyamide will be described, and this invention is not limited to the following examples. In the following preparation examples and comparative preparation examples, the diamines A) to E), K) to M) and AA) to AE) were the same as those in the above polyimide except those described below, and the dicarboxylic dihalides were as follows. In the tables for these preparation examples, "acid derivative" means a dicarboxylic dihalide; "$\eta_{inh}$" means a logarithmic viscosity determined in a concentration of 0.5 dL/g in N-methyl-2-pyrrolidone at 35° C.; "Tg" means a glass-transition temperature determined by DSC at a warming rate of 16° C./min in an atmosphere of nitrogen; and "$Td_5$" means a 5% weight-loss temperature in the air determined by DTA-TG at a warming rate of 10° C./min in the air.

Diamines (represented by the following symbols of BA) to BE) in the tables)

BA): 6,6'-bis(3-amino-5-trifluoromethylphenoxy)-3,3,3',3'-tetramethyl-1,1'-spirobiindan;

BB): 6,6'-bis(3-amino-4-isopropylphenoxy)-3,3,3',3'-tetramethyl-1,1'-spirobiindan;

BC): 6,6'-bis[3-amino-5-(p-methylphenoxy)phenoxy]-3,3,3',3'-tetramethyl-1,1'-spirobiindan;

BD): 6,6'-bis[3-amino-4-(m-trifluoromethylphenyl)phenoxy]-3,3,3',3'-tetramethyl-1,1'-spirobiindan;

BE): 2,2-bis[4-(3-aminophenoxy)phenyl]propane

Dicarboxylic dihalides: (represented by the following symbols of AW) to AZ) in the tables)

AW): terephthalic dichloride;

AX): isophthalic dichloride;

AY): 4,4'-biphenyldicarboxylic dichloride;

AZ): 2,2-bis(4-chloroformylphenyl)-1,1,1,3,3,3-hexafluoropropane.

Preparation processes for polyamides

The preparation processes for the polyamides used in these examples and comparative examples, but this invention is not limited to these specific processes.

Preparation Examples 95 to 123

Into a vessel equipped with an agitator and a nitrogen inlet tube were charged and dissolved a diamine and N-methyl-2-pyrrolidone (NMP) in the amount shown in Table 22, then 12.14 g of triethylamine (0.12 mol) was added, and the mixture was cooled to 5° C. Then with more vigorous agitation, a dicarboxylic dihalide in the amount shown in Table 22 (0.05 mol) was added to the mixture, and the stirring was continued at room temperature for 3 hours. The resulting viscous polymer solution was poured into 1 liter of methanol, to give a white powder. The powder was filtered, washed with 1 liter of methanol and dried under a reduced pressure at 180° C. for 12 hours, to give a polyamide powder. The yield, the logarithmic viscosity, the glass-transition temperature and the 5% weight-loss temperature for each of the polyamide powder after polymerization are shown in Table 22. The polyamide powder obtained was cast on a glass plate, and then it was heated at 100° C. for 30 min, at 200° C. for 30 min and at 250° C. for 1 hour to give a polyamide film.

TABLE 22

| | Diamine | | Dicarboxylic dihalides | | | Polymer | | | |
|---|---|---|---|---|---|---|---|---|---|
| Prep. Ex. | Compd | Amount (g) | Compd | Amount (g) | NMP (g) | Yield (%) | $\eta_{inh}$ (dl/g) | Tg (° C.) | $Td_5$ (° C.) |
| 95 | A) | 24.53 | AY) | 18.96 | 131 | 96.8 | 1.11 | 215 | 502 |
| 96 | A) | 24.53 | AZ) | 21.45 | 138 | 95.5 | 1.05 | 205 | 499 |
| 97 | B) | 24.53 | AY) | 18.98 | 131 | 94.8 | 0.95 | 212 | 507 |
| 98 | B) | 24.53 | AZ) | 21.45 | 138 | 94.4 | 1.08 | 203 | 506 |
| 99 | C) | 28.74 | AW) | 10.15 | 117 | 98.0 | 0.88 | 208 | 510 |
| 100 | C) | 28.74 | AX) | 10.15 | 117 | 94.9 | 1.20 | 198 | 503 |
| 101 | D) | 35.13 | AW) | 10.15 | 136 | 95.5 | 1.05 | 205 | 506 |
| 102 | D) | 35.13 | AX) | 10.15 | 136 | 94.3 | 1.20 | 196 | 505 |
| 103 | E) | 38.94 | AW) | 10.15 | 147 | 97.0 | 0.95 | 204 | 502 |
| 104 | E) | 38.94 | AX) | 10.15 | 147 | 96.6 | 1.08 | 192 | 510 |
| 105 | A) | 24.53 | AY) | 9.48 | 134 | 97.5 | 0.93 | 207 | 504 |
| | | | AZ) | 10.73 | | | | | |
| 106 | A) | 12.27 | AZ) | 21.45 | 138 | 97.2 | 1.03 | 203 | 505 |
| | B) | 12.27 | | | | | | | |
| 107 | A) | 24.53 | AX) | 10.15 | 138 | 95.2 | 0.91 | 229 | 501 |
| 108 | A) | 24.53 | AW) | 10.15 | 138 | 95.1 | 0.90 | 235 | 495 |
| 109 | B) | 24.53 | AX) | 10.15 | 138 | 94.4 | 0.88 | 251 | 496 |
| 111 | B) | 24.53 | AW) | 10.15 | 138 | 94.8 | 0.82 | 272 | 490 |
| 112 | A) | 24.53 | AX) | 5.07 | 138 | 96.3 | 0.85 | 230 | 500 |
| | | | AW) | 5.07 | | | | | |
| 113 | A) | 12.27 | AX) | 10.15 | 138 | 96.9 | 0.88 | 242 | 496 |

TABLE 22-continued

|  | Diamine | | Dicarboxylic dihalides | | | Polymer | | | |
|---|---|---|---|---|---|---|---|---|---|
| Prep. Ex. | Compd | Amount (g) | Compd | Amount (g) | NMP (g) | Yield (%) | $\eta_{inh}$ (dl/g) | Tg (° C.) | Td$_5$ (° C.) |
|  | B) | 12.27 |  |  |  |  |  |  |  |
| 114 | BA) | 35.13 | AY) | 18.96 | 150 | 96.2 | 1.02 | 220 | 500 |
| 115 | BA) | 35.13 | AZ) | 21.45 | 157 | 95.8 | 1.01 | 210 | 496 |
| 116 | BB) | 28.74 | AW) | 10.15 | 117 | 98.0 | 0.88 | 208 | 510 |
| 117 | BB) | 28.74 | AX) | 10.15 | 117 | 94.9 | 1.20 | 198 | 503 |
| 118 | BC) | 35.13 | AW) | 10.15 | 136 | 95.5 | 1.05 | 205 | 506 |
| 119 | BC | 35.13 | AX) | 10.15 | 136 | 94.3 | 1.20 | 196 | 505 |
| 120 | BD) | 38.94 | AW) | 10.15 | 147 | 97.0 | 0.95 | 204 | 502 |
| 121 | BD) | 38.94 | AX) | 10.15 | 147 | 96.6 | 1.08 | 192 | 510 |
| 122 | BA) | 31.05 | AY) | 18.39 | 149 | 96.3 | 0.55 | 219 | 500 |
| 123 | BA) | 31.05 | AY) | 17.82 | 148 | 94.8 | 0.39 | 217 | 497 |

The copolymerization ratio for a copolymer is 5/5 (mol/mol).

Comparative Preparation Examples 25 to 33

For each of these examples, a polyamide powder was prepared from a diamine, N-methyl-2-pyrrolidone, triethylamine and dicarboxylic dihalide in the amounts shown in Table 23, as described in Preparation Examples 95 to 123. The physical properties for these polyamide powders are also shown in Table 23. Furthermore, films were formed from these polyamide powders as described in Preparation Examples 95 to 123.

TABLE 23

|  | Diamine | | Acid derivative | | | | Polymer | | | |
|---|---|---|---|---|---|---|---|---|---|---|
| Com. Prep. Ex. | Compd. | Amt. (g) | Compd. | Amt. (g) | Triethylamine (g) | NMP (g) | Yield (%) | $\eta_{inh}$ (dl/g) | Tg (° C.) | Td$_5$ (° C.) |
| 25 | K) | 2.453 | AY) | 1.396 | 1.214 | 11.5 | 95.5 | 0.92 | 214 | 502 |
| 26 | L) | 20.53 | AY) | 13.96 | 12.14 | 103 | 98.0 | 1.05 | 210 | 488 |
| 27 | L) | 20.53 | AZ) | 21.46 | 12.14 | 126 | 97.5 | 0.89 | 202 | 499 |
| 28 | M) | 14.62 | AW) | 10.15 | 12.14 | 74 | 96.8 | 0.93 | 218 | 502 |
| 29 | M) | 14.62 | AX) | 10.15 | 12.14 | 74 | 98.4 | 0.97 | 205 | 501 |
| 30 | M) | 14.62 | AY) | 13.96 | 12.14 | 86 | 97.2 | 1.05 | 211 | 508 |
| 31 | M) | 14.62 | AZ) | 21.46 | 12.14 | 108 | 94.0 | 1.08 | 203 | 504 |
| 32 | BE) | 20.53 | AY) | 21.45 | 12.14 | 103 | 98.0 | 1.05 | 210 | 488 |
| 33 | BE) | 20.53 | AY) | 10.15 | 12.14 | 126 | 97.5 | 0.89 | 202 | 499 |

Preparation Examples 124 to 126

Into a vessel equipped with an agitator and a nitrogen inlet tube were charged and dissolved a diamine and N,N-dimethylacetamide (N,N-DMAc) in the amounts shown in Table 24, then 1.53 g of benzoyl chloride was added, and the mixture was cooled to 0° C. Then with more vigorous agitation, a dicarboxylic dihalide in the amount shown in Table 24 was added to the mixture, and the stirring was continued at room temperature for 3 hours. The resulting viscous polymer solution was poured into 1 liter of methanol, to give a white powder. The powder was filtered, washed with 1 liter of methanol and dried under a reduced pressure at 180° C. for 12 hours, to give a polyamide powder. The yield, the logarithmic viscosity, the glass-transition temperature and the 5% weight-loss temperature for each of the polyamide powders after polymerization are shown in Table 24.

Comparative Preparation Examples 35 and 36

For each of these examples, a polyamide powder was prepared from a diamine, N,N-dimethylacetamide (N,N-DMAc) and dicarboxylic dihalide in the amounts shown in Table 25, and also 1.53 g of benzoyl chloride, as described in Preparation Examples 124 to 126. The physical properties for these polyamide powders are also shown in Table 25.

TABLE 24

|  | Diamine | | Acid derivative | | | Polymer | | |
|---|---|---|---|---|---|---|---|---|
| Prep. Ex. | Compd | Amount (g) | Compd | Amount (g) | N,N-DMAc (g) | $\eta_{inh}$ (dl/g) | Tg (° C.) | Td$_5$ (° C.) |
| 124 | A) | 49.07 | AZ) | 41.20 | 271 | 0.44 | 218 | 495 |
| 125 | B) | 49.07 | AZ) | 41.20 | 271 | 0.45 | 207 | 499 |
| 126 | A) | 24.53 | AZ) | 41.20 | 271 | 0.47 | 207 | 493 |
|  | B) | 24.53 |  |  |  |  |  |  |

TABLE 25

| Com. Prep. Ex. | Diamine Compd. | Amt. (g) | Acid derivative Compd. | Amt. (g) | N,N-DMAc (g) | Polymer $\eta_{inh}$ (dl/g) | Tg (° C.) | $Td_5$ (° C.) |
|---|---|---|---|---|---|---|---|---|
| 34 | L) | 41.06 | AZ) | 41.20 | 247 | 0.42 | 203 | 502 |
| 35 | M) | 29.23 | AW) | 19.49 | 146 | 0.47 | 215 | 501 |
| 36 | N) | 29.23 | AX) | 19.49 | 146 | 0.45 | 210 | 498 |

Evaluation procedure of a film

The films obtained in Preparation Examples 95 to 123 and Comparative Preparation Examples 25 to 33 were evaluated as was in the above polyimide.

Examples 234 to 261

The films obtained in Preparation Examples 95 to 123 were evaluated for appearance, a total light transmittance, a birefringence and heat resistance. The results are shown in Tables 26 and 27.

TABLE 26

| Ex. | Prep. Ex. | Appearance | Total light transmittance (%) | Birefringence (nm) | Heat resistance |
|---|---|---|---|---|---|
| 234 | 95 | ○ | 86 | 9 | ○ |
| 235 | 96 | ○ | 84 | 8 | ○ |
| 236 | 97 | ○ | 85 | 9 | ○ |
| 237 | 98 | ○ | 85 | 7 | ○ |
| 238 | 99 | ○ | 87 | 8 | ○ |
| 239 | 100 | ○ | 86 | 10 | Δ |
| 240 | 101 | ○ | 84 | 9 | ○ |
| 241 | 102 | ○ | 87 | 6 | Δ |
| 242 | 103 | ○ | 82 | 8 | ○ |
| 243 | 104 | ○ | 87 | 8 | Δ |
| 244 | 105 | ○ | 88 | 8 | ○ |
| 245 | 106 | ○ | 86 | 9 | ○ |
| 246 | 107 | ○ | 90 | 9 | ○ |
| 247 | 108 | ○ | 89 | 7 | ○ |
| 248 | 109 | ○ | 87 | 9 | ○ |
| 249 | 111 | ○ | 88 | 8 | ○ |
| 250 | 112 | ○ | 87 | 10 | ○ |
| 251 | 113 | ○ | 90 | 10 | ○ |

TABLE 27

| Ex. | Appearance | Total light trans-mittance(%) | Birefri-ng-ence(nm) | Heat resistance |
|---|---|---|---|---|
| 252 | ○ | 87 | 8 | ○ |
| 253 | ○ | 87 | 7 | ○ |
| 254 | ○ | 87 | 8 | ○ |
| 255 | ○ | 86 | 10 | Δ |
| 256 | ○ | 84 | 9 | ○ |
| 257 | ○ | 87 | 6 | Δ |
| 258 | ○ | 82 | 8 | ○ |
| 259 | ○ | 87 | 8 | Δ |
| 260 | ○ | 86 | 8 | ○ |
| 261 | ○ | 85 | 9 | Δ |

Comparative Examples 37 to 45

The films obtained in Comparative Preparation Examples 25 to 33 were evaluated as in Examples 234 to 261. The results are shown in Table 28.

TABLE 28

| Comp. Ex. | Comp. Prep. Ex. | Appearance | Total light transmittance (%) | Birefringence (nm) | Heat resistance |
|---|---|---|---|---|---|
| 37 | 25 | ○ | 85 | 54 | ○ |
| 38 | 26 | ○ | 85 | 58 | ○ |
| 39 | 27 | ○ | 86 | 42 | ○ |
| 40 | 28 | ○ | 86 | 56 | ○ |
| 41 | 29 | ○ | 86 | 60 | ○ |
| 42 | 30 | ○ | 84 | 58 | ○ |
| 43 | 31 | ○ | 87 | 44 | ○ |
| 44 | 32 | ○ | 85 | 58 | ○ |
| 45 | 33 | ○ | 86 | 42 | ○ |

As shown in Tables 26 to 27, an organic optical component formed from the polyamide resin of this invention has excellent transparency, heat resistance and mechanical strength, and has a lower birefringence than a conventional polyamide component.

Preparation and evaluation of an optical disk

Examples 262 to 264

Optical disks were formed and evaluated as in the above procedure for an optical disk from a polyimide, except that each of the polyamide powders obtained in Preparation Examples 124 to 126 was formed into a strand with a melting extruder (melting temperature: 350° C.). The results are shown in Table 29.

Comparative Examples 46 to 48

Optical disks from the polyamide powders obtained in Comparative Preparation Examples 34 to 36 were formed and evaluated, as in Examples 262 to 264. The results are shown in Table 29 together with those for Examples 260 to 262.

TABLE 29

| Ex./Comp.Ex. | Prep.Ex./Comp.Prep.Ex. | Birefringence (And single pulse) (nm) | BER (bit error rate) |
|---|---|---|---|
| Ex.262 | Prep.Ex.124 | 5 | $6 \times 10^{-6}$ |
| Ex.263 | Prep.Ex.125 | 6 | $7 \times 10^{-6}$ |
| Ex.264 | Prep.Ex.126 | 5 | $7 \times 10^{-6}$ |
| Comp.Ex. 46 | Comp.Prep. Ex.34 | 23 | $6 \times 10^{-4}$ |
| Comp.Ex. 47 | Comp.Prep. Ex.35 | 25 | $5 \times 10^{-4}$ |
| Comp.Ex. 48 | Comp.Prep. Ex.36 | 26 | $7 \times 10^{-4}$ |

As shown in Table 29, an optical disk prepared from the polyamide of this invention is improved for a BER, compared with one from any of the polyamides of the comparative examples, because of reduction in a birefringence.

Preparation and evaluation of a magneto-optical disk

Examples 265 to 267

Magneto-optical disks were formed and evaluated as in the above procedure for a magneto-optical disk from a polyimide, except that each of the polyamide powders obtained in Preparation Examples 124 to 126 was formed into a strand with a melting extruder (melting temperature: 350° C.). The results are shown in Table 30.

Comparative Examples 49 to 51

Magneto-optical disks from the polyamide powders obtained in Comparative Preparation Examples 34 to 36 were formed and evaluated, as in Examples 265 to 267. The results are shown in Table 30 together with those for Examples 263 to 265.

TABLE 30

| Ex./ Comp. Ex. | Prep. Ex./ Comp. Prep. Ex. | Birefringence (And single pulse) (nm) | CN (dB) | BER (bit error rate) | CN retention (%) |
|---|---|---|---|---|---|
| Ex. 265 | Prep. Ex. 124 | 8 | 59 | 7 × 10⁻⁶ | 91 |
| Ex. 266 | Prep. Ex. 125 | 8 | 56 | 7 × 10⁻⁶ | 94 |
| Ex. 267 | Prep. Ex. 126 | 7 | 57 | 8 × 10⁻⁶ | 95 |
| Comp. Ex. 49 | Comp. Prep. Ex. 34 | 28 | 45 | 5 × 10⁻⁴ | 84 |
| Comp. Ex. 50 | Comp. Prep. Ex. 35 | 25 | 44 | 3 × 10⁻⁴ | 83 |
| Comp. Ex. 51 | Comp. Prep. Ex. 36 | 27 | 45 | 4 × 10⁻⁴ | 82 |

As shown in Table 30, a magneto-optical disk prepared from the polyamide of this invention is improved for a CN ratio, a BER and CN retention, compared with one from any of the polyamides of the comparative examples, because of reduction in a birefringence.

The novel polyimide of this invention will be described by examples although this invention is not limited to these examples. In the following examples and comparative examples, the diamines and the tetracarboxylic dianhydrides used are as follows. In the tables for these preparation examples, "acid anhydride" means a tetracarboxylic dianhydride; "$\eta_{inh}$" means a logarithmic viscosity; "Tg" means a glass-transition temperature; and "$Td_5$" means a 5% weight-loss temperature in the air.

The evaluation conditions for the polyimides of the following examples and comparative examples are as follows;

$T_g$; determined with DSC (DSC 3100; Mac Science);

$Td_5$; determined in the air, with DTG (TG-DTA2000; Mac Science);

Melting initiation temperature; determined with Shimazu Koka Flow Tester (CFT500A) under the conditions; load: 100 kg, warming rate: 5° C./min;

Melt viscosity; determined with Shimazu Koka Flow Tester (CFT500A) with a load of 100 kg;

Dielectric constant; determined according to ASTM D150-87;

Film mechanical properties; determined according to ASTM D-822;

Saturation coefficient of moisture absorption; determined after leaving a material under the conditions: temperature: 23° C., humidity: 85%;

Yellowness index; determined with a direct-reading color difference computer (DEC-SCH3 model; Suga Shikenki Co., Ltd.), by a transmission method according to JISK-7103;

Light transmittance; determined with a recording spectrophotometer (Hitachi 3400 model);

Coefficient of linear expansion; determined with TMA4000 (MacScience);

Logarithmic viscosity; determined as a 0.5 g/100 mL solution of a polyamic acid in N,N-dimethylacetamide or of a polyimide in a mixture of p-chlorophenol/phenol (9/1 by weight) at 35° C.;

Solvent solubility; evaluated by adding a polyimide powder into each solvent in a concentration of 20 wt %, and stirring at room temperature.

Example 268

To a vessel equipped with an agitator, a reflux condenser and a nitrogen inlet tube were charged 24.53 g of 6,6'-bis (4-aminophenoxy)-3,3,3',3'-tetramethyl-1,1'-spirobiindan (0.05 mol), 14.42 g of 3,3',4,4'-biphenyltetracarboxylic dianhydride (0.048 mol), 0.592 g of phthalic anhydride (0.004 mol), 0.70 g of γ-picoline and 155.8 g of m-cresol, and the mixture was heated with stirring to 150° C., and the reaction was continued at 150° C. for additional 4 hours, while about 1.8 mL of distilled water was observed. At the end of the reaction, the mixture was cooled to room temperature and poured into about 1 liter of methyl ethyl ketone, and the polyimide powder generated was filtered. The polyimide powder was washed with methyl ethyl ketone, dried at 50° C. for 24 hours in the air, at 220° C. for 4 hours in an atmosphere of nitrogen, to give 35.92 g of polyimide powder (Yield: 95.2%). The polyimide obtained had a logarithmic viscosity of 0.42 dL/g. Its $T_g$ was observed at 260° C. In other words, the polyimide powder of this invention was essentially amorphous. This polyimide powder indicated $Td_5$ at 500° C. FIG. 1 is the IR spectrum of the polyimide powder, indicating marked absorptions around 1780 cm⁻¹ and 1720 cm−1, characteristic absorption bands for an imide group. The polyimide showed the following results of elemental analysis.

Calculated (%) C: 78.58, H: 4.86, N: 3.74; Observed (%) C: 77.51, H: 4.99, N: 3.65.

Figure 2:
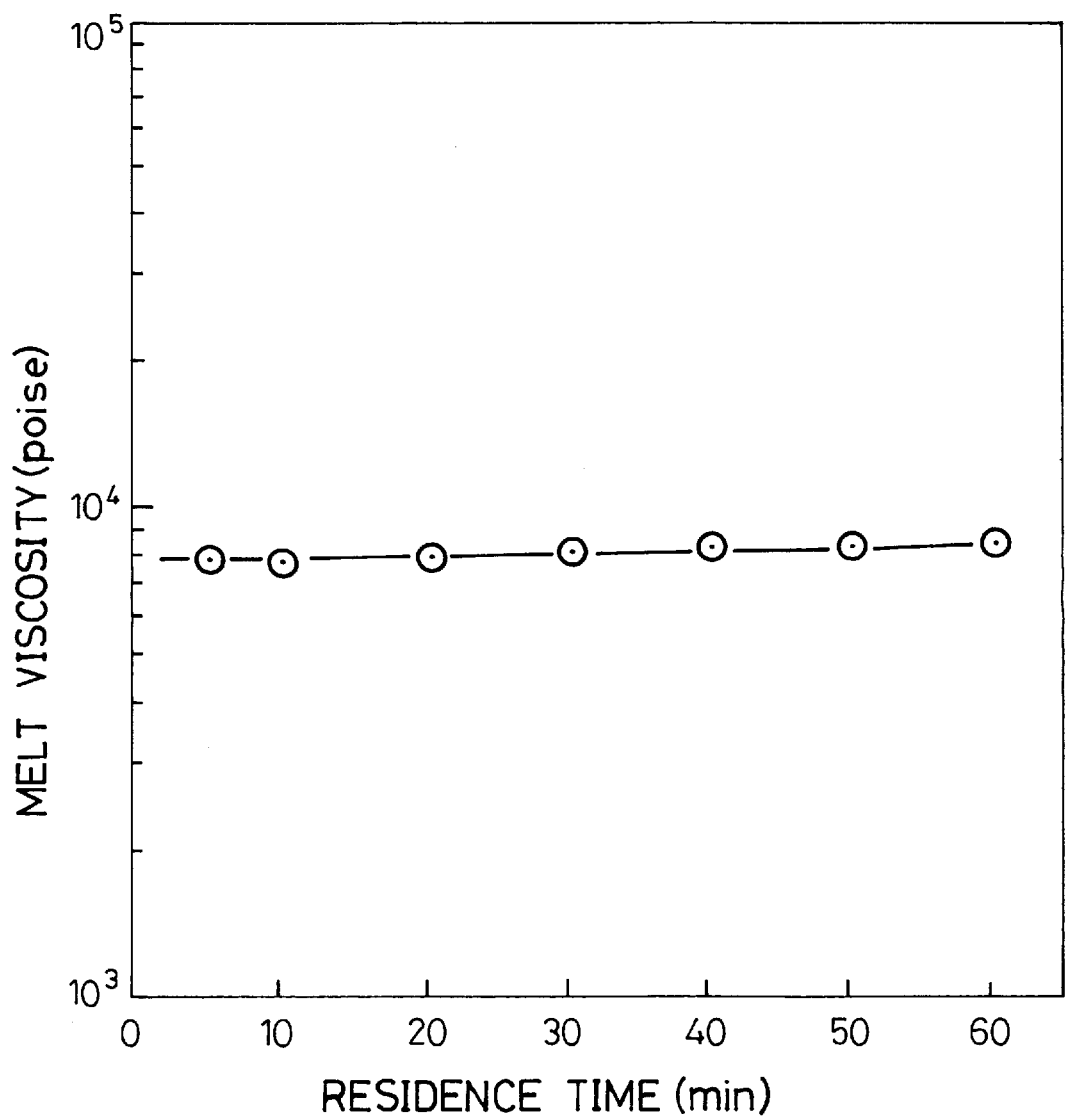
FIG. 2 is a graph for relationship between the residence time at 350° C. and the melt viscosity of the polyimide powder obtained in Example 266.

In measuring a flow initiation temperature of the polyimide powder with the Koka Flow Tester, flow was observed at 335° C. Its melt viscosity was 7800 poise at 380° C. and with a residence time of 5 min. Furthermore, its molding stability was determined, varying a residence time of the Flow Tester in the cylinder. The results at 380° C. and with a load of 100 kg are shown in FIG. 2. From the results, increase in the residence time in the cylinder caused little variation in the melt viscosity, indicating that the polyimide has good molding stability.

The polyimide produced was different solvents such as chloroform, dichloroethane, 1,1,2-trichloroethane, 1,1,2,2-tetrachloroethane, N,N-dimethylformamide, N,N-dimethylacetamide, N-methyl-2-pyrrolidone, 1,3-dimethylimidazolidinone and m-cresol.

Examples 269 to 273

Different polyimide powders were prepared from the acid anhydrides shown in Table 31, as described in Example 266. Table 31 shows the acid anhydrides, yields and the results for basic physical properties such as a logarithmic viscosity, $T_g$ and $Td_5$, as well as the results for Example 268. Table 32 shows the results for their solvent solubilities.

TABLE 31

| Ex. | Acid anhydride | Yield (%) | $\eta_{inh}$ (dl/g) | $T_g$ (° C.) | $Td_5$ (° C.) | Flow initiation temp. (° C.) | Melt viscosity*⁶ (poise) |
|---|---|---|---|---|---|---|---|
| 268 | BPDA*¹ | 95.2 | 0.42 | 260 | 500 | 335 | 7800 |
| 269 | PMDA*² | 96.5 | 0.41 | 286 | 511 | 350 | 6300 |
| 270 | BTDA*³ | 97.3 | 0.49 | 259 | 506 | 335 | 9400 |
| 271 | ODDA*⁴ | 93.8 | 0.43 | 244 | 516 | 315 | 8100 |
| 272 | 6FDA*⁵ | 95.1 | 0.48 | 262 | 499 | 330 | 6900 |

TABLE 31-continued

| Ex. | Acid anhydride | Yield (%) | $\eta_{inh}$ (dl/g) | $T_g$ (° C.) | $Td_5$ (° C.) | Flow initiation temp. (° C.) | Melt viscosity*6 (poise) |
|---|---|---|---|---|---|---|---|
| 273 | BPDA/ PMDA (= 5/5) | 95.5 | 0.45 | 273 | 508 | 340 | 7000 |

*1 3.3',4,4'-biphenyltetracarboxylic dianhydride
*2 pyromellitic dianhydride
*3 3.3',4,4'-benzophenonetetracarboxylic dianhydride
*4 3.3',4,4'-diphenyl ether tetracarboxylic dianhydride
*5 2,2-bis(3,4-dicarboxyphenyl)-1,1,1,3,3,3-hexafluoropropane dianhydride
*6 determined at 380° C.

TABLE 32

| Example | 268 | 269 | 270 | 271 | 272 | 273 |
|---|---|---|---|---|---|---|
| chloroform | ○ | ○ | ○ | ○ | ○ | ○ |
| dichloromethane | ○ | ○ | ○ | ○ | ○ | ○ |
| 1,1,2-trichloroethane | ○ | ○ | ○ | ○ | ○ | ○ |
| 1,1,2,2-tetrachloroethane | ○ | ○ | ○ | ○ | ○ | ○ |
| N,N-dimethylformamide | ○ | ○ | ○ | ○ | ○ | ○ |
| N,N-dimethylacetamide | ○ | ○ | ○ | ○ | ○ | ○ |
| N-methyl-2-pyrrolidone | ○ | ○ | ○ | ○ | ○ | ○ |
| 1,3-dimethylimidazolidinone | ○ | ○ | ○ | ○ | ○ | ○ |
| m-cresol | ○ | ○ | ○ | ○ | ○ | ○ |
| tetrahydrofuran | Δ | X | Δ | ○ | ○ | Δ |
| diglyme | Δ | X | Δ | ○ | ○ | X |
| methyl ethyl ketone | X | X | X | Δ | Δ | X |
| methyl isobutyl ketone | X | X | X | Δ | Δ | X |
| methylcellosolve | Δ | X | Δ | Δ | ○ | X |
| ethylcellosolve | Δ | X | Δ | Δ | ○ | X |
| methylcellosolve acetate | Δ | X | Δ | Δ | ○ | Δ |
| toluene | X | X | X | Δ | Δ | X |
| xylene | X | X | X | Δ | Δ | X |
| isopropyl alcohol | X | X | X | X | X | X |

○: soluble, X: insoluble, Δ: partially soluble or gel

Example 274

Into a vessel equipped with an agitator, a reflux condenser and a nitrogen inlet tube were charged 34.35 g of 6,6'-bis (4-aminophenoxy)-3,3,3',3'-tetramethyl-1,1'-spirobiindan (0.07 mol) and 152.71 g of N,N-dimethylacetamide, and then being careful to avoid temperature rise, was added 31.10 g of 2,2-bis(3,4-dicarboxyphenyl)-1,1,1,3,3,3-hexafluoropropane dianhydride at room temperature in an atmosphere of nitrogen. The solution was stirred for about 30 hours at room temperature in an atmosphere of nitrogen to produce a polyamic acid varnish, whose logarithmic viscosity was 1.45 dL/g. The polyamic acid varnish was applied on a glass plate, and then it was heated at 100° C. for 1 hour, at 200° C. for 1 hour and at 250° C. for 2 hour in an atmosphere of nitrogen, to give a polyimide film. The physical properties of the polyimide film were as follows; $T_g$: 273° C., $Td_5$: 516° C., tensile strength: 12.63 kg/mm$^2$, elongation percentage: 3%, tensile modulus: 314 kg/mm$^2$, coefficient of moisture absorption (MA): 0.36%, yellowness index (YI): 13, light transmittance (T %): 88%, and linear expansion coefficient (LE): 34.0 ppm.

Examples 275 to 279

Different polyimide films were prepared from the acid anhydrides shown in Table 33, as described in Example 272. In Table 33, the basic physical properties as those for Example 274 are shown together with the results for Example 274.

Controls

The following several commercially available materials were selected as controls for evaluation as described in Example 274; polyimides: Kapton (DuPont), Upilex-S (Ube Industries), Ultem (GE), and other resins: polycarbonate (Teijin), polyether sulfone-PES (Mitsui Toatsu Chemicals). The results are also shown in Table 33.

TABLE 33

| | | | | | Mechanical Properties | | | | | | |
|---|---|---|---|---|---|---|---|---|---|---|---|
| Ex. | Acid anhydride | $\eta_{inh}$ dL/g | $T_g$ ° C. | $Td_5$ ° C. | TS kg/mm$^2$ | EL*1 % | TM*1 kg/mm$^2$ | MA*1 % | YI*2 | T %*3 | LE*6 ppm |
| 274 | 6FDA | 1.45 | 273 | 516 | 12.63 | 3 | 314 | 0.36 | 13 | 88 | 34.0 |
| 275 | BPDA | 1.30 | 268 | 528 | —*5 | — | — | 0.75 | 18 | 85 | 28.6 |
| 276 | PMDA | 0.97 | 290 | 523 | — | — | — | 0.79 | 22 | 83 | 20.7 |
| 277 | BTDA | 1.06 | 263 | 518 | — | — | — | 0.54 | 19 | 84 | 36.6 |
| 278 | 6FDA/ | 0.83 | 249 | 526 | 10.77 | 5 | 302 | 0.62 | 16 | 86 | 49.2 |
| 279 | ODDA | 1.22 | 259 | 530 | 11.26 | 4 | 310 | 0.46 | 15 | 88 | 39.8 |
| Controls | | | | | | | | | | | |
| Kapton | — | ND*4 | — | — | — | — | 1.98 | 128 | 13 | 16.8 |
| Upilex-S | — | ND*4 | — | — | — | — | 1.23 | 123 | 11 | 10.5 |
| Ultem | — | 218 | — | — | — | — | 1.07 | 13 | 84 | 67.8 |
| PES | — | 221 | — | — | — | — | 2.01 | 2 | 93 | 57.8 |
| Polycarbonate | — | 153 | — | — | — | — | 0.96 | 2 | 88 | UD*7 |

*1 TS: tensile strength, EL: elongation percentage, TM: tensile modulus
*2 yellowness index
*3 light transmittance at 550 nm
*4 not detected
*5 "—" indicates "not determined".
The other abbreviations are as in the previous table.
*6 linear expansion coefficient at 150° C.
*7 undetectable

Example 280

A polyimide powder was prepared as described in Example 268, using 24.53 g of 6,6'-bis(3-aminophenoxy)-3,3,3',3'-tetramethyl-1,1'-spirobiindan (0.05 mol) as a diamine, 21.77 g of 2,2-bis(3,4-dicarboxyphenyl)-1,1,1,3,3,3-hexafluoropropane dianhydride (0.048 mol) as an acid anhydride, 0.592 g of phthalic anhydride (0.004 mol), 0.70 g of γ-picoline and 185.2 g of m-cresol.

Figure 3:
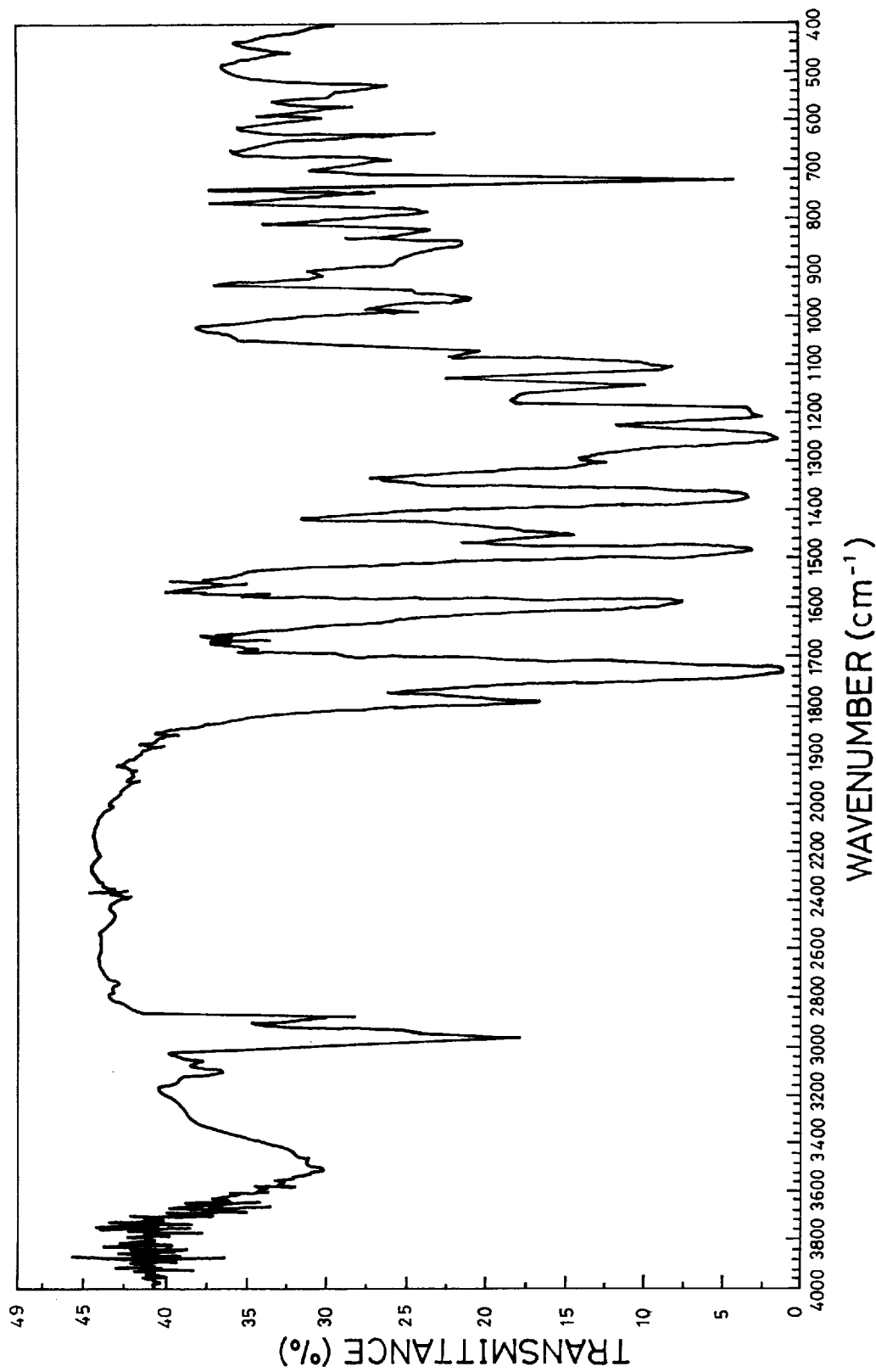
FIG. 3 shows an IR spectrum for the polyimide obtained in Example 278.

The polyimide obtained had a logarithmic viscosity of 0.58 dL/g. Its $T_g$ was observed at 222° C. In other words, the polyimide powder of this invention was essentially amorphous. This polyimide powder indicated $Td_5$ at 514° C. FIG. 3 is the IR spectrum of the polyimide powder, indicating marked absorptions around 1780 cm$^{-1}$ and 1720 cm$^{-1}$, characteristic absorption bands for an imide group. The polyimide showed the following results of elemental analysis.

Calculated (%) C: 69.48, H: 4.04, N: 3.12, F: 12.68; Observed (%) C: 68.88, H: 3.96, N: 3.29, F: 12.98.

In measuring a flow initiation temperature of the polyimide powder with the Koka Flow Tester, flow was observed at 295° C. Its melt viscosity was 12800 poise at 350° C. and with a residence time of 5 min. Furthermore, its molding stability was determined, varying a residence time of the Flow Tester in the cylinder. The results at 350° C. and with a load of 100 kg are shown in FIG. 4. From the results, increase in the residence time in the cylinder caused little variation in the melt viscosity, indicating that the polyimide has good molding stability.

The polyimide produced was different solvents such as chloroform, dichloroethane, 1,1,2-trichloroethane, 1,1,1-trichloroethane, N,N-dimethylformamide, N,N-dimethylacetamide, N-methyl-2-pyrrolidone, 1,3-dimethylimidazolidinone, m-cresol, tetrahydrofuran, diglyme, acetone, methyl ethyl ketone, methyl isobutyl ketone, methylcellosolve, ethylcellosolve, methylcellosolve acetate, toluene, xylene, ethyl acetate and butyl acetate.

Examples 281 to 285

Different polyimide powders were prepared from the acid anhydrides shown in Table 34, as described in Example 278. Table 34 shows the acid anhydrides, yields and the results for basic physical properties such as a logarithmic viscosity, $T_g$, $Td_5$ and melt flow property as well as the results for Example 280. Table 35 shows the results for their solvent solubilities.

TABLE 35

| Example | 280 | 281 | 282 | 283 | 284 | 285 |
|---|---|---|---|---|---|---|
| chloroform | ○ | ○ | ○ | ○ | ○ | ○ |
| dichloromethane | ○ | ○ | ○ | ○ | ○ | ○ |
| 1,1,2-trichloroethane | ○ | ○ | ○ | ○ | ○ | ○ |
| 1,1,1-trichloroethane | ○ | ○ | ○ | ○ | ○ | ○ |
| N,N-dimethylformamide | ○ | ○ | ○ | ○ | ○ | ○ |
| N,N-dimethylacetamide | ○ | ○ | ○ | ○ | ○ | ○ |
| N-methyl-2-pyrrolidone | ○ | ○ | ○ | ○ | ○ | ○ |
| 1,3-dimethylimidazolidinone | ○ | ○ | ○ | ○ | ○ | ○ |
| m-cresol | ○ | ○ | ○ | ○ | ○ | ○ |
| tetrahydrofuran | ○ | Δ | ○ | ○ | ○ | ○ |
| diglyme | ○ | Δ | Δ | ○ | ○ | ○ |
| acetone | ○ | X | Δ | ○ | Δ | Δ |
| methyl ethyl ketone | ○ | X | Δ | ○ | Δ | Δ |
| methyl isobutyl ketone | ○ | X | Δ | ○ | Δ | ○ |
| methylcellosolve | ○ | X | Δ | ○ | ○ | ○ |
| ethylcellosolve | ○ | X | Δ | ○ | ○ | ○ |
| methylcellosolve acetate | ○ | X | Δ | ○ | ○ | ○ |
| toluene | ○ | X | X | ○ | ○ | ○ |
| xylene | ○ | X | X | ○ | ○ | ○ |
| ethyl acetate | ○ | X | X | ○ | ○ | ○ |
| butyl acetate | ○ | X | X | ○ | ○ | ○ |
| isopropyl alcohol | X | X | X | X | X | X |

○: soluble, X: insoluble, Δ: partially soluble or gel

Example 286

A polyamic acid varnish was prepared as described in Example 272, using 34.35 g of 6,6'-bis(3-aminophenoxy)-3,3,3',3'-tetramethyl-1,1'-spirobiindan (0.07 mol) as a diamine, 31.10 g of bis(3,4-dicarboxyphenyl)-1,1,1,3,3,3-hexafluoropropane dianhydride as an acid anhydride, and 121.55 g of N,N-dimethylacetamide. The polyamic acid varnish obtained had a logarithmic viscosity of 0.45 dL/g.

A polyimide film was prepared from the polyamic acid, as described in Example 272, whose $T_g$ and $Td_5$ were 221° C. and 520° C., respectively. The polyimide film was evaluated as in Example 272, giving the results shown in Table 36.

TABLE 34

| Ex. | Acid anhydride | Yield (%) | η$_{inh}$ (dl/g) | $T_g$ (° C.) | $Td_5$ (° C.) | Flow initiation temp. (° C.) | Melt viscosity*[6] (poise) |
|---|---|---|---|---|---|---|---|
| 280 | 6FDA*[1] | 95.8 | 0.58 | 222 | 514 | 295 | 12800 |
| 281 | P2FDA*[2] | 96.3 | 0.45 | 248 | 494 | 315 | 24000 |
| 282 | P6FDA*[3] | 94.8 | 0.48 | 251 | 503 | 315 | 21400 |
| 283 | 10FEDA*[4] | 95.1 | 0.55 | 203 | 507 | 280 | 8400 |
| 284 | 6FBisADA*[5] | 96.3 | 0.43 | 182 | 516 | 255 | 7500 |
| 285 | 6FDA/P6FDA (= 5/5) | 95.0 | 0.52 | 238 | 511 | 305 | 15100 |

*[1]2,2-bis(3,4-dicarboxyphenyl)-1,1,1,3,3,3-hexafluoropropane dianhydride
*[2]1,4-difluoropyromellitic dianhydride
*[3]1,4-bis(trifluoromethyl)pyromellitic dianhydride
*[4]1,4-bis(3,4-dicarboxytrifluorophenoxy)tetrafluorobenzene dianhydride
*[5]2,2-bis[4-(3,4-dicarboxyphenoxy)benzene]-1,1,1,3,3,3-hexafluoropropane dianhydride
*[6]determined at 350° C.

Examples 287 to 291

Different polyimide films were prepared from the acid anhydrides shown in Table 36, as described in Example 286. In Table 36, the basic physical properties as those for Example 285 are shown together with the results for Example 285.

Controls

The following several commercially available materials were selected as controls for evaluation as described in Example 285; polyimides: Kapton (DuPont), Upilex-S (Ube Industries), Ultem (GE), and other resins: polycarbonate (Teijin), polyether sulfone-PES (Mitsui Toatsu Chemicals). The results are also shown in Table 36.

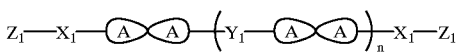

(1)

wherein ring A represents a monocyclic or polycyclic organic group, wherein two ring As are mutually bound via a spiro bond to form a spiro ring which has a molecular asymmetric structure; n is an integer of 0 to 10; $X_1$ is binding group independently selected from the group consisting of a single bond, —O—, —S— —NR'—, —SO$_2$—, —COO—, —OCO—, —CONR'—, —NR'CO—, —X$_{11}$R—X$_{11}$—,

TABLE 36

| Ex. | Acid anhydride | Mechanical Properties*1 | | | | | |
|-----|---------|------|------|------|------|------|------|
| | | ηinh (dL/g) | Tg (° C.) | Td$_s$ (° C.) | TS kg/mm² | EL % | TM kg/mm² |
| 286 | 6FDA | 0.45 | 221 | 520 | 9.12 | 4 | 278 |
| 287 | P2FDA | 0.55 | 253 | 504 | 11.30 | 5 | 318 |
| 288 | P6FDA | 0.44 | 249 | 505 | 10.95 | 5 | 325 |
| 289 | 10FEDA | 0.48 | 209 | 511 | 8.95 | 7 | 294 |
| 290 | 6FBisADA | 0.47 | 190 | 521 | 9.57 | 6 | 286 |
| 291 | 6FDA/P6FDA (=5/5) | 0.50 | 239 | 519 | 10.16 | 5 | 305 |
| Controls | | | | | | | |
| Kapton | | — | ND*4 | — | —*5 | — | — |
| Upilex-S | | — | — | — | — | — | — |
| Ultem | | — | 218 | — | — | — | — |
| PES | | — | 221 | — | — | — | — |
| Polycarbonate | | — | 153 | — | — | — | — |

| Ex. | Acid anhydride | Dielectric constant | | | MA*6 (%) | YI*2 | T%*3 | LE*7 (ppm) |
|-----|---------|------|------|------|------|------|------|------|
| | | 60Hz | 30kHz | 1MHz | | | | |
| 286 | 6FDA | 2.95 | 2.92 | 2.89 | 0.51 | 8 | 89 | 51.0 |
| 287 | P2FDA | 3.03 | 3.00 | 2.97 | 0.74 | 12 | 85 | 24.5 |
| 288 | P6FDA | 2.94 | 2.91 | 2.89 | 0.46 | 11 | 86 | 21.3 |
| 289 | 10FEDA | 2.94 | 2.92 | 2.88 | 0.42 | 7 | 90 | 64.6 |
| 290 | 6FBisADA | 3.06 | 3.04 | 3.02 | 0.85 | 10 | 88 | 59.2 |
| 291 | 6FDA/ODDA (=5/5) | 2.94 | 2.92 | 2.90 | 0.55 | 9 | 89 | 30.6 |
| Controls | | | | | | | | |
| Kapton | | 3.59 | 3.57 | 3.55 | 1.98 | 128 | 13 | 16.8 |
| Upilex-S | | 3.84 | 3.82 | 3.79 | 1.23 | 123 | 11 | 10.5 |
| Ultem | | 3.21 | 3.19 | 3.16 | 1.07 | 13 | 84 | 67.8 |
| PES | | 3.50 | 3.47 | 3.45 | 2.01 | 2 | 93 | 57.8 |
| Polycarbonate | | 3.36 | 3.34 | 3.31 | 0.96 | 2 | 88 | UD*8 |

*1: TS: tensile strength, EL: elongation percentage, TM: tensile modulus
*2: yellowness index
*3: light transmittance at 550 nm
*4: not detected
*5: "—" indicates "not determined". The other abbreviations are as in the previous table.
*6: coefficient of moisture absorption
*7: linear expansion coefficient at 150° C.
*8: undetectable As indicated above, this invention can provide an optical component which has excellent transparency, mechanical strength and heat resistance, as well as a low birefringence.

What is claimed is:

1. A low-birefringent organic optical component, comprising a polymer prepared by polymerizing a racemic mixture of a monomer with an asymmetric spiro ring represented by Formula (1), as an essential ingredient;

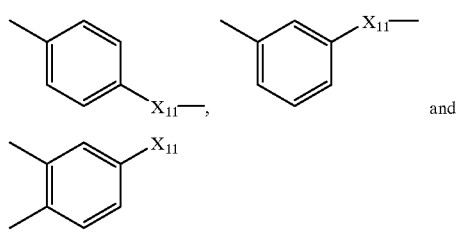

wherein R' is hydrogen atom or methyl group, R is straight or branched alkylene group with 1 to 3 carbon atoms, which may be substituted by F, CF$_3$ or CF$_3$O, X$_{11}$ is a single bond or —O— and is bound to ring A and combinations of these binding groups which may be of the same groups or different groups with the proviso that both of X$_1$ in the monomer represented by formula (1) are not a single bond at the same time; Y$_1$ is a binding group selected from the group consisting of single bond, —O—, —S—, —NR'—, —SO$_2$—, —COO—, —OCO—, —CONR'—, —NR'CO—, —X$_{11}$—R—X$_{11}$—,

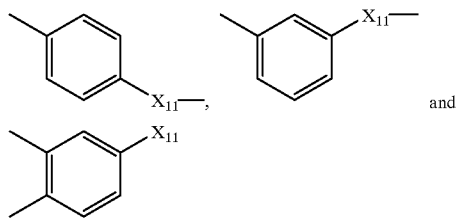

wherein R' is hydrogen atom or methyl group, R is straight or branched alkylene group with 1 to 3 carbon atoms, which may be substituted by F, CF$_3$, CF$_3$O or OH, X$_{11}$ is a single bond or —O— and combinations of these binding groups which may be of the same groups or different groups; and Z$_1$ is a polymerization-active group.

2. A low-birefringent organic optical component as claimed in claim 1, wherein a racemic mixture of the monomer with an asymmetric spiro ring is represented by any of the general formulas (2) to (4);

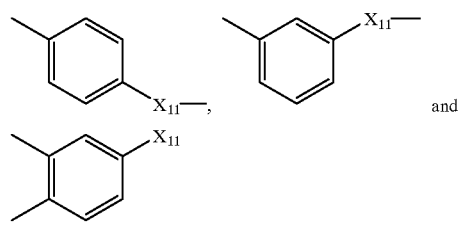

wherein R' is hydrogen atom or methyl group, R is straight or branched alkylene group with 1 to 3 carbon atoms, which may be substituted by F, CF$_3$ or CF$_3$O, X$_{11}$ is a single bond or —O— and is bound to ring A and combinations of these binding groups which may be of the same groups or different groups with the proviso that both of X$_2$ in the monomer represented by formula (1) are not a single bond at the same time; Y$_2$ is a binding group selected from the group consisting of single bond, —O—, —S—, —NR'—, —SO$_2$—, —COO—, —OCO—, —CONR'—, —NR'CO—, —X$_{11}$—R—X$_{11}$—,

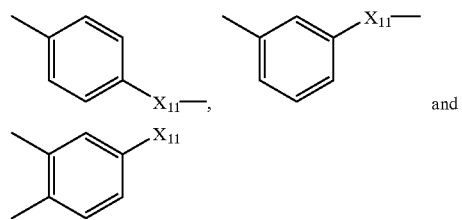

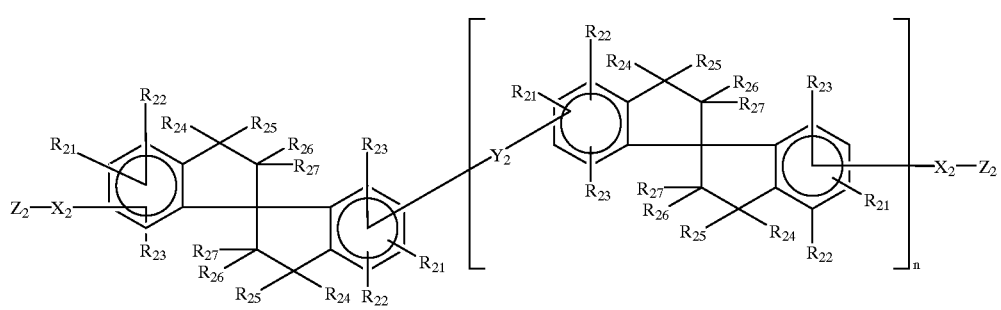

(2)

wherein R$_{21}$, R$_{22}$, R$_{23}$, R$_{24}$, R$_{25}$, R$_{26}$ and R$_{27}$ are independently a hydrogen atom, a halogen atom, an alkyl group, an alkoxy group or trifluoromethyl group; n is an integer of 0 to 10; X$_2$ is binding group independently selected from the group consisting of a single bond, —O—, —S— —NR'—, —SO$_2$—, —COO—, —OCO—, —CONR'—, —NR'CO—, —X$_{11}$—R—X$_{11}$—, wherein R' is hydrogen atom or methyl group, R is straight or branched alkylene group with 1 to 3 carbon atoms, which may be substituted by F, CF$_3$, CF$_3$O or OH, X$_{11}$ is a single bond or —O— and combinations of these binding groups which may be of the same groups or different groups; and Z$_2$ is a polymerization-active group;

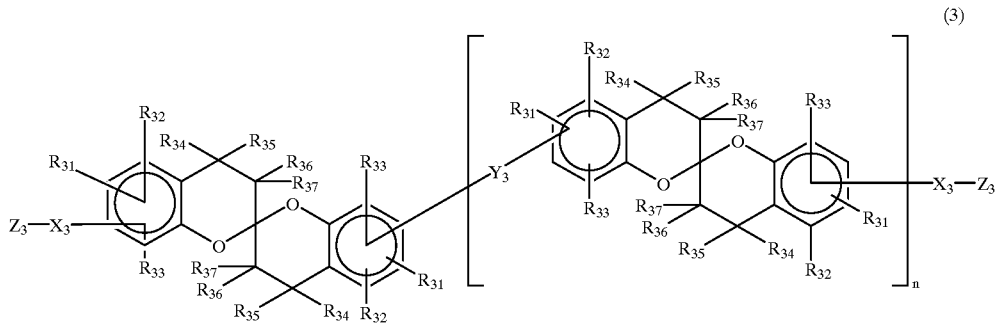

(3)

wherein $R_{31}$, $R_{32}$, $R_{33}$, $R_{34}$, $R_{35}$, $R_{36}$ and $R_{37}$ are independently a hydrogen atom, a halogen atom, an alkyl group, an alkoxy group or trifluoromethyl group; n is an integer of 0 to 10; $X_3$ is binding group independently selected from the group consisting of a single bond, —O—, —S— —NR'—, —SO$_2$—, —COO—, —OCO—, —CONR'—, —NR'CO—, —$X_{11}$—R—$X_{11}$—,

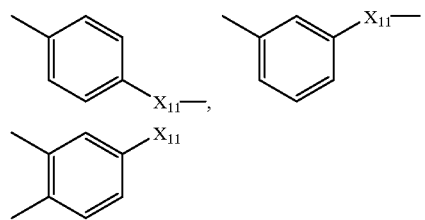

wherein R' is hydrogen atom or methyl group, R is straight or branched alkylene group with 1 to 3 carbon atoms, which may be substituted by F, CF$_3$ or CF$_3$O, $X_{11}$ is a single bond or —O— and is bound to ring A and combinations of these binding groups which may be of the same groups or different groups with the proviso that both of $X_3$ in the monomer represented by formula (1) are not a single bond at the same time; $Y_3$ is a binding group selected from the group consisting of single bond, —O—, —S—, —NR'—, —SO$_2$—, —COO—, —OCO—, —CONR'—, —NR'CO—, —$X_{11}$—R—$X_{11}$—,

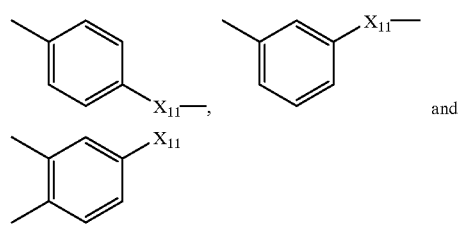

wherein R' is hydrogen atom or methyl group, R is straight or branched alkylene group with 1 to 3 carbon atoms, which may be substituted by F, CF$_3$, CF$_3$O or OH, $X_{11}$ is a single bond or —O— and combinations of these binding groups which may be of the same groups or different groups; and $Z_3$ is a polymerization-active group;

(4)

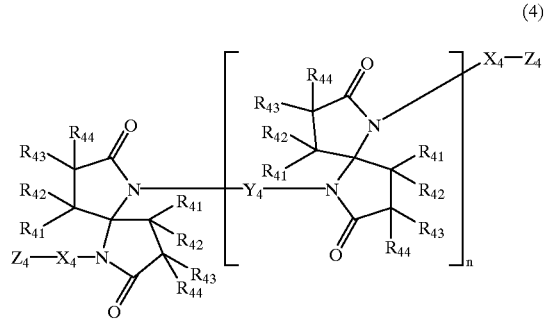

wherein $R_{41}$, $R_{42}$, $R_{43}$ and $R_{44}$ are independently a hydrogen atom, a halogen atom, an alkyl group, an alkoxy group or trifluoromethyl group; n is an integer of 0 to 10; $X_4$ is binding group independently selected from the group consisting of a single bond, —O—, —S—, —NR'—, —SO$_2$—, —COO—, —OCO—, —CONR'—, —NR'CO—, —$X_{11}$—R—$X_{11}$—,

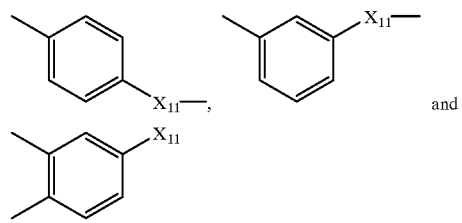

wherein R' is hydrogen atom or methyl group, R is straight or branched alkylene group with 1 to 3 carbon atoms, which may be substituted by F, CF$_3$ or CF$_3$O, $X_{11}$ is a single bond or —O— and is bound to ring A and combinations of these binding groups which may be of the same groups or different groups with the proviso that both of $X_4$ in the monomer represented by formula (1) are not a single bond at the same time; $Y_4$ is a binding group selected from the group consisting of single bond, —O—, —S—, —NR'—, —SO$_2$—, —COO—, —OCO—, —CONR'—, —NR'CO—, —$X_{11}$—R—$X_{11}$—,

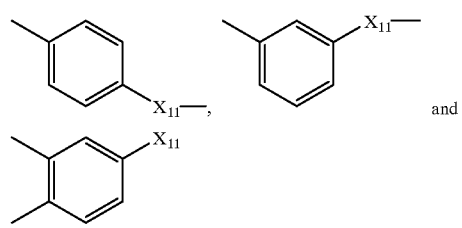

wherein R' is hydrogen atom or methyl group, R is straight or branched alkylene group with 1 to 3 carbon atoms, which may be substituted by F, $CF_3$, $CF_3O$ or OH, $X_{11}$ is a single bond or —O— and combinations of these binding groups which may be of the same groups or different groups; and $Z_4$ is a polymerization-active group.

3. A low-birefringent organic optical component as claimed in claim 2, wherein the polymer prepared by polymerizing the racemic mixture of a monomer represented by general formula (2) as an essential ingredient is any of the following (i) to (xi);

(i) a polycarbonate comprising a structural unit derived from the dihydroxy compound represented by formula (5);

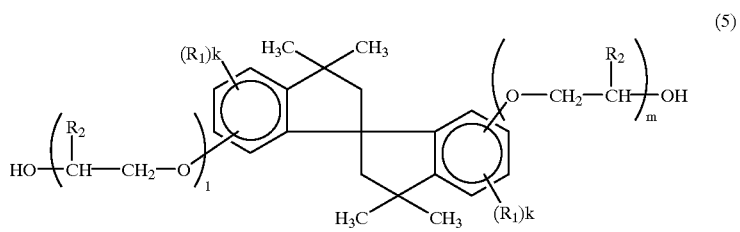

(5)

wherein $R_1$ represents an optionally substituted straight, branched or cyclic alkyl group, an optionally substituted straight, branched or cyclic alkoxy group, nitro group, or a halogen atom; $R_2$ is independently hydrogen atom or methyl group; k is an integer of 0 to 3; l and m are independently an integer of 0 to 20; and l+m is not zero;

(ii) a polymer prepared by polymerizing the acrylate compound represented by formula (6);

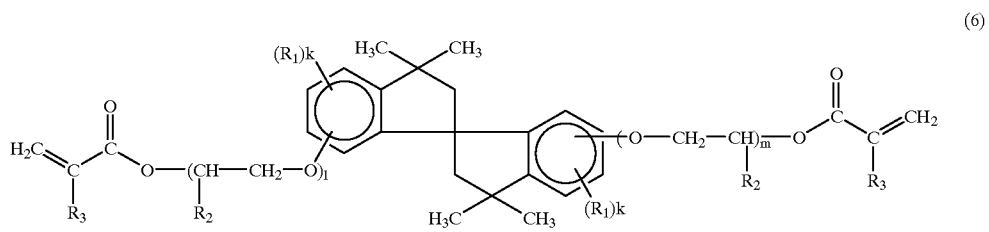

(6)

wherein $R_1$, $R_2$, k, l and m are as defined above, $R_3$ is independently hydrogen atom or methyl group; and l+m may be zero;

(iii) a polyester comprising the structural unit represented by formula (7);

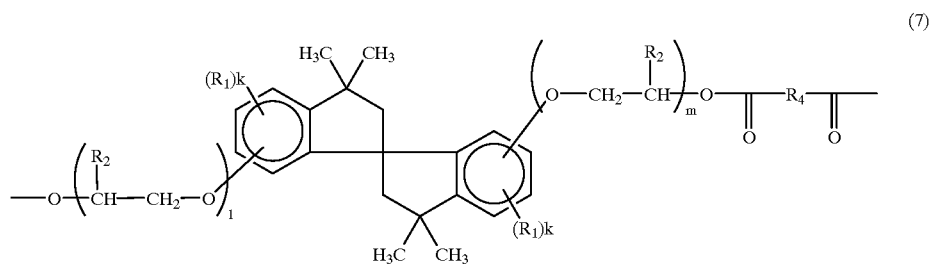

(7)

wherein $R_1$, $R_2$, k, l and m are as defined above, $R_4$ is an alkylene, aralkylene or arylene group; and l+m is not zero;

(iv) a polyurethane comprising the structural unit represented by formula (8);

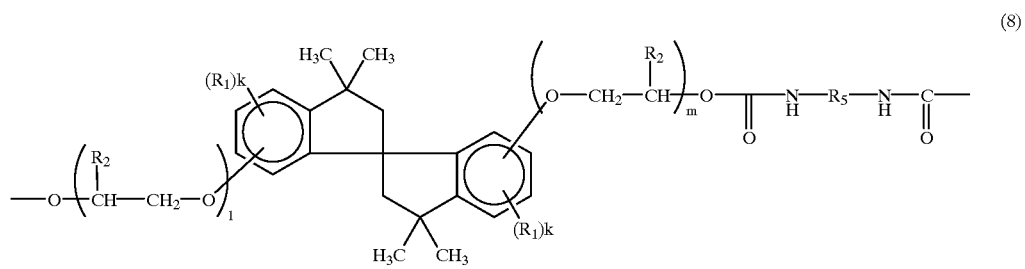

(8)

wherein $R_1$, $R_2$, k, l and m are as defined above, $R_5$ is a bivalent organic group; and l+m is not zero;

(v) a polymer prepared by polymerizing the epoxy compound represented by formula (9);

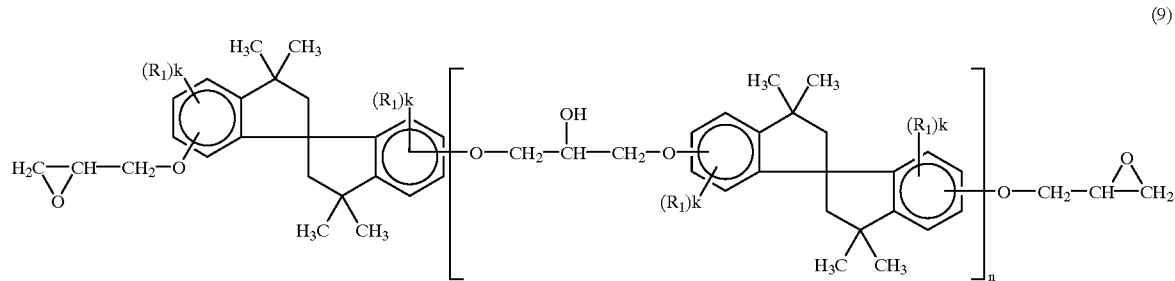

(9)

wherein $R_1$ and k are as defined above; n is an integer of 0 to 10;

(vi) a polymer prepared by polymerizing the epoxy acrylate compound represented by formula (10);

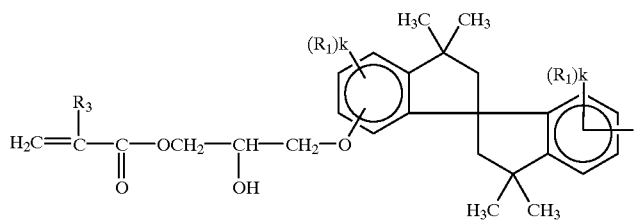
(10)

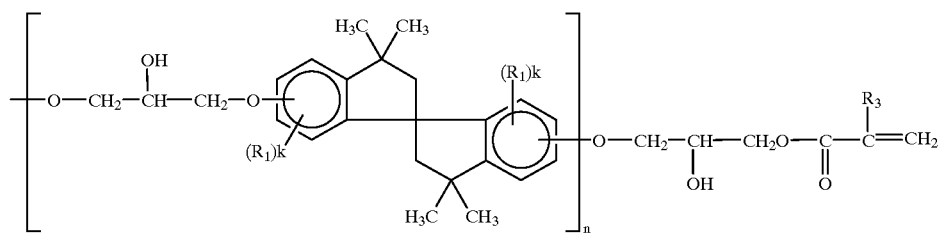

wherein $R_1$, $R_3$, k and n are as defined above;

(vii) a polymer prepared by polymerizing an acid-modified epoxy acrylate compound which is obtained by reaction of the epoxyacrylate compound represented by formula (10) with a carboxylic acid or its anhydride;

(viii) a polymer prepared by polymerizing the vinyl ether compound represented by formula (11);

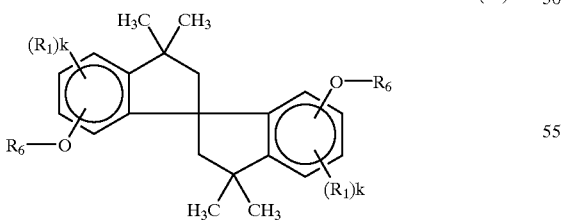
(11)

wherein $R_1$ and k are as defined above; $R_6$ is hydrogen atom or $CH_2$=CH—O—$R_7$— group wherein $R_7$ represents an alkylene group with 1 to 12 carbons or 2-hydroxytrimethylene group; two $R_6$s may be the same or different although they are not simultaneously hydrogen atom;

(x) a polyimide resin comprising the structural unit represented by formula (13);

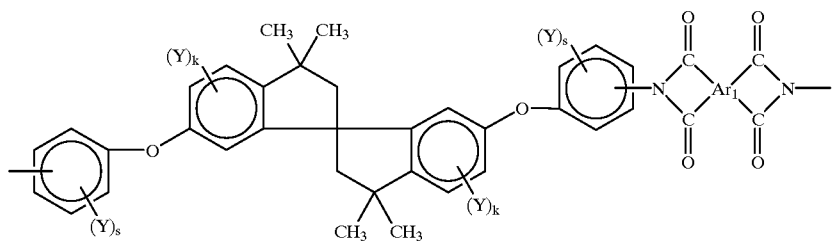
(13)

wherein Y is a monovalent group selected from an alkyl or alkoxy group with 1 to 3 carbons; phenyl, phenoxy, benzyl or naphthyl group; or the group represented by general formula (a) or (b);

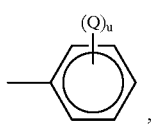
(a)

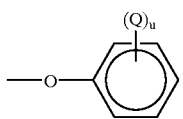
(b)

wherein Q is a monovalent group selected from a halogen atom, an alkyl or alkoxy group with 1 to 3 carbons, or the group represented by an halogenated or alkoxy group wherein hydrogen atoms are partially or completely substituted by halogen atoms; Q may be the same or different; u is an integer of 0 to 5;

Y may be the same or different; k and s are as defined above; Ar$_1$ is a tetravalent group represented by formula (c), (d) or (e);

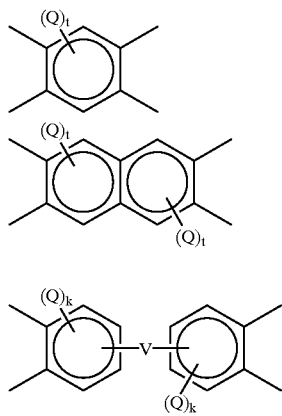

(c)

(d)

(e)

wherein Q and k are as defined above; t is an integer of 0 to 2; V is a bivalent group selected from a direct bond, —CO—, —S—, —O—, —SO$_2$—, —CH$_2$—, —C(CH$_3$)$_2$—, —C(CF$_3$)$_2$— or the group represented by general formula (f) or (g);

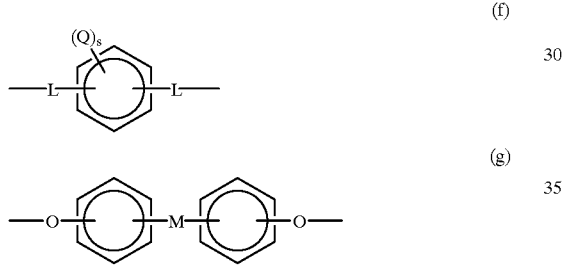

(f)

(g)

wherein Q and s are as defined above; L is a bivalent group selected from a direct bond, —CO—, —S— or —O—; M is a bivalent group selected from a direct bond, —CO—, —S—, —O—, —SO$_2$—, —CH$_2$—, —C(CH$_3$)$_2$— or —C(CF$_3$)$_2$—;

(xi) a polyamide resin comprising the structural unit represented by formula (14);

wherein Y, k and s are as defined above; Ar$_2$ is a bivalent group represented by formula (h), (i) or (j);

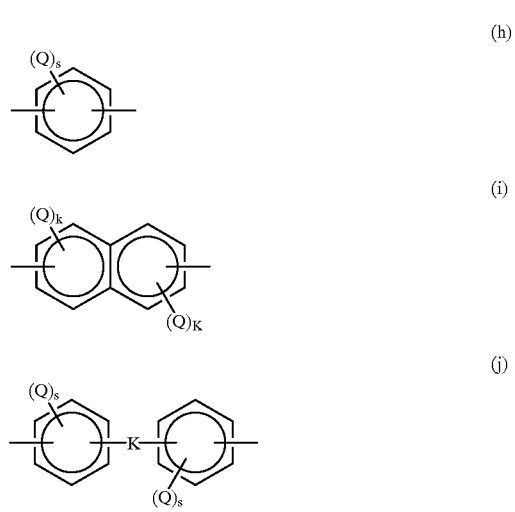

(h)

(i)

(j)

wherein Q, k and s areas defined above; K is a bivalent group selected from a direct bond, —CO—, —S—, —O—, —SO$_2$—, —CH$_2$—, —C(CH$_3$)$_2$—, —C(CF$_3$)$_2$—, or the group represented by formula (f), (g), (k) or (l);

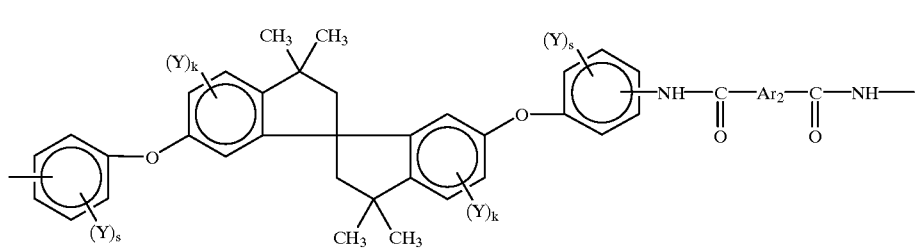

(14)

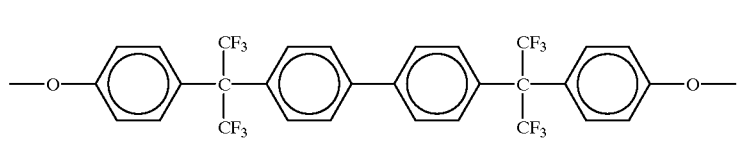
(k)

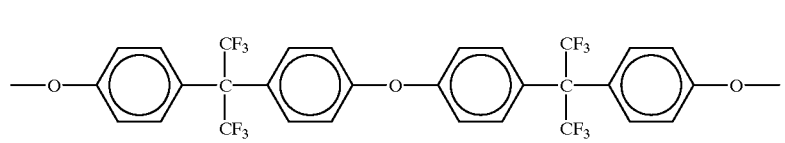
(l)

4. A polycarbonate comprising a structural unit derived from the dihydroxy compound represented by formula (5);

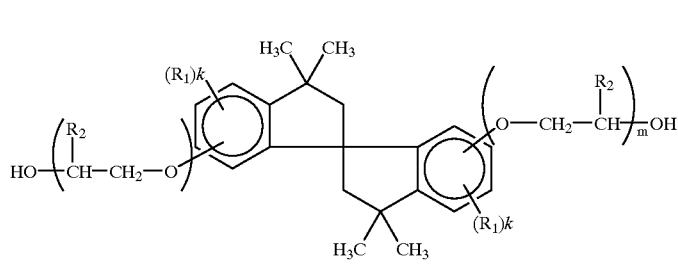
(5)

wherein $R_1$ represents an optionally substituted straight, branched or cyclic alkyl group, an optionally substituted straight, branched or cyclic alkoxy group, nitro group, or a halogen atom; $R_2$ is independently hydrogen atom or methyl group; k is an integer of 0 to 3; l and m are independently an integer of 0 to 20; and l+m is not zero.

5. An acrylate compound represented by formula (6);

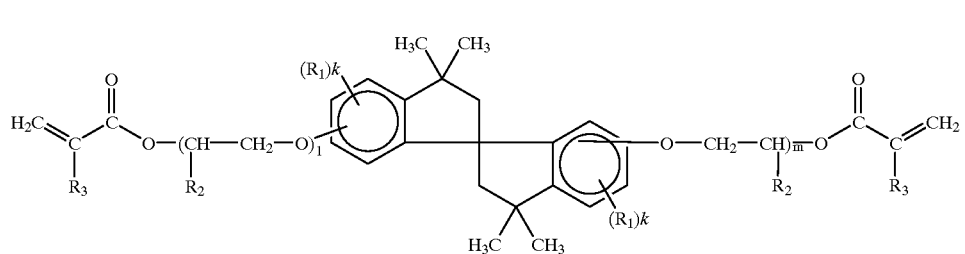
(6)

wherein $R_1$ represents an optionally substituted straight, branched or cyclic alkyl group, an optionally substituted straight, branched or cyclic alkoxy group, nitro group, or a halogen atom; $R_2$ is independently hydrogen atom or methyl group; $R_3$ is independently hydrogen atom or methyl group; k is an integer of 0 to 3; l and m are independently an integer of 0 to 20; and l+m may be zero.

6. A polyester comprising the structural unit represented by formula (7);

(7)

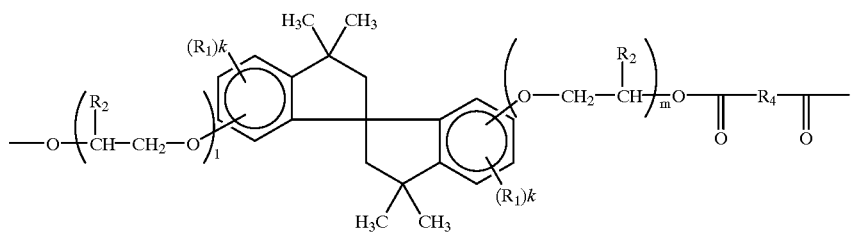

wherein $R_1$ represents an optionally substituted straight, branched or cyclic alkyl group, an optionally substituted straight, branched or cyclic alkoxy group, nitro group, or a halogen atom; $R_2$ is independently hydrogen atom or methyl group; $R_4$ is an alkylene, aralkylene or arylene group; k is an integer of 0 to 3; l and m are independently an integer of 0 to 20; and l+m is not zero.

7. A polyurethane comprising the structural unit represented by formula (8);

(8)

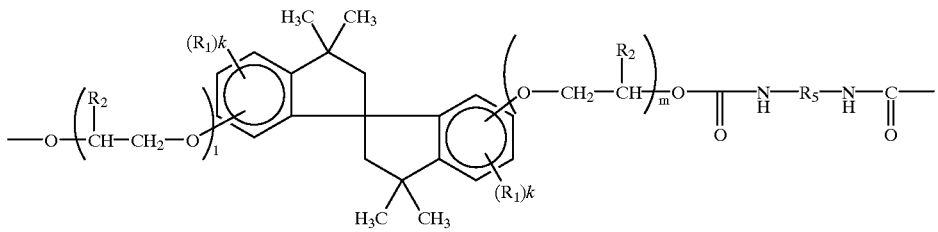

wherein $R_1$ represents an optionally substituted straight, branched or cyclic alkyl group, an optionally substituted straight, branched or cyclic alkoxy group, nitro group, or a halogen atom; $R_2$ is independently hydrogen atom or methyl group; $R_5$ is a bivalent organic group; k is an integer of 0 to 3; l and m are independently an integer of 0 to 20; and l+m is not 0.

8. A vinyl ether compound represented by formula (11);

(11)

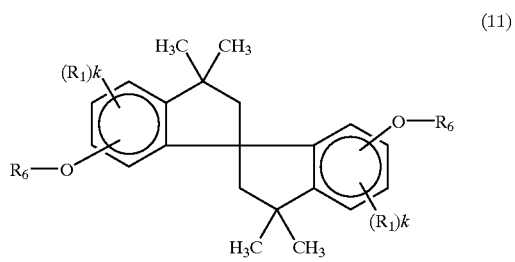

wherein $R_1$ represents an optionally substituted straight, branched or cyclic alkyl group, an optionally substituted straight, branched or cyclic alkoxy group, nitro group, or a halogen atom; $R_6$ is a hydrogen atom or $CH_2$=CH—O—$R_7$-group wherein $R_7$ represents an alkylene group with 1 to 12 carbons or 2-hydroxytrimethylene group; two $R_6$s may be the same as or different although they are not simultaneously hydrogen atom; and k is an integer of 0 to 3.

9. A copolymeric polycarbonate comprising the structural unit represented by formula (12);

(12)

wherein $R_1$ represents an optionally substituted straight, branched or cyclic alkyl group, an optionally substituted straight, branched or cyclic alkoxy group, nitro group, or a halogen atom; $R_2$ is independently hydrogen atom or methyl group; $R_8$ is an alkyl group; k is an integer of 0 to 3; l and m are independently an integer of 0 to 20; q and r are independently an integer of 0 to 20; and s is an integer of 0 to 4.

10. A fluorine-containing polyimide comprising the structural unit represented by formula (15);

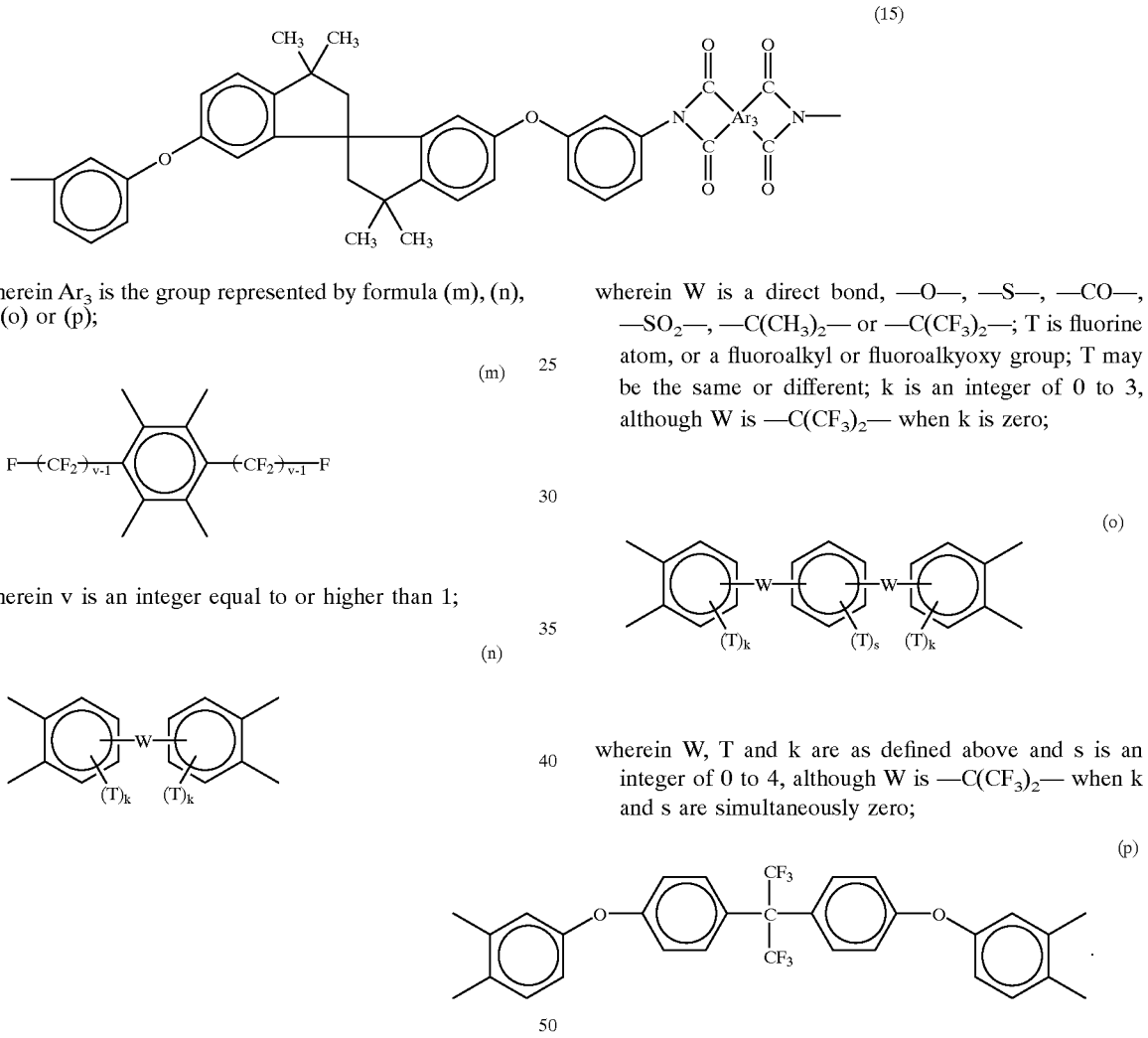

wherein $Ar_3$ is the group represented by formula (m), (n), (o) or (p);

wherein v is an integer equal to or higher than 1;

wherein W is a direct bond, —O—, —S—, —CO—, —$SO_2$—, —$C(CH_3)_2$— or —$C(CF_3)_2$—; T is fluorine atom, or a fluoroalkyl or fluoroalkyoxy group; T may be the same or different; k is an integer of 0 to 3, although W is —$C(CF_3)_2$— when k is zero;

wherein W, T and k are as defined above and s is an integer of 0 to 4, although W is —$C(CF_3)_2$— when k and s are simultaneously zero;

11. A polyimide comprising the structural unit represented by formula (16);

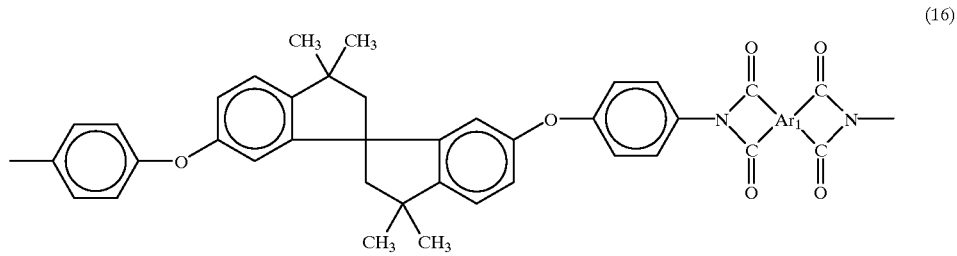

wherein $Ar_4$ is a tetravalent group selected from the group consisting of a monocyclic aromatic group represented by general formula (q), a fused polycyclic aromatic group represented by general formula (r) and a non-fused polycyclic aromatic group wherein the aromatic rings represented by general formula (s) is mutually linked directly or via a crosslinking member;

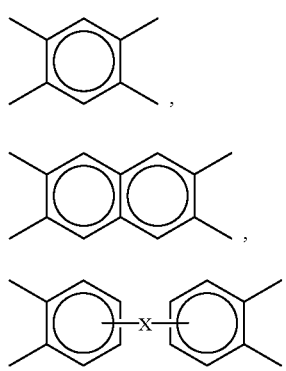
(q)

(r)

(s)

wherein X is a bivalent group selected from a direct bond, —CO—, —O—, —S—, —SO$_2$—, —CH$_2$—, —C(CH$_3$)$_2$—, —C(CF$_3$)$_2$—, or the group represented by formula (t), (u) or (v);

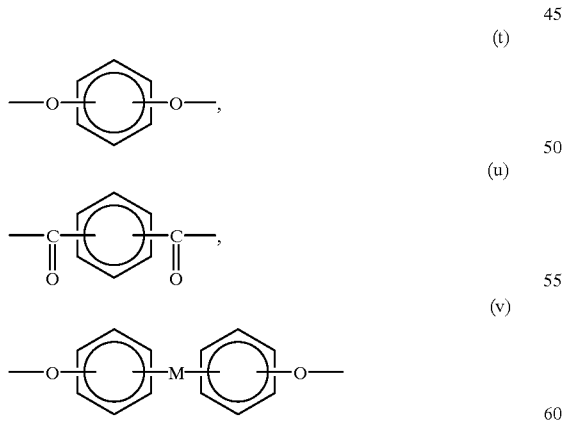
(t)

(u)

(v)

wherein M is a direct bond, —CO—, —O—, —S—, —SO$_2$—, —CH$_2$—, —C(CH$_3$)$_2$— or —C(CF$_3$)$_2$—.

12. A polyimide as claimed in claim 11, whose molecular end has an unsubstituted aromatic ring or an aromatic ring substituted by a group or groups inert to an amine or a dicarboxylic anhydride.

13. A polyimide with a logarithmic viscosity of at least 0.01 dL/g and up to 3.00 dL/g, comprising the structural unit represented by formula (17);

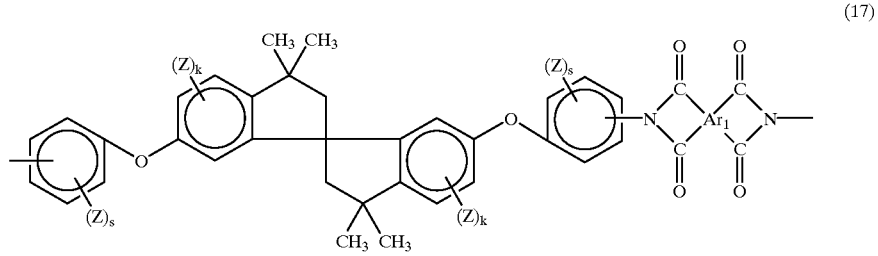
(17)

wherein Z is a monvalent group selected from an alkyl or alkoxy group with 1 to 3 carbons; phenyl, phenoxy, benzyl or naphthyl group; or the group represented by general formula (a), (b) or (w);

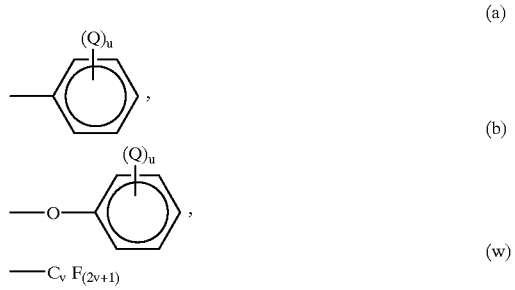
(a)

(b)

(w)

wherein Q is a monvalent group selected from a halogen atom, an alkyl or alkoxy group with 1 to 3 carbons, or the group represented by an halogenated or alkoxy group wherein hydrogen atoms are partially or completely substituted by halogen atoms; Q may be the same or different; u is an integer of 0 to 5, and v is an integer of 0 to 4;

$Ar_1$ is a tetravalent group represented by formula (c), (d) or (e);

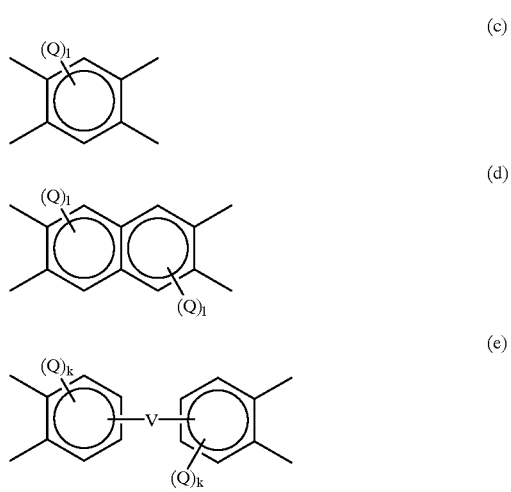
(c)

(d)

(e)

wherein Q and k are as defined above; k is an integer of 0 to 3 and s is an integer of 0 to 4, although the total of k and s is at least 1.

14. A polyimide as claimed in claim 13, whose polymer end is protected with a monoamine and/or a dicarboxylic anhydride.

15. A polyamide with a logarithmic viscosity of at least 0.01 dL/g up to 3.00 dL/g, comprising the structural unit represented by formula (18);

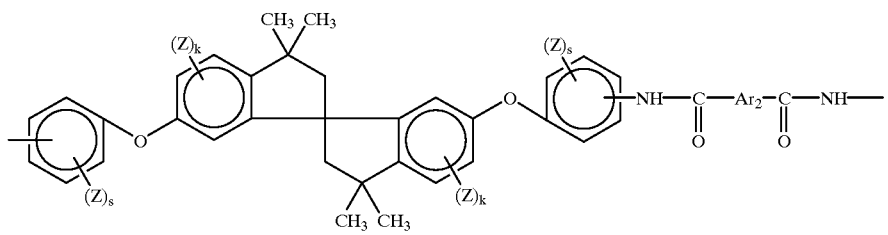
(18)

wherein $Ar_2$ is a bivalent group represented by formula (h), (i) or (j);

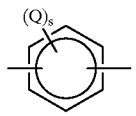
(h)

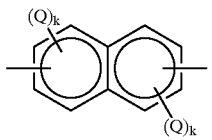
(i)

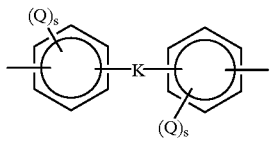
(j)

wherein Q is a monvalent group selected from a halogen atom, an alkyl or alkoxy group with 1 to 3 carbons, or the group represented by a halogenated or alkoxy group wherein hydrogen atoms are partially or completely substituted by halogen atoms; Q may be the same or different; k is an integer of 0 to 3 and s is an integer of 0 to 4 although the total of k and s is at least 1; K is a bivalent group selected from a direct bond, —CO—, —S—, —SO$_2$—, —CH$_2$—, —C(CH$_3$)$_2$—, —C(CF$_3$)$_2$— or the group represented by formula (f), (g), (k) or (l);

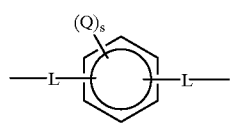
(f)

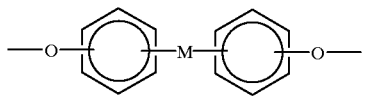
(g)

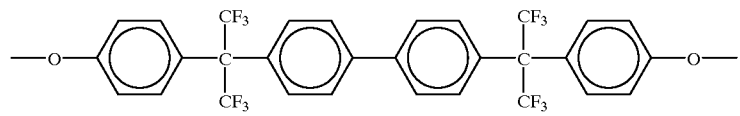
(k)

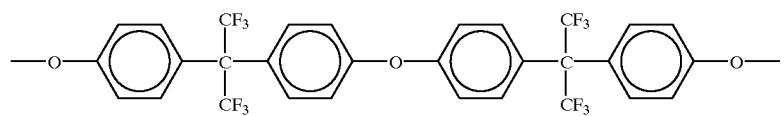
(l)

wherein Q and s are defined above, L is a bivalent group selected from a direct bond, —CO—, —S— or —O—; M is bivalent group selected from a direct bond, —CO—, —S—, —O—, —SO$_2$—, —CH$_2$—, —C(CH$_3$)$_2$— or —C(CF$_3$)$_2$—; and Z is a monvalent group selected from an alkyl or alkoxy group with 1 to 3 carbons; phenyl, phenoxy, benzyl or naphthyl group; or the group represented by general formula (a), (b) or (w);

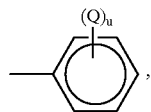 (a)

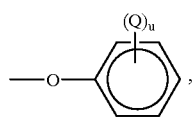 (b)

 (w)

wherein Q is defined above; u is an integer of 0 to 5; and v is an integer of 0 to 4.

16. A polyamide as claimed in claim 15, whose polymer end is protected with a monoamine and/or a dicarboxylic anhydride.

17. A curable resin composition comprising the acrylate as claimed in claim 5.

18. A photosensitive resin composition comprising the vinyl ether as claimed in claim 8.

19. A polyimide resin composition comprising 100 parts by weight of the polyimide as claimed in claim 12, and 5 to 70 parts by weight of a fibrous reinforcing agent selected from the group consisting of carbon, glass, aromatic polyamide and potassium titanate fibers.

20. A polyimide as claimed in claim 10, whose molecular end has an unsubstituted aromatic ring or an aromatic ring substituted by a group or groups inert to an amine or a dicarboxylic anhydride.

21. A polyimide resin composition comprising 100 parts by weight of the polyimide as claimed in claim 20, and 5 to 70 parts by weight of a fibrous reinforcing agent selected from the group consisting of carbon, glass, aromatic polyamide and potassium titanate fibers.

22. A polyimide resin composition comprising 100 parts by weight of the polyimide as claimed in claim 11, and 5 to 70 parts by weight of a fibrous reinforcing agent selected from the group consisting of carbon, glass, aromatic polyamide and potassium titanate fibers.

23. A polyimide resin composition comprising 100 parts by weight of the polyimide as claimed in claim 10, and 5 to 70 parts by weight of a fibrous reinforcing agent selected from the group consisting of carbon, glass, aromatic polyamide and potassium titanate fibers.

24. A low-birefringent organic optical component comprising the copolymeric polycarbonate as claimed in claim 9.

* * * * *